US011198820B2

(12) United States Patent
Lin et al.

(10) Patent No.: US 11,198,820 B2
(45) Date of Patent: Dec. 14, 2021

(54) CONVERSION PROCESS FOR AN ORGANIC MATERIAL

(71) Applicant: BEIJING SANJU ENVIRONMENTAL PROTECTION & NEW MATERIALS CO., LTD, Beijing (CN)

(72) Inventors: Ke Lin, Beijing (CN); Lixin Guo, Beijing (CN); Yongjun Cui, Beijing (CN); Shengfeng Li, Beijing (CN); Dongmei Cui, Beijing (CN)

(*) Notice: Subject to any disclaimer, the term of this patent is extended or adjusted under 35 U.S.C. 154(b) by 115 days.

(21) Appl. No.: 16/427,218

(22) Filed: May 30, 2019

(65) Prior Publication Data

US 2019/0330536 A1  Oct. 31, 2019

Related U.S. Application Data

(63) Continuation of application No. PCT/CN2018/122669, filed on Dec. 21, 2018.

(30) Foreign Application Priority Data

Apr. 28, 2018 (CN) .......................... 201810402049.8
Apr. 28, 2018 (CN) .......................... 201810404744.8
(Continued)

(51) Int. Cl.
*C10G 1/00* (2006.01)
*C10J 3/72* (2006.01)
(Continued)

(52) U.S. Cl.
CPC ............ *C10G 1/002* (2013.01); *B01J 23/745* (2013.01); *C10G 1/06* (2013.01); *C10G 2/33* (2013.01);
(Continued)

(58) Field of Classification Search
CPC .......... C10G 1/002; C10G 1/06; C10G 45/40; C10G 45/36; C10G 45/52; C10G 45/48;
(Continued)

(56) References Cited

U.S. PATENT DOCUMENTS 8,101,383 B2 * 1/2012 Henriksen ................ C12P 3/00
435/72
2011/0232166 A1  9/2011 Kocal
(Continued)

FOREIGN PATENT DOCUMENTS

CA    1195639 A    10/1985
CA    1294236 C    1/1992
(Continued)

OTHER PUBLICATIONS

Second Office Action of Chinese Application No. 2018114570136.
(Continued)

*Primary Examiner* — Thuan D Dang
(74) *Attorney, Agent, or Firm* — W&KIP

(57) ABSTRACT

Provided is a conversion process for an organic oil, relating to the field of biomass utilization, energy and chemical industry. The conversion process is carried out in presence of an aqueous slurry and a catalyst selected from the group consisting of an iron oxide compound, a waste agent resulting from use of an iron oxide compound as desulfurizer, and a regeneration product of the waste agent, under a controlled molar ratio of iron element to sulfur element. It is found that free radical condensation polymerization of organic oil during cracking process can be blocked effectively by using carbonylation, and hydrogenation is achieved with active hydrogen produced from the conversion of CO and water. In the conversion process, organic material, especially biomass
(Continued)

solid, can be directly converted without dehydration, and water can be additionally added to the biomass liquid or the mineral oil.

56 Claims, 3 Drawing Sheets

(30) Foreign Application Priority Data

| Sep. 19, 2018 | (CN) | .................. | 201811092022.X |
| Nov. 30, 2018 | (CN) | .................. | 201811457013.6 |
| Nov. 30, 2018 | (CN) | .................. | 201811457149.7 |
| Nov. 30, 2018 | (CN) | .................. | 201811457176.4 |
| Nov. 30, 2018 | (CN) | .................. | 201811457583.5 |
| Dec. 4, 2018 | (CN) | .................. | 201811474905.7 |
| Dec. 4, 2018 | (CN) | .................. | 201811476072.8 |

(51) Int. Cl.

| *C10G 1/06* | (2006.01) |
| *C10G 45/40* | (2006.01) |
| *C10G 45/36* | (2006.01) |
| *C10G 45/52* | (2006.01) |
| *C10G 45/48* | (2006.01) |
| *C10G 2/00* | (2006.01) |
| *B01J 23/745* | (2006.01) |
| *C10G 45/54* | (2006.01) |

(52) U.S. Cl.
CPC ............. *C10G 45/36* (2013.01); *C10G 45/40* (2013.01); *C10G 45/48* (2013.01); *C10G 45/52* (2013.01); *C10G 45/54* (2013.01); *C10J 3/72* (2013.01); *C10G 2300/1014* (2013.01); *C10G 2300/1022* (2013.01); *C10G 2300/1074* (2013.01); *C10J 2300/1659* (2013.01)

(58) Field of Classification Search
CPC .. C10G 2/33; C10G 45/54; C10G 2300/1014; C10G 2300/1022; C10G 2300/1074; C10J 3/72; C10J 2300/1659; B01J 23/745; B01J 35/023; B01J 2523/00; Y02E 50/30
See application file for complete search history.

(56) References Cited

U.S. PATENT DOCUMENTS

| 2013/0149767 A1 | 6/2013 | Marion et al. |
| 2019/0359892 A1 | 11/2019 | Lin et al. |

FOREIGN PATENT DOCUMENTS

| CA | 106929048 A | 7/2017 |
| CN | 101805629 A | 8/2010 |
| CN | 102382683 A | 3/2012 |
| CN | 103265967 A | 8/2013 |
| CN | 103980921 A | 8/2014 |
| CN | 103990458 A | 8/2014 |
| CN | 103992823 A | 8/2014 |
| CN | 104927948 A | 9/2015 |
| CN | 105018125 A | 11/2015 |
| CN | 105419867 A | 3/2016 |
| CN | 106147817 A | 11/2016 |
| CN | 106268826 A | 1/2017 |
| CN | 106281394 A | 1/2017 |
| CN | 106929048 A | 7/2017 |
| CN | 108165290 A | 6/2018 |
| CN | 108219817 A | 6/2018 |
| CN | 108277036 A | 7/2018 |
| CN | 101805629 A | 8/2018 |
| WO | 2010053989 A1 | 5/2010 |

OTHER PUBLICATIONS

First Office Action of Chinese Application No. 2018114571497.
First Office Action of Chinese Application No. 2018114571764.
Second Office Action of Chinese Application No. 2018114575835.
European Search Report of European Application No. 18916677.0.
Office Action of CN201811457013.6, dated Aug. 20, 2019.
Office Action of CN201811457583.5, dated Sep. 2, 2019.
Research progress and prospects of biomass solidification briquetting technology, Engineering Sciences 2011 vol. 13 Stage 2 p. 73.
International Search Report of PCT/CN2018/122669, dated Mar. 28, 2018.
International Written Opinion From ISA of PCT/CN2018/122669, dated Mar. 28, 2018.
Office Action of CN201811092022.X, dated Jul. 11, 2019.
Office Action of EP18916677.0, dated Sep. 8, 2020.
Office Action of CN201811457149.7, dated Sep. 8, 2020.
Office Action of CN201811474905.7 dated Apr. 25, 2021.
Office Action of EP18916677.0 dated Apr. 21, 2021.
Office Action of CN201811476072.8 dated Mar. 4, 2020.
Office Action of CN201811476072.8 dated Jul. 23, 2021.

\* cited by examiner

CONVERSION PROCESS FOR AN ORGANIC MATERIAL

CROSS-REFERENCE TO RELATED APPLICATIONS

This application is a continuation of International Patent Application No. PCT/CN2018/122669 with an international filing date of Dec. 21, 2018, designating the United States, now pending, and further claims priority benefits to Chinese Patent Application No. 201810404744.8, filed Apr. 28, 2018, Chinese Patent Application No. 201810402049.8, filed Apr. 28, 2018, Chinese Patent Application No. 201811092022.X, filed Sep. 19, 2018, Chinese Patent Application No. 201811457013.6, filed Nov. 30, 2018, Chinese Patent Application No. 201811457176.4, filed Nov. 30, 2018, Chinese Patent Application No. 201811457149.7, filed Nov. 30, 2018, Chinese Patent Application No. 201811457583.5, filed Nov. 30, 2018, Chinese Patent Application No. 201811476072.8, filed Dec. 4, 2018, Chinese Patent Application No. 201811474905.7, filed Dec. 4, 2018. The contents of all of the aforementioned applications, including any intervening amendments thereto, are incorporated herein by reference.

TECHNICAL FIELD

The present invention relates to the field of biomass utilization, energy and chemical industry, and more particularly to a conversion process for an organic material.

BACKGROUND

With rapid development of social economy, non-renewable fossil energy sources such as coals, crude oils, natural gases and oil shales are running out. At the same time, environmental pollution caused by pollutants such as $CO_2$, $SO_2$, $NO_x$ produced by burning such non-renewable fossil energy sources also becomes increasingly serious, forcing humans to think about ways to obtain energy and ways to improve environment.

At present, biomass liquefaction technology has become a new means of obtaining energy. This technology is an important part of biomass resource utilization. The liquefaction mechanism is as follows: biomass is first cleaved into oligomers, and then subjected to dehydration, dehydroxylation, dehydrogenation, deoxygenation and decarboxylation to form a small molecule compound, which is then subjected to reactions such as condensation, cyclization, polymerization, etc. to form a new compound. The biomass liquefaction technology mainly comprises two kinds, i.e., indirect liquefaction and direct liquefaction, wherein the direct liquefaction comprises directly liquefying the biomass from a solid to a liquid by methods such as hydrolysis and supercritical liquefaction or by introducing hydrogen, inert gas, etc. under the action of a solvent or a catalyst at proper temperature and pressure. During this process, pyrolysis liquefaction, catalytic liquefaction and pressurized hydroliquefaction are involved.

In the above-mentioned biomass liquefaction processes, the biomass raw materials need to be dehydrated prior to liquefaction, thereby increasing the drying cost, and even if the biomass raw materials are dry, a large amount of waste water will be generated after the process is completed. Furthermore, the above liquefaction process has strict requirements for reaction atmospheres and catalysts, and generally requires pure hydrogen atmosphere and noble metal catalyst, so is less economical. In addition, oils obtained in the above liquefaction process have low calorific value.

SUMMARY OF THE INVENTION

The present invention is designed to overcome the defects that biomass material needs to be dehydrated and strict requirements for reaction atmospheres and catalysts, low calorific value of the ails and large amount of waste water generated in the prior biomass liquefaction process, and further to provide a conversion process for an organic material adopting CO as reaction atmosphere, wherein, the biomass raw materials do not need to be dehydrated. The resulted oils have high calorific value, and waste water production is low, even without waste water.

For this purpose, the above-mentioned object of the present invention is achieved by the following technical solutions:

The present invention provides a conversion process for an organic material, comprising the following steps:
preparing a first slurry that comprises a catalyst and an organic material, wherein the catalyst is at least one selected from the group consisting of an iron oxide compound, a desulfurization waste agent resulting from use of an iron oxide compound as desulfurizer, and a regeneration product of the desulfurization waste agent, and wherein the first slurry comprises water; and
carrying out a first conversion reaction by mixing the first slurry with a pure CO gas or a CO containing gas and keeping a molar ratio of iron element to sulfur element of 1:(0.5-5) in a reaction system, thereby obtaining a first conversion product.

Preferably, a sulfur-containing substance is added to the catalyst to control the reaction system to have a molar ratio of iron element to sulfur element of 1:(0.5-5), preferably 1:(0.5-2), and more preferably 1:(1-2).

Preferably, the sulfur-containing substance is at least one selected from the group consisting of sulfur, hydrogen sulfide, and carbon disulfide.

Preferably, the water comprised in the first slurry comes from water inherently contained in the organic material, and based on a total weight of the organic material, water accounts for 500 ppm to 20%, preferably 2% to 10%; or, the water comprised in the first slurry comes from adding of outside water.

Preferably, the CO containing gas has a CO volume content of no less than 15%, preferably no less than 50%, and most preferably no less than 90%. Preferably, the CO containing gas is a gas mixture of CO and $H_2$ or a synthesis gas.

Preferably, the desulfurization waste agent is at least one selected from the group consisting of a waste agent resulting from use of a desulfurizer comprising iron oxide as an active component, a waste agent resulting from use of a desulfurizer comprising $Fe_{21.333}O_{32}$ as an active component, and a waste agent resulting from use of a desulfurizer comprising FeOOH as an active component; or the regeneration product is at least one selected from the group consisting of a regeneration product of a desulfurization waste agent of a desulfurizer comprising iron oxide as an active component, a regeneration product of a desulfurization waste agent of a desulfurizer comprising $Fe_{21.333}O_{32}$ as an active component, and a regeneration product of a desulfurization waste agent of a desulfurizer comprising FeOOH as an active component.

Preferably, the iron oxide is $Fe_2O_3$ and/or $Fe_3O_4$.

Preferably, the $Fe_2O_3$ is at least one selected from the group consisting of $\alpha$-$Fe_2O_3$, $\alpha$-$Fe_2O_3.H_2O$, $\gamma$-$Fe_2O_3$, $\gamma$-$Fe_2O_3.H_2O$, amorphous $Fe_2O_3$, and amorphous $Fe_2O_3.H_2O$; the $Fe_3O_4$ is of cubic crystal system; and the FeOOH is at least one selected from the group consisting of $\alpha$-FeOOH, $\beta$-FeOOH, $\gamma$-FeOOH, $\delta$-FeOOH, $\theta$-FeOOH, and amorphous FeOOH.

Preferably, the regeneration product is obtained with a slurry method by subjecting the desulfurization waste agent to oxidation, vulcanization and oxidation. Preferably, the slurry method comprises the following steps:

preparing a second slurry by mixing the desulfurization waste agent with water or an alkali solution;

carrying out a first oxidation reaction by adding an oxidizing agent to the second slurry to obtain an oxidized slurry;

carrying out a vulcanization reaction by adding a vulcanizing agent to the oxidized slurry to obtain a vulcanized slurry;

carrying out a second oxidation reaction by adding an oxidizing agent to the vulcanized slurry, repeating the vulcanization reaction and the second oxidation reaction to obtain a final slurry, and subjecting the final slurry to solid-liquid separation to obtain the regeneration product.

Preferably, the first conversion reaction is carried out at a reaction pressure of 5-22 MPa and a reaction temperature of 100-470 OC.

Preferably, the first conversion reaction has a reaction time of no less than 15 min, preferably 15-120 min.

Preferably, the catalyst is present in an amount of 0.1 to 10% by weight in the first slurry; and the catalyst has an average particle diameter of from 0.1 μm to 5 mm, preferably from 5 μm to 100 μm, and most preferably from 5 μm to 50 μm.

Preferably, said carrying out a first conversion reaction by mixing the first slurry with a pure CO gas or a CO containing gas comprises the following steps: pressurizing and heating a pure CO gas or CO containing gas to a pressure of 5-22 MPa and a temperature of 150-600 OC, then mixing with the first slurry in a reaction system to carry out a first conversion reaction.

Preferably, said carrying out the first conversion reaction by mixing the first slurry with a pure CO gas or a CO containing gas comprises the following steps:

pressurizing and heating a partial of the pure CO gas or CO containing gas to a pressure of 5-22 MPa and a temperature of 150-600° C., then mixing with the first slurry in a reaction system to carry out a first conversion reaction, and pressurizing and heating the remaining pure CO gas or CO containing gas to a pressure of 5-22 MPa and a temperature of 300-600° C., then mixing with the first slurry in a reaction system to carry out a first conversion reaction.

Preferably, a volume ratio of the pure CO gas or CO containing gas to the first slurry is (50-10000):1, preferably (100-5000):1.

Preferably, the reaction system is carried out in a reactor, which is selected from the group consisting of a suspended bed reactor, a slurry bed reactor, a bubbling column reactor, a fluidized bed reactor, a one-batch reactor; or the reactor is any one or more of a suspended bed reactor, a slurry bed reactor, a bubbling bed reactor, a fluidized bed reactor, and a one-batch reactor connected in series or in parallel.

Preferably, the conversion process further comprises pressurizing and heating the first slurry at a pressure of 5 Mpa-22 Mpa, and a temperature of 50-430° C. prior to the first conversion reaction.

Preferably, the CO-containing gas is obtained by gasifying a hydrocarbon. Preferably, the gasifying is carried out at a temperature of 350-1600° C. and a pressure of 1-20 MPa, and the hydrocarbon is at least one selected from the group consisting of coal, mineral oil, coke, biomass, a bio-regenerine oil, natural gas, methane, biogas, methanol, and ethanol.

Preferably, the conversion process further comprises carrying out a second conversion reaction by mixing the first conversion product with a pure CO or a CO containing gas and keeping a molar ratio of iron element to sulfur element of 1:(0.5-5) in a reaction system, thereby obtaining a second oil product.

Preferably, the second conversion reaction has a reaction pressure of 5-22 MPa and a reaction temperature of 100-470° C.

Preferably, the first conversion reaction has a reaction temperature of 100-350° C., the second conversion reaction has a reaction temperature of 300-470° C., and the reaction temperature of the first conversion reaction is lower than the reaction temperature of the second conversion reaction.

Preferably, the first conversion reaction has a reaction time of no less than 15 min, preferably 15-120 min, and most preferably 15-60 min; and the second conversion reaction has a reaction time of no less than 15 min, preferably 15-120 min, and most preferably 15-60 min.

Preferably, after carrying out the first conversion reaction and before carrying out the second conversion reaction, the first conversion product is subjected to separation to obtain a light oil and a heavy oil; and a further amount of the catalyst and/or a hydrogenation catalyst is added to the first conversion product.

Preferably, the hydrogenation catalyst is composed of a carrier and an active component loaded thereon, and the active component is loaded in an amount of 0.5-15% based on the total weight of the hydrogenation catalyst; and the active component is selected from the group consisting of Mo oxide, Mn oxide, W oxide, Fe oxide, Co oxide, Ni oxide, Pd oxide, and any combination thereof, and the carrier is selected from the group consisting of silica, alumina, zeolite, molecular sieve, and any combination thereof.

Preferably, when the organic material is biomass, said preparing the first slurry comprises the following steps:

pretreatment of raw materials: collecting and pulverizing a biomass to a particle size of 0.2 μm to 5 cm;

compression: compressing and molding the pulverized biomass;

second pulverization: pulverizing the compressed biomass again to a particle size of 0.1 μm to 500 μm, thereby obtaining a biomass powder;

slurry preparation: mixing the biomass powder with a flowing medium to obtain a mixed slurry, wherein the biomass powder is present in an amount of 10 to 60% by weight in the mixed slurry; and;

adding the catalyst in any of the above steps.

Preferably, the compressed biomass has a true density of between 0.75 and 1.5 kg/m³.

Preferably, the compression step has a compression pressure of 0.5-5 MPa and a compression temperature of 30-60° C.

Preferably, the catalyst is present in an amount of 0.1 to 10% by weight in the first slurry.

Preferably, the first slurry is prepared by grinding pulping, which is stirring pulping, dispersing pulping, emulsifying pulping, shearing pulping, homogeneous pulping and colloid grinder pulping.

Preferably, the biomass is selected from the group consisting of a crop straw, a wood chip, an oil residue, a leaf, an algae, and any combination thereof, and the flowing medium is an oil or water, wherein the oil is selected from the group consisting of hogwash oil, rancid oil, waste lubricating oil, waste engine oil, heavy oil, residual oil, washing oil, anthracene oil, and any combination thereof.

Preferably, the conversion process further comprises subjecting the second oil product to a first separation operation to produce a light component and a heavy component;
  carrying out vacuum distillation on the heavy component to obtain a light fraction;
  mixing the light component with the light fraction to form a mixture, carrying out a hydrogenation reaction on the mixture to obtain a hydrogenation product; and
  subjecting the hydrogenation product to fractionation operation to obtain a light oil.

Preferably, the vacuum distillation is carried out at a temperature of 320-400° C. under a pressure of 5-20 kPa.

Preferably, the hydrogenation reaction is carried out under following conditions:
  a reaction temperature of 300-440° C.;
  a reaction pressure of 6-25 MPa;
  a hydrogen/oil volume ratio of 1000-3000; and
  a space velocity of 0.3-2 $h^{-1}$.

Preferably, the fractionation operation is carried out at a temperature of 340-390° C.

Preferably, the conversion process further comprises a step of collecting a partial distillate oil obtained by the vacuum distillation and a heavy fraction obtained by the fractionation operation, and using the partial distillate oil and the heavy fraction as a pore filling oil and/or a solvent oil.

Preferably, before subjecting the hydrogenation product to fractionation operation, the hydrogenation product is subjected to a second separation operation to obtain hydrogen gas, a gas-phase light hydrocarbon and a liquid phase, wherein the hydrogen gas is circulated and used in the hydrogenation reaction.

Preferably, the hydrogenation catalyst comprises at least one selected from the group consisting of
  1) amorphous iron oxide and/or amorphous iron oxide hydroxide; and
  2) amorphous aluminum oxide loading an active component, wherein the active component comprises at least one selected from the group consisting of oxides of metals of group VIB, group VIIB and group VIII, and the active component has a content of 10 wt % to 25 wt %.

Preferably, the conversion process further comprises carrying out a second conversion reaction by mixing the first conversion product with hydrogen and keeping a molar ratio of iron element to sulfur element of 1:(0.5-5) in a reaction system, thereby obtaining a second oil product.

Preferably, both the first conversion reaction and the second conversion reaction have a reaction pressure of 5-22 MPa and a reaction temperature of 100-470° C.

Preferably, the first conversion reaction has a reaction temperature of 100-400° C., and the second conversion reaction has a reaction temperature of 300-470° C.

Preferably, the first conversion reaction has a reaction time of no less than 15 min, preferably 15-120 min, and most preferably 15-60 min; and the second conversion reaction has a reaction time of no less than 15 min, preferably 15-120 min, and most preferably 15-60 min.

Preferably, a further amount of the catalyst and/or a hydrogenation catalyst is added to the first conversion product.

Preferably, the hydrogenation catalyst is composed of a carrier and an active component loaded thereon, and the active component is loaded in an amount of 0.5-15% based on the total weight of the hydrogenation catalyst. Preferably, the active component is selected from the group consisting of oxides of Mo, Mn, W, Fe, Co, Ni, Pd, and any combination thereof; and the carrier is at least one selected from the group consisting of silica, alumina, zeolite, and molecular sieve.

Preferably, after the first conversion reaction and before the second conversion reaction, the first conversion product is subjected to a separation operation to produce a light oil and a heavy oil.

Preferably, the conversion process further comprises subjecting the second oil product to a first separation operation to produce a light component and a heavy component;
  carrying out vacuum distillation on the heavy component to obtain a light fraction;
  mixing the light component with the light fraction to form a mixture, carrying out a hydrogenation reaction on the mixture to obtain a hydrogenation product; and
  subjecting the hydrogenation product to fractionation operation to obtain a light oil.

Preferably, the hydrogenation reaction is carried out under the following conditions:
  a reaction temperature of 300-450° C.;
  a reaction pressure of 5-26 MPa;
  a hydrogen/oil volume ratio of 1000-3000; and
  a space velocity of 0.3-2 $h^{-1}$.

Preferably, the fractionation operation is carried out at a temperature of 300-400° C.

Preferably, the conversion process further comprises a step of collecting a partial distillate oil obtained by the vacuum distillation and a heavy fraction obtained by the fractionation operation, and adding the partial distillate oil and the heavy fraction to a first hydrogenation reaction.

Preferably, before the hydrogenation product is subjected to fractionation operation, the hydrogenation product is subjected to a second separation operation to obtain hydrogen gas, a gas-phase light hydrocarbon and a liquid phase, wherein the hydrogen gas is circulated and used in the second conversion reaction and the hydrogenation reaction.

Preferably, when the organic material is biomass or coal, the conversion process further comprises preparing an aqueous slurry comprising a catalyst, coal and biomass according to the following steps:
  pretreatment of biomass: collecting and pulverizing a biomass to a particle size of 0.2 μm to 5 cm;
  compression of biomass: compressing and molding the pulverized biomass;
  second pulverization of biomass: pulverizing the compressed biomass again to a particle size of 0.1-500 μm, thereby obtaining a biomass powder;
  pulverizing the coal to a particle size of 0.1-500 μm, thereby obtaining a coal powder;
  mixing the biomass powder and the coal powder with a solvent oil to obtain the aqueous slurry,
  wherein, the catalyst is added in any of the above steps.

Preferably, the first conversion reaction is carried out at a reaction pressure of 5-22 MPa and a reaction temperature of 200-500° C. Preferably, the first conversion reaction has a reaction time of no less than 15 min, preferably 15-120 min.

Preferably, the compressed biomass has a true density of between 0.75 and 2.0 kg/m$^3$; the compression step has a compression pressure of 0.5-10 MPa and a compression temperature of 30-70° C.; the biomass powder has an amount of 5-99% by weight based on the total mass of the biomass powder and the coal power; and/or the catalyst is present in an amount of 0.1-8% by weight in the aqueous slurry; and/or the biomass powder and the coal power are present in an amount of 10-60% by weight and the water is present in an amount of 1-18% in the aqueous slurry.

Preferably, the aqueous slurry is prepared by grinding pulping, which is stirring pulping, dispersing pulping, emulsifying pulping, shearing pulping, homogeneous pulping and colloid grinder pulping; and the grinding pulping lasts for 8-60 min.

The biomass is selected from the group consisting of a crop straw, a wood chip, an oil residue, a leaf kitchen waste, feces, animal carcasses, an algae, and any combination thereof; The solvent oil is a distillate oil from an animal oil, vegetable oil or petroleum, or is a coal tar or an oil produced by self-processing.

In addition, the organic material is at least one selected from the group consisting of a biomass solid, a biomass liquid, and a mineral oil.

The biomass solid is at least one selected from the group consisting of crop straw, wood, kitchen waste, feces, and carcass; and the biomass liquid is animal and vegetable oil or oil residue.

Preferably, when the organic material is a biomass solid, another slurry preparation method is provided, comprising the following steps: subjecting the organic material to a first pulverization, compression and a second pulverization sequentially, and then mixing with the catalyst to obtain a mixture, and adding the mixture to a solvent to obtain a slurry having an organic content of 10 to 60% by weight.

Preferably, the organic material obtained by the first pulverization and compression has a bulk density of no less than 0.4 g/cm$^3$, preferably no less than 0.8 g/cm$^3$, and more preferably no less than 1 g/cm$^3$.

The organic material after the second pulverization has an average particle size of no more than 5 mm, preferably no more than 1 mm, and more preferably no more than 500 pin, no more than 300 µm, no more than 60 µm, no more than 50 µm, no more than 5 µm, or no more than 1 µm.

Preferably, the compression is carried out under a pressure of 0.5 to 3 MPa and a temperature of 30 to 60° C.

Preferably, the solvent is water and/or oil.

Preferably, the solvent has an oil content of no less than 20% by weight, preferably no less than 50% by weight, most preferably no less than 80% by weight;

Preferably, the oil is selected form the group consisting of animal and vegetable oil, mineral oil, distillate oil, the above oil product, and any combination thereof.

In addition, in a specific embodiment, a conversion process of solid biomass is provided, comprising the following steps:
preparing a first slurry that comprises a catalyst and a biomass, comprising the following steps: subjecting the solid biomass to a first pulverization, compression granulation, and a second pulverization to obtain a biomass powder; mixing and wet milling the catalyst with a first solvent oil to obtain a catalyst-containing premixed slurry which has a catalyst content of 1 to 30% by weight, wherein the catalyst is at least one selected from the group consisting of an iron oxide compound, a desulfurization waste agent of an iron oxide compound or a regeneration product of a desulfurization waste agent of an iron oxide compound, and kneading or mixing under stirring the biomass powder, a second solvent oil and the catalyst-containing premixed slurry under vacuum, thereby obtaining a first slurry comprising a catalyst and a biomass with a biomass content of 5 to 60 wt % by weight and a water content of 0.1 to 20 wt % by weight;

pressurizing and heating the first slurry that comprises a catalyst and a biomass, and mixing the pressurized and heated slurry with a CO-containing gas in the reactor for carrying out a first conversion reaction at a pressure of 5-22 MPa and a temperature of 300-470° C., during which a molar ratio of iron element to sulfur element is controlled at 1:(0.5-5) in a reaction system, thereby obtaining a first reaction product;

subjecting the first reaction product to separation to obtain a biomass light oil at a temperature of less than or equal to 360° C., and a biomass heavy oil at a temperature of more than 360° C.

Preferably, the solid biomass is at least one selected form the group of a plant stem, a fruit, a shell, an agricultural wood, animal feces, a food solid waste, and at least one selected from the group consisting of a plant product or a waste rich in cellulose, hemicellulose, lignin or waste; and/or both the first solvent oil and the second solvent oil are at least one selected form the group of an animal and vegetable oil, a mineral ail, a distillate, a residual oil, a coal tar or at least one selected form the group of the oils obtained in the conversion of process solid biomass.

Preferably, the water comprised in the first slurry comprising a catalyst and a biomass comes from water inherently contained in the solid biomass material itself, the catalyst, or the solvent oil, or comes from adding of external water.

Preferably, the first conversion reaction has a reaction pressure of 5-22 MPa, and a reaction temperature of 300-470° C.

Preferably, the first conversion reaction has a reaction time of from 15 to 200 min, preferably from 30 to 120 min.

Preferably, the biomass after the first pulverization has an particle diameter of 0.1 to 5 cm; and/or the particle obtained by the compression granulation has a diameter of 2 to 50 mm, a length of 3 to 100 mm, and an apparent density of no less than 0.4 g/cm$^3$, preferably no less than 0.8 g/cm$^3$, and a water content of no more than 15%, preferably no more than 10%; and/or the biomass powder has a particle size of no more than 5 mm, preferably no more than 200 µm, and the second pulverization comprises at least one-stage pulverization.

Preferably, when the biomass powder, the second solvent oil and the catalyst-containing premixed slurry are sequentially mixed through a premixer and a stirring tank, a vacuum system is adopted to maintain the premixer and the stirring tank to have a vacuum degree of 1-95 kpa and a temperature of 20-200° C.

Preferably, the catalyst is present in an amount of 0.1 to 10 wt % by weight in the first slurry that comprises a catalyst and a biomass; and the catalyst has an average particle diameter of from 0.1 µm to 500 µm, preferably from 5 to 50 µm.

Preferably, the first pulverization and the second pulverization are carried out by, but not limited to, the following methods: hammer mill pulverization, roll pulverization, ball-milling pulverization, rod-miling pulverization, air jet pulverization and ultra-fine pulverization. The wet grinding is carried out by, but not limited to, the following methods: colloid mill, homogenous grinding, high-shear emulsifier.

Preferably, the first slurry comprising a catalyst and a biomass is subjected to pressurization and heating, and the resulted pressurized and heated slurry is mixed with a CO-containing gas to carry out the first conversion reaction in a reactor, comprising the following steps:
  dividing the CO-containing gas into a first part and a second part,
  pressurizing the first part to 5-22 MPa, and introducing into the first slurry comprising a catalyst and a biomass, and then heating to a temperature of 150-450° C. through heat transfer or heating, then introducing into a three-phase high-returned slurry bed reactor to carry out first conversion reaction including biomass cracking, carbonylation, conversion and hydrogenation; and
  pressurizing and heating the second part to a pressure of 5-22 MPa and a temperature of 300-600° C., and introducing into a three-phase high-returned reactor to mix with the first slurry that has already entered the reactor to carry out conversion reactions including biomass cracking, carbonylation, conversion and hydrogenation.

Preferably, a volume ratio of the CO-containing gas to the first slurry that comprises a catalyst and a biomass is (600-10000):1.

Preferably, the reactor is a three-phase high-returned slurry bed reactor, which is a cold wall reactor or a hot wall reactor, preferably a cold wall reactor. The cold wall reactor is insulated with refractory bricks or refractory castables.

Preferably, said pressurized and heated slurry comprising a catalyst and a biomass is introduced into a reactor from the bottom thereof to carry out a first conversion reaction, and the resulted reaction product is discharged out from the top of the reactor and is introduced to a hot high pressure separator to carry out gas-liquid-solid separation. A hot high pressure liquid is collected at the bottom of the hot high pressure separator and is depressurized by a pressure reducing system and then fed into a hot low pressure separator to separate and remove hydrogen and other light components dissolved therein, and then sent to a second separation system to obtain a gas, a biomass heavy oil and a solid residue.

A part of the biomass heavy oil is discharged out as a product, and the remaining is mixed with the first solvent oil and/or the first solvent oil and fed into a buffer tank for refining.

Preferably, the hot high pressure separator is operated at a pressure of 5-22 MPa and a temperature of 300-420° C.; and the hot low pressure separator is operated at a pressure of 0.3-2.5 MPa and a temperature of 280-390° C.

Preferably, a hot high pressure gas is collected from the top of the hot high-pressure separator and is sent into a cooling system, and is then sent into a first separation system to obtain a gas and a biomass light oil. A cold high pressure gas coming from the top of the first separation system is sent to a circulating gas compression system for pressurizing. The pressurized circulating gas is fed into the reactor from the side wall thereof and/or is mixed with the CO containing gas for recycling.

Preferably, the material outlet of the cooling system is controlled at a pressure of 5-22 MPa and a temperature of 50-200° C.

Preferably, the pressure reducing system comprises a high pressure three-way angle valve, two high pressure cut-off angle valves, two high pressure modulating pressure reducing angle valves, two high pressure cut-off straight-through valves, and connecting lines between the above four kinds of valves disposed on the pipeline. The inlet pipeline of the high pressure three-way angle valve is connected with the bottom pipeline of the hot high pressure separator; the outlet of the high pressure three-way angle valve is divided into two pipelines, and each line is respectively connected with an inlet pipeline of a high pressure cut-off angle valve; the outlet pipeline of the high pressure cut-off angle valve is connected to an inlet pipeline of the high pressure modulating pressure reducing angle valve, and the outlet pipeline of the high pressure modulating pressure reducing angle valve is connected with an inlet pipeline of the high pressure cut-off straight-through valve, and the outlet lines of the high pressure shut-off valve are connected to a hot low pressure separator respectively.

In addition, in the present invention, the first separation system is a conventional separation device composed of a heat exchanger, a heating furnace, and a fractionation column. The second separation system is a conventional atmospheric distillation separation system or a vacuum distillation separation system consisting of a fractionation column and a heat exchanger. The cooling system is composed of a heat exchanger and an air cooler.

The technical solution of the present invention has the following advantages:

1. The conversion process for an organic material provided by the present invention is carried out in the presence of an aqueous slurry and a catalyst which is at least one selected from the group consisting of an iron oxide compound, a desulfurization waste agent resulting from use of an iron oxide compound as desulfurizer, and a regeneration product of the desulfurization waste agent, under a controlled molar ratio of iron element to sulfur element in a reaction system. It is found that free radical condensation polymerization of the organic material during the cracking process can be blocked effectively due to carbonylation in the presence of CO, and hydrogenation is achieved with active hydrogen produced from the conversion of CO and water. In the conversion reaction, the organic material, especially a biomass solid, can be directly converted without dehydration, and water can be additionally added to the biomass liquid or the mineral oil, thereby increasing liquefaction yield and calorific value of the obtained oils. Besides, no large amount of waste water is generated after completion of the conversion reaction.

2. Further, in the conversion process for an organic material of the present invention, the desulfurization waste agent is at least one selected from the group consisting of a waste agent of a desulfurizer comprising iron oxide as an active component, a waste agent of a desulfurizer comprising $Fe_{21.333}O_{32}$ as an active component and a waste agent of a desulfurizer comprising FeOOH as an active component; and the regeneration product is at least one selected from the group consisting of a regeneration product of a desulfurization waste agent of a desulfurizer comprising iron oxide as an active component, a regeneration product of a desulfurization waste agent of a desulfurizer comprising $Fe_{21.333}O_{32}$ as an active component, and a regeneration product of a desulfurization waste agent of a desulfurizer comprising FeOOH as an active component. By incorporating an appropriate amount of sulfur in the above catalysts, it is found that under CO atmosphere these catalysts firstly combine with CO to form a carbonyl compound which then grafts carbon atoms to a small molecule active site formed by thermal cracking of the organic material (such as a biomass). At the same time, CO shift occurs under the catalytic action of iron and sulfur elements, producing hydrogen in-situ, thereby realizing catalytic hydrodeoxidation to reduce oxygen content in the oil products. In this way, the liquefaction yield of the solid organic material and the conversion yield of oils from long molecular chains to small molecules are greatly improved.

The regeneration product of a desulfurization waste agent resulting from use of an iron oxide compound as desulfriizer is obtained by a slurry process comprising subjecting an iron oxide compound alternately to vulcanization and oxidation regeneration. Furthermore, by repeating vulcanization and oxidation for many times, iron oxide compound and iron sulphide compound undergo crystal phase reconstruction and conversion. Since $S^{2-}$ ionic radius (0.18 nm) is greater than $O^{2-}$ ionic radius (0.14 nm), the crystal cells of iron oxide compound undergo shrinkage and expansion along with the conversion between Fe—O bond and Fe—S bond, as a result, stable crystalline particles of the iron oxide compound become loose and crack, producing a large amount of nano-iron compounds which are well-philophilic and easily vulcanized. At the same time, the surface of the nano-iron compound is covered with a non-polar elemental sulfur layer, which can not only prevent from agglomeration and growth of the nano-iron compound particles, thus greatly improving the dispersibility thereof, but also can ensure highly dispersion of the nano-iron compounds in non-polar oils based on the principle of similar mutual solubility. Furthermore, nano-iron compounds covered with sulfur have the following advantages: sulfur and iron are closely linked and the nano-iron compound itself has a smaller particle size, so sulfur can react with nano-iron compounds at low temperature to form pyrrhotite ($Fe_{1-x}S$) having hydrogenation activity for inferior heavy oils. Finally, the regeneration product obtained by this method has small particle size, good lipophilicity, and a sheet like nanostructure. Sheets in the nanostructure are separated from each other by adsorbed sulfur, thereby avoiding agglomeration thereof greatly improving the adsorption capacity for CO and enhancing the abilities of carbonylation, hydrogen production through shift and catalytic hydrogenation.

3. In the conversion process for an organic material of the present invention, the solid biomass is subjected to a first pulverization, compression and a second pulverization sequentially, and then mixed with the catalyst to obtain a mixture which is then added to a solvent and ground to obtain a slurry having an organic content of 10 to 60% by weight. The present invention firstly adopts a treatment process of subjecting the biomass solid firstly to compression and then to a second pulverization. Through compression, the loose biomass solid is subjected successively to stages of re-displacement and mechanical deformation such as collapse and closure, etc., which greatly reduces the volume of the biomass solid, thereby reducing the porosity of the biomass and increasing its density and specific gravity, which is beneficial to disperse the biomass in the oil and can increase its content in the oil, thereby increasing the concentration of the reaction material. The slurry can has a solid content as high as 10~60 wt %. Meanwhile, the increase of the biomass solid concentration in the slurry will also increase the amount of biomass solids delivered by the pump per unit time, thereby increasing the efficiency of the entire liquefaction process, reducing industrial costs and energy consumption. In addition, the increase in the specific gravity of the biomass solids is also conducive to the suspension and dispersion of biomass solids in the slurry, thereby reducing the viscosity of the slurry, achieving smooth flow of the slurry in the pipeline, avoiding clogging of the pipeline, achieving smooth operation and transportation of the pump, and also making it possible to use high viscosity waste oils such as waste engine oil, waste oil, and rancid oil that cannot be used as a liquefied solvent in the prior art.

4. In the conversion process for an organic material of the present invention, the biomass has a bulk density of no less than 0.4 $g/cm^3$ after treatment of a first pulverization and compression, and has a particle size of no more than 5 mm after second pulverization, so it is convenient to add the biomass to a solvent to prepare the slurry by grinding, and the solid content in the slurry is increased.

By compressing the biomass at temperature of 30-60° C., it can significantly enhance the rheology of the biomass solids and reduce the viscosity of the slurry, thereby achieving smooth flow of slurry in the pipeline and avoiding clogging of the pipeline, achieving smooth operation and transportation of the pump.

5. In the conversion process for an organic material of the present invention, reaction raw materials and a CO containing gas are transported to a reactor, where reactions including cracking, carbonylation, shift, hydrogenation and so on occur in the presence of suitable catalyst under appropriate temperature, pressure, and gas-liquid ratio. Further, by using a slurry bed reactor, the reaction raw materials are firstly fed to the slurry bed reactor through the bottom thereof, and at the same time, a CO containing gas is injected into the reactor to react with the raw materials. In this way, based on difference in specific gravity of gas, liquid and solid materials in the reactor along with change of specific gravity difference caused by the yield of light oil products, differential control of the flow velocity of each phase is realized, so that the biomass solid raw materials in the reactor undergo cracking, carbonylation, shift, hydrogenation, and reaction from bottom to top. In this process, even though the biomass solid and catalyst solid particles which have a large specific gravity rise with gas and light oils, they return to the bottom and participate in the reaction again under the action of the CO containing gas in the upper. In the reaction, by appropriately adjusting the amount of the CO containing gas injected to the reactor according to the density of materials in the upper, middle and lower portions of the reactor, circulation of the unconverted organic material in the reactor and balanced discharge of the catalysts are achieved, thereby ensuring all kinds of reactions are sufficiently carried out, which is beneficial to improve the conversion rate of an organic material and the yield of bio-oils.

6. In the conversion process for an organic material provided by the present invention, organic material does not need to be dehydrated, thus reducing the cost of drying. A CO containing gas is used in the reaction process, which may be pure CO or impure. For example, in addition to CO, it may also comprise hydrogen, hydrogen sulfide, methane, etc., or it may also be a synthesis gas produced by gasification of coal, biomass, natural gas, and a mineral oil. In addition to CO, the remaining part of the synthesis gas may be a mixture of hydrogen, carbon dioxide or methane, ethane, etc., so the cost of gas production is greatly reduced. In the process of reaction, a combined process of cracking reaction, carbonylation reaction, shift reaction and hydrogenation reaction is realized by using a CO containing gas and an inexpensive iron-based catalyst or a waste agent. It is easy to provide sufficient free radicals to avoid carbonization and coking of organic materials, so the conversion rate of organic materials and liquid yield are high, and reaction temperature and pressure are lowered. The oils produced by the liquefaction process can also be used to prepare slurry in the preceding process.

7. Further, in the conversion process for an organic material of the present invention, the slurry is heated and pressurized to a specific temperature and pressure before entering the reaction system, thereby effectively improving the fluidity and transportability of the slurry.

8. Further, the conversion process for an organic material of the present invention directly adopts a CO containing gas obtained by gasification of a hydrocarbon, which is rich in CO, $H_2$, $H_2S$, $CO_2$, methane, etc., and has a temperature of as high as 250-600° C., therefor, no gas purification is required, making full use of the high temperature and pressure of CO containing gas, avoiding the energy consumption of CO containing gas cooling to room temperature, and reducing the investment in cooling equipment, purification equipment, gas pressure increasing equipment, and gas heating equipment.

9. Further, the conversion process for an organic material of the present invention comprises at least two conversion reactions. The temperature, pressure, atmosphere, heating mode, cooling mode, separation method of intermediate material, etc. can be flexibly adjusted according to different properties of materials and different product requirements. Between the two-stage conversion reactions, light materials can be separated, and heavy materials can be sent to the next stage to continue the second conversion reaction. Specifically, the first conversion reaction has a high reaction pressure, and the second conversion reaction has a low reaction pressure, or the first conversion reaction has a low reaction pressure, and the second conversion reaction has a high reaction pressure. The first and second conversion reactions may be carried out with different gases. The first conversion reaction is carried out with pure CO or a CO containing gas, and the proportion of gas components, such as the ratio of CO to $H_2$ in the CO containing gas, as well as the amount can be adjusted according to the reaction conditions. The first and second conversion reactions can be carried out with different catalysts under different ratios. In short, by separately carrying out the first and second conversion reactions, the operation flexibility is greatly improved. For example, the reaction temperatures, the reaction pressures, the catalysts and the composition of the mixed gas for the first and second conversion reactions may be same or different.

The first conversion reaction has a reaction temperature of 100-350° C., the second conversion reaction has a reaction temperature of 300-470° C., and the temperature of the first conversion reaction is lower than that of the second conversion reaction. The first conversion reaction is moderate, mainly involving carbonylation, cracking, etc., and the second conversion reaction is intense, mainly involving shifting and hydroisomerization reactions, thereby improving the conversion effect of organic materials.

The biomass has a bulk density of no less than 0.7 g/cm$^3$ after treatment of a first pulverization and compression, and has an particle size of no more than 0.1-500 μm after a second pulverization, so it is convenient to add the biomass to a solvent to prepare the slurry by grinding, and the solid content in the slurry is increased.

By compressing the biomass at temperature of 30-60° C., it significantly enhance the rheology of the biomass solids and reduce the viscosity of the slurry, thereby achieving smooth flow of slurry in the pipeline and avoiding clogging of the pipeline, achieving smooth operation and transportation of the pump.

10. Further, in the conversion process for an organic material of the present invention, the first conversion reaction is moderate, mainly involving carbonylation, cracking, etc., and the second conversion reaction is intense, mainly involving shifting and hydroisomerization reaction, etc., thereby improving the conversion effect of organic materials. Through the two conversion reactions, the biomass is fully liquefied into a liquid phase, and the liquid oil yield is improved. The product obtained by the second conversion reaction is subjected to separation treatment to obtain a light component and a heavy component, and then the heavy component is subjected to vacuum distillation to obtain a light fraction, and the light component and the light fraction are mixed to carry out hydrogenation reaction. Thus the light fraction contained in the heavy component can be separated by vacuum distillation, and the heavy fraction that is difficult to be hydroliquefied is separated, thereby favoring the subsequent conversion of the light oils. In addition, a little heavy component that is easily lightening contained in the light component can be converted into a light component through hydrogenation reaction, thereby improving the yield of the light oils, especially the yield of low-range oil such as naphtha among light oils. Further, the residue can be removed from the bottom of the vacuum distillation unit to reduce the residue content in the subsequent light oils by making the residue enriched and agglomerated as much as possible. According to the test, the conversion rate of biomass is above 99%. In the obtained liquefied oil, the fraction with a boiling range of below 145° C. accounts for 22~31 wt %, the fraction with a boiling range of 145° C.~360° C. accounts for 35-40 wt %, the fraction with a boiling range of 360° C.~520° C. accounts for 28~36 wt %, and the balance is heavy oils with a boiling range of above 520° C. accounts for 1-4 wt %, and the residue accounts for no more than 5 wt %.

A part of the fraction oil obtained after the vacuum distillation step and the heavy fraction obtained in the fractionation step are collected and used as a solvent oil to prepare a biomass kerosene slurry, thereby effectively reducing the cost of the solvent oil and broadening the sources of the solvent oil. That is to say the source of the solvent oil is no longer limited to the adding of external solvent oils such as heavy oils, thus the solvent oil supply is flexible and the operation flexibility is large.

BRIEF DESCRIPTION OF THE DRAWINGS

In order to illustrate the technical solutions in the embodiments of the present invention or in the prior art more clearly, a brief description to the accompanying drawings which are needed in the description of the embodiments or the prior art is given below. Apparently, the accompanying drawings in the description below are merely some of the embodiments of the present invention, based on which other drawings may be obtained by those of ordinary skill in the art without any creative effort.

DESCRIPTION OF REFERENCE SIGNS

Figure 1:
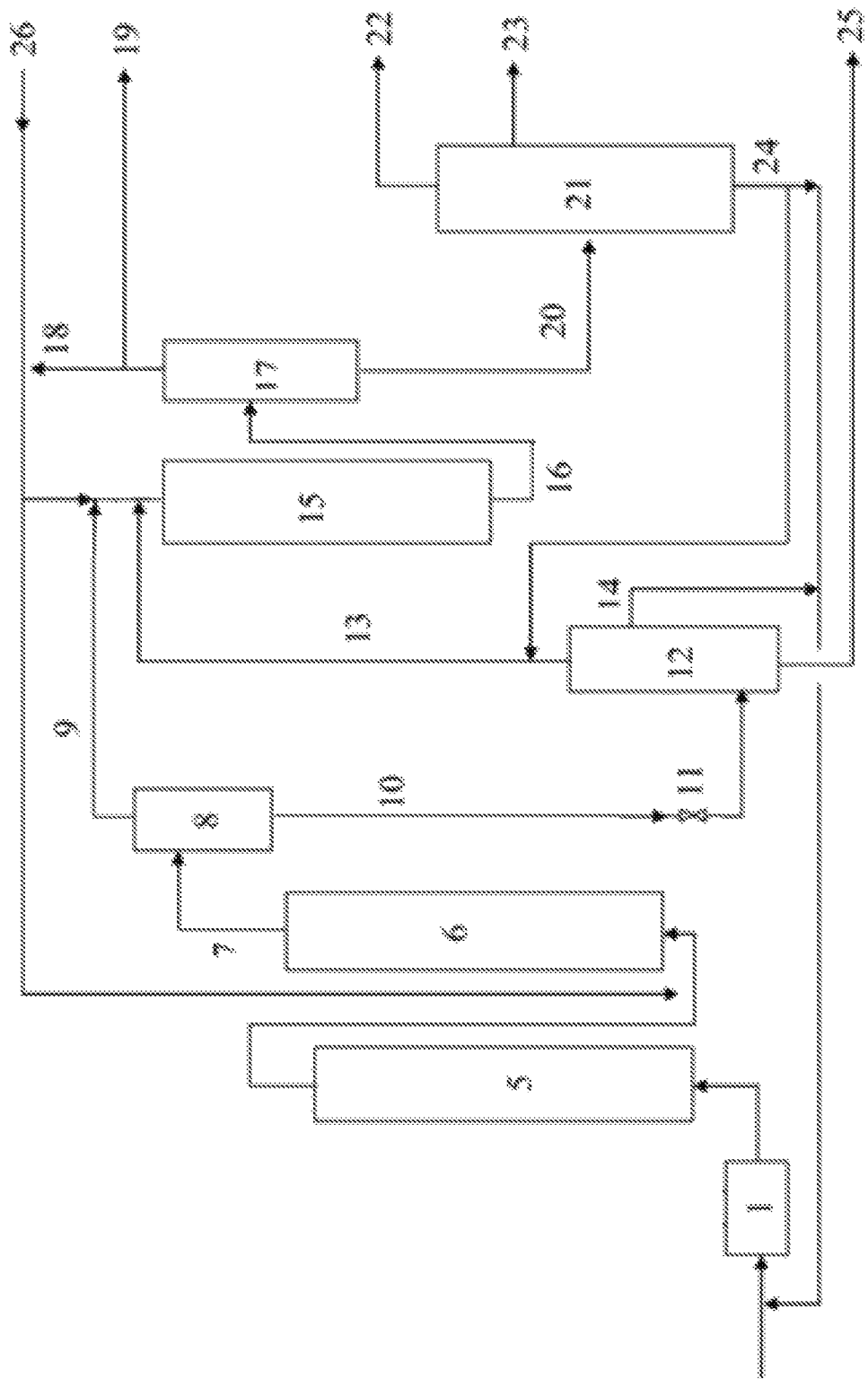
FIG. 1 is a schematic flow diagram of a process for producing light oil through liquefying biomass provided by embodiment 58.

1—biomass slurry preparation tank; 5—suspended-bed reactor; 6—internal-circulation suspended-bed reactor;

7—suspended-bed hydrogenation product; 8—hot high pressure separator; 9—light component; 10—heavy component; 11—high-pressure-difference relief valve; 12—distillation column; 13—tower top oil; 14—survey-line distillate oil; 15—fixed-bed hydrogenation reactor; 16—fixed-bed hydrogenation product; 17—separator; 18—hydrogen gas; 19—gas-phase light hydrocarbon; 20—distillate oil; 21—fractionating tower; 22—biomass naphtha; 23—biomass diesel; 24—biomass tower bottom oil; 25—residue; and 26—hydrogen gas;

1-1—buffer tank; 2-1—low pressure pump; 3-1—high pressure booster pump; 4-1—second heat exchange system; 5-1—first heating furnace; 6-1—first heat exchange system; 7-1—second heating furnace; 8-1—suspension bed reactor; 9-1—hot high pressure separator; 10-1—cooling system; 11-1—pressure reducing system; 12-1—hot low pressure separator; 13-1—first separation system; 14-1—second separation system; 15-1—circulating gas compression system; 16-1—fresh gas compression system; V1—high pressure three-way angle valve; V2—first high pressure shut-off valve; V3—second high pressure shut-off valve; V4—first high modulating pressure reducing angle valve; V5—second high pressure modulating pressure reducing angle valve; V6—first high pressure shut-off straight-through valve; V7—second high pressure shut-off straight-through valve.

DETAILED DESCRIPTION OF EMBODIMENTS

The technical solution of the present invention will now be described in detail with reference to the accompanying drawings. Obviously, the described embodiments are examplary embodiments of the invention, rather than all embodiments. Based on embodiments in the present invention, all other embodiments obtained by those skilled in the art without making creative work are within the scope of the present invention.

Embodiment 1

Provided is a co-conversion process for biomass and hogwash oil, described as below:

Pretreatment of Biomass:

Rice straw and reed straw are used as biomass solids. The bio biomass solids have a moisture content of 4% based on the total weight of the biomass. The rice straw and reed straw are fed to an ultrafine pulverizer for initial pulverization to a median particle size of 100 μm, then fed into a briquetting press for compressing at a temperature of 30° C. and a pressure of 3 MPa, and then extruded and molded to a bulk density of 0.8 g/cm$^3$, and then subjected to a second pulverization to produce a pretreated biomass having an average particle size of 3 mm.

Catalyst:

A waste agent resulting from use of a desulfurizer comprising FeOOH as an active component is used as a catalyst. The desulfurizer comprises 6 g soluble iron salt Fe(NO$_3$)$_3$·9H$_2$O, 9 g iron salt complexing agent triethanolamine, and 15 g amorphous iron hydroxyl oxide.

The waste agent is produced by a desulfurization process for removing H$_2$S from an exhaust gas with the above desulfurizer. In detail, an exhaust gas having a H$_2$S content of 5500 mg/cm$^3$ is introduced into a desulfurization section at a space velocity of 3000 h$^{-1}$ to carry out desulfurization reaction at a temperature of 30° C., and then a waste agent is collected in the desulfurization section when the content of H$_2$S in an outlet gas of the desulfurization section is less than or equal to 0.01 ppm.

Adding sulfur: The waste agent is tested to determine a molar ratio of iron element to sulfur element comprised therein. If the molar ratio of iron element to sulfur element is less than 1:5, solid sulfur powder is added to the waste agent until the molar ratio of iron element to sulfur element reaches 1:5, thereby ensuring that the molar ratio of iron element to sulfur element in the reaction system is 1:5. However if the molar ratio of iron element to sulfur element is greater than 1:5, excess sulfur is removed by conventional methods such as solvent extraction or heating.

Preparation of Biomass Slurry:

The pretreated biomass is mixed with the above catalyst to obtain a mixture, and the mixture is added to hogwash oil, followed by stirring and grinding to form a first slurry. The rice straw and the reed straw are present in a total amount of 60 wt % by weight in the first slurry, and the first slurry has a viscosity of 500 mPa·s (50° C.). Further, in the first slurry, the catalyst is present in an amount of 5 wt %, and has an average particle size of 5 μm.

Conversion Reaction:

A partial of a mixture of CO and H$_2$ (CO accounts for 60% and H$_2$ accounts for 40%) is pressurized to a pressure of 21 MPa and heated to a temperature of 350° C., and then introduced to a pipeline which conveys the first slurry as described above. The remaining of the mixture of CO and H$_2$ is pressurized to a pressure of 21 MPa and heated to a temperature of 500° C., and then injected to a slurry bed reactor through an inlet thereof to contact with the first slurry which has entered the slurry bed reactor, so that conversion reaction including cracking, carbonylation, shift and hydrogenation reactions takes place under a pressure of 20 MPa and a temperature of 380° C. The conversion reaction lasts for 60 min, during which a volume ratio of the mixture of CO and H$_2$ to the first slurry is controlled at 3000:1, producing a first ail product.

Embodiment 2

Provided is a co-conversion process for a biomass and palm oil, described as below.

Pretreatment of Biomass:

Wheat straw and corn straw are used as biomass solids. The biomass solids have a moisture content of 10% based on the total weight of the biomass. The wheat straw and corn straw are fed to an ultrafine pulverizer for initial pulverization to a median particle size of 300 μm, which are then fed into a briquetting press for compressing at a temperature of 60° C. and a pressure of 0.5 MPa, and then extruded and molded to a bulk density of 0.9 g/cm$^3$, and then subjected to a second pulverization to produce a pretreated biomass having an average particle size of 5 mm.

Catalyst:

A waste agent resulting from use of a desulfurizer comprising iron oxide as an active component is used as a catalyst. The desulfurizer comprises 10 g calcium bicarbonate, 12 g basic cupric carbonate, 18 g γ-Fe$_2$O$_3$, 8 g MnO$_2$, and 5 g NiO.

The waste agent is produced by a desulfurization process with the above desulfurizer, which is described as follows.

1) Exhaust gas produced by fixed bed catalytic hydrogenation of medium-low temperature coal tar is collected.

2) The above mentioned desulfurizer is prepared into particles having a diameter of 1 mm and a length of 15 mm, and filled in a desulfurization tower to form a desulfurization layer.

3) The collected exhaust gas passes through the desulfurization layer at a space velocity of 2000 h$^{-1}$, so that desulfurization reaction takes place when the exhaust gas contact with the desulfurizer in the desulfurization layer at 50° C. to remove hydrogen sulfide in the exhaust gas. After the reaction is completed, a waste agent, i.e. a spent desulfurizer, is collected and cooled to room temperature, i.e. obtaining a waste agent resulting from use of a desulfurizer comprising iron oxide as an active component.

Adding sulfur: The waste agent is tested to determine a molar ratio of iron element to sulfur element comprised therein. If the molar ratio of iron element to sulfur element is less than 1:1, solid sulfur powder is added to the waste agent until the molar ratio of iron element to sulfur element reaches 1:1, thereby ensuring that the molar ratio of iron element to sulfur element in the reaction system is 1:1. However if the molar ratio of iron element to sulfur element is greater than 1:1, excess sulfur is removed by conventional methods such as solvent extraction or heating.

Preparation of Biomass Slurry:

The pretreated biomass is mixed with the above catalyst to obtain a mixture, and the mixture is added to palm oil, followed by stirring to form a first slurry. The wheat straw and corn straw are present in a total amount of 50 wt % by weight in the slurry, and the first slurry has a viscosity of 1400 mPa·s (50° C.). Further, in the above first slurry, the catalyst is present in an amount of 1 wt %, and has an average particle size of 10 μm.

Conversion Reaction:

A partial of a mixture of CO and $H_2$ (CO accounts for 60% and $H_2$ accounts for 40%) is pressurized to a pressure of 16 MPa and heated to a temperature of 400° C., and then introduced to a pipeline which conveys the first slurry. The remaining of the mixture of CO and $H_2$ is pressurized to a pressure of 16 MPa and heated to a temperature of 520° C., and then injected to a suspended bed reactor through an inlet thereof to contact with the first slurry which has entered the suspended bed reactor, so that conversion reaction including cracking, carbonylation, shift and hydrogenation reactions takes place under a pressure of 15 MPa and a temperature of 420° C. The conversion reaction lasts for 30 min, during which a volume ratio of the mixture of CO and $H_2$ to the first slurry is controlled at 2000:1, producing a first oil product.

Embodiment 3

Provided is a co-conversion process for biomass and petroleum base wax oil as below.

Pretreatment of Biomass:

Cotton straw is used as biomass solid. The biomass solid has a moisture content of 1% based on the total weight of the biomass. The cotton straw is fed to an ultrafine pulverizer for initial pulverization to a median particle size of 200 μm, then fed into a briquetting press for compressing, extruding and molding at a temperature of 40° C. and a pressure of 2 MPa to a bulk density of 0.9 g/cm$^3$, then subjected to a second pulverization to produce a pretreated biomass having an average particle size of 1 mm.

Catalyst:

Amorphous FeOOH is used as a catalyst.

Adding sulfur: Solid sulfur powder is added to the above catalyst until the molar ratio of iron element to sulfur element reaches 1:2, thereby ensuring that the molar ratio of iron element to sulfur element in the reaction system is 1:2.

Preparation of Biomass Slurry:

The pretreated biomass is mixed with the above catalyst to obtain a mixture, and the mixture is added to petroleum base wax oil to carry out dispersing pulping to form a first slurry. The cotton straw is present in a total amount of 50 wt % by weight in the first slurry, and the first slurry has a viscosity of 400 mPa·s (50° C.). Further, in the above first slurry, the catalyst is present in an amount of 1 wt %, and has an average particle size of 10 μm.

Conversion Reaction:

A partial of a mixture of CO and $H_2$ (CO accounts for 60% and $H_2$ accounts for 40%) is pressurized to a pressure of 17 MPa and heated to a temperature of 250° C., and then introduced to a pipeline which conveys the first slurry. The remaining of the mixture of CO and $H_2$ is pressurized to a pressure of 17 MPa and heated to a temperature of 550° C., and then injected to a fluidized bed reactor through an inlet thereof to contact with the first slurry which has entered the suspended bed reactor, so that conversion reaction including cracking, carbonylation, shift and hydrogenation reactions takes place under a pressure of 16 MPa and a temperature of 420° C. The conversion reaction lasts for 40 min, during which a volume ratio of the mixture of CO and $H_2$ to the first slurry is controlled at 1000:1, producing a first oil product.

Embodiment 4

Provided is a co-conversion process for biomass and canola oil, described as below.

Pretreatment of Biomass:

Wood chips and soybean straw are used as biomass solids. The biomass solids have a moisture content of 2% based on the total weight of the biomass. The wood chips and soybean straw are fed to an ultrafine pulverizer for initial pulverization to a median particle size of 150 pin, then fed into a briquetting press for carrying out compressing, extruding and molding at a temperature of 50° C. and a pressure of 1 MPa to a bulk density of 1 g/cm$^3$, then subjected to a second pulverization to produce a pretreated biomass having an average particle size of 4 mm.

Catalyst:

A regeneration product of a waste agent resulting from use of a desulfurizer comprising iron oxide as an active component is used as a catalyst. The desulfurizer comprises 50 g cubic $Fe_3O_4$, 12 g calcium sulphate dihydrate, 20 g basic zinc carbonate, and 6 g sodium carboxymethylcellulose.

The desulfurizer is used in a desulfurization process for petroleum comprising hydrogen sulfide, which is described as below.

(1) The above mentioned desulfurizer is prepared into particles having a diameter of 1.5 mm, and filled in a desulfurization tower to form a desulfurization layer.

(2) Petroleum comprising hydrogen sulfide is sprayed by a nozzle into the desulfurization layer from the top of the desulfurization tower to carry out desulfurization under spraying. After desulfurization is completed, a spent desulfurizer is produced, which is the waste agent resulting from use of a desulfurizer comprising iron oxide.

The obtained waste agent is subjected to regeneration which is described as below:

1) The waste agent is mixed with water and stirred in a slurry tank to form a second slurry which has a solid content of 12 wt % by weight.

2) Sodium hypochlorite is introduced into the second slurry to carry out first oxidation reaction at 60° C. and 1 MPa, producing an oxidized slurry.

3) $Na_2S$ is added to the oxidized slurry to carry out a vulcanization reaction at 10° C. and 5 MPa, producing a vulcanized slurry.

4) Hydrogen peroxide is introduced into the vulcanized slurry to carry out a second oxidation reaction at 30° C. and 1.1 MPa to further oxidize and regenerate the slurry.

5) Steps 3) and 4) are repeated once to produce a final slurry wherein the molar ratio of iron to sulfur is 1:1.8.

6) The final slurry is subjected to solid-liquid separation to obtain the regeneration product of the above waste agent.

Adding sulfur: Solid sulfur powder is added to the above regeneration product until the molar ratio of iron element to sulfur element comprised therein is 1:2, thereby ensuring that the molar ratio of iron element to sulfur element in the reaction system is 1:2.

Preparation of Biomass Slurry:

The pretreated biomass is mixed with the above catalyst to obtain a mixture, and the mixture is added to canola oil to carry out shearing pulping to form a first slurry. The wood chips and soybean straw are present in a total amount of 40 wt % in the first slurry, and the first slurry has a viscosity of 1000 mPa·s (50° C.). Further, the regeneration product of a desulfurization waste agent of a desulfurizer comprising iron oxide as an active component is present in a content of 2 wt % in the slurry, and has an average particle size of 400 μm.

Conversion Reaction:

Synthesis gas (CO accounts for 20% by volume) is pressurized to a pressure of 18.2 MPa and heated to a temperature of 450° C., and then introduced into a bubbling bed reactor through four injection ports on the side and bottom of the bubbling bed reactor to contact with the first slurry which has entered the bubbling bed reactor to carry out conversion reaction including cracking, carbonylation, shift and hydrogenation reactions under a pressure of 18 MPa and a temperature of 380° C. The conversion reaction lasts for 100 min, during which the volume ratio of the synthesis gas to the first slurry is 950:1, producing a first oil product.

Embodiment 5

Provided is a conversion process for biomass, which is described as below.

Pretreatment of Biomass:

Pea straw, sorghum straw and rice straw are used as biomass solids. The biomass solids have a moisture content of 15% based on the total weight of the biomass. The pea straw, sorghum straw and rice straw are fed to an ultrafine pulverizer for initial pulverization to a median particle size of 250 μm, then fed into a briquetting press for carrying out compressing, extruding and molding at a temperature of 55° C. and a pressure of 1.5 MPa to a bulk density of 0.9 g/cm³, and then subjected to a second pulverization to produce a pretreated biomass having an average particle size of 0.9 mm.

Catalyst:

A regeneration product of a waste agent resulting from use of a desulfurizer comprising $Fe_{21.333}O_{32}$ as an active component is used as a catalyst. The desulfurizer comprises 55 g $Fe_{21.333}O_{32}$, 22 g anatase type $TiO_2$, and 15 g bentonite clay.

The desulfurizer comprising $Fe_{21.333}O_{32}$ as an active component is used in a desulfurization process is described as below:

The above desulfurizer is filled into a fixed bed reactor to contact fully with gas-field water containing $H_2S$ under a temperature of 35° C., a pressure of 0.2 MPa, and a volumetric space velocity of 10000 $h^{-1}$ to carry out desulfurization reaction. After the desulfurization reaction is completed, a spent desulfurizer is produced, i.e. obtaining a waste agent resulting from use of a desulfurizer comprising $Fe_{21.333}O_{32}$ as an active component.

The obtained waste agent was regenerated described as below:

1) The waste agent is dispersed in water to form a slurry.

2) The slurry is heated to a temperature of 45° C. under atmospheric pressure. Then hydrogen peroxide is added to the slurry by using a peristaltic pump and air is introduced at a hydrogen peroxide flow rate of 500 mL/min and an air flow rate of 100 mL/min to perform reactions for a period of 5 min under magnetic stirring.

3) After the reaction is completed, the resulted reaction solution is filtered, producing a precipitate which is then washed three times with water and then dried naturally to obtain a regeneration product of the above-mentioned waste agent.

Adding sulfur: Solid sulfur powder is added to the above regeneration product until the molar ratio of iron element to sulfur element reaches 1:4, thereby ensuring that the molar ratio of iron element to sulfur element in the reaction system is 1:4.

Preparation of Biomass Slurry:

The pretreated biomass is mixed with the above catalyst to obtain a mixture, and the mixture is added to a mixed oil of gutter oil and canola oil to carry out homogenize pulping to form a first slurry. The gutter oil and canola oil used in the subsequent pulping process can be replaced with the oil products produced by the biomass liquefaction process in the present embodiment. The pea straw, sorghum straw and rice straw are present in a total amount of 40 wt % in the first slurry, and the first slurry has a viscosity of 820 mPa·s (50° C.). Further, the regeneration product of a desulfurization waste agent of a desulfurizer comprising $Fe_{21.333}O_{32}$ as an active component is present in a content of 8 wt % in the first slurry, and has an average particle size of 300 μm.

Liquefaction Reaction:

A mixture of CO and $H_2$ (CO accounts for 50% by volume) is pressurized to a pressure of 17.5 MPa and heated to a temperature of 380° C., and then injected into a slurry bed reactor from five injection ports on the bottom and side walls thereof to contact with the first slurry which has entered therein to carry out first conversion reaction including cracking, carbonylation, shift and hydrogenation reactions under a pressure of 17 MPa and a temperature of 420° C. The reaction lasts for 50 min, during which the volume ratio of the mixture of CO and $H_2$ to the first slurry is 1500:1, producing a first oil product.

Embodiment 6

Provided is a liquefaction process for biomass, which is described as below.

Pretreatment of Biomass:

Wheat straw and flax straw are used as biomass solids. The biomass solids have a moisture content of 9% based on the total weight of the biomass. The wheat straw and flax straw are fed to an ultrafine pulverizer for initial pulverization to a median particle size of 300 Nm, then fed into a briquetting press for carrying out compressing, extruding and molding at a temperature of 60° C. and a pressure of 3 MPa to a bulk density of 1.1 g/cm³, then subjected to a second pulverization to produce a pretreated biomass having an average particle size of 2 mm.

Catalyst:

A regeneration product of a waste agent resulting from use of a desulfurizer comprising FeOOH as an active component is used as a catalyst. The desulfurizer comprises 30 g α-FeOOH, 20 g amorphous FeOOH, 8 g potassium oxide, and 10 g binding agent kaolin.

The desulfurizer comprising FeOOH as an active component is used in a desulfurization process for a tail gas produced in the hydro-upgrading process of medium-low temperature coal tar in industry described as below.

1) Exhaust gas produced by fixed bed catalytic hydrogenation of medium-low temperature coal tar is collected.

2) The above mentioned desulfurizer is prepared into particles having a diameter of 1 mm and a length of 15 mm, and filled in a desulfurization tower to form a desulfurization layer.

3) The collected exhaust gas passes through the desulfurization layer at a space velocity of 2000 $h^{-1}$, so that desulfurization reaction takes place when the exhaust gas contact with the desulfurizer in the desulfurization layer at 50° C. to remove hydrogen sulfide in the exhaust gas. After the reaction is completed, a waste agent, i.e. a spent desulfurizer, is collected and cooled to room temperature, i.e. obtaining a waste agent resulting from use of a desulfurizer comprising iron oxide as an active component.

The above waste agent was regenerated described as below:

1) The waste agent is mixed with sodium hydroxide solution and stirred in a slurry tank to form a second slurry which has a pH value of 8.0 and a solid content of 4 wt % by weight.

2) Air is introduced into the second slurry to carry out a first oxidation reaction at 90° C. and 0.1 MPa, producing an oxidized slurry.

3) $H_2S$ is introduced into the oxidized slurry to carry out a vulcanization reaction at 10° C. and 5 MPa, producing a vulcanized slurry.

4) Air is introduced into the vulcanized slurry to carry out a second oxidation reaction at 90° C. and 0.1 MPa to further oxidize and regenerate the slurry.

5) Steps 3) and 4) are repeated once to produce a final slurry wherein the molar ratio of iron to sulfur is 1:2.

6) The final slurry is subjected to solid-liquid separation to obtain the regeneration product of the above waste agent.

Preparation of Slurry:

The pretreated biomass is mixed with the above catalyst to obtain a mixture, and the mixture is added to a mixed oil of palm oil and a petroleum base wax oil under stirring to carry out stirring pulping to form a first slurry. The wheat straw and flax straw are present in a total amount of 45 wt % in the first slurry, and the first slurry has a viscosity of 530 mPa·s (50° C.). Further, the regeneration product of a desulfurization waste agent of a desulfurizer comprising FeOOH as an active component is present in a content of 0.3 wt % in the first slurry, and has an average particle size of 20 μm.

Adding Sulfur:

Solid sulfur powder is added to the above regeneration product until the molar ratio of iron element to sulfur element reaches 1:2.5, thereby ensuring that the molar ratio of iron element to sulfur element in the reaction system is 1:2.5.

Conversion Reaction:

A partial of a mixture of CO and $H_2$ (CO accounts for 80% and $H_2$ accounts for 20%) is pressurized to a pressure of 19.5 MPa and heated to a temperature of 300° C., and then introduced to a pipeline which conveys the first slurry as described above. The remaining of the mixture of CO and $H_2$ is pressurized to a pressure of 19.3 MPa and heated to a temperature of 480° C., and then injected to a slurry bed reactor through three injection ports on the bottom and side walls thereof to contact with the first slurry which has entered the slurry bed reactor, so that conversion reaction including cracking, carbonylation, shift and hydrogenation reactions takes place under a pressure of 19 MPa and a temperature of 390° C. The conversion reaction lasts for 100 min, during which a volume ratio of the mixture of CO and $H_2$ to the first slurry is controlled at 800:1, producing a first oil product.

Embodiment 7

Provided is a liquefaction process for biomass, which is described as below.

Pretreatment of Biomass:

Rice straw and broad bean straw are used as biomass solids. The biomass solids have a moisture content of 10% based on the total weight of the biomass. The rice straw and broad bean straw are fed to an ultrafine pulverizer for initial pulverization to a median particle size of 100 μm, then fed into a briquetting press for carrying out compressing, extruding and molding at a temperature of 30° C. and a pressure of 0.5 MPa to a bulk density of 1.0 g/cm$^3$, and then subjected to a second pulverization to produce a pretreated biomass having an average particle size of 1 mm.

Catalyst:

A regeneration product of a waste agent resulting from use of a desulfurizer comprising iron oxide as an active component is used as a catalyst. The desulfurizer comprises 12 g $Fe_3O_4$ of cubic crystal, 24 g amorphous $Fe_2O_3$, 39 g amorphous $Fe_2O_3 \cdot H_2O$, and 5 g NiO.

The waste agent is produced by a desulfurization process for removing $H_2S$ from an exhaust gas with the above desulfurizer. In detail, an exhaust gas having a $H_2S$ content of 5500 mg/cm$^3$ is introduced into a desulfurization section at a space velocity of 3000 $h^{-1}$ to carry out desulfurization reaction at a temperature of 30° C., and then a waste agent is collected in the desulfurization section when the content of $H_2S$ in an outlet gas of the desulfurization section is less than or equal to 0.01 ppm.

The above waste agent resulting from use of a desulfurizer comprising iron oxide as an active component was regenerated described as below:

The above waste agent was regenerated described as below:

1) The waste agent is washed with water, and then ground with water in a wet ball mill to obtain a waste powder of 200 mesh.

2) The waste powder is prepared into an aqueous suspension with a solid mass percentage of 7%, into which compressed air is introduced to carry out the reaction.

3) The aqueous suspension is filtered to obtain solid materials, which are placed in a flotation tank, into which water is added, and then air is introduced, and the precipitate at the lower part of the container is dried to obtain a regeneration product of the above waste agent.

Adding Sulfur:

Solid sulfur powder is added to the above regeneration product until the molar ratio of iron element to sulfur element comprised therein is 1:0.9, thereby ensuring that the molar ratio of iron element to sulfur element in the reaction system is 1:0.9.

Preparation of Biomass Slurry:

The pretreated biomass is mixed with the above catalyst to obtain a mixture, and the mixture is added to coal tar to carry out dispersing pulping to form a first slurry. The rice straw and broad bean straw are present in a total amount of 55 wt % in the first slurry, and the first slurry has a viscosity of 510 mPa·s (50° C.). Further, in the above first slurry, the catalyst is present in an amount of 0.2 wt %, and has an average particle size of 2 μm.

Conversion Reaction:

A mixture of CO and $H_2$ (CO accounts for 60% and $H_2$ accounts for 40%) is pressurized to a pressure of 20.4 MPa and heated to a temperature of 500° C., and then injected into a slurry bed reactor from three injection ports on side walls thereof to contact with the first slurry which has entered therein to carry out first conversion reaction including cracking, carbonylation, shift and hydrogenation reactions under a pressure of 20 MPa and a temperature of 410° C. The reaction lasts for 110 min, during which the volume ratio of the mixture of CO and $H_2$ to the first slurry is 650:1, producing a first conversion product, i.e. a first oil product.

Embodiment 8

Provided is a liquefaction process for biomass described as below.

Pretreatment of Biomass:

Corn straw and ramie straw are used as biomass solids. The biomass solids have a moisture content of 20% based on the total weight of the biomass. The corn straw and ramie straw are fed to an ultrafine pulverizer for initial pulverization to a median particle size of 300 pin, then fed into a briquetting press for carrying out compressing, extruding and molding at a temperature of 50° C. and a pressure of 2.5 MPa to a bulk density of 0.8 g/cm³, and then subjected to a second pulverization to produce a pretreated biomass having an average particle size of 3 mm.

Catalyst:

A waste agent resulting from use of a desulfurizer comprising FeOOH as an active component is used as a catalyst. The desulfurizer comprises 70 g amorphous FeOOH, 25 g $Co_2O_3$, and 5 g NiO.

The desulfurizer comprising FeOOH as an active component is used in a desulfurization process for removing $H_2S$ from exhaust gas, which is described as below. An exhaust gas having a $H_2S$ content of 5500 mg/cm³ is introduced to a desulfurization section at a space velocity of 3000 $h^{-1}$ to carry out desulfurization reaction at 30° C. When the content of $H_2S$ in the outlet gas of the desulfurization section is less than or equal to 0.01 ppm, a waste agent is produced and collected in the desulfurization section, i.e. obtaining the waste agent mentioned above.

Adding Sulfur:

Solid sulfur powder is added into the waste agent until the molar ratio of iron element to sulfur element is 1:3, thereby ensuring that the molar ratio of iron element to sulfur element in the reaction system is 1:3.

Preparation of Biomass Slurry:

The pretreated biomass is mixed with the above catalyst to obtain a mixture, and the mixture is added to gutter oil to carry out emulsifying pulping to form a first slurry. The corn straw and ramie straw are present in a total amount of 57 wt % in the first slurry, and the first slurry has a viscosity of 1130 mPa·s (50° C.). Further, the waste agent resulting from use of a desulfurizer comprising FeOOH as an active component is present in a content of 4 wt % in the first slurry, and has an average particle size of 120 μm.

Conversion Reaction:

A partial of pure CO gas is pressurized to a pressure of 18 MPa and heated to a temperature of 250° C., and then introduced into the first slurry. The remaining of the pure CO gas is pressurized to a pressure of 18 MPa and heated to a temperature of 500° C., and then injected to a slurry bed reactor through four injection ports on the bottom and side walls thereof to contact with the first slurry which has entered the slurry bed reactor, so that a first conversion reaction including cracking, carbonylation, shift and hydrogenation reactions takes place under a pressure of 17 MPa, a temperature of 400° C. The first conversion reaction lasts for 40 min, during which the volume ratio of pure CO to the first slurry is 950:1, producing a first oil product.

Embodiment 9

Provided is a liquefaction process for biomass, which is described as below.

Pretreatment of Biomass:

Pea straw, sorghum straw and rice straw are used as biomass solids. The biomass solids have a moisture content of 15% based on the total weight of the biomass. The pea straw, sorghum straw and rice straw are fed to an ultrafine pulverizer for initial pulverization to a median particle size of 250 nm, then fed into a briquetting press for carrying out compressing, extruding and molding at a temperature of 55° C. and a pressure of 1.5 MPa to a bulk density of 0.9 g/cm³, and then subjected to a second pulverization to produce a pretreated biomass having an average particle size of 0.9 mm.

Catalyst:

A waste agent resulting from use of a desulfurizer comprising FeOOH as an active component is used as a catalyst. The desulfurizer comprises 60% by weight of amorphous FeOOH, 30% by weight of diatomaceous earth carrier, and 10% by weight of cellulose powder binding agent.

The desulfurizer comprising FeOOH as an active component is used in a desulfurization process for removing $H_2S$ from exhaust gas, which is described as below. An exhaust gas having a $H_2S$ content of 5500 mg/cm³ is introduced to a desulfurization section at a space velocity of 3000 $h^{-1}$ to carry out desulfurization reaction at 30° C. When the content of $H_2S$ in the outlet gas of the desulfurization section is less than or equal to 0.01 ppm, a waste agent is produced and collected in the desulfurization section, i.e. obtaining the waste agent mentioned above.

Adding Sulfur:

Solid sulfur powder is added to the above waste agent until the molar ratio of iron element to sulfur element comprised therein is 1:4, thereby ensuring that the molar ratio of iron element to sulfur element in the reaction system is 1:4.

Preparation of Biomass Slurry:

The pretreated biomass is mixed with the above catalyst to obtain a mixture, and the mixture is added to a mixed oil of gutter oil and canola oil to carry out homogenous pulping to form a first slurry. The gutter oil and canola oil used in the subsequent pulping process can be replaced with the oil products produced by the biomass liquefaction process in the present embodiment. The pea straw, sorghum straw and rice straw are present in a total amount of 40 wt % in the first slurry, and the first slurry has a viscosity of 820 mPa·s (50° C.). Further, the desulfurizer comprising FeOOH as an active component is present in a content of 8 wt % in the first slurry, and has an average particle size of 300 μm.

Liquefaction Reaction:

A mixture of CO and $H_2$ (CO accounts for 50% by volume) is pressurized to a pressure of 18 MPa and heated to a temperature of 380° C., and then injected into a slurry bed reactor from five injection ports on the bottom and side walls thereof to contact with the first slurry which has entered therein to carry out first conversion reaction including cracking, carbonylation, shift and hydrogenation reactions under a pressure of 17 MPa and a temperature of 420° C. The reaction lasts for 50 min, during which the volume ratio of the mixture of CO and $H_2$ to the first slurry is 900:1, producing a first oil product.

Embodiment 10

Provided is a co-conversion process for oil residue and faeces, which is described as below.

Pretreatment of Oil Residue and Faeces:

Oil residue and faeces are used as biomass solid. The biomass solid has a moisture content of 12% based on the total weight of the biomass. The oil residue and faeces are fed to an ultrafine pulverizer for initial pulverization to a median particle size of 150 μm, then fed into a briquetting press for carrying out compressing, extruding and molding at a temperature of 55° C. and a pressure of 1.5 MPa to a bulk density of 1.0 g/cm³, and then subjected to a second pulverization to produce a pretreated biomass having an average particle size of 2 mm.

Catalyst:

The catalyst is amorphous FeOOH.

Adding sulfur: Solid sulfur powder is added to the above catalyst until the molar ratio of iron element to sulfur element comprised therein is 1:1.5, thereby ensuring that the molar ratio of iron element to sulfur element in the reaction system is 1:1.5.

Preparation of Slurry:

The pretreated oil residue and faeces are mixed with the above catalyst to obtain a mixture, and the mixture is added to petroleum base wax oil to carry out dispersing pulping to form a first slurry. The oil residue and faeces are present in a total amount of 50 wt % in the first slurry, and the first slurry has a viscosity of 400 mPa·s (50° C.). Further, in the above first slurry, the catalyst has a content of 1 wt %, and an average particle size of 10 μm.

Conversion Reaction:

A partial of a mixture of CO and $H_2$ (CO accounts for 60% and $H_2$ accounts for 40%) is pressurized to a pressure of 16.8 MPa and heated to a temperature of 250° C., and then introduced to a pipeline which conveys the first slurry. The remaining of the mixture of CO and $H_2$ is pressurized to a pressure of 16.2 MPa and heated to a temperature of 550° C., and then injected to a fluidized bed reactor through an inlet thereof to contact with the first slurry which has entered the suspended bed reactor, so that conversion reaction including cracking, carbonylation, shift and hydrogenation reactions takes place under a pressure of 16 MPa and a temperature of 420° C. The conversion reaction lasts for 40 min, during which a volume ratio of the mixture of CO and $H_2$ to the first slurry is controlled at 1000:1, producing a first oil product.

Embodiment 11

Provided is a co-conversion process for oil sand's oil and hogwash oil, described as below.

Catalyst:

A waste agent resulting from use of a desulfurizer comprising FeOOH as an active component is used as a catalyst. The desulfurizer comprises 6 g soluble iron salt Fe$(NO_3)_3 \cdot 9H_2O$, 9 g iron salt complexing agent triethanolamine, and 15 g amorphous iron hydroxyl oxide.

The waste agent is produced by a desulfurization process for removing $H_2S$ from an exhaust gas with the above desulfurizer. In detail, an exhaust gas having a $H_2S$ content of 5500 mg/cm³ is introduced into a desulfurization section at a space velocity of 3000 $h^{-1}$ to carry out desulfurization reaction at a temperature of 30° C., and then a waste agent is collected in the desulfurization section when the content of $H_2S$ in an outlet gas of the desulfurization section is less than or equal to 0.01 ppm.

Adding Sulfur:

The waste agent is tested to determine a molar ratio of iron element to sulfur element comprised therein. If the molar ratio of iron element to sulfur element is less than 1:2, solid sulfur powder is added to the waste agent until the molar ratio of iron element to sulfur element reaches 1:2, thereby ensuring that the molar ratio of iron element to sulfur element in the reaction system is 1:2. However if the molar ratio of iron element to sulfur element is greater than 1:2, excess sulfur is removed by conventional methods such as solvent extraction or heating.

Preparation of Slurry:

Oil sand's oil and hogwash oil are mixed with the above catalyst to obtain a mixture, and then an appropriate amount of water is added to the mixture under stirring to form a first slurry. The catalyst has an average particle diameter of 5 μm.

Conversion Reaction:

A partial of a mixture of CO and $H_2$ (CO accounts for 60% and $H_2$ accounts for 40%) is pressurized to a pressure of 5.7 MPa and heated to a temperature of 500° C., and then introduced to a pipeline which conveys the first slurry as described above. The remaining of the mixture of CO and $H_2$ is pressurized to a pressure of 5.2 MPa and heated to a temperature of 500° C., and then injected to a slurry bed reactor through an inlet thereof to contact with the first slurry which has entered the slurry bed reactor, so that conversion reaction including cracking, carbonylation, shift and hydrogenation reactions takes place under a pressure of 5 MPa and a temperature of 470° C. The conversion reaction lasts for 90 min, during which a volume ratio of the mixture of CO and $H_2$ to the first slurry is controlled at 8000:1, producing a first oil product.

Embodiment 12

Provided is a co-conversion process for oil residue, wheat straw and gutter oil as below.

Pretreatment of Oil Residue and Wheat Straw:

Oil residue and wheat straw are used as biomass solid. The biomass solid has a moisture content of 5% based on the total weight of the biomass. The oil residue and wheat straw are fed to an ultrafine pulverizer for initial pulverization to a median particle size of 200 μm, then fed into a briquetting press for carrying out compressing, extruding and molding at a temperature of 55° C. and a pressure of 1.5 MPa to a bulk density of 0.95 g/cm³, and then subjected to a second pulverization to produce a pretreated biomass having an average particle size of 60 μm.

Catalyst:

A regeneration product of a waste agent resulting from use of a desulfurizer comprising FeOOH is used as a catalyst. The desulfurizer comprises 45% by weight of γ-FeOOH, 35% by weight of α-FeOOH, 15% by weight of molecular sieve as carriers, and 5% by weight of sesbania powder as binder.

The desulfurizer is used in a desulfurization process for removing $H_2S$ from exhaust gas, which is described as below. An exhaust gas having a $H_2S$ content of 5500 mg/cm³ is introduced to a desulfurization section at a space velocity of 3000 $h^{-1}$ to carry out desulfurization reaction at 30° C. When the content of $H_2S$ in the outlet gas of the desulfurization section is less than or equal to 0.01 ppm, a waste agent in the desulfurization section is collected.

The obtained waste agent is regenerated described as below:

The waste agent is washed with water, and then ground with water in a wet ball mill to obtain a waste powder of 80 mesh. The waste powder is prepared into an aqueous suspension with a solid mass percentage of 8%, into which compressed air is introduced. Sample is taken for testing after reacting for a period of time. When there is no $H_2S$ produced from the reaction between the sample and hydrochloric acid, the iron sulphides in the waste agent have been completely converted into FeOOH and elemental sulfur, producing a slurry comprising FeOOH and elemental sulfur. Filtering the slurry to obtain a solid material, and extracting the solid material with $CCl_4$ for three times, then combining the extracted liquids, and recovering the solvents by distillation to obtain crystalline elemental sulfurs. Mixing the remaining solids separated from the extraction liquids with sesbania powders to obtain a regeneration product of the above-mentioned waste agent, wherein the amount of the binder sesbania powders is 5% by mass of the solids.

Adding carbon disulfides: Carbon disulfide is added into the above catalyst until the molar ratio of iron element to sulfur element is 1:2, thereby ensuring that the molar ratio of iron element to sulfur element in the reaction system is 1:2.

Preparation of Slurry:

The pretreated oil residue and wheat straw is mixed with the above catalyst to obtain a mixture, and the mixture is added to gutter oil to carry out dispersing pulping to form a first slurry. The oil residue and wheat straw are present in a total amount of 55 wt % in the first slurry, and the first slurry has a viscosity of 400 mPa·s (50° C.). Further, in the above first slurry, the catalyst has a content of 10 wt %, and an average particle size of 5 nm.

Conversion Reaction:

A partial of a mixture of CO and $H_2$ (CO accounts for 60% and $H_2$ accounts for 40%) is pressurized to a pressure of 16.8 MPa and heated to a temperature of 250° C., and then introduced to a pipeline which conveys the first slurry. Then the remaining of the mixture of CO and $H_2$ is pressurized to a pressure of 16.2 MPa and heated to a temperature of 550° C., and injected into a fluidized bed reactor through an inlet thereof to contact with the first slurry which has entered fluidized bed reactor to carry out conversion reaction including cracking, carbonylation, shift and hydrogenation reactions under a reaction pressure of 16 MP and a reaction temperature of 420° C. The conversion reaction lasts for 60 min, during which the volume ratio of the mixture of CO and $H_2$ to the first slurry is 5000:1, producing an oil product.

Embodiment 13

Provided is a co-conversion process for oil sand's oil and palm oil, described as below.

Catalyst:

A regeneration product of a waste agent resulting from use of a desulfurizer comprising $Fe_{21.333}O_{32}$ is used as a catalyst. The desulfurizer comprises 55 g $Fe_{21.333}O_{32}$, 12 g copper oxide, and 21 g $Fe_2O_3$ as carrier.

The desulfurizer is used in a desulfurization process for a coal pyrolysis gas comprising hydrogen sulfide, which is described as below.

(1) A compressed coal pyrolysis gas is cooled to a temperature of 30-35° C., and mixed with air from an air pump and introduced to a desulfurization tower filled with the above-mentioned desulfurizer which mainly comprises iron oxide as an active component. The compressed coal pyrolysis gas enters at the bottom and exits at the top, thereby preventing liquid water from entering the desulfurizer bed.

(2) After many times use of the above-mentioned desulfurizer, a waste agent, i.e. spent desulfurizer, is produced and removed from the desulfurizer bed, i.e. obtaining a waste agent resulting from use of a desulfurizer comprising $Fe_{21.333}O_{32}$.

The obtained waste agent was regenerated described as below:

1) The waste agent is dispersed in water to form a slurry.

2) The slurry is heated to a temperature of 60° C. under atmospheric pressure. Then hydrogen peroxide is added to the slurry by using a peristaltic pump at a flow rate of 500 mL/min to perform reactions for a period of 10 min under magnetic stirring.

3) After the reaction is completed, the resulted reaction solution is filtered, producing a precipitate which is then washed twice with water and then dried naturally to obtain a regeneration product of the above-mentioned waste agent.

Preparation of Slurry:

Oil sand's oil and palm oil are mixed with the above catalyst to obtain a mixture, and then an appropriate amount of water is added to the mixture under stirring to form a first slurry. The catalyst has an average particle diameter of 300 μm.

Conversion Reaction:

A partial of pure CO is pressurized to a pressure of 5.7 MPa and heated to a temperature of 500° C., and then introduced to a pipeline which conveys the first slurry. The remaining of the pure CO is pressurized to a pressure of 5.2 MPa and heated to a temperature of 500° C., and then injected to a slurry bed reactor through an inlet thereof to contact with the first slurry which has entered the slurry bed reactor, so that conversion reaction including cracking, carbonylation, shift and hydrogenation reactions takes place under a pressure of 5 MPa, a temperature of 470° C., and a controlled volume ratio of the mixture of CO and $H_2$ to the first slurry of 3000:1. The conversion reaction lasts for 90 min, during which hydrogen sulfide gas is introduced into the slurry bed reactor to ensure a molar ratio of iron element to sulfur element in the reaction system is 1:3, producing an oil product.

Embodiment 14

Provided is a con-conversion process for biomass and canola oil, which is the same as that of embodiment 4 except for the regeneration method. The waste agent is regenerated as described below.

1) Water vapor with a pressure of 1.5 MPa is introduced into a heating furnace to heat to 450° C.

2) The heated water vapor is introduced into a desulfurization tank at a speed of 15 m/s to heat the waste agent contained therein.

3) The waste agent is kept at a temperature of at least 400° C. for 2 h under heating by the water vapor which is consumed at a speed of 6 t/h.

4) The pH at the outlet of the desulfurization tank is analyzed, and when the pH is greater than or equal to 7.5 for three times, a small amount of coke oven gas is introduced into the desulfurization tank for carrying out reduction.

5) Coke oven gas caning from a first hydrogenation in a refined desulfurization process is introduced to the desulfurization tank at 800 m³/h for reducing the waste agent.

6) $H_2$ concentration at the inlet and outlet is tested every 30 min after the coke oven gas is introduced. A regeneration product is obtained when the $H_2$ concentration at the outlet is stably greater than or equal to the $H_2$ concentration at the inlet (analyze three times).

Comparative Example 1

Provided is a co-conversion process for biomass and canola oil, which is the same as that of embodiment 4 except that in this comparative example, wood chips and soybean straw are used as biomass solid, and the biomass solid has a water content of 80 ppm based on the total amount of the biomass; the molar ratio of iron to sulfur in the reaction system is 1:0.1.

Test Example 1

The oil products prepared in the Embodiments 1-14 of the present invention and that of comparative example 1 are tested and analyzed according to the following methods.

The conversion rate of solid organic material %=(the total mass of solid organic materials in the raw materials−the mass of residual solid organic materials in the reaction product)/the total mass of solid organic material in the raw materials. Wherein, said "solid organic material" in the conversion rate of solid organic material has no water and no ash basis (the same as below).

The yield of conversion oils in solid organic material %=the mass of liquid phase oils at normal temperature and pressure in the conversion products of solid organic material/the total feed mass of solid organic material in raw materials.

The rate of water produced in the reaction %=(the water mass of the reaction products−total mass of water added initially in the reaction or carried by the raw materials)/the mass of the total charge raw materials. When this value is <0, it is marked as "none". The corresponding test results are shown in Table 1 and Table 2:

TABLE 1

Product distributions after conversion of solid organic materials

| Conversion results | Conversion rate of solid organic material % | Yield of oils converted from solid organic material % | Carbon content of oils converted from solid organic material wt % | Hydrogen content of oils converted from solid organic material wt % | Oxygen content of oils converted from solid organic material wt % | Calorific value of oils converted from solid organic material (times of the calorific value of standard fuel oil) | Rate of water produced in the reaction wt % |
|---|---|---|---|---|---|---|---|
| Embodiment 1 | 99 | 52 | 82.2 | 11.7 | 4.8 | 0.92 | none |
| Embodiment 2 | 98 | 50 | 82.4 | 12 | 3.5 | 0.922 | none |
| Embodiment 3 | 98.7 | 51 | 83.5 | 11.9 | 2.8 | 0.92 | 1.2 |
| Embodiment 4 | 98.2 | 50.1 | 83 | 11.0 | 5 | 0.92 | none |
| Embodiment 5 | 99.1 | 52.1 | 82.3 | 12.1 | 3.6 | 0.913 | none |
| Embodiment 6 | 98.7 | 50.3 | 82 | 12.6 | 2.4 | 0.918 | none |
| Embodiment 7 | 98.9 | 51.2 | 83.2 | 12.7 | 3.6 | 0.921 | 1.5 |
| Embodiment 8 | 99.3 | 53.4 | 83.1 | 12.8 | 3.8 | 0.94 | none |
| Embodiment 9 | 99.2 | 52 | 82.8 | 11.1 | 3.7 | 0.909 | 0.87 |
| Embodiment 10 | 98.8 | 51.6 | 83 | 12.1 | 1.9 | 0.929 | none |
| Embodiment 12 | 98.4 | 55 | 83.2 | 12.7 | 3.6 | 0.92 | none |
| Embodiment 14 | 95.0 | 48.0 | 80.1 | 10.0 | 5.3 | 0.81 | 1.0 |
| Comparative Embodiment 1 | 89 | 30 | 75 | 8.3 | 16 | 0.86 | 4 |

The conversion rate of liquid organic material %=(the mass of materials with boiling point greater than 360° C. in the combined liquid organic feed−the total mass of oils with boiling point greater than 360° C. in the products)/the mass of materials with boiling point greater than 360° C. in the combined liquid organic feed.

The yield of conversion oils of the liquid organic material %=the mass of liquid phase oils at normal temperature and pressure in the conversion products/the mass of the total charge raw liquid mineral oils.

TABLE 2

Product distributions after conversion of liquid organic materials

| Conversion results | Conversion rate of liquid organic material % | Yield of oils converted from liquid organic material % | Carbon content of oils converted from liquid organic material wt % | Hydrogen content of oils converted from liquid organic material wt % | Oxygen content of oils converted from liquid organic material wt % | Calorific value of oils converted from liquid organic material (times of the calorific value of standard fuel oil) | Rate of water produced in the reaction wt % |
|---|---|---|---|---|---|---|---|
| Embodiment 11 | 95 | 94 | 84.2 | 11.7 | 0.8 | 0.942 | none |
| Embodiment 13 | 97 | 91 | 85.4 | 10.1 | 1.5 | 0.937 | none |

Table 1 and table 2 show that the yield of oils converted from the solid organic material using the method of the present invention is greater than 50 wt %; the yield of oils converted from liquid organic material is greater than 91%; the calorific value of coils converted from the organic material is 0.91 times greater than that of equal amount of standard fuel oil, and the oxygen content of oil phase in the oils converted from the organic material is less than 4.8 wt %, and the water content after reaction of the raw material is less than 1.5 wt %. However, the rate of water produced in the reaction in the conventional hydrogenation process under pure hydrogen in the prior art is 25 wt % or more.

Embodiment 15

Provided is a con-conversion process for biomass and hogwash oil, described as below.

Pretreatment of Biomass:

Rice straw and reed straw are used as biomass solid. The biomass solid has a moisture content of 4% based on the total weight of the biomass solid. The rice straw and reed straw are fed to an ultrafine pulverizer for initial pulverization to a median particle size of 100 μm, then fed into a briquetting press for carrying out compressing, extruding and molding at a temperature of 30° C. and a pressure of 3 MPa to a bulk density of 0.8 g/cm$^3$, and then subjected to a second pulverization to produce a pretreated biomass having an average particle size of 3 mm.

Catalyst:

A waste agent resulting from use of a desulfurizer comprising FeOOH as an active component is used as a catalyst. The desulfurizer comprises 6 g soluble iron salt Fe(NO$_3$)$_3$·9H$_2$O, 9 g iron salt complexing agent triethanolamine, and 15 g amorphous iron hydroxyl oxide.

The waste agent is produced by a desulfurization process for removing H$_2$S from an exhaust gas with the above desulfurizer. In detail, an exhaust gas having a H$_2$S content of 5500 mg/cm$^3$ is introduced into a desulfurization section at a space velocity of 3000 h$^{-1}$ to carry out desulfurization reaction at a temperature of 30° C., and then a waste agent is collected in the desulfurization section when the content of H$_2$S in an outlet gas of the desulfurization section is less than or equal to 0.01 ppm.

Adding Sulfur:

The waste agent is tested to determine a molar ratio of iron element to sulfur element comprised therein. If the molar ratio of iron element to sulfur element is less than 1:5, solid sulfur powder is added to the waste agent until the molar ratio of iron element to sulfur element reaches 1:5, thereby ensuring that the molar ratio of iron element to sulfur element in the reaction system is 1:5. However if the molar ratio of iron element to sulfur element is greater than 1:5, excess sulfur is removed by conventional methods such as solvent extraction or heating.

Preparation of Biomass Slurry:

The pretreated biomass is mixed with the above catalyst to obtain a mixture, and the mixture is added to hogwash oil and stirred to carry out grinding pulping to form a first slurry. The rice straw and reed straw are present in a total amount of 60 wt % in the first slurry, and the first slurry has a viscosity of 500 mPa·s (50° C.). Further, in the above first slurry, the catalyst has a content of 5 wt %, and an average particle size of 5 μm.

Conversion Reaction:

Firstly, the first slurry is pressurized and heated to a pressure of 21 MPa and a temperature of 300° C.

A partial of a mixture of CO and H$_2$ (CO accounts for 60% and H$_2$ accounts for 40%) is pressurized to a pressure of 21 MPa and heated to a temperature of 350° C., and then introduced to a pipeline which conveys the first slurry as described above. The remaining of the mixture of CO and H$_2$ is pressurized to a pressure of 21 MPa and heated to a temperature of 500° C., and then injected to a slurry bed reactor through an inlet thereof to contact with the first slurry which has entered the slurry bed reactor, so that conversion reaction including cracking, carbonylation, shift and hydrogenation reactions takes place under a pressure of 20 MPa and a temperature of 380° C. The conversion reaction lasts for 60 min, during which a volume ratio of the mixture of CO and H$_2$ to the first slurry is controlled at 3000:1, producing a first oil product.

Embodiment 16

Provided is a co-conversion process for biomass and palm oil, which is described as below.

Pretreatment of Biomass:

Wheat straw and corn straw are used as biomass solid. The biomass solid has a moisture content of 10% based on the total weight of the biomass solid. The rice straw and reed straw are fed to an ultrafine pulverizer for initial pulverization to a median particle size of 300 μm, then fed into a briquetting press for carrying out compressing, extruding and molding at a temperature of 60° C. (and a pressure of 0.5 MPa to a bulk density of 0.9 g/cm$^3$, and then subjected to a second pulverization to produce a pretreated biomass having an average particle size of 5 mm.

Catalyst:

A waste agent resulting from use of a desulfurizer comprising iron oxide as an active component is used as a catalyst. The desulfurizer comprises 10 g calcium bicarbonate, 12 g basic cupric carbonate, 18 g γ-Fe$_2$O$_3$, 5 g MnO$_2$, and 5 g NiO.

The waste agent is produced by a desulfurization process with the above desulfurizer, which is described as follows.

1) Exhaust gas produced by fixed bed catalytic hydrogenation of medium-low temperature coal tar is collected.

2) The above mentioned desulfurizer is prepared into particles having a diameter of 1 mm and a length of 15 mm, and filled in a desulfurization tower to form a desulfurization layer.

3) The collected exhaust gas passes through the desulfurization layer at a space velocity of 2000 h$^{-1}$, so that desulfurization reaction takes place when the exhaust gas contact with the desulfurizer in the desulfurization layer at 50° C. to remove hydrogen sulfide in the exhaust gas. After the reaction is completed, a waste agent, i.e. a spent desulfurizer, is collected and cooled to room temperature, i.e. obtaining a waste agent resulting from use of a desulfurizer comprising iron oxide as an active component.

Adding Sulfur:

The waste agent is tested to determine a molar ratio of iron element to sulfur element comprised therein. If the molar ratio of iron element to sulfur element is less than 1:1, solid sulfur powder is added to the waste agent until the molar ratio of iron element to sulfur element reaches 1:1, thereby ensuring that the molar ratio of iron element to sulfur element in the reaction system is 1:1. However if the molar ratio of iron element to sulfur element is greater than 1:1, excess sulfur is removed by conventional methods such as solvent extraction or heating.

Preparation of Biomass Slurry:

The pretreated biomass is mixed with the above catalyst to obtain a mixture, and the mixture is added to palm oil and stirred to carry out dispersing pulping to form a first slurry. The wheat straw and corn straw are present in a total amount of 50 wt % in the first slurry, and the first slurry has a viscosity of 1400 mPa·s (50° C.). Further, in the above first slurry, the catalyst has a content of 1 wt %, and an average particle size of 10 μm.

Conversion Reaction:

Firstly, the first slurry is pressurized and heated to a pressure of 16 MPa and a temperature of 400° C.

A partial of a mixture of CO and $H_2$ (CO accounts for 60% and $H_2$ accounts for 40%) is pressurized to a pressure of 16 MPa and heated to a temperature of 400° C., and then introduced to a pipeline which conveys the first slurry. The remaining of the mixture of CO and $H_2$ is pressurized to a pressure of 16 MPa and heated to a temperature of 520° C., and then injected to a suspended bed reactor through an inlet thereof to contact with the first slurry which has entered the suspended bed reactor, so that conversion reaction including cracking, carbonylation, shift and hydrogenation reactions takes place under a pressure of 15 MPa and a temperature of 420° C. The conversion reaction lasts for 30 min, during which a volume ratio of the mixture of CO and $H_2$ to the first slurry is controlled at 2000:1, producing a first oil product.

Embodiment 17

Provided is a co-conversion process for biomass and petroleum base wax oil as below.

Pretreatment of Biomass:

Wheat cotton is used as biomass solid. The biomass solid has a moisture content of 1% based on the total weight of the biomass solid. The cotton straw is fed to an ultrafine pulverizer for initial pulverization to a median particle size of 200 μm, then fed into a briquetting press for carrying out compressing, extruding and molding at a temperature of 40° C. and a pressure of 2 MPa to a bulk density of 0.9 g/cm³, and then subjected to a second pulverization to produce a pretreated biomass having an average particle size of 1 mm.

Catalyst:

Amorphous FeOOH is used as the catalyst.

Adding sulfur: Solid sulfur powder is added to the above catalyst until the molar ratio of iron element to sulfur element comprised therein is 1:2, thereby ensuring that the molar ratio of iron element to sulfur element in the reaction system is 1:2.

Preparation of Biomass Slurry:

The pretreated biomass is mixed with the above catalyst to obtain a mixture, and the mixture is added to petroleum base wax oil to carry out dispersing pulping to form a first slurry. The cotton straw is present in a total amount of 50 wt % in the first slurry, and the first slurry has a viscosity of 400 mPa·s (50° C.). Further, in the above first slurry, the catalyst has a content of 1 wt %, and an average particle size of 10 μm.

Conversion Reaction:

Firstly, the first slurry is pressurized and heated to a pressure of 22 MPa, and a temperature of 50° C.

A partial of a mixture of CO and $H_2$ (CO accounts for 60% and $H_2$ accounts for 40%) is pressurized to a pressure of 17 MPa and heated to a temperature of 250° C., and then introduced to a pipeline which conveys the first slurry. The remaining of the mixture of CO and $H_2$ is pressurized to a pressure of 17 MPa and heated to a temperature of 550° C., and then injected to a fluidized bed reactor through an inlet thereof to contact with the first slurry which has entered the suspended bed reactor, so that conversion reaction including cracking, carbonylation, shift and hydrogenation reactions takes place under a pressure of 16 MPa and a temperature of 420° C. The conversion reaction lasts for 40 min, during which a volume ratio of the mixture of CO and $H_2$ to the first slurry is controlled at 1000:1, producing an oil product.

Embodiment 18

Provided is a co-conversion process for biomass and canola oil, which is described as below.

Pretreatment of Biomass:

Wood chips and soybean straw are used as biomass solid. The biomass solid has a moisture content of 2% based on the total weight of the biomass solid. The wood chips and soybean straw are fed to an ultrafine pulverizer for initial pulverization to a median particle size of 150 μm, then fed into a briquetting press for carrying out compressing, extruding and molding at a temperature of 50° C. and a pressure of 1 MPa to a bulk density of 1 g/cm³, and subjected to a second pulverization to produce a pretreated biomass having an average particle size of 4 mm.

Catalyst:

A regeneration product of a waste agent resulting from use of a desulfurizer comprising iron oxide as an active component is used as a catalyst. The desulfurizer comprises 50 g cubic $Fe_3O_4$, 12 g calcium sulphate dihydrate, 20 g basic zinc carbonate, and 6 g sodium carboxymethylcellulose.

The desulfurizer is used in a desulfurization process for petroleum comprising hydrogen sulfide, which is described as below.

(1) The above mentioned desulfurizer is prepared into particles having a diameter of 1.5 mm, and filled in a desulfurization tower to form a desulfurization layer.

(2) Petroleum comprising hydrogen sulfide is sprayed by a nozzle into the desulfurization layer from the top of the desulfurization tower to carry out desulfurization under spraying. After desulfurization is completed, a spent desulfurizer is produced, which is the waste agent resulting from use of a desulfurizer comprising iron oxide.

The obtained waste agent is subjected to regeneration which is described as below:

1) The waste agent is mixed with water and stirred in a slurry tank to form a second slurry which has a solid content of 12 wt %.

2) Sodium hypochlorite is introduced into the second slurry to carry out a first oxidation reaction at 60° C. and 1 MPa, producing an oxidized slurry.

3) $Na_2S$ is added to the oxidized slurry to carry out a vulcanization reaction at 10° C. and 5 MPa, producing a vulcanized slurry.

4) Hydrogen peroxide is introduced into the vulcanized slurry to carry out a second oxidation reaction at 30° C. and 1.1 MPa to further oxidize and regenerate the slurry.

5) Steps 3) and 4) are repeated once to produce a final slurry wherein the molar ratio of iron to sulfur is 1:1.8.

6) The final slurry is subjected to solid-liquid separation to obtain the regeneration product of the above waste agent.

Adding Sulfur:

Solid sulfur powder is added to the above regeneration product until the molar ratio of iron element to sulfur element comprised therein is 1:2, thereby ensuring that the molar ratio of iron element to sulfur element in the reaction system is 1:2.

Preparation of Biomass Slurry:

Pretreated biomass is mixed with the above catalyst to obtain a mixture, and the mixture is added to canola oil to carry out shearing pulping to form a first slurry. The wood chips and soybean straw are present in a total amount of 40 wt % in the first slurry, and the first slurry has a viscosity of 1000 mPa·s (50° C.). Further, the regeneration product of a waste agent resulting from use of a desulfurizer comprising iron oxide as an active component is present in a content of 2 wt % in the first slurry, and has an average particle size of 400 μm.

Conversion Reaction:

Firstly, the first slurry is pressurized and heated to a pressure of 18 MPa and a temperature of 200° C.

Synthesis gas (CO accounts for 20% by volume) is pressurized to a pressure of 18.2 MPa and heated to a temperature of 450° C., and then injected into a bubble column reactor through four injection ports on the bottom and side walls thereof to contact with the first slurry which has entered the bubble column reactor, so that conversion reaction including cracking, carbonylation, shift and hydrogenation reactions takes place under a pressure of 18 MPa and a temperature of 380° C. The conversion reaction lasts for 100 min, during which a volume ratio of the synthesis gas to the first slurry is controlled at 950:1, producing a first oil product.

Embodiment 19

Provided is a liquefaction conversion process for biomass, which is described as below.

Pretreatment of Biomass:

Pea straw, sorghum straw and rice straw are used as biomass solid. The biomass solid has a moisture content of 15% based on the total weight of the biomass solid. The pea straw, sorghum straw and rice straw are fed to an ultrafine pulverizer for initial pulverization to a median particle size of 250 μm, then fed into a briquetting press for carrying out compressing, extruding and molding at a temperature of 55° C. and a pressure of 1.5 MPa to a bulk density of 0.9 g/cm$^3$, and then subjected to a second pulverization to produce a pretreated biomass having an average particle size of 0.9 mm.

Catalyst:

A regeneration product of a waste agent resulting from use of a desulfurizer comprising $Fe_{21.333}O_{32}$ as an active component is used as a catalyst. The desulfurizer comprises 55 g $Fe_{21.333}O_{32}$, 22 g anatase type $TiO_2$, and 15 g bentonite clay.

The desulfurizer comprising $Fe_{21.333}O_{32}$ as an active component is used in a desulfurization process is described as below:

The above desulfurizer is filled into a fixed bed reactor to contact fully with gas-field water containing $H_2S$ under a temperature of 35° C., a pressure of 0.2 MPa, and a volumetric space velocity of 10000 h$^{-1}$ to carry out desulfurization reaction. After the desulfurization reaction is completed, a spent desulfurizer is produced, i.e. obtaining a waste agent resulting from use of a desulfurizer comprising $Fe_{21.333}O_{32}$ as an active component.

The obtained waste agent was regenerated described as below:

1) The waste agent is dispersed in water to form a slurry.

2) The slurry is heated to a temperature of 45° C. under atmospheric pressure. Then hydrogen peroxide is added to the slurry by using a peristaltic pump and air is introduced at a hydrogen peroxide flow rate of 500 mL/min and an air flow rate of 100 mL/min to perform reactions for a period of 5 min under magnetic stirring.

3) After the reaction is completed, the resulted reaction solution is filtered, producing a precipitate which is then washed three times with water and then dried naturally to obtain a regeneration product of the above-mentioned waste agent.

Adding Sulfur:

Solid sulfur powder is added to the above regeneration product until the molar ratio of iron element to sulfur element reaches 1:4, thereby ensuring that the molar ratio of iron element to sulfur element in the reaction system is 1:4.

Preparation of Biomass Slurry:

The pretreated biomass is mixed with the above catalyst to obtain a mixture, and the mixture is added to a mixed oil of gutter oil and canola oil to carry out homogenize pulping to form a first slurry. The gutter oil and canola oil used in the subsequent pulping process can be replaced with the oil products produced by the biomass liquefaction process in the present embodiment. The pea straw, sorghum straw and rice straw are present in a total amount of 40 wt % in the first slurry, and the first slurry has a viscosity of 820 mPa·s (50° C.). Further, the regeneration product of a desulfurization waste agent of a desulfurizer comprising $Fe_{21.333}O_{32}$ as an active component is present in a content of 8 wt % in the first slurry, and has an average particle size of 300 μm.

Liquefaction Reaction:

Firstly, the first slurry is pressurized and heated to a pressure of 10 MPa and a temperature of 290° C.

A mixture of CO and $H_2$ (CO accounts for 50% by volume) is pressurized to a pressure of 17.5 MPa and heated to a temperature of 380° C., and then injected into a slurry bed reactor from five injection ports on the bottom and side walls thereof to contact with the first slurry which has entered therein to carry out first conversion reaction including cracking, carbonylation, shift and hydrogenation reactions under a pressure of 17 MPa and a temperature of 420° C. The reaction lasts for 50 min, during which the volume ratio of the mixture of CO and $H_2$ to the first slurry is controlled at 1500:1, producing a first oil product.

Embodiment 20

Provided is a liquefaction conversion process for biomass, which is described as below.

Pretreatment of Biomass:

Wheat straw and flax straw are used as biomass solid. The biomass solid has a moisture content of 9% based on the total weight of the biomass solid. The wheat straw and flax straw are fed to an ultrafine pulverizer for initial pulverization to a median particle size of 300 μm, then fed into a briquetting press for carrying out compressing, extruding and molding at a temperature of 60° C. and a pressure of 3 MPa to a bulk density of 1.1 g/cm$^3$, and then subjected to a second pulverization to produce a pretreated biomass having an average particle size of 2 nm.

Catalyst:

A regeneration product of a waste agent resulting from use of a desulfurizer comprising FeOOH as an active component is used as a catalyst. The desulfurizer comprises 30 g α-FeOOH, 20 g amorphous FeOOH, 8 g potassium oxide, and 10 g binding agent kaolin.

The desulfurizer comprising FeOOH as an active component is used in a desulfurization process for a tail gas produced in the hydro-upgrading process of medium-low temperature coal tar in industry described as below:

1) Exhaust gas produced by fixed bed catalytic hydrogenation of medium-low temperature coal tar is collected.

2) The above mentioned desulfurizer is prepared into particles having a diameter of 1 mm and a length of 15 mm, and filled in a desulfurization tower to form a desulfurization layer.

3) The collected exhaust gas passes through the desulfurization layer at a space velocity of 2000 h$^{-1}$, so that desulfurization reaction takes place when the exhaust gas contact with the desulfurizer in the desulfurization layer at 50° C. to remove hydrogen sulfide in the exhaust gas. After the reaction is completed, a waste agent, i.e. a spent desulfurizer, is collected and cooled to room temperature, i.e. obtaining a waste agent resulting from use of a desulfurizer comprising iron oxide as an active component.

The above waste agent was regenerated described as below:

1) The waste agent is mixed with sodium hydroxide solution and stirred in a slurry tank to form a second slurry which has a pH value of 8.0 and a solid content of 4 wt % by weight.

2) Air is introduced into the second slurry to carry out a first oxidation reaction at 90° C. and 0.1 MPa, producing an oxidized slurry.

3) $H_2S$ is introduced into the oxidized slurry to carry out a vulcanization reaction at 10° C. and 5 MPa, producing a vulcanized slurry.

4) Air is introduced into the vulcanized slurry to carry out a second oxidation reaction at 90° C. and 0.1 MPa to further oxidize and regenerate the slurry.

5) Steps 3) and 4) are repeated once to produce a final slurry wherein the molar ratio of iron to sulfur is 1:2.

6) The final slurry is subjected to solid-liquid separation to obtain the regeneration product of the above waste agent.

Preparation of Slurry:

The pretreated biomass is mixed with the above catalyst to obtain a mixture, and the mixture is added to a mixed oil of palm oil and a petroleum base wax oil and stirred to carry out stirring pulping to form a first slurry. The wheat straw and flax straw are present in a total amount of 45 wt % in the first slurry, and the first slurry has a viscosity of 530 mPa·s (50° C.). Further, the regeneration product of a desulfurization waste agent of a desulfurizer comprising FeOOH as an active component is present in a content of 0.3 wt % in the first slurry, and has an average particle size of 20 μm.

Adding Sulfur:

Solid sulfur powder is added to the above regeneration product until the molar ratio of iron element to sulfur element reaches 1:2.5, thereby ensuring that the molar ratio of iron element to sulfur element in the reaction system is 1:2.5.

Conversion Reaction:

Firstly, the first slurry is pressurized and heated to a pressure of 16 MPa and a temperature of 350° C.

A partial of a mixture of CO and $H_2$ (CO accounts for 80% and $H_2$ accounts for 20%) is pressurized to a pressure of 19.5 MPa and heated to a temperature of 300° C., and then introduced to a pipeline which conveys the first slurry as described above. The remaining of the mixture of CO and $H_2$ is pressurized to a pressure of 19.3 MPa and heated to a temperature of 480° C., and then injected to a slurry bed reactor through three injection ports on the bottom and side walls thereof to contact with the first slurry which has entered the slurry bed reactor, so that conversion reaction including cracking, carbonylation, shift and hydrogenation reactions takes place under a pressure of 19 MPa and a temperature of 390° C. The conversion reaction lasts for 100 min, during which a volume ratio of the mixture of CO and $H_2$ to the first slurry is controlled at 800:1, producing a first oil product.

Embodiment 21

Provided is a liquefaction process for biomass, which is described as below.

Pretreatment of Biomass:

Rice straw and broad bean straw are used as biomass solids. The biomass solids have a moisture content of 10% based on the total weight of the biomass solids. The rice straw and broad bean straw are fed to an ultrafine pulverizer for initial pulverization to a median particle size of 100 μm, then fed into a briquetting press for carrying out compressing, extruding and molding at a temperature of 30° C. and a pressure of 0.5 MPa to a bulk density of 1.0 g/cm³, and then subjected to a second pulverization to produce a pretreated biomass having an average particle size of 1 nm.

Catalyst:

A regeneration product of a waste agent resulting from use of a desulfurizer comprising iron oxide as an active component is used as a catalyst. The desulfurizer comprises 12 g $Fe_3O_4$ of cubic crystal, 24 g amorphous $Fe_2O_3$, 39 g amorphous $Fe_2O_3·H_2O$, and 5 g NiO.

The waste agent is produced by a desulfurization process for removing $H_2S$ from an exhaust gas with the above desulfurizer. In detail, an exhaust gas having a $H_2S$ content of 5500 mg/cm³ is introduced into a desulfurization section at a space velocity of 3000 $h^{-1}$ to carry out desulfurization reaction at a temperature of 30° C., and then a waste agent is collected in the desulfurization section when the content of $H_2S$ in an outlet gas of the desulfurization section is less than or equal to 0.01 ppm.

The above waste agent resulting from use of a desulfurizer comprising iron oxide as an active component was regenerated described as below:

1) The waste agent is washed with water, and then ground with water in a wet ball mill to obtain a waste powder of 200 mesh.

2) The waste powder is prepared into an aqueous suspension with a solid mass percentage of 7%, into which compressed air is introduced to carry out the reaction.

3) The aqueous suspension is filtered to obtain solid materials, which are placed in a flotation tank, into which water is added, and then air is introduced, and the precipitate at the lower part of the container is dried to obtain a regeneration product of the above waste agent.

Adding Sulfur:

Solid sulfur powder is added to the above regeneration product until the molar ratio of iron element to sulfur element comprised therein is 1:0.9, thereby ensuring that the molar ratio of iron element to sulfur element in the reaction system is 1:0.9.

Preparation of Biomass Slurry:

The pretreated biomass is mixed with the above catalyst to obtain a mixture, and the mixture is added to coal tar to carry out dispersing pulping to form a first slurry. The rice straw and broad bean straw are present in a total amount of 55 wt % in the first slurry, and the first slurry has a viscosity of 510 mPa·s (50° C.). Further, in the above first slurry, the catalyst has a content of 0.2 wt %, and an average particle size of 2 μm.

Conversion Reaction:

Firstly, the first slurry is pressurized and heated to a pressure of 21 MPa and a temperature of 190° C.

A mixture of CO and $H_2$ (CO accounts for 60% and $H_2$ accounts for 40%) is pressurized to a pressure of 20.4 MPa and heated to a temperature of 500° C., and then injected into a slurry bed reactor from three injection ports on side walls thereof to contact with the first slurry which has entered therein to carry out first conversion reaction including cracking, carbonylation, shift and hydrogenation reactions under a pressure of 20 MPa and a temperature of 410° C. The reaction lasts for 110 min, during which the volume ratio of the mixture of CO and H$_2$ to the first slurry is controlled at 650:1, producing a first oil product.

Embodiment 22

Provided is a liquefaction process for biomass, which is described as below.

Pretreatment of Biomass:

Corn straw and ramie straw are used as biomass solids. The biomass solids have a moisture content of 20% based on the total weight of the biomass solids. The corn straw and ramie straw are fed to an ultrafine pulverizer for initial pulverization to a median particle size of 300 μm, then fed into a briquetting press for carrying out compressing, extruding and molding at a temperature of 50° C. and a pressure of 2.5 MPa to a bulk density of 0.8 g/cm$^3$, and then subjected to a second pulverization to produce a pretreated biomass having an average particle size of 3 mm.

Catalyst:

A waste agent resulting from use of a desulfurizer comprising FeOOH as an active component is used as a catalyst. The desulfurizer comprises 70 g amorphous FeOOH, 25 g Co$_2$O$_3$, and 5 g NiO.

The desulfurizer comprising FeOOH as an active component is used in a desulfurization process for removing H$_2$S from exhaust gas, which is described as below. An exhaust gas having a H$_2$S content of 5500 mg/cm$^3$ is introduced to a desulfurization section at a space velocity of 3000 h$^{-1}$ to carry out desulfurization reaction at 30° C. When the content of H$_2$S in the outlet gas of the desulfurization section is less than or equal to 0.01 ppm, a waste agent is produced and collected in the desulfurization section, i.e. obtaining the waste agent mentioned above.

Adding Sulfur:

Solid sulfur powder is added into the waste agent until the molar ratio of iron element to sulfur element is 1:3, thereby ensuring that the molar ratio of iron element to sulfur element in the reaction system is 1:3.

Preparation of Biomass Slurry:

The pretreated biomass is mixed with the above catalyst to obtain a mixture, and the mixture is added to gutter oil to carry out emulsifying pulping to form a first slurry. The corn straw and ramie straw are present in a total amount of 57 wt % in the first slurry, and the first slurry has a viscosity of 1130 mPa·s (50° C.). Further, the waste agent resulting from use of a desulfurizer comprising FeOOH as an active component is present in a content of 4 wt % in the first slurry, and has an average particle size of 120 μm.

Conversion Reaction:

Firstly, the first slurry is pressurized and heated to a pressure of 14 MPa and a temperature of 250° C.

A partial of pure CO gas is pressurized to a pressure of 18 MPa and heated to a temperature of 250° C., and then introduced into the first slurry. The remaining of the pure CO gas is pressurized to a pressure of 18 MPa and heated to a temperature of 500° C., and then injected to a slurry bed reactor through four injection ports on the bottom and side walls thereof to contact with the first slurry which has entered the slurry bed reactor, so that first conversion reaction including cracking, carbonylation, shift and hydrogenation reactions takes place under a pressure of 17 MPa, a temperature of 400° C. The first conversion reaction lasts for 40 min, during which the volume ratio of pure CO gas to the first slurry is controlled at 950:1, producing a first conversion product, i.e. a first oil product.

Embodiment 23

Provided is a liquefaction process for biomass described as below.

Pretreatment of Biomass:

Pea straw, sorghum straw and rice straw are used as biomass solids. The biomass solids have a moisture content of 15% based on the total weight of the biomass solids. The pea straw, sorghum straw and rice straw are fed to an ultrafine pulverizer for initial pulverization to a median particle size of 250 ppm, then fed into a briquetting press for carrying out compressing, extruding and molding at a temperature of 55° C. and a pressure of 1.5 MPa to a bulk density of 0.9 g/cm$^3$, and then subjected to a second pulverization to produce a pretreated biomass having an average particle size of 0.9 mm.

Catalyst:

A waste agent resulting from use of a desulfurizer comprising FeOOH as an active component is used as a catalyst. The desulfurizer comprises 60% by weight of amorphous FeOOH, 30% by weight of diatomaceous earth carrier, 10% by weight of cellulose powder binding agent.

The desulfurizer comprising FeOOH as an active component is used in a desulfurization process for removing H$_2$S from exhaust gas, which is described as below. An exhaust gas having a H$_2$S content of 5500 mg/cm$^3$ is introduced to a desulfurization section at a space velocity of 3000 h$^{-1}$ to carry out desulfurization reaction at 30° C. When the content of H$_2$S in the outlet gas of the desulfurization section is less than or equal to 0.01 ppm, a waste agent is produced and collected in the desulfurization section, i.e. obtaining the waste agent mentioned above.

Adding Sulfur:

Solid sulfur powder is added to the above regeneration product until the molar ratio of iron element to sulfur element comprised therein is 1:4, thereby ensuring that the molar ratio of iron element to sulfur element in the reaction system is 1:4.

Preparation of Biomass Slurry:

The pretreated biomass is mixed with the above catalyst to obtain a mixture, and the mixture is added to a mixed oil of gutter oil and canola oil to carry out homogenous pulping to form a first slurry. The gutter oil and canola oil used in the subsequent pulping process can be replaced with the oil products produced by the biomass liquefaction process in the present embodiment. The pea straw, sorghum straw and rice straw are present in a total amount of 40 wt % in the first slurry, and the first slurry has a viscosity of 820 mPa·s (50° C.). Further, the desulfurizer comprising FeOOH as an active component is present in a content of 8 wt % in the first slurry, and has an average particle size of 300 μm.

Liquefaction Reaction:

Firstly, the first slurry is pressurized and heated to a pressure of 18 MPa and a temperature of 380° C.

A mixture of CO and H$_2$ (CO accounts for 50% by volume) is pressurized to a pressure of 18 MPa and heated to a temperature of 380° C., and then injected into a slurry bed reactor from five injection ports on the bottom and side walls thereof to contact with the first slurry which has entered therein to carry out first conversion reaction including cracking, carbonylation, shift and hydrogenation reactions under a pressure of 17 MPa and a temperature of 420° C. The first conversion reaction lasts for 50 min, during which the volume ratio of the mixture of CO and H$_2$ to the first slurry is controlled at 900:1, producing a first oil product.

Embodiment 24

Provided is a conversion process for oil residue and faeces, which is described as below.

Pretreatment of Oil Residue and Faeces:

Oil residue and faeces are used as biomass solid. The biomass solid has a moisture content of 12% based on the total weight of the biomass solid. The oil residue and faeces are fed to an ultrafine pulverizer for initial pulverization to a median particle size of 150 μm, then fed into a briquetting press for carrying out compressing, extruding and molding at a temperature of 55° C. and a pressure of 1.5 MPa to a bulk density of 1.0 $g/cm^3$, and then subjected to a second pulverization to produce a pretreated biomass having an average particle size of 2 mm.

Catalyst:

Amorphous FeOOH is used as the catalyst.

Adding Sulfur:

Solid sulfur powder is added to the catalyst until the molar ratio of iron element to sulfur element comprised therein is 1:1.5, thereby ensuring that the molar ratio of iron element to sulfur element in the reaction system is 1:1.5.

Preparation of Slurry:

The pretreated oil residue and faeces are mixed with the above catalyst to obtain a mixture, and the mixture is added to petroleum base wax oil to carry out dispersing pulping to form a first slurry. The oil residue and faeces are present in a total amount of 50 wt % in the first slurry, and the first slurry has a viscosity of 400 mPa·s (50° C.). Further, in the above first slurry, the catalyst has a content of 1 wt %, and an average particle size of 10 μm.

Conversion Reaction:

Firstly, the first slurry is pressurized and heated to a pressure of 22 MPa and a temperature of 50° C.

A partial of a mixture of CO and $H_2$ (CO accounts for 60% and $H_2$ accounts for 40%) is pressurized to a pressure of 16.8 MPa and heated to a temperature of 250° C., and then introduced to a pipeline which conveys the first slurry. The remaining of the mixture of CO and $H_2$ is pressurized to a pressure of 16.2 MPa and heated to a temperature of 550° C., and then injected to a fluidized bed reactor through an inlet thereof to contact with the first slurry which has entered the suspended bed reactor, so that conversion reaction including cracking, carbonylation, shift and hydrogenation reactions takes place under a pressure of 16 MPa and a temperature of 420° C. The conversion reaction lasts for 40 min, during which a volume ratio of the mixture of CO and $H_2$ to the first slurry is controlled at 1000:1, producing a first oil product.

Embodiment 25

Provided is a co-conversion process for oil sand's oil and hogwash oil, described as below.

Catalyst:

A waste agent resulting from use of a desulfurizer comprising FeOOH as an active component is used as a catalyst. The desulfurizer comprises 6 g soluble iron salt $Fe(NO_3)_3 \cdot 9H_2O$, 9 g iron salt complexing agent triethanolamine, and 15 g amorphous iron hydroxyl oxide.

The waste agent is produced by a desulfurization process for removing $H_2S$ from an exhaust gas with the above desulfurizer. In detail, an exhaust gas having a $H_2S$ content of 5500 $mg/cm^3$ is introduced into a desulfurization section at a space velocity of 3000 $h^{-1}$ to carry out desulfurization reaction at a temperature of 30° C., and then a waste agent is collected in the desulfurization section when the content of $H_2S$ in an outlet gas of the desulfurization section is less than or equal to 0.01 ppm.

Adding Sulfur:

The waste agent is tested to determine a molar ratio of iron element to sulfur element comprised therein. If the molar ratio of iron element to sulfur element is less than 1:2, solid sulfur powder is added to the waste agent until the molar ratio of iron element to sulfur element reaches 1:2, thereby ensuring that the molar ratio of iron element to sulfur element in the reaction system is 1:2. However if the molar ratio of iron element to sulfur element is greater than 1:2, excess sulfur is removed by conventional methods such as solvent extraction or heating.

Preparation of Slurry:

Oil sand's oil and hogwash oil are mixed with the above catalyst to obtain a mixture, and then an appropriate amount of water is added to the mixture under stirring to form a first slurry. The catalyst has an average particle diameter of 5 μm.

Conversion Reaction:

Firstly, the first slurry is pressurized and heated to a pressure of 15 MPa and a temperature of 250° C.

A partial of a mixture of CO and $H_2$ (CO accounts for 60% and $H_2$ accounts for 40%) is pressurized to a pressure of 5.7 MPa and heated to a temperature of 500° C., and then introduced to a pipeline which conveys the first slurry as described above. The remaining of the mixture of CO and $H_2$ is pressurized to a pressure of 5.2 MPa and heated to a temperature of 500° C., and then injected to a slurry bed reactor through an inlet thereof to contact with the first slurry which has entered the slurry bed reactor, so that conversion reaction including cracking, carbonylation, shift and hydrogenation reactions takes place under a pressure of 5 MPa and a temperature of 470° C. The conversion reaction lasts for 90 min, during which a volume ratio of the mixture of CO and $H_2$ to the first slurry is controlled at 8000:1, producing a first oil product.

Embodiment 26

Provided is a co-conversion process for oil residue, wheat straw and gutter oil as below.

Pretreatment of Oil Residue and Wheat Straw:

Oil residue and wheat straw are used as biomass solid. The biomass solid has a moisture content of 5% based on the total weight of the biomass solid. The oil residue and wheat straw are fed to an ultrafine pulverizer for initial pulverization to a median particle size of 200 μm, then fed into a briquetting press for carrying out compressing, extruding and molding at a temperature of 550° C. and a pressure of 1.5 MPa to a bulk density of 0.95 $g/cm^3$, and then subjected to a second pulverization to produce a pretreated biomass having an average particle size of 60 pin.

Catalyst:

A regeneration product of a waste agent resulting from use of a desulfurizer comprising FeOOH is used as a catalyst. The desulfurizer comprises 45% by weight of γ-FeOOH, 35% by weight of α-FeOOH, 15% by weight of molecular sieve as carriers, and 5% by weight of sesbania powder as binder.

The desulfurizer is used in a desulfurization process for removing $H_2S$ from exhaust gas, which is described as below. An exhaust gas having a $H_2S$ content of 5500 $mg/cm^3$ is introduced to a desulfurization section at a space velocity of 3000 $h^{-1}$ to carry out desulfurization reaction at 30° C. When the content of $H_2S$ in the outlet gas of the desulfurization section is less than or equal to 0.01 ppm, a waste agent in the desulfurization section is collected.

The obtained waste agent was regenerated described as below: The waste agent is washed with water, and then ground with water in a wet ball mill to obtain a waste powder of 80 mesh. The waste powder is prepared into an aqueous suspension with a solid mass percentage of 8%, into which compressed air is introduced. Sample is taken for testing after reacting for a period of time. When there is no $H_2S$ produced from the reaction between the sample and hydrochloric acid, the iron sulphides in the waste agent have been completely converted into FeOOH and elemental sulfur, producing a slurry comprising FeOOH and elemental sulfur. Filtering the slurry to obtain a solid material, and extracting the solid material with $CCl_4$ for three times, then combining the extracted liquids, and recovering the solvents by distillation to obtain crystalline elemental sulfurs. Mixing the remaining solids separated from the extraction liquids with sesbania powders to obtain a regeneration product of the above-mentioned waste agent, wherein the amount of the binder sesbania powders is 5% by mass of the solids.

Adding carbon disulfides: Adding carbon disulfides into the above regeneration product until the molar ratio of iron element to sulfur element is 1:2, thereby ensuring that the molar ratio of iron element to sulfur element in the reaction system is 1:2.

Preparation of Slurry:

The pretreated oil residue and wheat straw are mixed with the above catalyst to obtain a mixture, and the mixture is added to gutter oil to carry out dispersing pulping to form a first slurry. The oil residue and faeces are present in a total amount of 55 wt % in the first slurry, and the first slurry has a viscosity of 400 mPa·s (50° C.). Further, in the above first slurry, the catalyst has a content of 10 wt %, and an average particle size of 5 mm.

Conversion Reaction:

Firstly, the first slurry is pressurized and heated to a pressure of 16 MPa and a temperature of 250° C.

A partial of a mixture of CO and $H_2$ (CO accounts for 60% and $H_2$ accounts for 40%) is pressurized to a pressure of 16.8 MPa and heated to a temperature of 250° C., and then introduced to a pipeline which conveys the first slurry. The remaining of the mixture of CO and $H_2$ is pressurized to a pressure of 16.2 MPa and heated to a temperature of 550° C., and then injected to a fluidized bed reactor through an inlet thereof to contact with the first slurry which has entered the fluidized bed reactor, so that conversion reaction including cracking, carbonylation, shift and hydrogenation reactions takes place under a pressure of 16 MPa and a temperature of 420° C. The conversion reaction lasts for 60 min, during which a volume ratio of the mixture of CO and $H_2$ to the first slurry is controlled at 5000:1, producing a first oil product.

Embodiment 27

Provided is a co-conversion process for oil sand's oil and palm oil, described as below.

Catalyst:

A regeneration product of a waste agent resulting from use of a desulfurizer comprising $Fe_{21.333}O_{32}$ is used as a catalyst. The desulfurizer comprises 55 g $Fe_{21.333}O_{32}$, 12 g copper oxide, and 21 g $Fe_2O_3$ as carrier.

The desulfurizer is used in a desulfurization process for a coal pyrolysis gas comprising hydrogen sulfide, which is described as below.

(1) A compressed coal pyrolysis gas is cooled to a temperature of 30-35° C., and mixed with air from an air pump and introduced to a desulfurization tower filled with the above-mentioned desulfurizer which mainly comprises iron oxide as an active component. The compressed coal pyrolysis gas enters at the bottom and exits at the top, thereby preventing liquid water from entering the desulfurizer bed.

(2) After many times use of the above-mentioned desulfurizer, a waste agent, i.e. spent desulfriizer, is produced and removed from the desulfurizer bed, i.e. obtaining a waste agent resulting from use of a desulfurizer comprising $Fe_{21.333}O_{32}$.

The obtained waste agent was regenerated described as below:

1) The waste agent is dispersed in water to form a slurry.
2) The slurry is heated to a temperature of 60° C. under atmospheric pressure. Then hydrogen peroxide is added to the slurry by using a peristaltic pump at a flow rate of 500 mL/min to perform reactions for a period of 10 min under magnetic stirring.
3) After the reaction is completed, the resulted reaction solution is filtered, producing a precipitate which is then washed twice with water and then dried naturally to obtain a regeneration product of the above-mentioned waste agent.

Preparation of Slurry:

Oil sand's oil and palm oil are mixed with the above catalyst to obtain a mixture, and then an appropriate amount of water is added to the mixture under stirring to form a first slurry. The catalyst has an average particle diameter of 300 μm.

Conversion Reaction:

Firstly, the first slurry is pressurized and heated to a pressure of 8 MPa and a temperature of 400° C.

A partial of pure CO is pressurized to a pressure of 5.7 MPa and heated to a temperature of 500° C., and then introduced to a pipeline which conveys the first slurry. The remaining of the pure CO is pressurized to a pressure of 5.2 MPa and heated to a temperature of 500° C., and then injected to a slurry bed reactor through an inlet thereof to contact with the first slurry which has entered the slurry bed reactor, so that conversion reaction including cracking, carbonylation, shift and hydrogenation reactions takes place under a pressure of 5 MPa, a temperature of 470° C., and a controlled volume ratio of the mixture of CO and $H_2$ to the first slurry of 3000:1. The conversion reaction lasts for 90 min, during which hydrogen sulfide gas is introduced into the slurry bed reactor to ensure a molar ratio of iron element to sulfur element in the reaction system is 1:3, producing a first oil product.

Embodiment 28

Provided is a co-conversion process for biomass and canola oil, which is the same as that of embodiment 4 except for the regeneration method. The waste agent is regenerated as described below.

1) Water vapor with a pressure of 1.5 MPa is introduced into a heating furnace to heat to 450° C.
2) The heated water vapor is introduced into a desulfurization tank containing the waste agent at a speed of 15 m/s to heat the waste agent contained therein.
3) The waste agent is kept at 400° C. for 2 h under heating by the water vapor which is consumed at a speed of 6 t/h.
4) The pH of the outlet of the desulfurization tank is analyzed, and when the pH is greater than or equal to 7.5 for three times, a small amount of coke oven gas is introduced into the desulfurization tank for carrying out reduction.

5) Coke oven gas coming from a first hydrogenation in a refined desulfurization process is introduced to the desulfurization tank at 800 m³/h for reducing the waste agent.

6) $H_2$ concentration at the inlet and outlet is tested every 30 minutes after the coke oven gas is introduced. A regeneration product is obtained when the $H_2$ concentration at the outlet is stably greater than or equal to the $H_2$ concentration at the inlet (analyze three times).

Comparative Example 2

Provided is a co-conversion process for biomass and canola oil, which is the same as that of embodiment 18 except that in this comparative example, wood chips and soybean straw are used as biomass solid, and the biomass solid has a water content of 80 ppm based on the total amount of the biomass solid, the molar ratio of iron to sulfur in the reaction system is 1:0.1.

Test Example 2

The oil products prepared in the Embodiments 15-28 of the present invention and that of comparative example 2 are tested and analyzed according to the following methods.

The conversion rate of solid organic material %=(the total mass of solid organic materials in the raw materials−the mass of residual solid organic materials in the reaction product)/the total mass of solid organic material in the raw materials. Wherein, said "solid organic material" in the conversion rate of solid organic material has no water and no ash basis (the same as below).

The yield of oils converted from solid organic material %=the mass of liquid phase oils at normal temperature and pressure in the conversion products of solid organic material/the total feed mass of solid organic material in raw materials.

The rate of water produced in the reaction %=(the water mass of the reaction products−total mass of water added initially in the reaction or carried by the raw materials)/the mass of the total charge raw materials. When this value is <0, it is marked as "none".

The corresponding test results are shown in Table 3 and Table 4:

TABLE 3

Product distributions after conversion of solid organic materials

| Conversion results | Conversion rate of solid organic material % | Yield of oils converted from solid organic material % | Carbon content of oils converted from solid organic material wt % | Hydrogen content of oils converted from solid organic material wt % | Oxygen content of oils converted from solid organic material wt % | Calorific value of oils converted from solid organic material (times of the calorific value of standard fuel oil) | Rate of water produced in the reaction wt % |
|---|---|---|---|---|---|---|---|
| Embodiment 15 | 99.1 | 52.3 | 82.4 | 11.8 | 4.5 | 0.93 | none |
| Embodiment 16 | 98.1 | 50.5 | 82.6 | 12.1 | 3.2 | 0.924 | none |
| Embodiment 17 | 98.8 | 51.4 | 83.7 | 12.0 | 2.5 | 0.93 | 1.0 |
| Embodiment 18 | 98.3 | 50.4 | 83.2 | 11.1 | 4.6 | 0.93 | none |
| Embodiment 19 | 99.2 | 52.5 | 82.5 | 12.2 | 3.3 | 0.918 | none |
| Embodiment 20 | 98.8 | 50.6 | 82.2 | 12.7 | 2.1 | 0.92 | none |
| Embodiment 21 | 99.0 | 51.5 | 83.4 | 12.8 | 3.3 | 0.928 | 1.2 |
| Embodiment 22 | 99.4 | 53.7 | 83.3 | 12.9 | 3.5 | 0.97 | none |
| Embodiment 23 | 99.3 | 52.3 | 83.1 | 11.2 | 3.3 | 0.923 | 0.65 |
| Embodiment 24 | 98.9 | 51.9 | 83.2 | 12.2 | 1.5 | 0.931 | none |
| Embodiment 26 | 98.5 | 55.4 | 83.24 | 12.9 | 3.3 | 0.928 | none |
| Embodiment 28 | 95.1 | 48.3 | 80.5 | 10.8 | 5.0 | 0.89 | 0.9 |
| Comparative Embodiment 2 | 89.1 | 30.2 | 75.1 | 8.4 | 15.8 | 0.865 | 3.9 |

The conversion rate of liquid organic material %=(the mass of materials with boiling point greater than 360° C. in the combined liquid organic feed−the total mass of oils with boiling point greater than 360° C. in the products)/the mass of materials with boiling point greater than 360° C. in the combined liquid organic feed.

The yield of oils converted from the liquid organic material %=the mass of liquid phase oils at normal temperature and pressure in the conversion products/the mass of the total charge raw liquid mineral oils.

TABLE 4

Product distributions after conversion of liquid organic materials

| Conversion results | Conversion rate of liquid organic material % | Yield of oils converted from liquid organic material % | Carbon content of oils converted from liquid organic material wt % | Hydrogen content of oils converted from liquid organic material wt % | Oxygen content of oils converted from liquid organic material wt % | Calorific value of oils converted from liquid organic material (times of the calorific value of standard fuel oil) | Rate of water produced in the reaction wt % |
|---|---|---|---|---|---|---|---|
| Embodiment 25 | 95.6 | 94.3 | 84.8 | 11.9 | 0.6 | 0.948 | none |
| Embodiment 27 | 97.8 | 91.4 | 85.9 | 10.8 | 1.0 | 0.949 | none |

Table 3 and table 4 show that the yield of oils converted from the solid organic material using the method of the present invention is greater than 50.4 wt %; the yield of oils converted from liquid organic material is greater than 91.4%; the calorific value of oils converted from the organic material is 0.918 times greater than that of equal amount of standard fuel oil, and the oxygen content of oil phase in the conversion oils of organic material is less than 4.6 wt %, and the water content after reaction of the raw material is less than 1.2 wt %. However, the rate of water produced in the reaction in the conventional hydrogenation process under pure hydrogen in the prior art is 25 wt % or more.

Embodiment 29

Provided is a liquefaction process for biomass, which is described as below.

Pretreatment of Biomass:

Cotton straw is used as biomass solid which has a moisture content of 1% based on the total weight of the biomass solid. The cotton straw is fed to an ultrafine pulverizer for initial pulverization to a median particle size of 200 μm, then fed into a briquetting press for carrying out compressing, extruding and molding at a temperature of 40° C. and a pressure of 2 MPa to a bulk density of 0.9 g/cm$^3$, and then subjected to a second pulverization to produce a pretreated biomass having an average particle size of 1 mm.

Catalyst

Amorphous FeOOH is used as a catalyst.

Adding sulfur: Solid sulfur powder is added to the above catalyst until the molar ratio of iron element to sulfur element reaches 1:2, thereby ensuring that the molar ratio of iron element to sulfur element in the reaction system is 1:2.

Preparation of Biomass Slurry:

The pretreated biomass is mixed with the above catalyst to obtain a mixture, and the mixture is added to petroleum base wax oil to carry out dispersing pulping to form a first slurry. The cotton straw is present in a total amount of 50 wt % by weight in the first slurry, and the first slurry has a viscosity of 400 mPa·s (50° C.). Further, in the above first slurry, the catalyst has a content of 1 wt %, and an average particle size of 10 μm.

CO-Containing Gas:

Straw pellets are gasified at a high temperature of 900° C. and a pressure of 5 MPa, and a CO containing gas having a temperature of 250 to 600° C. is collected.

Liquefaction Reaction:

The CO-containing gas (CO accounts for 50% and $H_2$ accounts for 20%) is injected to a fluidized bed reactor through an inlet thereof to contact with the first slurry which has entered the fluidized bed reactor, so that conversion reaction including cracking, carbonylation, shift and hydrogenation reactions takes place under a pressure of 16 MPa and a temperature of 440° C. The conversion reaction lasts for 40 min, during which a volume ratio of the CO-containing gas to the first slurry is controlled at 1000:1, producing a first oil product.

Embodiment 30

Provided is a liquefaction process for biomass, which is described as below.

Pretreatment of Biomass:

Rice straw and broad bean straw are used as biomass solids which have a moisture content of 10% based on the total weight of the biomass. The rice straw and broad bean straw are fed to an ultrafine pulverizer for initial pulverization to a median particle size of 100 μm, then fed into a briquetting press for carrying out compressing, extruding and molding at a temperature of 30° C. and a pressure of 0.5 MPa to a bulk density of 1.0 g/cm$^3$, and then subjected to a second pulverization to produce a pretreated biomass having an average particle size of 1 mm.

Catalyst:

A regeneration product of a waste agent resulting from use of a desulfurizer comprising iron oxide as an active component is used as a catalyst. The desulfurizer comprises 12 g cubic $Fe_3O_4$, 24 g amorphous $Fe_2O_3$, 39 g amorphous $Fe_2O_3.H_2O$, and 5 g NiO.

The desulfurizer is used in a desulfurization process for removing $H_2S$ from exhaust gas, which is described as below. An exhaust gas having a $H_2S$ content of 5500 mg/cm$^3$ is introduced to a desulfurization section at a space velocity of 3000 h$^{-1}$ to carry out desulfurization reaction at 30° C. When the content of $H_2S$ in the outlet gas of the desulfurization section is less than or equal to 0.01 ppm, a waste agent in the desulfurization section is collected.

The above waste agent resulting from use of a desulfurizer comprising iron oxide as an active component was regenerated described as below:

1) The waste agent is washed with water, and then ground with water in a wet ball mill to obtain a waste powder of 200 mesh.

2) The waste powder is prepared into an aqueous suspension with a solid mass percentage of 7%, into which compressed air is introduced to carry out the reaction.

3) The aqueous suspension is filtered to obtain solid materials, which are placed in a flotation tank, into which water is added, and then air is introduced, and the precipitate at the lower part of the container is dried to obtain a regeneration product of the above waste agent.

Adding sulfur: Solid sulfur powder is added to the above regeneration product until the molar ratio of iron element to sulfur element comprised therein is 1:0.9, thereby ensuring that the molar ratio of iron element to sulfur element in the reaction system is 1:0.9.

Preparation of Biomass Slurry:

The pretreated biomass is mixed with the above catalyst to obtain a mixture, and the mixture is added to coal tar to carry out dispersing pulping to form a first slurry. The rice straw and broad bean straw are present in a total amount of 55 wt % in the first slurry, and the first slurry has a viscosity of 510 mPa s (50° C.). Further, in the above first slurry, the catalyst has a content of 0.2 wt %, and an average particle size of 2 μm.

CO-Containing Gas:

Coal is gasified at a high temperature of 1400° C. and a pressure of 5 MPa, and a CO containing gas having a temperature of 250 to 600° C. is collected.

Liquefaction Reaction:

The CO containing gas (CO accounts for 45% and $H_2$ accounts for 22%) is injected into a slurry bed reactor from three injection ports on side walls thereof to contact with the first slurry which has entered therein to carry out first conversion reaction including cracking, carbonylation, shift and hydrogenation reactions under a pressure of 20 MPa and a temperature of 410° C. The reaction lasts for 110 min, during which the volume ratio of the CO containing gas to the first slurry is 650:1, producing a first oil product.

Embodiment 31

Provided is a liquefaction process for oil residue and faeces, which is described as below.

Pretreatment of Oil Residue and Faeces:

Oil residue and faeces are used as biomass solid. The biomass solid has a moisture content of 12% based on the total weight of the biomass solid. The oil residue and faeces are fed to an ultrafine pulverizer for initial pulverization to a median particle size of 150 μm, then fed into a briquetting press for carrying out compressing, extruding and molding at a temperature of 55° C. and a pressure of 1.5 MPa to a bulk density of 1.0 g/cm$^3$, and then subjected to a second pulverization to produce a pretreated biomass having an average particle size of 2 nm.

Catalyst:

Amorphous FeOOH is used as the catalyst.

Adding sulfur: Solid sulfur powder is added into the catalyst until the molar ratio of iron element to sulfur element is 1:1.5, thereby ensuring that the molar ratio of iron element to sulfur element in the reaction system is 1:1.5.

Preparation of Slurry:

The pretreated oil residue and faeces are mixed with the above catalyst to obtain a mixture, and the mixture is added to petroleum base wax oil to carry out dispersion pulping to form a first slurry. The oil residue and faeces are present in a total amount of 50 wt % in the first slurry, and the first slurry has a viscosity of 400 mPa·s (50° C.). Further, the catalyst is present in a content of 1 wt % in the first slurry, and has an average particle size of 10 μm.

CO-Containing Gas:

Coal is gasified at a high temperature of 1350° C. and a pressure of 6 MPa to collect a CO containing gas having a temperature of 250 to 600° C.

Liquefaction Reaction:

The CO containing gas (CO accounts for 45% and H$_2$ accounts for 25%) is injected into a fluidized bed reactor through an inlet thereof to contact with the first slurry which has entered therein to carry out first conversion reaction including cracking, carbonylation, shift and hydrogenation reactions under a pressure of 16 MPa and a temperature of 420° C. The reaction lasts for 40 min, during which the volume ratio of the CO containing gas to the first slurry is 1000:1, producing a first oil product.

Test Example 3

The oil products prepared in the Embodiments 29-31 of the present invention are tested and analyzed according to the following methods.

Liquefaction rate of solid biomass %=(the total mass of solid biomass in the raw material−the mass of residual solid organic materials in the reaction product)/the total mass of solid biomass in the raw material. Wherein, said "solid biomass" in the liquefaction rate of solid biomass has no water and no ash basis (the same as below).

Yield of oil produced by liquefaction of solid biomass %=the mass of liquid phase oils at normal temperature and pressure in the liquefaction products of solid biomass/the total mass of solid biomass in the raw material.

The rate of water produced in the reaction %=(the water mass of the reaction products−total mass of water added initially in the reaction or carried by the raw materials)/the mass of the total charge raw materials. When this value is <0, it is marked as "none".

The corresponding test results are shown in Table 5:

TABLE 5

Product distributions after liquefaction of solid biomass

| Liquefaction results | Liquefaction rate of solid biomass % | Yield of oil produced from liquefaction of solid biomass % | Carbon content of oil produced from liquefaction of solid biomass wt % | Hydrogen content of oil produced from liquefaction of solid biomass wt % | Oxygen content of oil produced from liquefaction of solid biomass wt % | Calorific value of oils produced from liquefaction of solid biomass (times of the calorific value of standard fuel oil) | Rate of water produced in the reaction wt % |
|---|---|---|---|---|---|---|---|
| Embodiment 29 | 99.5 | 52.4 | 85.9 | 12.6 | 0.8 | 0.981 | none |
| Embodiment 30 | 99.7 | 54.7 | 87.1 | 12.0 | 0.8 | 0.991 | none |
| Embodiment 31 | 99.9 | 57.3 | 86.0 | 13.1 | 0.5 | 0.998 | none |

Table 5 shows that, by using a CO containing gas produced by the gasification process, the catalyst functions in hydrothermal conversion, deoxidation, hydrogenation and cracking reactions under conditions of a high temperature and high pressure, so that the biomass solid is fully converted into biomass fuel, and no excess water is formed. However in the comparative examples, due to the low water content in the slurry and the low sulfur content in the catalyst, the biomass conversion rate is low.

Embodiment 32

Provided is a two-stage conversion process for biomass, which is described as below.

Iron-Based Catalyst:

A waste agent resulting from use of a desulfurizer comprising iron oxide as an active component is used as an iron-based catalyst. The desulfurizer comprises 10 g calcium bicarbonate, 12 g basic cupric carbonate, 18 gγ-Fe$_2$O$_3$, 8 g MnO$_2$, and 5 g NiO.

The waste agent is produced by a desulfurization process with the above desulfurizer, which is described as follows.

1) Exhaust gas produced by fixed bed catalytic hydrogenation of medium-low temperature coal tar is collected.

2) The above mentioned desulfurizer is prepared into particles having a diameter of 1 mm and a length of 15 mm, and filled in a desulfurization tower to form a desulfurization layer.

3) The collected exhaust gas passes through the desulfurization layer at a space velocity of 2000 h$^{-1}$, so that desulfurization reaction takes place when the exhaust gas contact with the desulfurizer in the desulfurization layer at 50° C. to remove hydrogen sulfide in the exhaust gas. After the reaction is completed, a waste agent, i.e. a spent desulfurizer, is collected and cooled to room temperature, i.e.

obtaining a waste agent resulting from use of a desulfurizer comprising iron oxide as an active component.

Adding Sulfur:

The waste agent is tested to determine a molar ratio of iron element to sulfur element comprised therein. If the molar ratio of iron element to sulfur element is less than 1:1, solid sulfur powder is added to the waste agent until the molar ratio of iron element to sulfur element reaches 1:1, thereby ensuring that the molar ratio of iron element to sulfur element in the reaction system is 1:1. However if the molar ratio of iron element to sulfur element is greater than 1:1, excess sulfur is removed by conventional methods such as solvent extraction or heating.

Preparation of Biomass Slurry:

(1) Corn straw having a water content of 5 wt % to 20 wt % is collected, and then pulverized to a particle size of 0.2 cm to 5 cm by using an ultrafine pulverizer.

(2) The pulverized straw produced in step (1) is compressed and molded by using a plodder under a compression pressure of 2.5 MPa and a compression temperature of 45° C. to a true density of 1.0 kg/m$^3$.

(3) The compressed straw produced in step (2) is pulverized again to a particle size of 0.1-500 μm by using an airflow crusher to obtain straw powder.

(4) 80 kg of a waste lubricating oil is mixed uniformly with 6 kg of the above iron-based catalyst and 100 kg of the straw powder to obtain a first slurry, wherein, the iron-based catalyst has an average particle size of 10 μm.

First Conversion Reaction:

A partial of a mixture of CO and H$_2$ (CO accounts for 60% and H$_2$ accounts for 40%) is pressurized to a pressure of 17 MPa, and then introduced to a pipeline which conveys the first slurry as described above. The remaining of the mixture of CO and H$_2$ is pressurized to a pressure of 17 MPa and heated to a temperature of 450° C., and then injected to a suspended bed reactor through an inlet thereof to contact with the first slurry which has entered the suspended bed reactor, so that first conversion reaction including cracking, carbonylation, shift and hydrogenation reactions takes place under a pressure of 16 MPa and a temperature of 300° C. The first conversion reaction lasts for 30 min, during which a volume ratio of the mixture of CO and H$_2$ to the first slurry is controlled at 2000:1, producing a first conversion product.

Second Conversion Reaction:

Synthesis gas (CO accounts for 50% by volume) is divided into a first part and a second part. The first part of the synthesis gas is pressurized to a pressure of 16 MPa and heated to a temperature of 350° C., and then introduced to a pipeline which conveys the first conversion product. The second part of the synthesis gas is pressurized to a pressure of 16 MPa and heated to a temperature of 500° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 15 MPa and a temperature of 400° C. The second conversion reaction lasts for 60 min, during which a volume ratio of the synthesis gas to the first conversion product is controlled at 2000:1, producing a second oil product.

Embodiment 33

Provided is a two-stage conversion process for biomass, which is described as below Iron-Based Catalyst:

Amorphous FeOOH is used as an iron-based catalyst.

Adding sulfur: Solid sulfur powder is added to the catalyst until the molar ratio of iron element to sulfur element comprised therein is 1:2, thereby ensuring that the molar ratio of iron element to sulfur element in the reaction system is 1:2.

Preparation of Biomass Slurry:

(1) Corn straw having a water content of 5 wt % to 20 wt % is collected, and then pulverized to a particle size of 0.2 cm to 5 cm by using an ultrafine pulverizer.

(2) The pulverized straw produced in step (1) is compressed and molded by using a plodder under a compression pressure of 2.5 MPa and a compression temperature of 45° C. to a true density of 1.0 kg/m$^3$.

(3) The compressed straw produced in step (2) is pulverized again to a particle size of 0.1-500 μm by using an airflow crusher to obtain straw powder.

(4) 110 kg of a waste lubricating oil is mixed uniformly with 100 kg of the straw powder obtained in step (3) and 6 kg of the iron-based catalyst, then ground with a colloid mill for 15 min to obtain a first slurry.

First Conversion Reaction:

A partial of a mixture of CO and H$_2$ (CO accounts for 60% and H$_2$ accounts for 40%) is pressurized to a pressure of 17 MPa and heated to a temperature of 250° C., and then introduced to a pipeline which conveys the first slurry. The remaining of the mixture of CO and H$_2$ is pressurized to a pressure of 17 MPa and heated to a temperature of 350° C., and then injected to a fluidized bed reactor through an inlet thereof to contact with the first slurry which has entered the fluidized bed reactor, so that first conversion reaction including cracking, carbonylation, shift and hydrogenation reactions takes place under a pressure of 16 MPa and a temperature of 270° C. The first conversion reaction lasts for 35 min, during which a volume ratio of the mixture of CO and H$_2$ to the first slurry is controlled at 1000:1, producing a first conversion product.

Second Conversion Reaction:

Firstly, an iron-based catalyst is added to the first conversion product. The iron-based catalyst is amorphous hydroxyl oxidize iron and has an adding amount of 0.5 wt % by mass of the first conversion product.

Synthesis gas (CO accounts for 50% by volume) is pressurized to a pressure of 15.4 MPa and heated to a temperature of 380° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 15 MPa and a temperature of 425° C. The second conversion reaction lasts for 45 min, during which a volume ratio of the synthesis gas to the first conversion product is controlled at 1500:1, producing a second oil product.

Embodiment 34

Provided is a two-stage conversion process for biomass, which is described as below.

Iron-Based Catalyst:

A regeneration product of a waste agent resulting from use of a desulfurizer comprising FeOOH as an active component is used as an iron-based catalyst.

The desulfurizer comprises 30 g α-FeOOH, 20 g amorphous FeOOH, 8 g potassium oxide, and 10 g binding agent kaolin.

The desulfurizer comprising FeOOH as an active component is used in a desulfurization process for a tail gas produced in the hydro-upgrading process of medium-low temperature coal tar in industry described as below.

1) Exhaust gas produced by fixed bed catalytic hydrogenation of medium-low temperature coal tar is collected.

2) The above mentioned desulfurizer is prepared into particles having a diameter of 1 mm and a length of 15 mm, and filled in a desulfurization tower to form a desulfurization layer.

3) The collected exhaust gas passes through the desulfurization layer at a space velocity of 2000 $h^{-1}$, so that desulfurization reaction takes place when the exhaust gas contact with the desulfurizer in the desulfurization layer at 50° C. to remove hydrogen sulfide in the exhaust gas. After the reaction is completed, a waste agent, i.e. a spent desulfurizer, is collected and cooled to room temperature, i.e. obtaining a waste agent resulting from use of a desulfurizer comprising iron oxide as an active component.

The above waste agent was regenerated described as below:

1) The waste agent is mixed with sodium hydroxide solution and stirred in a slurry tank to form a second slurry which has a pH value of 8.0 and a solid content of 4 wt %.

2) Air is introduced into the second slurry to carry out a first oxidation reaction at 90° C. and 0.1 MPa, producing an oxidized slurry.

3) $H_2S$ is introduced into the oxidized slurry to carry out a vulcanization reaction at 10° C. and 5 MPa, producing a vulcanized slurry.

4) Air is introduced into the vulcanized slurry to carry out a second oxidation reaction at 90° C. and 0.1 MPa to further oxidize and regenerate the slurry.

5) Steps 3) and 4) are repeated once to produce a final slurry wherein the molar ratio of iron to sulfur is 1:2.

6) The final slurry is subjected to solid-liquid separation to obtain the regeneration product of the above waste agent.

Preparation of Biomass Slurry:

(1) Corn straw and cotton straw, having a water content of 5 wt % to 20 wt %, are collected, and then pulverized to a particle size of 0.2 cm to 5 cm by using an ultrafine pulverizer.

(2) The pulverized straw obtained in step (1) is compressed and molded by using a plodder under a compression pressure of 4 MPa and a compression temperature of 40° C. to a true density of 0.9 kg/m$^3$.

(3) The compressed straw obtained in step (2) is pulverized again to a particle diameter of 0.1-500 μm by using an airflow crusher to obtain straw powder, then 100 kg of the straw powder is mixed with 1 kg of the above iron-based catalyst to obtain a mixed powder, wherein, the regeneration product of the waste agent resulting from use of a desulfurizer comprising FeOOH as an active component has an average diameter of 20 μm.

(4) Then the mixed powder is mixed with 100 kg of rancid oil to carry out grinding pulping for 15 min by using a colloid mill to obtain a first slurry.

Adding sulfur: Solid sulfur powder is added to the above regeneration product until the molar ratio of iron element to sulfur element reaches 1:2.5, thereby ensuring that the molar ratio of iron element to sulfur element in the reaction system is 1:2.5.

First Conversion Reaction:

A partial of a mixture of CO and $H_2$ (CO accounts for 80% and $H_2$ accounts for 20%) is pressurized to a pressure of 19.5 MPa and heated to a temperature of 200° C., and then introduced to a pipeline which conveys the first slurry. The remaining of the mixture of CO and $H_2$ is pressurized to a pressure of 19.3 MPa and heated to a temperature of 380° C., and then injected into a slurry bed reactor through three injection ports on the bottom and side walls thereof to contact with the first slurry which has entered the slurry bed reactor, so that first conversion reaction including cracking, carbonylation, shift and hydrogenation reactions takes place under a pressure of 19 MPa and a temperature of 350° C. The first conversion reaction lasts for 20 min, during which a volume ratio of the mixture of CO and $H_2$ to the first slurry is controlled at 800:1, producing a first conversion product.

Second Conversion Reaction:

Firstly, a hydrogenation catalyst is added to the first conversion product. The hydrogenation catalyst consists of zeolite loading 2% MoO, 6% NiO and 3% CoO based on the total weight of the hydrogenation catalyst, and is present in an amount of 2 wt % of the first conversion product.

Then, a mixture of CO and $H_2$ (CO accounts for 20% and $H_2$ accounts for 80%) is divided into a first part and a second part, the first part of which is pressurized to a pressure of 20 MPa and heated to a temperature of 380° C., and then introduced to a pipeline which conveys the first conversion product. The second part of the mixture of CO and $H_2$ is pressurized to a pressure of 20 MPa and heated to a temperature of 480° C., and then injected to a slurry bed reactor through an inlet thereof to contact with the first conversion product which has entered the slurry bed reactor, so that the second conversion reaction including cracking, carbonylation, shift and hydrogenation reactions takes place under a pressure of 15 MPa and a temperature of 390° C. The second conversion reaction lasts for 30 min, during which a volume ratio of the mixture of CO and $H_2$ to the first conversion product is controlled at 4000:1, producing a second oil product.

Embodiment 35

Provided is a two-stage conversion process for biomass, which is described as below.

Iron-Based Catalyst:

A regeneration product of a waste agent resulting from use of a desulfurizer comprising iron oxide as an active component is used as an iron-based catalyst. The desulfurizer comprises 12 g $Fe_3O_4$ of cubic crystal, 24 g amorphous $Fe_2O_3$, 39 g amorphous $Fe_2O_3.H_2O$, and 5 g NiO.

The desulfurizer is used in a desulfurization process for removing $H_2S$ from exhaust gas, which is described as below. An exhaust gas having a $H_2S$ content of 5500 mg/cm$^3$ is introduced to a desulfurization section at a space velocity of 3000 $h^{-1}$ to carry out desulfurization reaction at 30° C. When the content of $H_2S$ in the outlet gas of the desulfurization section is less than or equal to 0.01 ppm, a waste agent in the desulfurization section is collected.

The waste agent is regenerated described as below:

1) The waste agent is washed with water, and then ground with water in a wet ball mill to obtain a waste powder of 200 mesh.

2) The waste powder is prepared into an aqueous suspension with a solid mass percentage of 7%, into which compressed air is introduced to carry out the reaction.

3) The aqueous suspension is filtered to obtain solid materials, which are placed in a flotation tank, into which water is added, and then air is introduced, and the precipitate at the lower part of the container is dried to obtain a regeneration product of the above waste agent.

Adding sulfur: Solid sulfur powder is added to the above regeneration product until the molar ratio of iron element to sulfur element comprised therein is 1:0.9, thereby ensuring that the molar ratio of iron element to sulfur element in the reaction system is 1:0.9.

Preparation of Biomass Slurry:

(1) Red algae is collected, and dried to a moisture content of less than 20 wt %, and then pulverized to a particle size of 0.2 cm to 5 cm.

(2) The pulverized red algae obtained in step (1) is compressed and molded by using a plodder under a compression pressure of 3 MPa and a compression temperature of 40° C. to a true density of 0.95 kg/m$^3$.

(3) The compressed red algae obtained in step (2) is pulverized again to a particle size of 100-200 μm by using an airflow crusher to obtain red algae powder.

(4) 100 kg of the red algae powder is mixed with 200 kg of waste engine oil and 16 kg of the above iron-based catalyst to carry out grinding pulping for 12 min to produce a first slurry, wherein the iron-based catalyst has an average diameter of 2 μm.

First Conversion Reaction:

A mixture of CO and $H_2$ (CO accounts for 60% and $H_2$ accounts for 40%) is pressurized to a pressure of 20.4 MPa and heated to a temperature of 400° C., and then injected to a slurry bed reactor through three injection ports thereof to contact with the first slurry which has entered the slurry bed reactor, so that first conversion reaction including cracking, carbonylation, shift and hydrogenation reactions takes place under a pressure of 20 MPa and a temperature of 300° C. The first conversion reaction lasts for 30 min, during which a volume ratio of the mixture of CO and $H_2$ to the first slurry is controlled at 650:1, producing a first conversion product.

Second Conversion Reaction:

Firstly, an iron-based catalyst is added to the first conversion product at a dosage of 1.9 wt % of the first conversion product.

Then, a mixture of CO and $H_2$ (CO accounts for 30% and $H_2$ accounts for 70%) is pressurized to a pressure of 19 MPa and heated to a temperature of 490° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 18 MPa and a temperature of 440° C. The second conversion reaction lasts for 30 min, during which a volume ratio of the mixture of CO and $H_2$ to the first conversion product is controlled at 1000:1, producing a second oil product.

Embodiment 36

Provided is a liquefaction process for biomass, which is described as below

Iron-Based Catalyst:

A waste agent resulting from use of a desulfurizer comprising FeOOH as an active component is used as a catalyst. The desulfurizer comprises 70 g amorphous FeOOH, 25 g $Co_2O_3$, and 5 g NiO.

The desulfurizer comprising FeOOH as an active component is used in a desulfurization process for removing $H_2S$ from exhaust gas, which is described as below. An exhaust gas having a $H_2S$ content of 5500 mg/cm$^3$ is introduced to a desulfurization section at a space velocity of 3000 h$^{-1}$ to carry out desulfurization reaction at 30° C. When the content of $H_2S$ in the outlet gas of the desulfurization section is less than or equal to 0.01 ppm, a waste agent is produced and collected in the desulfurization section, i.e. obtaining the waste agent mentioned above.

Adding sulfur: Solid sulfur powder is added into the waste agent until the molar ratio of iron element to sulfur element is 1:3, thereby ensuring that the molar ratio of iron element to sulfur element in the reaction system is 1:3.

Preparation of Slurry:

(1) Peanut oil residue having a moisture content of 5-15 wt % is collected, and then pulverized to a particle size of 0.2 cm to 5 cm by using an ultrafine pulverizer.

(2) The pulverized peanut oil residue of step (1) is compressed and molded by using a plodder under a compression pressure of 2.5 MPa and a compression temperature of 50° C. to a true density of 1.2 kg/m$^3$.

(3) The compressed peanut oil residue of step (2) is pulverized again to a particle size of 0.1-500 μm by using an airflow crusher to obtain peanut oil residue powder.

(4) 150 kg of gutter oil is mixed with 100 kg of the peanut oil residue power of step (3) and 5 kg of the above iron-based catalyst uniformly to obtain a first slurry, wherein the waste agent of a desulfurizer comprising FeOOH as an active component has an average size of 120 μm.

First Conversion Reaction:

A partial of pure CO gas is pressurized to a pressure of 18 MPa and heated to a temperature of 250° C., and then introduced into the first slurry. The remaining of the pure CO gas is pressurized to a pressure of 18 MPa and heated to a temperature of 500° C., and then injected to a slurry bed reactor through four injection ports on the bottom and side walls thereof to contact with the first slurry which has entered the slurry bed reactor, so that first conversion reaction including cracking, carbonylation, shift and hydrogenation reactions takes place under a pressure of 17 MPa, a temperature of 310° C. The first conversion reaction lasts for 20 min, during which the volume ratio of pure CO gas to the first slurry is 950:1, producing a first conversion product.

Second Conversion Reaction:

Synthesis gas (CO accounts for 70% by volume) is pressurized to a pressure of 14 MPa and heated to a temperature of 480° C., and then introduced into a slurry bed reactor through an inlet thereof to contact with the first conversion product which has entered the slurry bed reactor, so that second conversion reaction including cracking, carbonylation, shift and hydrogenation reactions takes place under a pressure of 20 MPa and a temperature of 380° C. The second conversion reaction lasts for 30 min, during which a volume ratio of the synthesis gas to the first conversion product is controlled at 1500:1, producing a second oil product.

Embodiment 37

Provided is a two-stage conversion process for biomass, which is described as below.

Iron-Based Catalyst:

A waste agent of a desulfurizer comprising FeOOH as an active component is used as an iron-based catalyst. The desulfurizer comprises 6 g soluble iron salt $Fe(NO_3)_3 \cdot 9H_2O$, 9 g iron salt complexing agent triethanolamine, and 15 g amorphous iron hydroxyl oxide.

The above desulfurizer is used in a desulfurization process for removing $H_2S$ from exhaust gas, which is described as below. An exhaust gas having a $H_2S$ content of 5500 mg/cm$^3$ is introduced to a desulfurization section at a space velocity of 3000 h$^{-1}$ to carry out desulfurization reaction at 30° C. When the content of $H_2S$ in the outlet gas of the desulfurization section is less than or equal to 0.01 ppm, a waste agent in the desulfurization section is collected.

Adding sulfur: The waste agent is tested to determine a molar ratio of iron element to sulfur element comprised therein. If the molar ratio of iron element to sulfur element is less than 1:2, solid sulfur powder is added to the waste agent until the molar ratio of iron element to sulfur element reaches 1:2, thereby ensuring that the molar ratio of iron element to sulfur element in the reaction system is 1:2. However if the molar ratio of iron element to sulfur element is greater than 1:2, excess sulfur is removed by conventional methods such as solvent extraction or heating.

Preparation of Slurry:

(1) Peanut oil residue having a moisture content of 5-15 wt % is collected, and then pulverized to a particle size of 0.2-5 cm by using an ultrafine pulverizer.

(2) The pulverized peanut oil residue of step (1) is mixed with 8 kg catalyst, then compressed and molded by using a plodder under a compression pressure of 2.5 MPa and a compression temperature of 50° C. to a true density of 1.2 kg/m$^3$.

(3) The compressed material of step (2) is pulverized again to a particle size of 0.1-500 μm by using an airflow crusher to obtain a mixed powder of peanut oil residue and catalyst;

(4) 90 kg gutter oil is mixed with the mixed power of step (3) under a negative pressure of 30 KPa to obtain a mixture;

(5) The obtained mixture of step (4) is mixed with 8 kg water to carry out grinding pulping for 16 min by using a colloid mill to obtain a first slurry, wherein the iron-based catalyst has an average size of 5 μm.

First Conversion Reaction:

A partial of a mixture of CO and $H_2$ (CO accounts for 60% and $H_2$ accounts for 40%) is pressurized to a pressure of 5.7 MPa and heated to a temperature of 400° C., and then introduced to a pipeline which conveys the first slurry. The remaining of the mixture of CO and $H_2$ is pressurized to a pressure of 5.2 MPa and heated to a temperature of 400° C., and then injected to a slurry bed reactor through an inlet thereof to contact with the first slurry which has entered the slurry bed reactor, so that first conversion reaction including cracking, carbonylation, shift and hydrogenation reactions takes place under a pressure of 5 MPa and a temperature of 340° C. The first conversion reaction lasts for 90 min, during which a volume ratio of the mixture of CO and $H_2$ to the first slurry is controlled at 8000:1, producing a first conversion product.

Second Conversion Reaction:

Firstly, a further amount of the iron-based catalyst is added to the first conversion product at a dosage of 1 wt % of the first conversion product.

Then, a mixture of CO and $H_2$ (CO accounts for 60% and $H_2$ accounts for 40%) is pressurized to a pressure of 19 MPa and heated to a temperature of 480° C., and then injected to a slurry bed reactor through an inlet thereof to contact with the first conversion product which has entered the slurry bed reactor, so that the second conversion reaction including cracking, carbonylation, shift and hydrogenation reactions takes place under a pressure of 18 MPa and a temperature of 370° C. The conversion reaction lasts for 30 min, during which a volume ratio of the mixture of CO and $H_2$ to the first conversion product is controlled at 7000:1, producing a second oil product.

Embodiment 38

Provided is a two-stage conversion process for biomass, which is described as below Iron-Based Catalyst:

A regeneration product of a waste agent resulting from use of a desulfurizer comprising FeOOH is used as an iron-based catalyst. The desulfurizer comprises 45% by weight of γ-FeOOH, 35% by weight of α-FeOOH, 15% by weight of molecular sieve as carriers, and 5% by weight of sesbania powder as binder.

The desulfurizer is used in a desulfurization process for removing $H_2S$ from exhaust gas, which is described as below. An exhaust gas having a $H_2S$ content of 5500 mg/cm$^3$ is introduced to a desulfurization section at a space velocity of 3000 h$^{-1}$ to carry out desulfurization reaction at 30° C. When the content of $H_2S$ in the outlet gas of the desulfurization section is less than or equal to 0.01 ppm, a waste agent in the desulfurization section is collected.

The obtained waste agent was regenerated described as below: The waste agent is washed with water, and then ground with water in a wet ball mill to obtain a waste powder of 80 mesh. The waste powder is prepared into an aqueous suspension with a solid mass percentage of 8%, into which compressed air is introduced. Sample is taken for testing after reacting for a period of time. When there is no $H_2S$ produced from the reaction between the sample and hydrochloric acid, the iron sulphides in the waste agent have been completely converted into FeOOH and elemental sulfur, producing a slurry comprising FeOOH and elemental sulfur. Filtering the slurry to obtain a solid material, and extracting the solid material with $CCl_4$ for three times, then combining the extracted liquids, and recovering the solvents by distillation to obtain crystalline elemental sulfurs. Mixing the remaining solids separated from the extraction liquids with sesbania powders to obtain a regeneration product of the above-mentioned waste agent, wherein the amount of the binder sesbania powders is 5% by mass of the solids.

Adding carbon disulfides: Adding carbon disulfides into the above regeneration product until the molar ratio of iron element to sulfur element is 1:2, thereby ensuring that the molar ratio of iron element to sulfur element in the reaction system is 1:2.

Preparation of Slurry:

(1) Wheat straw and peanut straw, having a moisture content of 8-20 wt %, are collected, and then pulverized to a particle size of 0.2-5 cm by using an ultrafine pulverizer.

(2) The pulverized straw of step (1) is compressed and molded by using a plodder under a compression pressure of 5 MPa and a compression temperature of 30° C. to a true density of 1.5 kg/m$^3$.

(3) The compressed material of step (2) is pulverized again to a particle size of 0.1-500 μm by using an airflow crusher to obtain straw powder.

(4) 10 kg of the above catalyst is mixed with 80 kg anthracene oil, and then mixed with 100 kg of the straw power of step (3) to obtain straw power mixture.

(5) The straw power mixture of step (4) is mixed with 3 kg water to carry out grinding pulping for 20 min by using a colloid mill to obtain a first slurry, wherein the iron-based catalyst has an average diameter of 5 mm.

First Conversion Reaction:

A partial of a mixture of CO and $H_2$ (CO accounts for 60% and $H_2$ accounts for 40%) is pressurized to a pressure of 16.8 MPa and heated to a temperature of 250° C., and then introduced to a pipeline which conveys the first slurry. The remaining of the mixture of CO and $H_2$ is pressurized to a pressure of 16.2 MPa and heated to a temperature of 450° C., and then injected to a fluidized bed reactor through an inlet thereof to contact with the first slurry which has entered the fluidized bed reactor, so that first conversion reaction including cracking, carbonylation, shift and hydrogenation reactions takes place under a pressure of 16 MPa and a temperature of 350° C. The conversion reaction lasts for 60 min, during which a volume ratio of the mixture of CO and $H_2$ to the first slurry is controlled at 5000:1, producing a first conversion product.

Second Conversion Reaction:

CO is pressurized directly to a pressure of 19 MPa and heated to a temperature of 410° C., and then injected to a slurry bed reactor through an inlet thereof to contact with the first conversion product which has entered the slurry bed reactor, so that the second conversion reaction including cracking, carbonylation, shift and hydrogenation reactions takes place under a pressure of 18 MPa and a temperature of 420° C. The second conversion reaction lasts for 30 min, during which a volume ratio of the mixture of CO and $H_2$ to the first conversion product is controlled at 2600:1, producing a second oil product.

Embodiment 39

Provided is a two-stage conversion process for biomass, which is described as below Iron-Based Catalyst:

A regeneration product of a waste agent resulting from use of a desulfurizer comprising $Fe_{21.333}O_{32}$ is used as an iron-based catalyst.

The desulfurizer comprises 55 g magnetic iron oxide red $Fe_{21.333}O_{32}$, 12 g copper oxide, and 21 g carrier $Fe_2O_3$.

The desulfurizer is used in a desulfurization process for a coal pyrolysis gas comprising hydrogen sulfide, which is described as below.

(1) A compressed coal pyrolysis gas is cooled to a temperature of 30-35° C., and mixed with air from an air pump and introduced to a desulfurization tower filled with the above-mentioned desulfurizer which mainly comprises iron oxide as an active component. The compressed coal pyrolysis gas enters at the bottom and exits at the top, thereby preventing liquid water from entering the desulfurizer bed.

(2) After many times use of the above-mentioned desulfurizer, a waste agent, i.e. spent desulfurizer, is produced and removed from the desulfurizer bed, i.e. obtaining a waste agent resulting from use of a desulfurizer comprising $Fe_{21.333}O_{32}$.

The obtained waste agent was regenerated described as below:

1) The waste agent is dispersed in water to form a slurry.

2) The slurry is heated to a temperature of 60° C. under atmospheric pressure. Then hydrogen peroxide is added to the slurry by using a peristaltic pump at a flow rate of 500 mL/min to perform reactions for a period of 10 min under magnetic stirring.

3) After the reaction is completed, the resulted reaction solution is filtered, producing a precipitate which is then washed twice with water and then dried naturally to obtain a regeneration product of the above-mentioned waste agent.

Preparation of Slurry:

(1) Corn straw and cotton straw, having a moisture content of 5-20 wt %, are collected, then mixed with 5 kg catalyst, and then pulverized to a particle size of 0.2-5 cm by using an ultrafine pulverizer;

(2) The pulverized material of step (1) is compressed and molded by using a plodder under a compression pressure of 4 MPa and a compression temperature of 40° C. to a true density of 0.9 kg/m³;

(3) The compressed mixed material of step (2) is pulverized again to a particle size of 0.1-500 μm by using an airflow crusher to obtain a mixed powder of straw and catalyst;

(4) 30 kg rancid oil is mixed with the mixed powder of step (3) under a negative pressure of 100 KPa to obtain a mixture;

(5) The obtained mixture of step (4) is mixed with 50 kg rancid oil, and then mixed with 2 kg water to carry out grinding pulping for 15 min by using a colloid mill to obtain a first slurry, wherein the iron-based catalyst has an average diameter of 300 μm.

First Conversion Reaction:

A partial of pure CO is pressurized to a pressure of 5.7 MPa and heated to a temperature of 250° C., and then introduced to a pipeline which conveys the first slurry. The remaining of the pure CO is pressurized to a pressure of 5.2 MPa and heated to a temperature of 300° C., and then injected to a slurry bed reactor through an inlet thereof to contact with the first slurry which has entered the slurry bed reactor, so that first conversion reaction including cracking, carbonylation, shift and hydrogenation reactions takes place under a pressure of 5 MPa, a temperature of 270° C., and a controlled volume ratio of the mixture of the pure CO to the first slurry of 3000:1. The first conversion reaction lasts for 90 min, during which hydrogen sulfide gas is introduced into the slurry bed reactor to ensure a molar ratio of iron element to sulfur element in the reaction system is 1:3, producing a first conversion product.

Second Conversion Reaction:

Synthesis gas (CO accounts for 39% by volume) is pressurized to a pressure of 16 MPa and heated to a temperature of 400° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 15 MPa and a temperature of 360° C. The second conversion reaction lasts for 40 min, during which a volume ratio of the synthesis gas to the first conversion product is controlled at 6000:1, producing a second oil product.

Comparative Example 3 (One Stage Conversion)

Provided is a conversion process for biomass, wherein the iron-based catalyst source and the slurry preparation are the same as embodiment 35 except for the specific steps of the conversion reaction: a mixture of CO and $H_2$ (CO accounts for 60% and $H_2$ accounts for 40%) is pressurized to a pressure of 20.4 MPa and heated to a temperature of 500° C., and then injected to a slurry bed reactor through three injection ports on the side walls thereof to contact with the first slurry which has entered the slurry bed reactor, so that first conversion reaction including cracking, carbonylation, shift and hydrogenation reactions takes place under a pressure of 20 MPa and a temperature of 410° C. The first conversion reaction lasts for 30 min, during which a volume ratio of the mixture of CO and $H_2$ to the first slurry is controlled at 650:1, producing a first oil product.

Comparative Example 4 (Drying, the Molar Ratio of Iron to Sulfur in the Reaction System is 1:0.1)

Provided is a conversion process for biomass, which is the same as that of embodiment 7 except that, in this comparative example, wheat straw and peanut straw are used as biomass solid, and the biomass solid has a water content of 80 ppm based on the total weight of the biomass solid; the molar ratio of iron to sulfur in the reaction system is 1:0.1.

Test Example 4

The oil products prepared in the Embodiments 32-39 of the present invention and that of comparative examples 3-4 are tested and analyzed according to the following methods.

The conversion rate of solid organic material %=(the total mass of solid organic materials in the raw materials−the mass of residual solid organic materials in the reaction product)/the total mass of solid organic material in the raw materials. Wherein, said "solid organic material" in the conversion rate of solid organic material has no water and no ash basis (the same as below).

The yield of oils converted from solid organic material %=the mass of liquid phase oils at normal temperature and pressure in the conversion products of solid organic material/the total feed mass of solid organic material in raw materials.

The rate of water produced in the reaction %=(the water mass of the reaction products−total mass of water added initially in the reaction or carried by the raw materials)/the mass of the total charge raw materials. When this value is <0, it is marked as "none".

The corresponding test results are shown in Table 6.

iron-based catalyst. The desulfurizer comprises 10 g calcium bicarbonate, 12 g basic cupric carbonate, 18 g γ-$Fe_2O_3$, 8 g $MnO_2$, and 5 g NiO.

The waste agent is produced by a desulfurization process with the above desulfurizer, which is described as follows.

1) Exhaust gas produced by fixed bed catalytic hydrogenation of medium-low temperature coal tar is collected.

2) The above mentioned desulfurizer is prepared into particles having a diameter of 1 mm and a length of 15 mm, and filled in a desulfurization tower to form a desulfurization layer.

3) The collected exhaust gas passes through the desulfurization layer at a space velocity of 2000 $h^{-1}$, so that desulfurization reaction takes place when the exhaust gas contact with the desulfurizer in the desulfurization layer at 50° C. to remove hydrogen sulfide in the exhaust gas. After the reaction is completed, a waste agent, i.e. a spent desulfurizer, is collected and cooled to room temperature, i.e. obtaining a waste agent resulting from use of a desulfurizer comprising iron oxide as an active component.

Adding sulfur: The waste agent is tested to determine a molar ratio of iron element to sulfur element comprised therein. If the molar ratio of iron element to sulfur element is less than 1:1, solid sulfur powder is added to the waste agent until the molar ratio of iron element to sulfur element reaches 1:1, thereby ensuring that the molar ratio of iron element to sulfur element in the reaction system is 1:1.

TABLE 6

Product distributions after conversion of solid organic materials

| Conversion results | Conversion rate of solid organic material % | Yield of oils converted from solid organic material % | Carbon content of oils converted from solid organic material wt % | Hydrogen content of oils converted from solid organic material wt % | Oxygen content of oils converted from solid organic material wt % | Calorific value of oils converted from solid organic material (imes of the calorific value of standard fuel oil) | Rate of water produced in the reaction wt % |
|---|---|---|---|---|---|---|---|
| Embodiment 32 | 98.3 | 50.5 | 85.0 | 11.1 | 1.0 | 0.971 | none |
| Embodiment 33 | 98.0 | 50.8 | 85.1 | 12.6 | 0.7 | 0.975 | none |
| Embodiment 34 | 98.5 | 51.1 | 85.7 | 12.3 | 0.8 | 0.980 | none |
| Embodiment 35 | 98.9 | 52.6 | 84.8 | 12.4 | 1.3 | 0.972 | none |
| Embodiment 36 | 98.2 | 51.8 | 85.7 | 12.0 | 1.2 | 0.977 | none |
| Embodiment 37 | 99.8 | 53.3 | 86.0 | 12.7 | 0.7 | 0.987 | none |
| Embodiment 38 | 99.1 | 54.7 | 86.1 | 12.8 | 0.8 | 0.990 | none |
| Embodiment 39 | 98.4 | 56 | 86.6 | 12.9 | 0.6 | 0.995 | none |
| Comparative Embodiment 3 | 89.5 | 42.7 | 83.5 | 11.7 | 6.8 | 0.89 | 4 |
| Comparative Embodiment 4 | 78.1 | 36.6 | 88.1 | 9.8 | 9.0 | 0.86 | 8 |

Table 6 shows that the conversion rate of solid organic material, the yield of oils converted from solid organic material, the oxygen content of oil phase in the oils liquefied from solid biomass, and the calorific value of oils liquefied from solid biomass are all superior to that of the comparative examples. From the data comparison between the embodiments, it can be seen that the special pulping process can further improve the above indexes by filling the pores of the biomass solid material.

Embodiment 40

Provided is two-stage conversion refining process for biomass, which is described as below.

Iron-Based Catalyst:

A waste agent resulting from use of a desulfurizer comprising iron oxide as an active component is used as an However if the molar ratio of iron element to sulfur element is greater than 1:1, excess sulfur is removed by conventional methods such as solvent extraction or heating.

Preparation of Slurry:

(1) Corn straw having a water content of 5 wt % to 20 wt % is collected, and then pulverized to a particle size of 0.2 cm to 5 cm by using an ultrafine pulverizer.

(2) The pulverized straw in step (1) is compressed and molded by using a plodder under a compression pressure of 2.5 MPa and a compression temperature of 45° C. to a true density of 1.0 kg/$m^3$.

(3) The compressed straw in step (2) is pulverized again to a particle size of 0.1-500 μm by using an airflow crusher to obtain straw powder.

(4) 80 kg waste lubricating oil is mixed uniformly with 100 kg of the straw powder, and 6 kg of the above iron-based catalyst to obtain a first slurry, wherein the iron-based catalyst has an average particle diameter of 10 μm.

First Conversion Reaction:

A partial of a mixture of CO and $H_2$ (CO accounts for 60% and $H_2$ accounts for 40%) is pressurized to a pressure of 17 MPa and heated to a temperature of 300° C., and then introduced to a pipeline which conveys the first slurry. The remaining of the mixture of CO and $H_2$ is pressurized to a pressure of 17 MPa and heated to a temperature of 450° C., and then injected to a suspended bed reactor through an inlet thereof to contact with the first slurry which has entered the suspended bed reactor, so that first conversion reaction including cracking, carbonylation, shift and hydrogenation reactions takes place under a pressure of 16 MPa and a temperature of 300° C. The first conversion reaction lasts for 30 min, during which a volume ratio of the mixture of CO and $H_2$ to the first slurry is controlled at 2000:1, producing a first conversion product.

Second Conversion Reaction:

Synthesis gas (CO accounts for 50% by volume) is divided into a first part and a second part, and the first part is pressurized to a pressure of 16 MPa and heated to a temperature of 350° C., and then introduced to a pipeline which conveys the first conversion product. The second part of the synthesis gas is pressurized to a pressure of 16 MPa and heated to a temperature of 500° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 15 MPa and a temperature of 430° C. The second conversion reaction lasts for 60 min, during which a volume ratio of the synthesis gas to the first conversion product is controlled at 2000:1, producing a second oil product.

Refining of Oils:

(1) The second oil product is subjected to a first separation operation in a hot high pressure separator under a pressure of 15 MPa to produce a light component and a heavy component;

(2) The heavy component is subjected to depressurization operation with a high-pressure-difference relief valve, and then introduced into a vacuum tower for carrying out reduced pressure distillation at a temperature of 360° C. under a pressure of 10 kPa to obtain a light fraction, i.e. a tower top oil, and a sideline distillate oil. The sideline distillate oil is returned to the slurry preparation step for use as pore filling oil and/or solvent oil. Residues are collected from the bottom of the vacuum tower.

(3) The light component is mixed with the tower top oil and introduced to a fixed-bed hydrogenation reactor to carry out hydrogenation reaction under a temperature of 380° C., a pressure of 17 MPa, a volume ratio of hydrogen to oil of 1100, and a space velocity of 0.7 $h^{-1}$, producing a fixed-bed hydrogenation product.

(4) The fixed-bed hydrogenation product is introduced to a separator to carry out a second separation operation to obtain hydrogen gas, a gas-phase light hydrocarbon and a liquid phase, wherein the hydrogen gas can be used in the above hydrogenation reaction, and the gas-phase light hydrocarbon is recycled.

(5) The distillate oil is introduced to a fractionating tower to carry out fractionation operation at a temperature of 360° C. to separate out naphtha from the top of the tower, to separate out diesel from the middle and upper part of the tower, and to discharge a tower bottom oil, i.e., a heavy fraction, from the bottom of the tower. The heavy fraction is returned to the step of preparing the biomass slurry for use as a pore filling oil and/or a solvent oil.

Embodiment 41

Provided is a two-stage conversion refining process for biomass, described as below.

Iron-Based Catalyst:

Amorphous FeOOH is used as an iron-based catalyst.

Adding sulfur: Solid sulfur powder is added to the catalyst until the molar ratio of iron element to sulfur element comprised therein is 1:2, thereby ensuring that the molar ratio of iron element to sulfur element in the reaction system is 1:2.

Preparation of Slurry:

(1) Corn straw having a water content of 5 wt % to 20 wt % is collected, and then pulverized to a particle size of 0.2 cm to 5 cm by using an ultrafine pulverizer.

(2) The pulverized straw in step (1) is compressed and molded by using a plodder under a compression pressure of 2.5 MPa and a compression temperature of 45° C. to a true density of 1.0 kg/m³.

(3) The compressed straw in step (2) is pulverized again to a particle size of 0.1-500 μm by using an airflow crusher to obtain straw powder;

(4) 80 kg waste lubricating oil is mixed uniformly with 100 kg of the straw power obtained in step (3) and 6 kg of the above iron-based catalyst to obtain a first slurry, wherein the iron-based catalyst has an average particle size 10 μm.

First Conversion Reaction:

A partial of a mixture of CO and $H_2$ (CO accounts for 60% and $H_2$ accounts for 40%) is pressurized to a pressure of 17 MPa and heated to a temperature of 250° C., and then introduced to a pipeline which conveys the first slurry. The remaining of the mixture of CO and $H_2$ is pressurized to a pressure of 17 MPa and heated to a temperature of 550° C., and then injected to a fluidized bed reactor through an inlet thereof to contact with the first slurry which has entered the fluidized bed reactor, so that first conversion reaction including cracking, carbonylation, shift and hydrogenation reactions takes place under a pressure of 16 MPa and a temperature of 270° C. The first conversion reaction lasts for 35 min, during which a volume ratio of the mixture of CO and $H_2$ to the first slurry is controlled at 1000:1, producing a first conversion product.

Second Conversion Reaction:

Firstly, an iron-based catalyst is added to the first conversion product. The iron-based catalyst is amorphous FeOOH and has an amount of 0.5 wt % by mass of the first conversion product.

Synthesis gas (CO accounts for 50% by volume) is pressurized to a pressure of 15.4 MPa and heated to a temperature of 380° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 15 MPa and a temperature of 425° C. The second conversion reaction lasts for 45 min, during which a volume ratio of the synthesis gas to the first conversion product is controlled at 1500:1, producing a second oil product.

Refining of Oils:

(1) The second oil product is subjected to a first separation operation in a hot high pressure separator under a pressure of 15 MPa to produce a light component and a heavy component.

(2) The heavy component is subjected to depressurization operation with a high-pressure-difference relief valve, and then introduced into a vacuum tower for carrying out reduced pressure distillation at a temperature of 400° C. under a pressure of 5 kPa to obtain a light fraction, i.e., a tower top oil, and a sideline distillate oil. The sideline distillate oil is returned to the step of preparing the aqueous slurry for use as a pore filling oil and/or solvent oil, and residues are recycled from the bottom of the vacuum tower.

(3) The light component is mixed with the tower top oil and introduced to a fixed-bed hydrogenation reactor to carry out hydrogenation reaction under a temperature of 400° C., a pressure of 15 MPa, a hydrogen-oil volume ratio of 1500 and a space velocity of 0.5 $h^{-1}$, producing a fixed-bed hydrogenation product.

(4) The fixed-bed hydrogenation product is introduced to a separator to carry out a second separation operation to obtain hydrogen gas, a gas-phase light hydrocarbon and a liquid phase, wherein the hydrogen gas can be used in the above hydrogenation reaction, and the gas-phase light hydrocarbon is recycled; and (5) The distillate oil is introduced to a fractionating tower to carry out fractionation operation at a temperature of 390° C. to separate out naphtha from the top of the tower, to separate out diesel from the middle and upper part of the tower, and discharge a tower bottom oil, i.e., a heavy fraction from the bottom of the tower. The heavy fraction is returned to the step of preparing the biomass slurry for use as a pore filling oil and/or a solvent oil.

Embodiment 42

Provided is a two-stage conversion and refining process for biomass, described as below.

Iron-Based Catalyst:

A regeneration product of a waste agent resulting from use of a desulfurizer comprising FeOOH as an active component is used as an iron-based catalyst. The desulfurizer comprises 30 g α-FeOOH, 20 g amorphous FeOOH, 8 g potassium oxide, and 10 g binding agent kaolin.

The desulfurizer comprising FeOOH as an active component is used in a desulfurization process for a tail gas produced in the hydro-upgrading process of medium-low temperature coal tar in industry described as below.

1) Exhaust gas produced by fixed bed catalytic hydrogenation of medium-low temperature coal tar is collected.

2) The above mentioned desulfurizer is prepared into particles having a diameter of 1 mm and a length of 15 mm, and filled in a desulfurization tower to form a desulfurization layer.

3) The collected exhaust gas passes through the desulfurization layer at a space velocity of 2000 $h^{-1}$, so that desulfurization reaction takes place when the exhaust gas contact with the desulfurizer in the desulfurization layer at 50° C. to remove hydrogen sulfide in the exhaust gas. After the reaction is completed, a waste agent, i.e. a spent desulfurizer, is collected and cooled to room temperature, i.e. obtaining a waste agent resulting from use of a desulfurizer comprising iron oxide as an active component.

The above waste agent was regenerated described as below:

1) The waste agent is mixed with sodium hydroxide solution and stirred in a slurry tank to form a second slurry which has a pH value of 8.0 and a solid content of 4 wt %.

2) Air is introduced into the second slurry to carry out a first oxidation reaction at 90° C. and 0.1 MPa, producing an oxidized slurry.

3) $H_2S$ is introduced into the oxidized slurry to carry out a vulcanization reaction at 10° C. and 5 MPa, producing a vulcanized slurry.

4) Air is introduced into the vulcanized slurry to carry out a second oxidation reaction at 90° C. and 0.1 MPa to further oxidize and regenerate the slurry.

5) Steps 3) and 4) are repeated once to produce a final slurry wherein the molar ratio of iron to sulfur is 1:2.

6) The final slurry is subjected to solid-liquid separation to obtain the regeneration product of the above waste agent.

Preparation of Slurry:

(1) Corn straw and cotton straw, having a water content of 5 wt % to 20 wt %, are collected, and then pulverized to a particle size of 0.2 cm to 5 cm by using an ultrafine pulverizer.

(2) The pulverized straw in step (1) is compressed and molded by using a plodder under a compression pressure of 4 MPa and a compression temperature of 40° C. to a true density of 0.9 kg/$m^3$.

(3) The compressed straw in step (2) is pulverized again to a particle diameter of 0.1-500 μm by using an airflow crusher to obtain straw powder, then 100 kg of the straw powder is mixed with 1 kg of the above iron-based catalyst to obtain a mixed powder, wherein the regeneration product of the waste agent resulting from use of the desulfurizer comprising FeOOH as an active component has an average diameter of 20 μm.

(4) Then the mixed powder is mixed with 50 kg rancid oil to carry out grinding pulping for 15 min by using a colloid mill to obtain a first slurry.

Adding sulfur: Solid sulfur powder is added to the above regeneration product until the molar ratio of iron element to sulfur element reaches 1:2.5, thereby ensuring that the molar ratio of iron element to sulfur element in the reaction system is 1:2.5.

First Conversion Reaction:

A partial of a mixture of CO and $H_2$ (CO accounts for 80% and $H_2$ accounts for 20%) is pressurized to a pressure of 19.5 MPa and heated to a temperature of 300° C., and then introduced to a pipeline which conveys the first slurry. The remaining of the mixture of CO and $H_2$ is pressurized to a pressure of 19.3 MPa and heated to a temperature of 480° C., and then injected into a slurry bed reactor through three injection ports on the bottom and side walls thereof to contact with the first slurry which has entered the slurry bed reactor, so that first conversion reaction including cracking, carbonylation, shift and hydrogenation reactions takes place under a pressure of 19 MPa and a temperature of 280° C. The first conversion reaction lasts for 20 min, during which a volume ratio of the mixture of CO and $H_2$ to the first slurry is controlled at 800:1, producing a first conversion product.

Second Conversion Reaction:

Firstly, a hydrogenation catalyst is added to the first conversion product. The hydrogenation catalyst consists of zeolite loading 2% MoO, 6% NiO and 3% CoO based on the total weight of the hydrogenation catalyst, and is present in an amount of 2 wt % by mass of the first conversion product.

Then, a mixture of CO and $H_2$ (CO accounts for 20% and $H_2$ accounts for 80%) is divided into a first part and a second part, and the first part is pressurized to a pressure of 20 MPa and heated to a temperature of 380° C., and then introduced to a pipeline which conveys the first conversion product. The second part of the mixture of CO and $H_2$ is pressurized to a pressure of 20 MPa and heated to a temperature of 480° C., and then injected to a slurry bed reactor through an inlet thereof to contact with the first conversion product which has entered the slurry bed reactor, so that the second conversion reaction including cracking, carbonylation, shift and hydrogenation reactions takes place under a pressure of 15 MPa and a temperature of 390° C. The second conversion reaction lasts for 30 min, during which a volume ratio of the mixture of CO and $H_2$ to the first conversion product is controlled at 4000:1, producing a second oil product.

Refining of Oils:

(1) The obtained second oil product is subjected to a first separation operation in a hot high pressure separator under a pressure of 15 MPa to produce a light component and a heavy component;

(2) The heavy component is subjected to depressurization operation with a high-pressure-difference relief valve, and then introduced into a vacuum tower for carrying out reduced pressure distillation at a temperature of 320° C. under a pressure of 20 kPa to obtain a light fraction, i.e., a tower top oil, and a sideline distillate oil. The sideline distillate oil is returned to the slurry preparation step for use as pore filling oil and/or solvent oil. Residues are collected from the bottom of the vacuum tower.

(3) The light component is mixed with the tower top oil and introduced to a fixed-bed hydrogenation reactor to carry out a hydrogenation reaction under a temperature of 360° C., a reaction pressure of 16 MPa, a hydrogen-oil volume ratio of 1000 and a space velocity of 0.6 $h^{-1}$, producing a fixed-bed hydrogenation product.

(4) The fixed-bed hydrogenation product is introduced to a separator to carry out a second separation operation to obtain hydrogen gas, a gas-phase light hydrocarbon and a liquid phase, wherein the hydrogen gas can be used in the above hydrogenation reaction, and the gas-phase light hydrocarbon is recycled.

(5) The distillate oil is introduced to a fractionating tower to carry out fractionation operation at a temperature of 300° C. to separate out naphtha from the top of the tower, to separate out diesel from the middle and upper part of the tower, and to discharge a tower bottom oil, i.e., a heavy fraction, from the bottom of the tower. The heavy fraction is returned to the step of preparing the biomass slurry for use as a pore filling oil and/or a solvent oil.

Embodiment 43

Provided is a two-stage conversion and refining process for biomass, described as below.

Iron-Based Catalyst:

A regeneration product of a waste agent resulting from use of a desulfurizer comprising iron oxide as an active component is used as an iron-based catalyst. The iron-based catalyst comprises 12 g $Fe_3O_4$ of cubic crystal, 24 g amorphous $Fe_2O_3$, 39 g amorphous $Fe_2O_3.H_2O$, and 5 g NiO.

The desulfurizer is used in a desulfurization process for removing $H_2S$ from exhaust gas, which is described as below. An exhaust gas having a $H_2S$ content of 5500 mg/cm$^3$ is introduced to a desulfurization section at a space velocity of 3000 $h^{-1}$ to carry out desulfurization reaction at 30° C. When the content of $H_2S$ in the outlet gas of the desulfurization section is less than or equal to 0.01 ppm, a waste agent in the desulfurization section is collected.

The waste agent component was regenerated described as below:

1) The waste agent is washed with water, and then ground with water in a wet ball mill to obtain a waste powder of 200 mesh.

2) The waste powder is prepared into an aqueous suspension with a solid mass percentage of 7%, into which compressed air is introduced to carry out the reaction.

3) The aqueous suspension is filtered to obtain solid materials, which are placed in a flotation tank, into which water is added, and then air is introduced, and the precipitate at the lower part of the container is dried to obtain a regeneration product of the above waste agent.

Adding sulfur: Solid sulfur powder is added to the above regeneration product until the molar ratio of iron element to sulfur element comprised therein is 1:0.9, thereby ensuring that the molar ratio of iron element to sulfur element in the reaction system is 1:0.9.

Preparation of Slurry:

(1) Red algae is collected and dried to a moisture content of less than 20 wt %, and then pulverized to a particle size of 0.2 cm to 5 cm.

(2) The pulverized red algae in step (1) is compressed and molded by using a plodder under a compression pressure of 3 MPa and a compression temperature of 40° C. to a true density of 0.95 kg/m$^3$.

(3) The compressed red algae in step (2) is pulverized again to a particle size of 100-200 μm by using an airflow crusher to obtain red algae powder.

(4) 100 kg of the red algae powder is mixed with 70 kg of waste engine oil and 16 kg of the above iron-based catalyst to carry out grinding pulping for 12 min to obtain a first slurry, wherein the iron-based catalyst has an average diameter of 2 μm.

First Conversion Reaction:

A mixture of CO and $H_2$ (CO accounts for 60% and $H_2$ accounts for 40%) is pressurized to a pressure of 20.4 MPa and heated to a temperature of 400° C., and then injected to a slurry bed reactor through an inlet thereof to contact with the first slurry which has entered the slurry bed reactor, so that first conversion reaction including cracking, carbonylation, shift and hydrogenation reactions takes place under a pressure of 20 MPa and a temperature of 300° C. The first conversion reaction lasts for 30 min, during which a volume ratio of the mixture of CO and $H_2$ to the first slurry is controlled at 650:1, producing a first conversion product.

Second Conversion Reaction:

Firstly, a further amount of the iron-based catalyst is added to the first conversion product at a dosage of 1.9 wt % of the first conversion product.

Then, a mixture of CO and $H_2$ (CO accounts for 30% and $H_2$ accounts for 70%) is pressurized to a pressure of 19 MPa and heated to a temperature of 490° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 18 MPa and a temperature of 440° C. The second conversion reaction lasts for 30 min, during which a volume ratio of the mixture of CO and $H_2$ to the first conversion product is controlled at 1000:1, producing a second oil product.

Refining of Oils:

(1) The obtained second oil product is subjected to a first separation operation in a hot high pressure separator under a pressure of 20 MPa to produce a light component and a heavy component.

(2) The heavy component is subjected to depressurization operation with a high-pressure-difference relief valve, and then introduced into a vacuum tower for carrying out reduced pressure distillation at a temperature of 380° C. under a pressure of 8 kPa to obtain a light fraction, i.e., a tower top oil, and a sideline distillate oil. Residues are collected from the bottom of the vacuum tower.

(3) The light component is mixed with the tower top oil and introduced to a fixed-bed hydrogenation reactor to carry out a hydrogenation reaction under a temperature of 400° C., a pressure of 18 MPa, a hydrogen-oil volume ratio of 1100 and a space velocity of 0.3 $h^{-1}$, producing a fixed-bed hydrogenation product.

(4) The fixed-bed hydrogenation product is introduced to a separator to carry out a second separation operation to obtain hydrogen gas, a gas-phase light hydrocarbon and a liquid phase, wherein the hydrogen gas can be used in the above hydrogenation reaction, and the gas-phase light hydrocarbon 19 is recycled.

(5) The distillate oil is introduced to a fractionating tower to carry out fractionation operation at a temperature of 330° C. to separate out naphtha from the top of the tower, to separate out diesel from the middle and upper part of the tower, and to discharge a tower bottom oil, i.e., a heavy fraction from the bottom of the tower.

Embodiment 44

Provided is a two-stage conversion refining process for biomass, described as below.

Iron-Based Catalyst:

A waste agent resulting from use of a desulfurizer comprising FeOOH as an active component is used as a catalyst. The desulfurizer comprises 70 g amorphous FeOOH, 25 g $Co_2O_3$, and 5 g NiO.

The desulfurizer comprising FeOOH as an active component is used in a desulfurization process for removing $H_2S$ from exhaust gas, which is described as below. An exhaust gas having a $H_2S$ content of 5500 mg/cm$^3$ is introduced to a desulfurization section at a space velocity of 3000 $h^{-1}$ to carry out desulfurization reaction at 30° C. When the content of $H_2S$ in the outlet gas of the desulfurization section is less than or equal to 0.01 ppm, a waste agent is produced and collected in the desulfurization section, i.e. obtaining the waste agent mentioned above.

Adding sulfur: Solid sulfur powder is added into the waste agent until the molar ratio of iron element to sulfur element is 1:3, thereby ensuring that the molar ratio of iron element to sulfur element in the reaction system is 1:3.

Preparation of Biomass Slurry:

(1) Peanut oil residue having a moisture content of 5-15 wt % is collected, and then pulverized to a particle size of 0.2 cm to 5 cm by using an ultrafine pulverizer.

(2) The pulverized peanut oil residue of step (1) is compressed and molded by using a plodder under a compression pressure of 2.5 MPa and a compression temperature of 50° C. to a true density of 1.2 kg/m$^3$.

(3) The compressed peanut oil residue of step (2) is pulverized again to a particle size of 0.1-500 μm by using an airflow crusher to obtain peanut oil residue powder.

(4) 90 kg gutter oil is mixed with 100 kg of the peanut oil residue power of step (3) and 5 kg of the above iron-based catalyst uniformly to obtain a first slurry, wherein the waste agent of the desulfurizer comprising FeOOH as an active component has an average size of 120 in.

First Conversion Reaction:

A partial of pure CO gas is pressurized to a pressure of 18 MPa and heated to a temperature of 250° C., and then introduced into the first slurry. The remaining of the pure CO gas is pressurized to a pressure of 18 MPa and heated to a temperature of 500° C., and then injected to a slurry bed reactor through four injection ports on the bottom and side walls thereof to contact with the first slurry which has entered the slurry bed reactor, so that first conversion reaction including cracking, carbonylation, shift and hydrogenation reactions takes place under a pressure of 17 MPa, a temperature of 310° C. The first conversion reaction lasts for 20 min, during which the volume ratio of pure CO gas to the first slurry is 950:1, producing a first conversion product.

Second Conversion Reaction:

Synthesis gas (CO accounts for 70% by volume) is pressurized to a pressure of 14 MPa and heated to a temperature of 480° C., and then introduced into a slurry bed reactor through an inlet thereof to contact with the first conversion product which has entered the slurry bed reactor, so that second conversion reaction including cracking, carbonylation, shift and hydrogenation reactions takes place under a pressure of 20 MPa and a temperature of 380° C. The second conversion reaction lasts for 30 min, during which a volume ratio of the synthesis gas to the first conversion product is controlled at 1500:1, producing a second oil product.

Refining of Oils:

(1) The obtained second oil product is subjected to a first separation operation in a hot high pressure separator under a pressure of 19 MPa to produce a light component and a heavy component.

(2) The heavy component is subjected to depressurization operation with a high-pressure-difference relief valve, and then introduced into a vacuum tower for carrying out reduced pressure distillation at a temperature of 330° C. under a pressure of 11 kPa to obtain a light fraction, i.e., a tower top oil, and a sideline distillate oil, The sideline distillate oil is returned to the slurry preparation step for use as pore filling oil and/or solvent oil. Residues are collected from the bottom of the vacuum tower.

(3) The light component is mixed with the tower top oil and introduced to a fixed-bed hydrogenation reactor to carry out a hydrogenation reaction under a temperature of 390° C., a pressure of 7 MPa, a hydrogen-oil volume ratio of 2000 and a space velocity of 1 $h^{-1}$, obtaining a fixed-bed hydrogenation product.

(4) The fixed-bed hydrogenation product is introduced to a separator to carry out a second separation operation to obtain hydrogen gas, a gas-phase light hydrocarbon and a liquid phase, wherein the hydrogen gas can be used in the above hydrogenation reaction, and the gas-phase light hydrocarbon is recycled; and (5) The distillate oil is introduced to a fractionating tower to carry out fractionation operation at a temperature of 280° C. to separate out naphtha from the top of the tower, to separate out diesel from the middle and upper part of the tower, and to discharge a tower bottom oil, i.e., a heavy fraction from the bottom of the tower. The heavy fraction is returned to the step of preparing the biomass slurry for use as a pore filling oil and/or a solvent oil.

Embodiment 45

Provided is a two-stage conversion refining process for biomass, described as below.

Iron-Based Catalyst:

A waste agent of a desulfurizer comprising FeOOH as an active component is used as an iron-based catalyst. The desulfurizer comprises 6 g soluble iron salt $Fe(NO_3)_3 \cdot 9H_2O$, 9 g iron salt complexing agent triethanolamine, and 15 g amorphous iron hydroxyl oxide.

The above desulfurizer is used in a desulfurization process for removing $H_2S$ from exhaust gas, which is described as below. An exhaust gas having a $H_2S$ content of 5500 mg/cm³ is introduced to a desulfurization section at a space velocity of 3000 h⁻¹ to carry out desulfurization reaction at 30° C. When the content of $H_2S$ in the outlet gas of the desulfurization section is less than or equal to 0.01 ppm, a waste agent in the desulfurization section is collected.

Adding sulfur: The waste agent is tested to determine a molar ratio of iron element to sulfur element comprised therein. If the molar ratio of iron element to sulfur element is less than 1:2, solid sulfur powder is added to the waste agent until the molar ratio of iron element to sulfur element reaches 1:2, thereby ensuring that the molar ratio of iron element to sulfur element in the reaction system is 1:2. However if the molar ratio of iron element to sulfur element is greater than 1:2, excess sulfur is removed by conventional methods such as solvent extraction or heating.

Preparation of Slurry:

(1) 100 kg peanut oil residue having a moisture content of 5-15 wt % is collected, and then pulverized to a particle size of 0.2-5 cm by using an ultrafine pulverizer.

(2) The pulverized peanut oil residue of step (1) is mixed with 8 kg catalyst, and compressed and molded by using a plodder under a compression pressure of 2.5 MPa and a compression temperature of 50° C. to a true density of 1.2 kg/m³.

(3) The compressed material of step (2) is pulverized again to a particle size of 0.1-500 μm by using an airflow crusher to obtain a mixed powder of peanut oil residue and catalyst;

(4) 80 kg gutter oil is mixed with the mixed power of step (3) under a negative pressure of 30 KPa to obtain a mixture;

(5) The mixture of step (4) is mixed with 8 kg water to carry out grinding pulping for 16 min by using a colloid mill to obtain a first slurry, wherein the iron-based catalyst has an average size of 5 μm.

First Conversion Reaction:

A partial of a mixture of CO and $H_2$ (CO accounts for 60% and $H_2$ accounts for 40%) is pressurized to a pressure of 5.7 MPa and heated to a temperature of 400° C., and then introduced to a pipeline which conveys the first slurry. The remaining of the mixture of CO and $H_2$ is pressurized to a pressure of 5.2 MPa and heated to a temperature of 400° C., and then injected to a slurry bed reactor through an inlet thereof to contact with the first slurry which has entered the slurry bed reactor, so that first conversion reaction including cracking, carbonylation, shift and hydrogenation reactions takes place under a pressure of 5 MPa and a temperature of 240° C. The first conversion reaction lasts for 90 min, during which a volume ratio of the mixture of CO and $H_2$ to the first slurry is controlled at 8000:1, producing a first conversion product.

Second Conversion Reaction:

Firstly, the iron-based catalyst is added to the first conversion product at a dosage of 1 wt % of the first conversion product.

Then, a mixture of CO and $H_2$ (CO accounts for 60% and $H_2$ accounts for 40%) is pressurized to a pressure of 19 MPa and heated to a temperature of 480° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 18 MPa and a temperature of 370° C. The second conversion reaction lasts for 30 min, during which a volume ratio of the mixture of CO and $H_2$ to the first conversion product is controlled at 7000:1, producing a second oil product.

Refining of Oils:

(1) The obtained second oil product is subjected to a first separation operation in a hot high pressure separator under a pressure of 16 MPa to produce a light component and a heavy component.

(2) The heavy component is subjected to depressurization operation with a high-pressure-difference relief valve, and then introduced into a vacuum tower for carrying out reduced pressure distillation at a temperature of 330° C. under a pressure of 11 kPa to obtain a light fraction, i.e., a tower top oil, and a sideline distillate oil. The sideline distillate oil is returned to the slurry preparation step for use as pore filling oil and/or solvent oil. Residues are collected from the bottom of the vacuum tower.

(3) The light component is mixed with the tower top oil and introduced to a fixed-bed hydrogenation reactor to carry out a hydrogenation reaction under a temperature of 380° C., a pressure of 16 MPa, a hydrogen-oil volume ratio of 1500 and a space velocity of 1 h⁻¹, obtaining a fixed-bed hydrogenation product.

(4) The fixed-bed hydrogenation product is introduced to a fractionating tower to carry out fractionation operation at a temperature of 280° C. to separate out naphtha from the top of the tower, to separate out diesel from the middle and upper part of the tower, and to discharge a tower bottom oil, i.e., a heavy fraction from the bottom of the tower. The heavy fraction is returned to the step of preparing the biomass slurry for use as a pore filling oil and/or a solvent oil.

Embodiment 46

Provided is a two-stage conversion refining process for biomass, described as below.

Iron-Based Catalyst:

A regeneration product of a waste agent resulting from use of a desulfurizer comprising FeOOH is used as an iron-based catalyst. The desulfurizer comprises 45% by weight of r-FeOOH, 35% by weight of α-FeOOH, 15% by weight of molecular sieve as carriers, and 5% by weight of sesbania powder as binder.

The desulfurizer is used in a desulfurization process for removing $H_2S$ from exhaust gas, which is described as below. An exhaust gas having a $H_2S$ content of 5500 mg/cm³ is introduced to a desulfurization section at a space velocity of 3000 h⁻¹ to carry out desulfurization reaction at 30° C. When the content of $H_2S$ in the outlet gas of the desulfurization section is less than or equal to 0.01 ppm, a waste agent in the desulfurization section is collected.

The obtained waste agent was regenerated described as below: The waste agent is washed with water, and then ground with water in a wet ball mill to obtain a waste powder of 80 mesh. The waste powder is prepared into an aqueous suspension with a solid mass percentage of 8%, into which compressed air is introduced. Sample is taken for testing after reacting for a period of time. When there is no $H_2S$ produced from the reaction between the sample and hydrochloric acid, the iron sulphides in the waste agent have been completely converted into FeOOH and elemental sulfur, producing a slurry comprising FeOOH and elemental sulfur. Filtering the slurry to obtain a solid material, and extracting the solid material with $CCl_4$ for three times, then combining the extracted liquids, and recovering the solvents by distillation to obtain crystalline elemental sulfurs. Mixing the remaining solids separated from the extraction liquids with sesbania powders to obtain a regeneration product of the above-mentioned waste agent, wherein the amount of the binder sesbania powders is 5% by mass of the solids.

Adding carbon disulfides: Adding carbon disulfides into the above regeneration product until the molar ratio of iron element to sulfur element is 1:2, thereby ensuring that the molar ratio of iron element to sulfur element in the reaction system is 1:2.

Preparation of Slurry:

(1) Wheat straw and peanut straw, having a moisture content of 8-20 wt %, are collected, and then pulverized to a particle size of 0.2-5 cm by using an ultrafine pulverizer.

(2) The pulverized straw of step (1) is compressed and molded by using a plodder under a compression pressure of 5 MPa and a compression temperature of 30° C. to a true density of 1.5 kg/m$^3$.

(3) The compressed material of step (2) is pulverized again to a particle size of 0.1-500 μm by using an airflow crusher to obtain straw powder.

(4) 10 kg of the above catalyst is mixed with 80 kg anthracene oil, and then mixed with 100 kg of the straw power of step (3) to obtain straw power mixture.

(5) The straw power mixture of step (4) is mixed with 3 kg water to carry out grinding pulping for 20 min by using a colloid mill to obtain a first slurry, wherein the iron-based catalyst has an average diameter of 5 mm.

First Conversion Reaction:

A partial of a mixture of CO and $H_2$ (CO accounts for 60% and $H_2$ accounts for 40%) is pressurized to a pressure of 16.8 MPa and heated to a temperature of 250° C., and then introduced to a pipeline which conveys the first slurry. The remaining of the mixture of CO and $H_2$ is pressurized to a pressure of 16.2 MPa and heated to a temperature of 450° C., and then injected to a fluidized bed reactor through an inlet thereof to contact with the first slurry which has entered the fluidized bed reactor, so that first conversion reaction including cracking, carbonylation, shift and hydrogenation reactions takes place under a pressure of 16 MPa and a temperature of 350° C. The first conversion reaction lasts for 60 min, during which a volume ratio of the mixture of CO and $H_2$ to the first slurry is controlled at 5000:1, producing a first conversion product.

Second Conversion Reaction:

CO is pressurized directly to a pressure of 19 MPa and heated to a temperature of 410° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 18 MPa and a temperature of 420° C. The second conversion reaction lasts for 30 min, during which a volume ratio of CO to the first conversion product is controlled at 2600:1, producing a second oil product.

Refining ofOils:

(1) The obtained oil is subjected to a first separation operation in a hot high pressure separator under a pressure of 15 MPa to produce a light component and a heavy component.

(2) The heavy component is subjected to depressurization operation with a high-pressure-difference relief valve, and then introduced into a vacuum tower for carrying out reduced pressure distillation at a temperature of 400° C. under a pressure of 5 kPa to obtain a light fraction, i.e., a tower top oil, and a sideline distillate oil. The sideline distillate oil is returned to the slurry preparation step for use as pore filling oil and/or solvent oil. Residues are collected from the bottom of the vacuum tower.

(3) The light component is mixed with the tower top oil and introduced to a fixed-bed hydrogenation reactor to carry out a hydrogenation reaction under a temperature of 430° C., a pressure of 18 MPa, a hydrogen-oil volume ratio of 1500 and a space velocity of 0.5 h$^{-1}$, obtaining a fixed-bed hydrogenation product.

(4) The fixed-bed hydrogenation product is introduced to a separator to carry out a second separation operation to obtain hydrogen gas, a gas-phase light hydrocarbon and a liquid phase, wherein the hydrogen gas can be used in the above hydrogenation reaction, and the gas-phase light hydrocarbon is recycled.

(5) The distillate oil is introduced to a fractionating tower for carrying out fractionation operation at a temperature of 390° C. to separate out naphtha from the top of the tower, to separate out diesel from the middle and upper part of the tower, and to discharge a tower bottom oil, i.e., a heavy fraction from the bottom of the tower. The heavy fraction is returned to the step of preparing the biomass slurry for use as a pore filling oil and/or a solvent oil.

Embodiment 47

Provided is a two-stage conversion refining process for biomass, described as below.

Iron-Based Catalyst:

A regeneration product of a waste agent resulting from use of a desulfurizer comprising $Fe_{21.333}O_{32}$ is used as an iron-based catalyst. The desulfurizer comprises 55 g magnetic iron oxide red $Fe_{21.333}O_{32}$, 12 g copper oxide, and 21 g carrier $Fe_2O_3$.

The iron-based catalyst is used in a desulfurization process for a coal pyrolysis gas comprising hydrogen sulfide, which is described as below.

(1) A compressed coal pyrolysis gas is cooled to a temperature of 30-35° C., and mixed with air from an air pump and introduced to a desulfurization tower filled with the above-mentioned desulfurizer which mainly comprises iron oxide as an active component. The compressed coal pyrolysis gas enters at the bottom and exits at the top, thereby preventing liquid water from entering the desulfurizer bed.

(2) After many times use of the above-mentioned desulfurizer, a waste agent, i.e. spent desulfurizer, is produced and removed from the desulfriizer bed, i.e. obtaining a waste agent resulting from use of a desulfurizer comprising $Fe_{21.333}O_{32}$.

The obtained waste agent was regenerated described as below:

1) The waste agent is dispersed in water to form a slurry.

2) The slurry is heated to a temperature of 60° C. under atmospheric pressure. Then hydrogen peroxide is added to the slurry by using a peristaltic pump at a flow rate of 500 mL/min to perform reactions for a period of 10 min under magnetic stirring.

3) After the reaction is completed, the resulted reaction solution is filtered, producing a precipitate which is then washed twice with water and then dried naturally to obtain a regeneration product of the above-mentioned waste agent.

Preparation of Slurry:

(1) 100 kg of corn straw and cotton straw, having a moisture content of 5-20 wt %, is collected and mixed with 5 kg catalyst, then pulverized to a particle size of 0.2-5 cm by using an ultrafine pulverizer;

(2) The pulverized material of step (1) is compressed and molded by using a plodder under a compression pressure of 4 MPa and a compression temperature of 40° C. to a true density of 0.9 kg/m$^3$;

(3) The compressed mixed material of step (2) is pulverized again to a particle size of 0.1-500 μm by using an airflow crusher to obtain a mixed powder of straw and catalyst;

(4) 50 kg rancid oil is mixed with the mixed powder of step (3) under a negative pressure of 100 KPa to obtain a mixture;

(5) The mixture of step (4) is mixed with 50 kg rancid oil, and then mixed with 2 kg water to carry out grinding pulping for 15 min by using a colloid mill to obtain a first slurry, wherein, the iron-based catalyst has an average diameter of 300 μm.

First Conversion Reaction:

A partial of pure CO is pressurized to a pressure of 5.7 MPa and heated to a temperature of 250° C., and then introduced to a pipeline which conveys the first slurry. The remaining of the pure CO is pressurized to a pressure of 5.2 MPa and heated to a temperature of 300° C., and then injected to a slurry bed reactor through an inlet thereof to contact with the first slurry which has entered the slurry bed reactor, so that first conversion reaction including cracking, carbonylation, shift and hydrogenation reactions takes place under a pressure of 5 MPa, a temperature of 270° C., and a controlled volume ratio of the mixture of CO and $H_2$ to the first slurry of 3000:1. The first conversion reaction lasts for 90 min, during which hydrogen sulfide gas is introduced into the slurry bed reactor to ensure a molar ratio of iron element to sulfur element in the reaction system is 1:3, producing a first conversion product.

Second Conversion Reaction:

Synthesis gas (CO accounts for 39% by volume) is pressurized to a pressure of 16 MPa and heated to a temperature of 400° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 15 MPa and a temperature of 380° C. The second conversion reaction lasts for 40 min, during which a volume ratio of the synthesis gas to the first conversion product is controlled at 6000:1, producing a second oil product.

Refining of Oils:

(1) The obtained second oil product is subjected to a first separation operation in a hot high pressure separator under a pressure of 13 MPa to produce a light component and a heavy component.

(2) The heavy component is subjected to depressurization operation with a high-pressure-difference relief valve, and then introduced into a vacuum tower for carrying out reduced pressure distillation at a temperature of 380° C. under a pressure of 8 kPa to obtain a light fraction, i.e., a tower top oil, and a sideline distillate oil. Residues are collected from the bottom of the vacuum tower.

(3) The light component is mixed with the tower top oil and introduced to a fixed-bed hydrogenation reactor to carry out a hydrogenation reaction under a temperature of 400° C., a reaction pressure of 12 MPa, a hydrogen-oil volume ratio of 1100 and a space velocity of 0.3 $h^{-1}$, obtaining a fixed-bed hydrogenation product.

(4) The fixed-bed hydrogenation product is introduced to a separator to carry out a second separation operation to obtain hydrogen gas, a gas-phase light hydrocarbon and a liquid phase, wherein the hydrogen gas can be used in the above hydrogenation reaction, and the gas-phase light hydrocarbon 19 is recycled; and (5) The distillate oil is introduced to a fractionating tower to carry out fractionation operation at a temperature of 330° C. to separate out naphtha from the top of the tower, to separate out diesel from the middle and upper part of the tower, and to discharge a tower bottom oil, i.e., a heavy fraction from the bottom of the tower.

Comparative Example 5 (One Stage Conversion)

Provided is a comparative conversion process for biomass, wherein the iron-based catalyst source and the slurry preparation are the same as that of embodiment 4, but the specific steps of the conversion reaction are different, described as below:

A mixture of CO and $H_2$ (CO accounts for 60% and $H_2$ accounts for 40%) is pressurized to a pressure of 20.4 MPa and heated to a temperature of 500° C., and then injected to a slurry bed reactor through three injection parts on the side walls thereof to contact with the first slurry which has entered the slurry bed reactor, so that conversion reaction including cracking, carbonylation, shift and hydrogenation reactions takes place under a pressure of 20 MPa and a temperature of 410° C. The conversion reaction lasts for 30 min, during which a volume ratio of the mixture of CO and $H_2$ to the first slurry is controlled at 650:1, producing a first oil product.

The first oil product is subjected to a first separation operation in a hot high pressure separator under a pressure of 19 MPa to produce a light component and a heavy component.

Comparative Example 6 (Drying, the Molar Ratio of Iron to Sulfur in the Reaction System is 1:0.1)

Provided is a comparative conversion process for biomass, which is the same as that of embodiment 7 except that, in this comparative example, wheat straw and peanut straw are used as biomass solid, and the biomass solid has a water content of 80 ppm based on the total amount of the biomass; the molar ratio of iron to sulfur in the reaction system is 1:0.1. The first oil product is subjected to a first separation operation in a hot high pressure separator under a pressure of 19 MPa to produce a light component and a heavy component.

Test Example 5

The oil products prepared in the Embodiments 40-47 of the present invention and that of comparative examples 5-6 are tested and analyzed according to the following methods.

In each of the following embodiments and comparative examples, calculation formulas for conversion rate of biomass solid, yield of oil converted from biomass solid, content of biomass oil of each fractionation range in distillate oil, and residue content are as follows:

Conversion rate of biomass solid %=(the mass of biomass solid feed−the mass of residual biomass solid)/the mass of biomass solid feed.

Yield of oil converted from biomass solid=the mass of oil converted from biomass solid/the mass of biomass solid feed.

Content of biomass oil of each fractionation range in distillate oil=(mass of oil of each fractionation range−mass of solvent oil of the fractionation range)/total mass of biomass oil.

The corresponding test results are shown in Table 7:

TABLE 7

Product distributions after conversion of solid organic materials

| Test item | | | Embodiment No. | | | | | | | Comparative example 5 | Comparative example 6 |
|---|---|---|---|---|---|---|---|---|---|---|---|
| | | | 40 | 41 | 42 | 43 | 44 | 45 | 46 | 47 | | |
| Conversion rate of biomass (%) | | | 99.1 | 99.2 | 98.9 | 99.7 | 99.3 | 99.5 | 99.5 | 99.2 | 89.1 | 85.6 |
| Yield of biomass oil (%) | | | 54.2 | 55.1 | 53.2 | 48.3 | 53.2 | 55.2 | 56.1 | 56.3 | 38.9 | 40.0 |
| Main element content | C | | 85.0 | 85.3 | 86.2 | 85.3 | 86.5 | 85.3 | 86.4 | 85.5 | 80.5 | 83.1 |
| of oil converted from | H | | 13.8 | 14.1 | 13.3 | 13.8 | 13.7 | 14.2 | 13.2 | 14.1 | 11.0 | 11.2 |
| biomass solid (wt %) | O | | 0.2 | 0.2 | 0.1 | 0.1 | 0.2 | 0.1 | 0.1 | 0.1 | 6 | 5 |
| Fraction distribution | <145° C. | | 22 | 29 | 28 | 25 | 27 | 30 | 31 | 30 | 18 | 21 |
| of oil converted from | 145-360° C. | | 38 | 36 | 35 | 40 | 39 | 40 | 39 | 38 | 23 | 20 |
| biomass solid (wt %) | 360-520° C. | | 36 | 30 | 31 | 30 | 30 | 28 | 29 | 30 | 46 | 48 |
| | >520° C. | | 3 | 2 | 3 | 4 | 3 | 2 | 1 | 1 | 11 | 10 |

Table 7 shows that the conversion rate of biomass, the yield of oil converted from biomass, the oxygen content in the oil converted from biomass, and the fraction distribution of oil converted from biomass solid are all superior to those of the comparative examples. From the data comparison between the embodiments, it can be seen that the special pulping process can further improve the above indexes by filling the pores of the biomass solid material.

Embodiment 48

Provided is a two-stage conversion process for biomass, which is described as below.

Preparation of Biomass Slurry:

Corn straw having a water content of 5 wt % to 20 wt % is collected, and then pulverized to a particle size of 0.2 μm to 5 cm by using an ultrafine pulverizer.

The pulverized straw is compressed and molded by using a plodder under a compression pressure of 2.5 MPa and a compression temperature of 45° C. to a true density of 1.0 kg/m$^3$.

The compressed straw is pulverized again to a particle size of 100 mesh by using an airflow crusher to obtain straw powder, then 40 kg of the straw powder is mixed with the above iron-based catalyst to obtain a mixed powder.

80 kg waste lubricating oil is mixed uniformly with the mixed powder and 4 kg water to carry out grinding pulping for 15 min by using a colloid mill to obtain a first slurry.

Wherein, the catalyst added in the first slurry is an iron-based catalyst with a content of 5 wt % and an average particle size of 5 μm.

Iron-Based Catalyst:

A waste agent of a desulfurizer comprising FeOOH as an active component is used as an iron-based catalyst. Every 30 g desulfurizer comprises 6 g soluble iron salt Fe(NO$_3$)$_3$·9H$_2$O, 9 g iron salt complexing agent triethanolamine, and 15 g amorphous iron hydroxyl oxide.

The above desulfurizer is used in a desulfurization process for removing H$_2$S from exhaust gas, which is described as below. An exhaust gas having a H$_2$S content of 5500 mg/cm$^3$ is introduced to a desulfurization section at a space velocity of 3000 h$^{-1}$ to carry out desulfurization reaction at 30° C. When the content of H$_2$S in the outlet gas of the desulfurization section is less than or equal to 0.01 ppm, a waste agent in the desulfurization section is collected.

Adding sulfur: The waste agent is tested to determine a molar ratio of iron element to sulfur element comprised therein. If the molar ratio of iron element to sulfur element is less than 1:5, solid sulfur powder is added to the waste agent until the molar ratio of iron element to sulfur element reaches 1:5, thereby ensuring that the molar ratio of iron element to sulfur element in the reaction system is 1:5. However if the molar ratio of iron element to sulfur element is greater than 1:5, excess sulfur is removed by conventional methods such as solvent extraction or heating.

First Conversion Reaction:

A partial of a mixture of CO and H$_2$ (CO accounts for 60% and H$_2$ accounts for 40%) is pressurized to a pressure of 21 MPa and heated to a temperature of 350° C., and then introduced to a pipeline which conveys the first slurry. The remaining of the mixture of CO and H$_2$ is pressurized to a pressure of 21 MPa and heated to a temperature of 500° C., and then injected to a slurry bed reactor through an inlet thereof to contact with the first slurry which has entered the slurry bed reactor, so that first conversion reaction including cracking, carbonylation, shift and hydrogenation reactions takes place under a pressure of 20 MPa and a temperature of 360° C. The first conversion reaction lasts for 20 min, during which a volume ratio of the mixture of CO and H$_2$ to the first slurry is controlled at 3000:1, producing a first conversion product.

Second Conversion Reaction:

Firstly, a hydrogenation catalyst is added to the first conversion product. The hydrogenation catalyst consists of aluminium oxide loading 5% MoO based on the total weight of the hydrogenation catalyst, and is present in an amount of 1.5 wt % by mass of the first conversion product.

Then, H$_2$ is divided into a first part and a second part, and the first part is pressurized to a pressure of 21 MPa and heated to a temperature of 350° C., and then introduced to a pipeline which conveys the first conversion product. The second part of H$_2$ is pressurized to a pressure of 21 MPa and heated to a temperature of 500° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 18 MPa and a temperature of 430° C. The second conversion reaction lasts for 30 min, during which a volume ratio of H$_2$ to the first conversion product is controlled at 1000:1, producing a second oil product.

Embodiment 49

Provided is a two-stage conversion process for biomass, which is described as below.

Preparation of Biomass Slurry:

Wheat straw having a water content of 10 wt % to 20 wt % is collected and pulverized to a particle size of 0.2 μm to 5 cm by using an ultrafine pulverizer.

The pulverized straw is compressed and molded by using a plodder under a compression pressure of 0.5 MPa and a compression temperature of 60° C. to a true density of 0.75 kg/m$^3$.

The compressed straw is pulverized again to a particle size of 80 mesh by using an airflow crusher to obtain straw powder.

100 kg washing oil is mixed uniformly with 100 kg of the straw powder and 3 kg water to carry out grinding pulping for 8 min by using a colloid mill to obtain a first slurry.

Wherein, the catalyst added in the first slurry is an iron-based catalyst with a content of 1 wt % and an average particle size of 10 μm.

Iron-Based Catalyst:

A waste agent resulting from use of a desulfurizer comprising iron oxide as an active component is used as an iron-based catalyst. Every 53 g of the desulfurizer comprises 10 g calcium bicarbonate, 12 g basic cupric carbonate, 18 g γ-Fe$_2$O$_3$, 8 g MnO$_2$, and 5 g NiO.

The waste agent is produced by a desulfurization process with the above desulfurizer, which is described as follows.

1) Exhaust gas produced by fixed bed catalytic hydrogenation of medium-low temperature coal tar is collected.

2) The above mentioned desulfurizer is prepared into particles having a diameter of 1 mm and a length of 15 mm, and filled in a desulfurization tower to form a desulfurization layer.

3) The collected exhaust gas passes through the desulfurization layer at a space velocity of 2000 h$^{-1}$, so that desulfurization reaction takes place when the exhaust gas contact with the desulfurizer in the desulfurization layer at 50° C. to remove hydrogen sulfide in the exhaust gas. After the reaction is completed, a waste agent, i.e. a spent desulfurizer, is collected and cooled to room temperature, i.e. obtaining a waste agent resulting from use of a desulfurizer comprising iron oxide as an active component.

Adding sulfur: The waste agent is tested to determine a molar ratio of iron element to sulfur element comprised therein. If the molar ratio of iron element to sulfur element is less than 1:1, solid sulfur powder is added to the waste agent until the molar ratio of iron element to sulfur element reaches 1:1, thereby ensuring that the molar ratio of iron element to sulfur element in the reaction system is 1:1. However if the molar ratio of iron element to sulfur element is greater than 1:1, excess sulfur is removed by conventional methods such as solvent extraction or heating.

First Conversion Reaction:

A partial of a mixture of CO and H$_2$ (CO accounts for 60% and H$_2$ accounts for 40%) is pressurized to a pressure of 17 MPa and heated to a temperature of 300° C., and then introduced to a pipeline which conveys the first slurry as described above. The remaining of the mixture of CO and H$_2$ is pressurized to a pressure of 17 MPa and heated to a temperature of 450° C., and then injected to a suspended bed reactor through an inlet thereof to contact with the first slurry which has entered the suspended bed reactor, so that first conversion reaction including cracking, carbonylation, shift and hydrogenation reactions takes place under a pressure of 16 MPa and a temperature of 300° C. The first conversion reaction lasts for 30 min, during which a volume ratio of the mixture of CO and H$_2$ to the first slurry is controlled at 2000:1, producing a first conversion product.

Second Conversion Reaction:

H$_2$ is divided into a first part and a second part, and the first part is pressurized to a pressure of 16 MPa and heated to a temperature of 350° C., and then introduced to a pipeline which conveys the first conversion product as described above. The second part of H$_2$ is pressurized to a pressure of 16 MPa and heated to a temperature of 500° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 15 MPa and a temperature of 390° C. The second conversion reaction lasts for 15 min, during which a volume ratio of H$_2$ to the first conversion product is controlled at 2000:1, producing a second oil product.

Embodiment 50

Provided is a two-stage conversion process for biomass, which is described as below.

Preparation of Biomass Slurry:

Red algae is collected and dried to a moisture content of less than 20 wt %, and then pulverized to a particle size of 0.2 μm to 5 cm.

The pulverized red algae is compressed and molded by using a plodder under a compression pressure of 3 MPa and a compression temperature of 40° C. to a true density of 0.95 kg/m$^3$.

The compressed red algae is pulverized again to a particle size of 100 mesh by using an airflow crusher to obtain red algae powder.

40 kg of the red algae powder is mixed with 50 kg waste engine oil and 4 kg water to carry out grinding pulping for 12 min to obtain a first slurry.

Wherein, the catalyst added in the first slurry is an iron-based catalyst with a content of 1 wt % and an average particle size of 10 μm.

Iron-Based Catalyst:

Amorphous FeOOH is used as an iron-based catalyst.

Adding sulfur: Solid sulfur powder is added to the catalyst until the molar ratio of iron element to sulfur element comprised therein is 1:2, thereby ensuring that the molar ratio of iron element to sulfur element in the reaction system is 1:2.

First Conversion Reaction:

A partial of a mixture of CO and H$_2$ (CO accounts for 60% and H$_2$ accounts for 40%) is pressurized to a pressure of 17 MPa and heated to a temperature of 250° C., and then introduced to a pipeline which conveys the first slurry. The remaining of the mixture of CO and H$_2$ is pressurized to a pressure of 17 MPa and heated to a temperature of 550° C., and then injected to a fluidized bed reactor through an inlet thereof to contact with the first slurry which has entered the fluidized bed reactor, so that first conversion reaction including cracking, carbonylation, shift and hydrogenation reactions takes place under a pressure of 16 MPa and a temperature of 380° C. The first conversion reaction lasts for 35 min, during which a volume ratio of the mixture of CO and H$_2$ to the first slurry is controlled at 1000:1, producing a first conversion product.

Second Conversion Reaction:

Firstly, an iron-based catalyst is added to the first conversion product. The iron-based catalyst is amorphous FeOOH and has an amount of 0.5 wt % by mass of the first conversion product.

Then, $H_2$ is pressurized to a pressure of 15.4 MPa and heated to a temperature of 380° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 15 MPa and a temperature of 450° C. The second conversion reaction lasts for 20 min, during which a volume ratio of $H_2$ to the first conversion product is controlled at 1500:1, producing a second oil product.

Embodiment 51

Provided is a two-stage conversion process for biomass, which is described as below.

Preparation of Biomass Slurry:

Wheat straw and peanut straw, having a moisture content of 8-20 wt %, are collected, and then pulverized to a particle size of 0.2 μm to 5 cm by using an ultrafine pulverizer.

The pulverized straw is compressed and molded by using a plodder under a compression pressure of 5 MPa and a compression temperature of 30° C. to a true density of 1.5 kg/m³.

The compressed straw is pulverized again to a particle size of 120 mesh by using an airflow crusher to obtain straw powder.

The above catalyst is mixed with 100 kg anthracene oil, and then mixed with 40 kg of the straw power and 3 kg water to carry out grinding pulping for 20 min by using a colloid mill to obtain a first slurry.

An iron-based catalyst is used as a catalyst, wherein, a regeneration product of a waste agent resulting from use of a desulfurizer comprising iron oxide as an active component is present in the first slurry in a content of 2 wt %, and it has an average particle size of 400 μm.

Iron-Based Catalyst:

A regeneration product of a waste agent resulting from use of a desulfurizer comprising iron oxide as an active component is used as an iron-based catalyst. Every 88 g of the desulfurizer comprises 50 g cubic $Fe_3O_4$, 12 g calcium sulphate dihydrate, 20 g basic zinc carbonate, and 6 g sodium carboxymethylcellulose.

The desulfurizer is used in a desulfurization process for petroleum comprising hydrogen sulfide, which is described as below.

(1) The above mentioned desulfurizer is prepared into particles having a diameter of 1.5 mm, and filled in a desulfurization tower to form a desulfurization layer.

(2) Petroleum comprising hydrogen sulfide is sprayed by a nozzle into the desulfurization layer from the top of the desulfurization tower to carry out desulfurization under spraying. After desulfurization is completed, a spent desulfurizer is produced, which is the waste agent resulting from use of a desulfurizer comprising iron oxide.

The obtained waste agent is subjected to regeneration which is described as below:

1) The waste agent is mixed with water and stirred in a slurry tank to form a second slurry which has a solid content of 12 wt %.

2) Sodium hypochlorite is introduced into the second slurry to carry out a first oxidation reaction at 60° C. and 1 MPa, producing an oxidized slurry.

3) $Na_2S$ is added to the oxidized slurry to carry out a vulcanization reaction at 10° C. and 5 MPa, producing a vulcanized slurry.

4) Hydrogen peroxide is introduced into the vulcanized slurry to carry out a second oxidation reaction at 30° C. and 1.1 MPa to further oxidize and regenerate the slurry.

5) Steps 3) and 4) are repeated once to produce a final slurry wherein the molar ratio of iron to sulfur is 1:1.8.

6) The final slurry is subjected to solid-liquid separation to obtain the regeneration product of the above waste agent.

Adding sulfur: Solid sulfur powder is added to the above regeneration product until the molar ratio of iron element to sulfur element comprised therein is 1:2, thereby ensuring that the molar ratio of iron element to sulfur element in the reaction system is 1:2.

First Conversion Reaction:

Synthesis gas (CO accounts for 20% by volume) is pressurized to a pressure of 8.2 MPa and heated to a temperature of 450° C., and then introduced into a bubbling bed reactor through four injection ports on the bottom and side walls thereof to contact with the first slurry which has entered the bubbling bed reactor to carry out first conversion reaction including cracking, carbonylation, shift and hydrogenation reactions under a pressure of 8 MPa and a temperature of 380° C. The first conversion reaction lasts for 60 min, during which the volume ratio of the synthesis gas to the first slurry is 950:1, producing a first conversion product.

Second Conversion Reaction:

$H_2$ is pressurized directly to a pressure of 18 MPa and heated to a temperature of 500° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 18 MPa and a temperature of 400° C. The second conversion reaction lasts for 30 min, during which a volume ratio of $H_2$ to the first conversion product is controlled at 1000:1, producing a second oil product.

Embodiment 52

Provided is a two-stage conversion process for biomass, which is described as below.

Preparation of Biomass Slurry:

Corn straw having a water content of 5 wt % to 20 wt % is collected, and then pulverized to a particle size of 0.2 μm to 5 cm by using an ultrafine pulverizer.

The pulverized straw is compressed and molded by using a plodder under a compression pressure of 2.5 MPa and a compression temperature of 45° C. to a true density of 1.0 kg/m³.

The compressed straw is pulverized again to a particle size of 100 mesh by using an airflow crusher to obtain straw powder.

The catalyst is mixed with 80 kg waste lubricating oil, 20 kg of the straw powder and 2 kg water to carry out grinding pulping for 15 min by using a colloid mill to obtain a first slurry. Wherein, the catalyst is an iron-based catalyst with a content of 8 wt %.

Iron-Based Catalyst:

A regeneration product of a waste agent resulting from use of a desulfurizer comprising $Fe_{21.333}O_{32}$ as an active component is used as anion-based catalyst. Every 92 g of the desulfurizer comprises 55 g $Fe_{21.333}O_{32}$, 22 g anatase type $TiO_2$, and 15 g bentonite clay.

The desulfurizer comprising $Fe_{21.333}O_{32}$ as an active component is used in a desulfurization process is described as below:

The above desulfurizer is filled into a fixed bed reactor to contact fully with gas-field water containing $H_2S$ under a temperature of 35° C., a pressure of 0.2 MPa, and a volumetric space velocity of 10000 $h^{-1}$ to carry out desulfurization reaction. After the desulfurization reaction is completed, a spent desulfurizer is produced, i.e. obtaining a waste agent resulting from use of a desulfurizer comprising $Fe_{21.333}O_{32}$ as an active component.

The obtained waste agent was regenerated described as below:

1) The waste agent is dispersed in water to form a slurry.

2) The slurry is heated to a temperature of 45° C. under atmospheric pressure. Then hydrogen peroxide is added to the slurry by using a peristaltic pump and air is introduced at a hydrogen peroxide flow rate of 500 mL/min and an air flow rate of 100 mL/min to perform reactions for a period of 5 min under magnetic stirring.

3) After the reaction is completed, the resulted reaction solution is filtered, producing a precipitate which is then washed three times with water and then dried naturally to obtain a regeneration product of the above-mentioned waste agent.

Adding sulfur: Solid sulfur powder is added to the above regeneration product until the molar ratio of iron element to sulfur element reaches 1:4, thereby ensuring that the molar ratio of iron element to sulfur element in the reaction system is 1:4.

Hydrogenation Catalyst:

The hydrogenation catalyst consists of silica loading 5% MoO and 2% CoO based on the total weight of the hydrogenation catalyst, and has a particle size of 500 μm.

First Conversion Reaction:

Synthesis gas is pressurized directly to a pressure of 20 MPa and heated to a temperature of 450° C., and then injected to a slurry bed reactor through an inlet thereof to contact with the first slurry which has entered the slurry bed reactor, so that first conversion reaction including cracking, carbonylation, shift and hydrogenation reactions takes place under a pressure of 20 MPa and a temperature of 380° C. The first conversion reaction lasts for 30 min, during which a volume ratio of the synthesis gas to the first slurry is controlled at 2000:1, producing a first conversion product.

Second Conversion Reaction:

The first conversion product and the above hydrogenation catalyst are prepared into an aqueous slurry, wherein the iron-based catalyst is present in an amount of 5 wt %. $H_2$ is pressurized to a pressure of 16 MPa and heated to a temperature of 410° C., and then injected to a slurry bed reactor through an inlet thereof to contact with the aqueous slurry which has entered the slurry bed reactor, so that first conversion reaction including cracking, carbonylation, shift and hydrogenation reactions takes place under a pressure of 15 MPa and a temperature of 400° C. The second conversion reaction lasts for 25 min, during which a volume ratio of $H_2$ to the aqueous slurry is controlled at 2000:1, producing a second oil product.

Embodiment 53

Provided is a two-stage conversion process for biomass, which is described as below.

Preparation of Biomass Slurry:

100 kg corn straw and cotton straw, having a water content of 5 wt % to 20 wt %, are collected and mixed with a catalyst, and then pulverized to a particle size of 0.2 μm to 5 cm by using an ultrafine pulverizer.

The pulverized material is compressed and molded by using a plodder under a compression pressure of 4 MPa and a compression temperature of 40° C. to a true density of 0.9 $kg/m^3$.

The compressed material is pulverized again to a particle size of 100 mesh by using an airflow crusher to obtain a mixed powder of straw and catalyst.

150 kg rancid oil is mixed with the mixed powder and 2 kg water to carry out grinding pulping for 15 min by using a colloid mill to obtain a first slurry.

The catalyst is an iron-based catalyst, wherein, a regeneration product of a waste agent resulting from use of a desulfurizer comprising iron oxide as an active component is present in the first slurry in a content of 0.3 wt %, and has an average particle size of 20 μm.

Iron-Based Catalyst:

A regeneration product of a waste agent resulting from use of a desulfurizer comprising FeOOH as an active component is used as an iron-based catalyst. Every 68 g of the desulfurizer comprises 30 g α-FeOOH, 20 g amorphous FeOOH, 8 g potassium oxide, and 10 g binding agent kaolin.

The desulfurizer comprising FeOOH as an active component is used in a desulfurization process for a tail gas produced in the hydro-upgrading process of medium-low temperature coal tar in industry described as below.

1) Exhaust gas produced by fixed bed catalytic hydrogenation of medium-low temperature coal tar is collected.

2) The above mentioned desulfurizer is prepared into particles having a diameter of 1 mm and a length of 15 mm, and filled in a desulfurization tower to form a desulfurization layer.

3) The collected exhaust gas passes through the desulfurization layer at a space velocity of 2000 $h^{-1}$, so that desulfurization reaction takes place when the exhaust gas contact with the desulfurizer in the desulfurization layer at 50° C. to remove hydrogen sulfide in the exhaust gas. After the reaction is completed, a waste agent, i.e. a spent desulfurizer, is collected and cooled to room temperature, i.e. obtaining a waste agent resulting from use of a desulfurizer comprising iron oxide as an active component.

The above waste agent was regenerated described as below:

1) The above waste agent is mixed with sodium hydroxide solution and stirred in a slurry tank to form a second slurry which has a pH value of 8.0 and a solid content of 4 wt % by weight.

2) Air is introduced into the second slurry to carry out a first oxidation reaction at 90° C. and 0.1 MPa, producing an oxidized slurry.

3) $H_2S$ is introduced into the oxidized slurry to carry out a vulcanization reaction at 10° C. and 5 MPa, producing a vulcanized slurry.

4) Air is introduced into the vulcanized slurry to carry out a second oxidation reaction at 90° C. and 0.1 MPa to further oxidize and regenerate the slurry.

5) Steps 3) and 4) are repeated once to produce a final slurry wherein the molar ratio of iron to sulfur is 1:2.

6) The final slurry is subjected to solid-liquid separation to obtain the regeneration product of the above waste agent.

7) Adding sulfur: Solid sulfur powder is added to the above regeneration product until the molar ratio of iron element to sulfur element reaches 1:2.5, thereby ensuring that the molar ratio of iron element to sulfur element in the reaction system is 1:2.5.

First Conversion Reaction:

A partial of a mixture of CO and $H_2$ (CO accounts for 80% and $H_2$ accounts for 20%) is pressurized to a pressure of 19.5 MPa and heated to a temperature of 300° C., and then introduced to a pipeline which conveys the first slurry. The remaining of the mixture of CO and $H_2$ is pressurized to a pressure of 19.3 MPa and heated to a temperature of 480° C., and then injected into a slurry bed reactor through three injection ports on the bottom and side walls thereof to contact with the first slurry which has entered the slurry bed reactor, so that first conversion reaction including cracking, carbonylation, shift and hydrogenation reactions takes place under a pressure of 19 MPa and a temperature of 390° C. The first conversion reaction lasts for 20 min, during which a volume ratio of the mixture of CO and $H_2$ to the first slurry is controlled at 800:1, producing a first conversion product.

Second Conversion Reaction:

Firstly, a hydrogenation catalyst is added to the first conversion product. The hydrogenation catalyst consists of zeolite loading 2% MoO, 6% NiO and 3% CoO based on the total weight of the hydrogenation catalyst, and is present in an amount of 2 wt % of the first conversion product.

Then, $H_2$ is divided into a first part and a second part, and the first part is pressurized to a pressure of 20 MPa and heated to a temperature of 380° C., and then introduced to a pipeline which conveys the first conversion product. The second part of $H_2$ is pressurized to a pressure of 20 MPa and heated to a temperature of 480° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 15 MPa and a temperature of 380° C. The second conversion reaction lasts for 30 min, during which a volume ratio of $H_2$ to the first conversion product is controlled at 4000:1, producing a second oil product.

Embodiment 54

Provided is a two-stage conversion process for biomass, which is described as below.

Preparation of Slurry:

100 kg peanut oil residue having a moisture content of 5-15 wt % is collected and mixed with a catalyst, and then pulverized to a particle size of 0.2 µm to 5 cm by using an ultrafine pulverizer.

The pulverized material is compressed and molded by using a plodder under a compression pressure of 2.5 MPa and a compression temperature of 50° C. to a true density of 1.2 kg/m³.

The compressed material is pulverized again to a particle size of 100 mesh by using an airflow crusher to obtain a mixed powder of peanut oil residue and catalyst; 200 kg gutter oil is mixed with the mixed powder and 8 kg water to carry out grinding pulping for 16 min by using a colloid mill to obtain a first slurry.

Wherein, the catalyst is an iron-based catalyst with a content of 0.2 wt % and an average particle size of 2 µm.

Iron-Based Catalyst:

A regeneration product of a waste agent resulting from use of a desulfurizer comprising iron oxide as an active component is used as an iron-based catalyst. Every 80 g of the desulfurizer comprises 12 g $Fe_3O_4$ of cubic crystal, 24 g amorphous $Fe_2O_3$, 39 g amorphous $Fe_2O_3 \cdot H_2O$, and 5 g NiO.

The waste agent is produced by a desulfurization process for removing $H_2S$ from an exhaust gas with the above desulfurizer. In detail, an exhaust gas having a $H_2S$ content of 5500 mg/cm³ is introduced into a desulfurization section at a space velocity of 3000 h⁻¹ to carry out desulfurization reaction at a temperature of 30° C., and then a waste agent is collected in the desulfurization section when the content of $H_2S$ in an outlet gas of the desulfurization section is less than or equal to 0.01 ppm.

The above waste agent resulting from use of a desulfurizer comprising iron oxide as an active component was regenerated described as below:

The above waste agent was regenerated described as below:

1) The waste agent is washed with water, and then ground with water in a wet ball mill to obtain a waste powder of 200 mesh.

2) The waste powder is prepared into an aqueous suspension with a solid mass percentage of 7%, into which compressed air is introduced to carry out the reaction.

3) The aqueous suspension is filtered to obtain solid materials, which are placed in a flotation tank, into which water is added, and then air is introduced, and the precipitate at the lower part of the container is dried to obtain a regeneration product of the above waste agent.

Adding sulfur: Solid sulfur powder is added to the above regeneration product until the molar ratio of iron element to sulfur element comprised therein is 1:0.9, thereby ensuring that the molar ratio of iron element to sulfur element in the reaction system is 1:0.9.

First Conversion Reaction:

A mixture of CO and $H_2$ (CO accounts for 60% and $H_2$ accounts for 40%) is pressurized to a pressure of 20.4 MPa and heated to a temperature of 500° C., and then injected to a slurry bed reactor through three injection ports thereof to contact with the first slurry which has entered the slurry bed reactor, so that first conversion reaction including cracking, carbonylation, shift and hydrogenation reactions takes place under a pressure of 20 MPa and a temperature of 400° C. The first conversion reaction lasts for 30 min, during which a volume ratio of the mixture of CO and $H_2$ to the first slurry is controlled at 650:1, producing a first conversion product.

Second Conversion Reaction:

Firstly, an iron-based catalyst is added to the first conversion product at a dosage of 1.9 wt % of the first conversion product. Then, $H_2$ is pressurized to a pressure of 19 MPa and heated to a temperature of 490° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 18 MPa and a temperature of 400° C. The second conversion reaction lasts for 30 min, during which a volume ratio of $H_2$ to the first conversion product is controlled at 1000:1, producing a second oil product.

Embodiment 55

Provided is a two-stage conversion process for biomass, which is described as below.

Preparation of Slurry:

100 kg peanut oil residue having a moisture content of 5-15 wt % is collected, and then pulverized to a particle size of 0.2 µm to 5 cm by using an ultrafine pulverizer.

The pulverized peanut oil residue is mixed with a catalyst, and then compressed and molded by using a plodder under a compression pressure of 2.5 MPa and a compression temperature of 50° C. to a true density of 1.2 kg/m³.

The compressed material is pulverized again to a particle size of 100 mesh by using an airflow crusher to obtain a mixed powder of peanut oil residue and catalyst.

400 kg gutter oil is mixed with mixed powder and 8 kg water under a negative pressure of 3990 Pa to carry out grinding pulping for 16 min by using a colloid mill to obtain a first slurry.

The catalyst is an iron-based catalyst, wherein, a waste agent resulting from use of a desulfurizer comprising FeOOH as an active component is present in the first slurry in a content of 4 wt %, and has an average particle size of 120 μm.

Iron-Based Catalyst:

A waste agent resulting from use of a desulfurizer comprising FeOOH as an active component is used as an iron-based catalyst. Every 100 g of the desulfurizer comprises 70 g amorphous FeOOH, 25 g $Co_2O_3$, and 5 g NiO.

The desulfurizer comprising FeOOH as an active component is used in a desulfurization process for removing $H_2S$ from exhaust gas, which is described as below. An exhaust gas having a $H_2S$ content of 5500 mg/cm$^3$ is introduced to a desulfurization section at a space velocity of 3000 h$^{-1}$ to carry out desulfurization reaction at 30° C. When the content of $H_2S$ in the outlet gas of the desulfurization section is less than or equal to 0.01 ppm, a waste agent is produced and collected in the desulfurization section, i.e. obtaining the waste agent mentioned above.

Adding sulfur: Solid sulfur powder is added into the waste agent until the molar ratio of iron element to sulfur element is 1:3, thereby ensuring that the molar ratio of iron element to sulfur element in the reaction system is 1:3.

First Conversion Reaction:

A partial of pure CO gas is pressurized to a pressure of 18 MPa and heated to a temperature of 250° C., and then introduced into the first slurry. The remaining of the pure CO gas is pressurized to a pressure of 18 MPa and heated to a temperature of 500° C., and then injected to a slurry bed reactor through four injection ports on the bottom and side walls thereof to contact with the first slurry which has entered the slurry bed reactor, so that first conversion reaction including cracking, carbonylation, shift and hydrogenation reactions takes place under a pressure of 17 MPa, a temperature of 380° C. The first conversion reaction lasts for 20 min, during which the volume ratio of pure CO gas to the first slurry is 950:1, producing a first conversion product.

Second Conversion Reaction:

$H_2$ is pressurized to a pressure of 14 MPa and heated to a temperature of 480° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 20 MPa and a temperature of 390° C. The second conversion reaction lasts for 30 min, during which a volume ratio of $H_2$ to the first conversion product is controlled at 1500:1, producing a second oil product.

Embodiment 56

Provided is a two-stage conversion process for biomass, which is described as below.

Preparation of Slurry:

100 kg red algae is collected and dried to a moisture content of less than 20 wt %, and then pulverized to a particle size of 0.2 μm to 5 cm.

The pulverized red algae is compressed and molded by using a plodder under a compression pressure of 3 MPa and a compression temperature of 40° C. to a true density of 0.95 kg/m$^3$.

The compressed red algae is mixed with a catalyst, and pulverized again to a particle size of 100 mesh by using an airflow crusher to obtain a mixed power of red algae and catalyst.

The pulverized mixed power is mixed with 90 kg waste engine oil and 5 kg water under a negative pressure of 133 Pa to carry out grinding pulping for 12 min to obtain a first slurry.

The catalyst is an iron-based catalyst, wherein, a desulfurizer comprising FeOOH as an active component is present in the first slurry in a content of 8 wt %, and has an average particle size of 300 μm.

Iron-Based Catalyst:

A desulfurizer comprising FeOOH as an active component is used as the iron-based catalyst. Based on the total weight of the desulfurizer, the desulfurizer comprises 60% by weight of amorphous FeOOH, 30% by weight of diatomaceous earth carrier, and 10% by weight of cellulose powder binding agent.

Adding sulfur: Solid sulfur powder is added into the iron-based catalyst until the molar ratio of iron element to sulfur element is 1:4, thereby ensuring that the molar ratio of iron element to sulfur element in the reaction system is 1:4.

First Conversion Reaction:

A mixture of CO and $H_2$ (CO accounts for 50% by volume) is pressurized to a pressure of 18 MPa and heated to a temperature of 380° C., and then injected into a slurry bed reactor from five injection ports on the bottom and side walls thereof to contact with the first slurry which has entered therein to carry out first conversion reaction including cracking, carbonylation, shift and hydrogenation reactions under a pressure of 17 MPa and a temperature of 380° C. The first conversion reaction lasts for 50 min, during which the volume ratio of the mixture of CO and $H_2$ to the first slurry is 900:1, producing a first conversion product.

Second Conversion Reaction:

$H_2$ is pressurized directly to a pressure of 22 MPa and heated to a temperature of 500° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 22 MPa and a temperature of 430° C. The second conversion reaction lasts for 60 min, during which a volume ratio of $H_2$ to the first conversion product is controlled at 4000:1, producing a second oil product.

Embodiment 57

Provided is a two-stage conversion process for biomass, which is described as below.

Preparation of Slurry:

Corn straw having a water content of 5 wt % to 20 wt % is collected, and then pulverized to a particle size of 0.2 μm to 5 cm by using an ultrafine pulverizer.

The pulverized straw is compressed and molded by using a plodder under a compression pressure of 2.5 MPa and a compression temperature of 45° C. to a true density of 1.0 kg/m$^3$.

The compressed straw is pulverized again to a particle size of 100 mesh by using an airflow crusher to obtain straw powder.

80 kg waste lubricating oil is mixed with 100 kg of the straw powder and 8 kg water to carry out grinding pulping for 15 min by using a colloid mill to obtain a first slurry.

Wherein, the catalyst is an iron-based catalyst present in an amount of 10 wt % of the first slurry and having an average particle size of 5 μm.

Iron-Based Catalyst:

A regeneration product of a waste agent resulting from use of a desulfurizer comprising FeOOH is used as the iron-based catalyst. Based on the total weight of the desulfurizer, the desulfurizer comprises 45% by weight of γ-FeOOH, 35% by weight of α-FeOOH, 15% by weight of molecular sieve as carriers, and 5% by weight of sesbania powder as binder.

The desulfurizer is used in a desulfurization process for removing $H_2S$ from exhaust gas, which is described as below. An exhaust gas having a $H_2S$ content of 5500 mg/cm$^3$ is introduced to a desulfurization section at a space velocity of 3000 h$^{-1}$ to carry out desulfurization reaction at 30° C. When the content of $H_2S$ in the outlet gas of the desulfurization section is less than or equal to 0.01 ppm, a waste agent in the desulfurization section is collected.

The obtained waste agent was regenerated described as below: The waste agent is washed with water, and then ground with water in a wet ball mill to obtain a waste powder of 80 mesh. The waste powder is prepared into an aqueous suspension with a solid mass percentage of 8%, into which compressed air is introduced. Sample is taken for testing after reacting for a period of time. When there is no $H_2S$ produced from the reaction between the sample and hydrochloric acid, the iron sulphides in the waste agent have been completely converted into FeOOH and elemental sulfur, producing a slurry comprising FeOOH and elemental sulfur. Filtering the slurry to obtain a solid material, and extracting the solid material with $CCl_4$ for three times, then combining the extracted liquids, and recovering the solvents by distillation to obtain crystalline elemental sulfurs. Mixing the remaining solids separated from the extraction liquids with sesbania powders to obtain a regeneration product of the above-mentioned waste agent, wherein the amount of the binder sesbania powders is 5% by mass of the solids.

Adding carbon disulfides: Adding carbon disulfides into the above regeneration product until the molar ratio of iron element to sulfur element is 1:2, thereby ensuring that the molar ratio of iron element to sulfur element in the reaction system is 1:2.

First Conversion Reaction:

A partial of a mixture of CO and $H_2$ (CO accounts for 60% and $H_2$ accounts for 40%) is pressurized to a pressure of 16.8 MPa and heated to a temperature of 250° C., and then introduced to a pipeline which conveys the first slurry. The remaining of the mixture of CO and $H_2$ is pressurized to a pressure of 16.2 MPa and heated to a temperature of 550° C., and then injected to a fluidized bed reactor through an inlet thereof to contact with the first slurry which has entered the fluidized bed reactor, so that first conversion reaction including cracking, carbonylation, shift and hydrogenation reactions takes place under a pressure of 16 MPa and a temperature of 390° C. The first conversion reaction lasts for 60 min, during which a volume ratio of the mixture of CO and $H_2$ to the first slurry is controlled at 5000:1, producing a first conversion product.

Second Conversion Reaction:

$H_2$ is pressurized directly to a pressure of 19 MPa and heated to a temperature of 410° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 18 MPa and a temperature of 420° C. The second conversion reaction lasts for 30 min, during which a volume ratio of $H_2$ to the first conversion product is controlled at 2600:1, producing a second oil product.

Comparative Example 7

Provided is a comparative co-conversion process for biomass and anthracene oil, which is the same as that of embodiment 51 except that, in this comparative example, wheat straw and peanut straw are used as biomass solid, and the biomass solid has a water content of 80 ppm based on the total amount of the biomass solid; the molar ratio of iron to sulfur in the reaction system is 1:0.1.

Test Example 6

The oil products prepared in the Embodiments 48-57 of the present invention and that of comparative examples 7 are tested and analyzed according to the following methods.

The conversion rate of solid organic material %=(the total mass of solid organic materials in the raw materials−the mass of residual solid organic materials in the reaction product)/the total mass of solid organic material in the raw materials. Wherein, said "solid organic material" in the conversion rate of solid organic material has no water and no ash basis (the same as below).

The yield of oils converted from solid organic material %=the mass of liquid phase oils at normal temperature and pressure in the conversion products of solid organic material/the total feed mass of solid organic material in raw materials.

Hydrogen consumption rate (mol/100 g solid organic slurry)=(moles of hydrogen feed−moles of hydrogen in product gas)/mass of solid organic slurry feed×100%.

Carbon monoxide consumption rate (mol/100 g solid organic slurry)=(molds of carbon monoxide feed−moles of carbon monoxide in the product gas)/mass of solid organic slurry feed×100%.

The corresponding test results are shown in Table 8.

TABLE 8

| | Product distributions after conversion of solid organic materials | | | | | | | |
|---|---|---|---|---|---|---|---|---|
| Conversion results | Conversion rate of solid organic material % | Yield of oils converted from solid organic material % | Carbon content of oils converted from solid organic material wt % | Hydrogen content of oils converted from solid organic material wt % | Oxygen content of oils converted from solid organic material wt % | Calorific value of oils converted from solid organic material (times of the calorific value of standard fuel oil) | Hydrogen consumption rate (mol/100 g) | Carbon monoxide consumption rate (mol/100 g) |
| Embodiment 48 | 99.3 | 51.5 | 85.4 | 12.1 | 1.1 | 0.98 | 0.6 | 0.7 |
| Embodiment 49 | 99.0 | 50.8 | 86.1 | 12.6 | 0.8 | 0.99 | 1.12 | 1.25 |

TABLE 8-continued

Product distributions after conversion of solid organic materials

| Conversion results | Conversion rate of solid organic material % | Yield of oils converted from solid organic material % | Carbon content of oils converted from solid organic material wt % | Hydrogen content of oils converted from solid organic material wt % | Oxygen content of oils converted from solid organic material wt % | Calorific value of oils converted from solid organic material (times of the calorific value of standard fuel oil) | Hydrogen consumption rate (mol/100 g) | Carbon monoxide consumption rate (mol/100 g) |
|---|---|---|---|---|---|---|---|---|
| Embodiment 50 | 99.5 | 52.1 | 85.7 | 12.8 | 0.6 | 0.97 | 0.87 | 0.53 |
| Embodiment 51 | 98.9 | 50.6 | 84.8 | 12.6 | 1.6 | 0.97 | 0.4 | 1.0 |
| Embodiment 52 | 99.2 | 50.8 | 85.7 | 12.0 | 1.4 | 0.96 | 0.28 | 0.47 |
| Embodiment 53 | 99.1 | 53.1 | 86.0 | 12.4 | 0.9 | 0.98 | 1.2 | 1.5 |
| Embodiment 54 | 99.7 | 54.7 | 87.1 | 12.0 | 0.8 | 0.99 | 1.1 | 0.7 |
| Embodiment 55 | 99.4 | 56 | 86.6 | 12.2 | 0.7 | 0.98 | 1.2 | 0.6 |
| Embodiment 56 | 98.8 | 51.9 | 85.8 | 12.2 | 1.3 | 0.97 | 1.1 | 0.8 |
| Embodiment 57 | 98.9 | 52.3 | 86.0 | 11.9 | 1.6 | 0.96 | 1.4 | 0.9 |
| Comparative Embodiment 7 | 90.9 | 42.0 | 82.0 | 10.2 | 7.6 | 0.85 | 0.6 | 0.3 |

Embodiment 58

Provided is a two-stage conversion process for biomass to produce light oil as below.

Preparation of Biomass Slurry:

Corn straw having a water content of 5 wt % to 20 wt % is collected, and then pulverized to a particle size of 0.2 µm to 5 cm by using an ultrafine pulverizer.

The pulverized straw is compressed and molded by using a plodder under a compression pressure of 2.5 MPa and a compression temperature of 45° C. to a true density of 1.0 kg/m$^3$.

The compressed straw is pulverized again to a particle size of 100 mesh by using an airflow crusher to obtain straw powder, then 100 kg of the straw powder is mixed with a catalyst to obtain a mixed powder.

80 kg waste lubricating oil is mixed with the mixed powder and 8 kg water to carry out grinding pulping for 15 min by using a colloid mill to obtain a first slurry.

The catalyst is an iron-based catalyst present in an amount of 5 wt % in the first slurry and having an average particle size of 5 µm.

Iron-Based Catalyst:

A waste agent of a desulfurizer comprising FeOOH as an active component is used as the iron-based catalyst. Every 30 g of the desulfurizer comprises 6 g soluble iron salt Fe(NO$_3$)$_3$·9H$_2$O, 9 g iron salt complexing agent triethanolamine, and 15 g amorphous iron hydroxyl oxide.

The above desulfurizer is used in a desulfurization process for removing H$_2$S from exhaust gas, which is described as below. An exhaust gas having a H$_2$S content of 5500 mg/cm$^3$ is introduced to a desulfurization section at a space velocity of 3000 h$^{-1}$ to carry out desulfurization reaction at 30° C. When the content of H$_2$S in the outlet gas of the desulfurization section is less than 0.01 ppm, a waste agent in the desulfurization section is collected.

Adding sulfur: The waste agent is tested to determine a molar ratio of iron element to sulfur element comprised therein. If the molar ratio of iron element to sulfur element is less than 1:5, solid sulfur powder is added to the waste agent until the molar ratio of iron element to sulfur element reaches 1:5, thereby ensuring that the molar ratio of iron element to sulfur element in the reaction system is 1:5. However if the molar ratio of iron element to sulfur element is greater than 1:5, excess sulfur is removed by conventional methods such as solvent extraction or heating.

First Conversion Reaction:

A partial of a mixture of CO and H$_2$ (CO accounts for 60% and H$_2$ accounts for 40%) is pressurized to a pressure of 21 MPa and heated to a temperature of 350° C., and then introduced to a pipeline which conveys the first slurry. The remaining of the mixture of CO and H$_2$ is pressurized to a pressure of 21 MPa and heated to a temperature of 500° C., and then injected to a slurry bed reactor through an inlet thereof to contact with the first slurry which has entered the slurry bed reactor, so that first conversion reaction including cracking, carbonylation, shift and hydrogenation reactions takes place under a pressure of 20 MPa and a temperature of 360° C. The first conversion reaction lasts for 20 min, during which a volume ratio of the mixture of CO and H$_2$ to the first slurry is controlled at 3000:1, producing a first conversion product.

Second Conversion Reaction:

Firstly, a hydrogenation catalyst is added to the first conversion product. The hydrogenation catalyst consists of aluminium oxide loading 5% MoO based on the total weight of the hydrogenation catalyst, and is present in an amount of 1.5 wt % by mass of the first conversion product.

Then, H$_2$ is divided into a first part and a second part, and the first part is pressurized to a pressure of 21 MPa and heated to a temperature of 350° C., and then introduced to a pipeline which conveys the first conversion product. The second part of H$_2$ is pressurized to a pressure of 21 MPa and heated to a temperature of 500° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 18 MPa and a temperature of 380° C. The second conversion reaction lasts for 30 min, during which a volume ratio of H$_2$ to the first conversion product is controlled at 1000:1, producing a second conversion product.

The second conversion product is subjected to a first separation operation in a hot high pressure separator 8 under a pressure of 19 MPa to produce a light component 9 and a heavy component 10.

The heavy component 10 is subjected to depressurization operation with a high-pressure-difference relief valve 11, and then introduced into a distillation tower 12 to carry out vacuum distillation at a temperature of 360° C. to obtain a light fraction, i.e., a tower top oil 13, and a sideline distillate oil 14. Residues 25 are recycled from the bottom of the distillation tower 12.

The light component 9 is mixed with the tower top oil 13 and introduced to a fixed-bed hydrogenation reactor 16 to carry out a hydrogenation reaction under a temperature of 440° C., a pressure of 26 MPa, a hydrogen-oil volume ratio of 1100 and a space velocity of 1.2/h, producing a fixed-bed hydrogenation product 16.

The fixed-bed hydrogenation product 16 is introduced to a separator 17 to carry out a second separation operation to obtain hydrogen gas 18, a gas-phase light hydrocarbon 19 and a liquid phase, i.e., a distillate oil 20, wherein the hydrogen gas 18 can be used in the second conversion reaction and the hydrogenation reaction, and the gas-phase light hydrocarbon 19 is recycled.

The distillate oil 20 is introduced to a fractionating tower 21 to carry out fractionation operation at a temperature of 360° C. to separate out naphtha from the top of the tower, to separate out diesel from the middle and upper part of the tower, and to discharge a tower bottom oil 24, i.e., a heavy fraction from the bottom of the tower.

Embodiment 59

Provided is a two-stage conversion process for biomass to produce light oil as below.

Preparation of Biomass Slurry:

Wheat straw having a water content of 10 wt % to 20 wt % is collected, and then pulverized to a particle size of 0.2 μm to 5 cm by using an ultrafine pulverizer.

The pulverized straw is compressed and molded by using a plodder under a compression pressure of 0.5 MPa and a compression temperature of 60° C. to a true density of 0.75 kg/m$^3$.

The compressed straw is pulverized again to a particle size of 80 mesh by using an airflow crusher to obtain straw powder.

100 kg washing oil is mixed with 100 kg of the straw powder, a catalyst and 3 kg water to carry out grinding pulping for 8 min by using a colloid mill to obtain a first slurry.

Wherein, the catalyst is an iron-based catalyst present in an amount of 1 wt % of the first slurry and having an average particle size of 10 μm.

Iron-Based Catalyst:

A waste agent resulting from use of a desulfurizer comprising iron oxide as an active component is used the iron-based catalyst. Every 53 g of the desulfurizer comprises 10 g calcium bicarbonate, 12 g basic cupric carbonate, 18 g γ-$Fe_2O_3$, 8 g $MnO_2$, and 5 g NiO.

The waste agent is produced by a desulfurization process with the above desulfurizer, which is described as follows.

1) Exhaust gas produced by fixed bed catalytic hydrogenation of medium-low temperature coal tar is collected.

2) The above mentioned desulfurizer is prepared into particles having a diameter of 1 mm and a length of 15 mm, and filled in a desulfurization tower to form a desulfurization layer.

3) The collected exhaust gas passes through the desulfurization layer at a space velocity of 2000 h$^{-1}$, so that desulfurization reaction takes place when the exhaust gas contact with the desulfurizer in the desulfurization layer at 50° C. to remove hydrogen sulfide in the exhaust gas. After the reaction is completed, a waste agent, i.e. a spent desulfurizer, is collected and cooled to room temperature, i.e. obtaining a waste agent resulting from use of a desulfurizer comprising iron oxide as an active component.

Adding sulfur: The waste agent is tested to determine a molar ratio of iron element to sulfur element comprised therein. If the molar ratio of iron element to sulfur element is less than 1:1, solid sulfur powder is added to the waste agent until the molar ratio of iron element to sulfur element reaches 1:1, thereby ensuring that the molar ratio of iron element to sulfur element in the reaction system is 1:1. However if the molar ratio of iron element to sulfur element is greater than 1:1, excess sulfur is removed by conventional methods such as solvent extraction or heating.

First Conversion Reaction:

A partial of a mixture of CO and $H_2$ (CO accounts for 60% and $H_2$ accounts for 40%) is pressurized to a pressure of 17 MPa and heated to a temperature of 300° C., and then introduced to a pipeline which conveys the first slurry as described above. The remaining of the mixture of CO and $H_2$ is pressurized to a pressure of 17 MPa and heated to a temperature of 450° C., and then injected to a suspended bed reactor through an inlet thereof to contact with the first slurry which has entered the suspended bed reactor, so that first conversion reaction including cracking, carbonylation, shift and hydrogenation reactions takes place under a pressure of 16 MPa and a temperature of 300° C. The first conversion reaction lasts for 30 min, during which a volume ratio of the mixture of CO and $H_2$ to the first slurry is controlled at 2000:1, producing a first conversion product.

Second Conversion Reaction:

$H_2$ is divided into a first part and a second part, and the first part is pressurized to a pressure of 16 MPa and heated to a temperature of 350° C., and then introduced to a pipeline which conveys the first conversion product. The second part of $H_2$ is pressurized to a pressure of 16 MPa and heated to a temperature of 500° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 15 MPa and a temperature of 420° C. The second conversion reaction lasts for 15 min, during which a volume ratio of $H_2$ to the first conversion product is controlled at 2000:1, producing a second conversion product.

The second conversion product is subjected to a first separation operation in a hot high pressure separator 8 under a pressure of 15 MPa to produce a light component 9 and a heavy component 10.

The heavy component 10 is subjected to depressurization operation with a high-pressure-difference relief valve 11, and then introduced into a distillation tower 12 to carry out vacuum distillation at a temperature of 400° C. to obtain a light fraction, i.e., a tower top oil 13, and a sideline distillate oil 14. Residues 25 are recycled from the bottom of the distillation tower 12.

The light component 9 is mixed with the tower top oil 13 and introduced to a fixed-bed hydrogenation reactor 16 to carry out a hydrogenation reaction under a temperature of 400° C., a pressure of 15 MPa, a hydrogen-oil volume ratio of 1500 and a space velocity of 0.3/h, producing a fixed-bed hydrogenation product 16.

The fixed-bed hydrogenation product 16 is introduced to a separator 17 to carry out a second separation operation to obtain hydrogen gas 18, a gas-phase light hydrocarbon 19 and a liquid phase, i.e., a distillate oil 20, wherein the hydrogen gas 18 can be used in the second conversion reaction and the hydrogenation reaction, and the gas-phase light hydrocarbon 19 is recycled.

The distillate oil 20 is introduced to a fractionating tower 21 to carry out fractionation operation at a temperature of 390° C. to separate out naphtha from the top of the tower, to separate out diesel from the middle and upper part of the tower, and to discharge a tower bottom oil 24, i.e., a heavy fraction from the bottom of the tower.

Embodiment 60

Provided is a two-stage conversion process for biomass to produce light oil as below.
Preparation of Biomass Slurry:
Red algae is collected and dried to a moisture content of less than 20 wt %, and then pulverized to a particle size of 0.2 μm to 5 cm.

The pulverized red algae is compressed and molded by using a plodder under a compression pressure of 3 MPa and a compression temperature of 40° C. to a true density of 0.95 kg/m$^3$.

The compressed red algae is pulverized again to a particle size of 100 mesh by using an airflow crusher to obtain red algae powder.

40 kg of the red algae powder is mixed with 50 kg waste engine oil and 5 kg water to carry out grinding pulping for 12 min to obtain a first slurry.

Wherein, the catalyst added in the first slurry is an iron-based catalyst with a content of 1 wt % and an average particle size of 10 μm.

Iron-Based Catalyst:
Amorphous FeOOH is used as the iron-based catalyst.
Adding sulfur: Solid sulfur powder is added to the catalyst until the molar ratio of iron element to sulfur element comprised therein is 1:2, thereby ensuring that the molar ratio of iron element to sulfur element in the reaction system is 1:2.

First Conversion Reaction:
A partial of a mixture of CO and $H_2$ (CO accounts for 60% and $H_2$ accounts for 40%) is pressurized to a pressure of 17 MPa and heated to a temperature of 250° C., and then introduced to a pipeline which conveys the first slurry. The remaining of the mixture of CO and $H_2$ is pressurized to a pressure of 17 MPa and heated to a temperature of 550° C., and then injected to a fluidized bed reactor through an inlet thereof to contact with the first slurry which has entered the fluidized bed reactor, so that first conversion reaction including cracking, carbonylation, shift and hydrogenation reactions takes place under a pressure of 16 MPa and a temperature of 380° C. The first conversion reaction lasts for 35 min, during which a volume ratio of the mixture of CO and $H_2$ to the first slurry is controlled at 1000:1, producing a first conversion product.

Second Conversion Reaction:
Firstly, an iron-based catalyst is added to the first conversion product. The iron-based catalyst is amorphous FeOOH and has an amount of 0.5 wt % of the first conversion product.

Then, $H_2$ is pressurized to a pressure of 15.4 MPa and heated to a temperature of 380° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 15 MPa and a temperature of 450° C. The second conversion reaction lasts for 20 min, during which a volume ratio of $H_2$ to the first conversion product is controlled at 1500:1, producing a second conversion product.

The second conversion product is subjected to a first separation operation in a hot high pressure separator 8 under a pressure of 15 MPa to produce a light component 9 and a heavy component 10.

The heavy component 10 is subjected to depressurization operation with a high-pressure-difference relief valve 11, and then introduced into a distillation tower 12 to carry out vacuum distillation at a temperature of 360° C. to obtain a light fraction, i.e., a tower top oil 13, and a sideline distillate oil 14. Residues 25 is recycled from the bottom of the distillation tower 12.

The light component 9 is mixed with the tower top oil 13 and introduced to a fixed-bed hydrogenation reactor 16 to carry out a hydrogenation reaction under a temperature of 450° C., a pressure of 22 MPa, a hydrogen-oil volume ratio of 1000 and a space velocity of 1.5/h, producing a fixed-bed hydrogenation product 16.

The fixed-bed hydrogenation product 16 is introduced to a separator 17 to carry out a second separation operation to obtain hydrogen gas 18, a gas-phase light hydrocarbon 19 and a liquid phase, i.e., a distillate oil 20, wherein the hydrogen gas 18 can be used in the second conversion reaction and the hydrogenation reaction, and the gas-phase light hydrocarbon 19 is recycled.

The distillate oil 20 is introduced to a fractionating tower 21 to carry out fractionation operation at a temperature of 300° C. to separate out naphtha from the top of the tower, to separate out diesel from the middle and upper part of the tower, and to discharge a tower bottom oil 24, i.e., a heavy fraction from the bottom of the tower.

Embodiment 61

Provided is a two-stage conversion process for biomass to produce light oil as below.
Preparation of Biomass Slurry:
Wheat straw and peanut straw, having a moisture content of 8-20 wt %, are collected, and then pulverized to a particle size of 0.2 μm to 5 cm by using an ultrafine pulverizer.

The pulverized straw is compressed and molded by using a plodder under a compression pressure of 5 MPa and a compression temperature of 30° C. to a true density of 1.5 kg/m$^3$.

The compressed straw is pulverized again to a particle size of 120 mesh by using an airflow crusher to obtain straw powder.

A catalyst is mixed with 70 kg anthracene oil, and then mixed with 100 kg of the straw power and 3 kg water to carry out grinding pulping for 20 min by using a colloid mill to obtain a first slurry.

The catalyst is an iron-based catalyst, wherein, a regeneration product of a waste agent resulting from use of a desulfurizer comprising iron oxide as an active component is present in the first slurry in a content of 2 wt %, and has an average particle size of 400 μm.

Iron-Based Catalyst:
A regeneration product of a waste agent resulting from use of a desulfurizer comprising iron oxide as an active component is used as the iron-based catalyst. Every 88 g of the desulfurizer comprises 50 g cubic $Fe_3O_4$, 12 g calcium sulphate dihydrate, 20 g basic zinc carbonate, and 6 g sodium carboxymethylcellulose.

The desulfurizer is used in a desulfurization process for petroleum comprising hydrogen sulfide, which is described as below.

(1) The above mentioned desulfurizer is prepared into particles having a diameter of 1.5 mm, and filled in a desulfurization tower to form a desulfurization layer.

(2) Petroleum comprising hydrogen sulfide is sprayed by a nozzle into the desulfurization layer from the top of the desulfurization tower to carry out desulfurization under spraying.

After desulfurization is completed, a spent desulfurizer is produced, which is the waste agent resulting from use of a desulfurizer comprising iron oxide.

The obtained waste agent is subjected to regeneration which is described as below:

1) The waste agent is mixed with water and stirred in a slurry tank to form a second slurry which has a solid content of 12% by weight.

2) Sodium hypochlorite is introduced into the second slurry to carry out a first oxidation reaction at 60° C. and 1 MPa, producing an oxidized slurry.

3) $Na_2S$ is added to the oxidized slurry to carry out a vulcanization reaction at 10° C. and 5 MPa, producing a vulcanized slurry.

4) Hydrogen peroxide is introduced into the vulcanized slurry to carry out a second oxidation reaction at 30° C. and 1.1 MPa to further oxidize and regenerate the slurry.

5) Steps 3) and 4) are repeated once to produce a final slurry wherein the molar ratio of iron to sulfur is 1:1.8.

6) The final slurry is subjected to solid-liquid separation to obtain the regeneration product of the above waste agent.

Adding sulfur: Solid sulfur powder is added to the above regeneration product until the molar ratio of iron element to sulfur element comprised therein is 1:2, thereby ensuring that the molar ratio of iron element to sulfur element in the reaction system is 1:2.

First Conversion Reaction:

Synthesis gas (CO accounts for 20% by volume) is pressurized to a pressure of 8.2 MPa and heated to a temperature of 450° C., and then introduced into a bubbling bed reactor through four injection ports on the side walls and bottom thereof to contact with the first slurry which has entered the bubbling bed reactor to carry out first conversion reaction including cracking, carbonylation, shift and hydrogenation reactions under a pressure of 8 MPa and a temperature of 380° C. The first conversion reaction lasts for 60 min, during which the volume ratio of the synthesis gas to the first slurry is 950:1, producing a first conversion product.

Second Conversion Reaction:

$H_2$ is pressurized directly to a pressure of 18 MPa and heated to a temperature of 500° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 18 MPa and a temperature of 400° C. The second conversion reaction lasts for 30 min, during which a volume ratio of $H_2$ to the first conversion product is controlled at 1000:1, producing a second conversion product.

The second conversion product is subjected to a first separation operation in a hot high pressure separator 8 under a pressure of 22 MPa to produce a light component 9 and a heavy component 10.

The heavy component 10 is subjected to depressurization operation with a high-pressure-difference relief valve 11, and then introduced into a distillation tower 12 to carry out vacuum distillation at a temperature of 380° C. to obtain a light fraction, i.e., a tower top oil 13, and a sideline distillate oil 14. Residues 25 are recycled from the bottom of the distillation tower 12.

The light component 9 is mixed with the tower top oil 13 and introduced to a fixed-bed hydrogenation reactor 16 to carry out a hydrogenation reaction under a temperature of 450° C., a pressure of 20 MPa, a hydrogen-oil volume ratio of 1000 and a space velocity of 1.5/h, producing a fixed-bed hydrogenation product 16.

The fixed-bed hydrogenation product 16 is introduced to a separator 17 to carry out a second separation operation to obtain hydrogen gas 18, a gas-phase light hydrocarbon 19 and a liquid phase, i.e., a distillate oil 20, wherein the hydrogen gas 18 can be used in the second conversion reaction and the hydrogenation reaction, and the gas-phase light hydrocarbon 19 is recycled.

The distillate oil 20 is introduced to a fractionating tower 21 to carry out fractionation operation at a temperature of 330° C. to separate out naphtha from the top of the tower, to separate out diesel from the middle and upper part of the tower and to discharge a tower bottom oil 24, i.e., a heavy fraction from the bottom of the tower.

Embodiment 62

Provided is a two-stage conversion process for biomass to produce light oil as below.

Preparation of Biomass Slurry:

Corn straw having a water content of 5 wt % to 20 wt % is collected, and then pulverized to a particle size of 0.2 μm to 5 cm by using an ultrafine pulverizer.

The pulverized straw is compressed and molded by using a plodder under a compression pressure of 2.5 MPa and a compression temperature of 45° C. to a true density of 1.0 kg/m$^3$.

The compressed straw is pulverized again to a particle size of 100 mesh by using an airflow crusher to obtain straw powder.

A catalyst is mixed with 80 kg waste lubricating oil, then mixed with 100 kg of the straw powder and 8 kg water to carry out grinding pulping for 15 min by using a colloid mill to obtain a first slurry. Wherein, the catalyst is an iron-based catalyst with a content of 8 wt %.

Iron-Based Catalyst:

A regeneration product of a waste agent resulting from use of a desulfurizer comprising $Fe_{21.333}O_{32}$ as an active component is used as the iron-based catalyst. Every 92 g of the desulfurizer comprises 55 g $Fe_{21.333}O_{32}$, 22 g anatase type $TiO_2$, and 15 g bentonite clay.

The desulfurizer comprising $Fe_{21.333}O_{32}$ as an active component is used in a desulfurization process is described as below: The desulfurizer is filled into a fixed bed reactor to contact fully with gas-field water containing $H_2S$ under a temperature of 35° C., a pressure of 0.2 MPa, and a volumetric space velocity of 10000 h$^{-1}$ to carry out desulfurization reaction. After the desulfurization reaction is completed, a spent desulfurizer is produced, i.e. obtaining a waste agent resulting from use of a desulfurizer comprising $Fe_{21.333}O_{32}$ as an active component.

The obtained waste agent was regenerated described as below:

1) The waste agent is dispersed in water to form a slurry.

2) The slurry is heated to a temperature of 45° C. under atmospheric pressure. Then hydrogen peroxide is added to the slurry by using a peristaltic pump and air is introduced at a hydrogen peroxide flow rate of 500 mL/min and an air flow rate of 100 mL/min to perform reactions for a period of 5 min under magnetic stirring.

3) After the reaction is completed, the resulted reaction solution is filtered, producing a precipitate which is then washed three times with water and then dried naturally to obtain a regeneration product of the above-mentioned waste agent.

Adding sulfur: Solid sulfur powder is added to the above regeneration product until the molar ratio of iron element to sulfur element reaches 1:4, thereby ensuring that the molar ratio of iron element to sulfur element in the reaction system is 1:4.

Hydrogenation Catalyst:

The hydrogenation catalyst consists of silica loading 5% MoO and 2% CoO based on the total weight of the hydrogenation catalyst, and has a particle size of 500 μm.

First Conversion Reaction:

Synthesis gas is pressurized directly to a pressure of 20 MPa and heated to a temperature of 450° C., and then injected to a slurry bed reactor through an inlet thereof to contact with the first slurry which has entered the slurry bed reactor, so that first conversion reaction including cracking, carbonylation, shift and hydrogenation reactions takes place under a pressure of 20 MPa and a temperature of 380° C. The first conversion reaction lasts for 30 min, during which a volume ratio of the synthesis gas to the first slurry is controlled at 2000:1, producing a first conversion product.

Second Conversion Reaction:

The first conversion product and the above hydrogenation catalyst are prepared into an aqueous slurry, wherein, the iron-based catalyst is present in an amount of 5 wt %. $H_2$ is pressurized to a pressure of 16 MPa and heated to a temperature of 410° C., and then injected to a slurry bed reactor through an inlet thereof to contact with the aqueous slurry which has entered the slurry bed reactor, so that second conversion reaction including cracking, carbonylation, shift and hydrogenation reactions takes place under a pressure of 15 MPa and a temperature of 400° C. The second conversion reaction lasts for 25 min, during which a volume ratio of $H_2$ to the aqueous slurry is controlled at 2000:1, producing a second conversion product.

The second conversion product is subjected to a first separation operation in a hot high pressure separator 8 under a pressure of 21 MPa to produce a light component 9 and a heavy component 10.

The heavy component 10 is subjected to depressurization operation with a high-pressure-difference relief valve 11, and then introduced into a distillation tower 12 to carry out vacuum distillation at a temperature of 330° C. to obtain a light fraction, i.e., a tower top oil 13, and a sideline distillate oil 14. Residues 25 are recycled from the bottom of the distillation tower 12.

The light component 9 is mixed with the tower top oil 13 and introduced to a fixed-bed hydrogenation reactor 16 to carry out a hydrogenation reaction under a temperature of 430° C., a pressure of 20 MPa, a hydrogen-oil volume ratio of 1000 and a space velocity of 0.3/h, producing a fixed-bed hydrogenation product 16.

The fixed-bed hydrogenation product 16 is introduced to a separator 17 to carry out a second separation operation to obtain hydrogen gas 18, a gas-phase light hydrocarbon 19 and a liquid phase, i.e., a distillate oil 20, wherein the hydrogen gas 18 can be used in the second conversion reaction and the hydrogenation reaction, and the gas-phase light hydrocarbon 19 is recycled.

The distillate oil 20 is introduced to a fractionating tower 21 to carry out fractionation operation at a temperature of 280° C. to separate out naphtha from the top of the tower, to separate out diesel from the middle and upper part of the tower and to discharge a tower bottom oil 24, i.e., a heavy fraction from the bottom of the tower.

Embodiment 63

Provided is a two-stage conversion process for biomass to produce light oil as below.

Preparation of Biomass Slurry:

100 kg of corn straw and cotton straw, having a water content of 5 wt % to 20 wt %, are collected, and mixed with a catalyst, then pulverized to a particle size of 0.2 μm to 5 cm by using an ultrafine pulverizer.

The pulverized material is compressed and molded by using a plodder under a compression pressure of 4 MPa and a compression temperature of 40° C. to a true density of 0.9 $kg/m^3$.

The compressed material is pulverized again to a particle size of 100 mesh by using an airflow crusher to obtain a mixed powder of straw and catalyst.

65 kg rancid oil is mixture with the nixed powder and 2 kg water to carry out grinding pulping for 15 min to obtain a first slurry.

The used catalyst is an iron-based catalyst, wherein, a regeneration product of a waste agent resulting from use of a desulfurizer comprising iron oxide as an active component is present in the first slurry in a content of 0.3 wt %, and has an average particle size of 20 μm.

Iron-Based Catalyst:

A regeneration product of a waste agent resulting from use of a desulfurizer comprising FeOOH as an active component is used as the iron-based catalyst. Every 68 g of the desulfurizer comprises 30 g α-FeOOH, 20 g amorphous FeOOH, 8 g potassium oxide, and 10 g binding agent kaolin.

The desulfurizer comprising FeOOH as an active component is used in a desulfurization process for a tail gas produced in the hydro-upgrading process of medium-low temperature coal tar in industry described as below.

1) Exhaust gas produced by fixed bed catalytic hydrogenation of medium-low temperature coal tar is collected.

2) The above mentioned desulfurizer is prepared into particles having a diameter of 1 mm and a length of 15 mm, and filled in a desulfurization tower to form a desulfurization layer.

3) The collected exhaust gas passes through the desulfurization layer at a space velocity of 2000 $h^{-1}$, so that desulfurization reaction takes place when the exhaust gas contact with the desulfurizer in the desulfurization layer at 50° C. to remove hydrogen sulfide in the exhaust gas. After the reaction is completed, a waste agent, i.e. a spent desulfurizer, is collected and cooled to room temperature, i.e. obtaining a waste agent resulting from use of a desulfurizer comprising iron oxide as an active component.

The above waste agent was regenerated described as below:

1) The above waste agent is mixed with sodium hydroxide solution and stirred in a slurry tank to form a second slurry which has a pH value of 8.0 and a solid content of 4 wt %.

2) Air is introduced into the second slurry to carry out a first oxidation reaction at 90° C. and 0.1 MPa, producing an oxidized slurry.

3) $H_2S$ is introduced into the oxidized slurry to carry out a vulcanization reaction at 10° C. and 5 MPa, producing a vulcanized slurry.

4) Air is introduced into the vulcanized slurry to carry out a second oxidation reaction at 90° C. and 0.1 MPa to further oxidize and regenerate the slurry.

5) Steps 3) and 4) are repeated once to produce a final slurry wherein the molar ratio of iron to sulfur is 1:2.

6) The final slurry is subjected to solid-liquid separation to obtain the regeneration product of the above waste agent.

7) Adding sulfur: Solid sulfur powder is added to the above regeneration product until the molar ratio of iron element to sulfur element reaches 1:2.5, thereby ensuring that the molar ratio of iron element to sulfur element in the reaction system is 1:2.5.

First Conversion Reaction:

A partial of a mixture of CO and $H_2$ (CO accounts for 80% and $H_2$ accounts for 20%) is pressurized to a pressure of 19.5 MPa and heated to a temperature of 300° C., and then introduced to a pipeline which conveys the first slurry. The remaining of the mixture of CO and $H_2$ is pressurized to a pressure of 19.3 MPa and heated to a temperature of 480° C., and then injected into a slurry bed reactor through three injection ports on the bottom and side walls thereof to contact with the first slurry which has entered the slurry bed reactor, so that first conversion reaction including cracking, carbonylation, shift and hydrogenation reactions takes place under a pressure of 19 MPa and a temperature of 390° C. The first conversion reaction lasts for 20 min, during which a volume ratio of the mixture of CO and $H_2$ to the first slurry is controlled at 800:1, producing a first conversion product.

Second Conversion Reaction:

Firstly, a hydrogenation catalyst is added to the first conversion product. The hydrogenation catalyst consists of zeolite loading 2% MoO, 6% NiO and 3% CoO based on the total weight of the hydrogenation catalyst, and is present in an amount of 2 wt % of the first conversion product.

Then, $H_2$ is divided into a first part and a second part, and the first part is pressurized to a pressure of 20 MPa and heated to a temperature of 380° C., and then introduced to a pipeline which conveys the first conversion product. The second part of $H_2$ is pressurized to a pressure of 20 MPa and heated to a temperature of 480° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 7 MPa and a temperature of 360° C. The second conversion reaction lasts for 30 min, during which a volume ratio of $H_2$ to the first conversion product is controlled at 4000:1, producing a second conversion product.

The second conversion product is subjected to a first separation operation in a hot high pressure separator 8 under a pressure of 21 MPa to produce a light component 9 and a heavy component 10.

The heavy component 10 is subjected to depressurization operation with a high-pressure-difference relief valve 11, and then introduced into a distillation tower 12 to carry out vacuum distillation at a temperature of 330° C. to obtain a light fraction, i.e., a tower top oil 13, and a sideline distillate oil 14. Residues 25 are recycled from the bottom of the distillation tower 12.

The light component 9 is mixed with the tower top oil 13 and introduced to a fixed-bed hydrogenation reactor 16 to carry out a hydrogenation reaction under a temperature of 450° C., a pressure of 20 MPa, a hydrogen-oil volume ratio of 1000 and a space velocity of 1.5/h, obtaining a fixed-bed hydrogenation product 16.

The fixed-bed hydrogenation product 16 is introduced to a fractionating tower 21 to carry out fractionation operation at a temperature of 280° C. to separate out naphtha from the top of the tower, to separate out diesel from the middle and upper part of the tower and to discharge a tower bottom oil 24, i.e., a heavy fraction from the bottom of the tower.

Embodiment 64

Provided is a two-stage conversion process for biomass to produce light oil as below.

Preparation of Biomass Slurry:

100 kg peanut oil residue having a moisture content of 5-15 wt % is collected and mixed with a catalyst, and then pulverized to a particle size of 0.2 µm to 5 cm by using an ultrafine pulverizer.

The pulverized material is compressed and molded by using a plodder under a compression pressure of 2.5 MPa and a compression temperature of 50° C. to a true density of 1.2 kg/m³.

The compressed material is pulverized again to a particle size of 100 mesh by using an airflow crusher to obtain a mixed powder of peanut oil residue and catalyst; 20 kg gutter oil is mixed with the mixed powder under a negative pressure of 60 torches to obtain a mixture.

The obtained mixture is mixed with 8 kg water firstly, and then mixed with 40 kg gutter oil to carry out grinding pulping for 16 min by using a colloid mill to obtain a first slurry.

Wherein, the catalyst is an iron-based catalyst present in an amount of 0.2 wt % and having an average particle size of 2 µm.

Iron-Based Catalyst:

A regeneration product of a waste agent resulting from use of a desulfurizer comprising iron oxide as an active component is used as the iron-based catalyst. Every 80 g of the desulfurizer comprises 12 g $Fe_3O_4$ of cubic crystal, 24 g amorphous $Fe_2O_3$, 39 g amorphous $Fe_2O_3.H_2O$, and 5 g NiO.

The waste agent is produced by a desulfurization process for removing $H_2S$ from an exhaust gas with the above desulfurizer. In detail, an exhaust gas having a $H_2S$ content of 5500 mg/cm³ is introduced into a desulfurization section at a space velocity of 3000 $h^{-1}$ to carry out desulfurization reaction at a temperature of 30° C., and then a waste agent is collected in the desulfurization section when the content of $H_2S$ in an outlet gas of the desulfurization section is less than or equal to 0.01 ppm.

The above waste agent resulting from use of a desulfurizer comprising iron oxide as an active component was regenerated described as below:

The above waste agent was regenerated described as below:

1) The waste agent is washed with water, and then ground with water in a wet ball mill to obtain a waste powder of 200 mesh.

2) The waste powder is prepared into an aqueous suspension with a solid mass percentage of 7%, into which compressed air is introduced to carry out the reaction.

3) The aqueous suspension is filtered to obtain solid materials, which are placed in a flotation tank, into which water is added, and then air is introduced, and the precipitate at the lower part of the container is dried to obtain a regeneration product of the above waste agent.

Adding sulfur: Solid sulfur powder is added to the above regeneration product until the molar ratio of iron element to sulfur element comprised therein is 1:0.9, thereby ensuring that the molar ratio of iron element to sulfur element in the reaction system is 1:0.9.

First Conversion Reaction:

A mixture of CO and $H_2$ (CO accounts for 60% and $H_2$ accounts for 40%) is pressurized to a pressure of 20.4 MPa and heated to a temperature of 500° C., and then injected to a slurry bed reactor through three injection ports on side walls thereof to contact with the first slurry which has entered the slurry bed reactor, so that first conversion reaction including cracking, carbonylation, shift and hydrogenation reactions takes place under a pressure of 20 MPa and a temperature of 410° C. The first conversion reaction lasts for 30 min, during which a volume ratio of the mixture of CO and $H_2$ to the first slurry is controlled at 650:1, producing a first conversion product.

Second Conversion Reaction:

Firstly, a further amount of the iron-based catalyst is added to the first conversion product at a dosage of 1.9 wt % of the first conversion product.

Then, $H_2$ is pressurized to a pressure of 19 MPa and heated to a temperature of 490° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 18 MPa and a temperature of 440° C. The second conversion reaction lasts for 30 min, during which a volume ratio of $H_2$ to the first conversion product is controlled at 1000:1, producing a second conversion product.

The second conversion product is subjected to a first separation operation in a hot high pressure separator 8 under a pressure of 15 MPa to produce a light component 9 and a heavy component 10.

The heavy component 10 is subjected to depressurization operation with a high-pressure-difference relief valve 11, and then introduced into a distillation tower 12 to carry out vacuum distillation at a temperature of 400° C. to obtain a light fraction, i.e., a tower top oil 13, and a sideline distillate oil 14. Residues 25 are recycled from the bottom of the distillation tower 12.

The light component 9 is mixed with the tower top oil 13 and introduced to a fixed-bed hydrogenation reactor to carry out a hydrogenation reaction under a temperature of 380° C., a pressure of 16 MPa, a hydrogen-oil volume ratio of 1500 and a space velocity of 0.5/h, obtaining a fixed-bed hydrogenation product 16.

The fixed-bed hydrogenation product 16 is introduced to a separator 17 to carry out a second separation operation to obtain hydrogen gas 18, a gas-phase light hydrocarbon 19 and a liquid phase, i.e., a distillate oil 20, wherein the hydrogen gas 18 can be used in the second conversion reaction and the hydrogenation reaction, and the gas-phase light hydrocarbon 19 is recycled.

The distillate oil 20 is introduced to a fractionating tower 21 to carry out fractionation operation at a temperature of 390° C. to separate out naphtha from the top of the tower, to separate out diesel from the middle and upper part of the tower and to discharge a tower bottom oil 24, i.e., a heavy fraction from the bottom of the tower.

Embodiment 65

Provided is a two-stage conversion process for biomass to produce light oil as below.

Preparation of Biomass Slurry:

100 kg peanut oil residue having a moisture content of 5-15 wt % is collected, and then pulverized to a particle size of 0.2 µm to 1 µm by using an ultrafine pulverizer.

The pulverized peanut oil residue is mixed with a catalyst, and then compressed and molded by using a plodder under a compression pressure of 2.5 MPa and a compression temperature of 50° C. to a true density of 1.2 kg/m³.

The compressed material is pulverized again to a particle size of 100 mesh by using an airflow crusher to obtain a mixed powder of peanut oil residue and catalyst.

70 kg gutter oil is mixed with mixed powder and 8 kg water to carry out grinding pulping for 16 min by using a colloid mill to obtain a first slurry.

The used catalyst is an iron-based catalyst, wherein, a waste agent resulting from use of a desulfurizer comprising FeOOH as an active component is present in the first slurry in a content of 4 wt %, and has an average particle size of 120 µm.

Iron-Based Catalyst:

A waste agent resulting from use of a desulfurizer comprising FeOOH as an active component is used as the iron-based catalyst. Every 100 g of desulfurizer comprises 70 g amorphous FeOOH, 25 g $Co_2O_3$, and 5 g NiO.

The desulfurizer comprising FeOOH as an active component is used in a desulfurization process for removing $H_2S$ from exhaust gas, which is described as below. An exhaust gas having a $H_2S$ content of 5500 mg/cm³ is introduced to a desulfurization section at a space velocity of 3000 $h^{-1}$ to carry out desulfurization reaction at 30° C. When the content of $H_2S$ in the outlet gas of the desulfurization section is less than or equal to 0.01 ppm, a waste agent is produced and collected in the desulfurization section, i.e. obtaining the waste agent mentioned above.

Adding sulfur: Solid sulfur powder is added into the waste agent until the molar ratio of iron element to sulfur element is 1:3, thereby ensuring that the molar ratio of iron element to sulfur element in the reaction system is 1:3.

First Conversion Reaction:

A partial of pure CO gas is pressurized to a pressure of 18 MPa and heated to a temperature of 250° C., and then introduced into the first slurry. The remaining of the pure CO gas is pressurized to a pressure of 18 MPa and heated to a temperature of 500° C., and then injected to a slurry bed reactor through four injection ports on the bottom and side walls thereof to contact with the first slurry which has entered the slurry bed reactor, so that first conversion reaction including cracking, carbonylation, shift and hydrogenation reactions takes place under a pressure of 17 MPa and a temperature of 380° C. The first conversion reaction lasts for 20 min, during which the volume ratio of pure CO to the first slurry is 950:1, producing a first conversion product.

Second Conversion Reaction:

$H_2$ is pressurized to a pressure of 14 MPa and heated to a temperature of 480° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 20 MPa and a temperature of 410° C. The second conversion reaction lasts for 30 min, during which a volume ratio of $H_2$ to the first conversion product is controlled at 1500:1, producing a second conversion product.

The second conversion product is subjected to a first separation operation in a hot high pressure separator 8 under a pressure of 15 MPa to produce a light component 9 and a heavy component 10.

The heavy component 10 is subjected to depressurization operation with a high-pressure-difference relief valve 11, and then introduced into a distillation tower 12 to carry out vacuum distillation at a temperature of 400° C. to obtain a light fraction, i.e., a tower top oil 13, and a sideline distillate oil 14. Residues 25 are recycled from the bottom of the distillation tower 12.

The light component 9 is mixed with the tower top oil 13 and introduced to a fixed-bed hydrogenation reactor 16 to carry out a hydrogenation reaction under a temperature of 390° C., a pressure of 21 MPa, a hydrogen-oil volume ratio of 1500 and a space velocity of 0.5/h, obtaining a fixed-bed hydrogenation product 16.

The fixed-bed hydrogenation product 16 is introduced to a separator 17 to carry out a second separation operation to obtain hydrogen gas 18, a gas-phase light hydrocarbon 19 and a liquid phase, i.e., a distillate oil 20, wherein the hydrogen gas 18 can be used in the second conversion reaction and the hydrogenation reaction, and the gas-phase light hydrocarbon 19 is recycled.

The distillate oil 20 is introduced to a fractionating tower 21 to carry out fractionation operation at a temperature of 390° C. to separate out naphtha from the top of the tower, to separate out diesel from the middle and upper part of the tower and to discharge a tower bottom oil 24, i.e., a heavy fraction from the bottom of the tower.

Embodiment 66

Provided is a two-stage conversion process for biomass to produce light oil as below.

Preparation of Biomass Slurry:

100 kg red algae having a moisture content of 70 wt/to 90 wt/is collected and dried to a moisture content of less than 20 wt %, and then pulverized to a particle size of 0.2 μm to 5 cm.

The pulverized red algae is compressed and molded by using a plodder under a compression pressure of 3 MPa and a compression temperature of 40° C. to a true density of 0.95 kg/m$^3$.

The compressed red algae is mixed with a catalyst, and pulverized again to a particle size of 100 mesh by using an airflow crusher to obtain a mixed power of red algae and catalyst.

The pulverized mixed power is mixed with 62 kg waste engine oil and 5 kg water to carry out grinding pulping for 12 min to obtain a first slurry.

The catalyst is an iron-based catalyst, wherein, a desulfurizer comprising FeOOH as an active component is present in the first slurry in a content of 8 wt %, and has an average particle size of 300 μm.

Iron-Based Catalyst:

A desulfurizer comprising FeOOH as an active component is used as the iron-based catalyst. Based on the total weight of the desulfurizer, the desulfurizer comprises 60% by weight of amorphous FeOOH, 30% by weight of diatomaceous earth carrier, and 10% by weight of cellulose powder binding agent.

Adding sulfur: Solid sulfur powder is added into the catalyst until the molar ratio of iron element to sulfur element is 1:4, thereby ensuring that the molar ratio of iron element to sulfur element in the reaction system is 1:4.

First Conversion Reaction:

A mixture of CO and H$_2$ (CO accounts for 50% by volume) is pressurized to a pressure of 18 MPa and heated to a temperature of 380° C., and then injected into a slurry bed reactor from five injection ports on the bottom and side walls thereof to contact with the first slurry which has entered therein to carry out first conversion reaction including cracking, carbonylation, shift and hydrogenation reactions under a pressure of 17 MPa and a temperature of 380° C. The first conversion reaction lasts for 50 min, during which the volume ratio of the mixture of CO and H$_2$ to the first slurry is 900:1, producing a first conversion product.

Second Conversion Reaction:

H$_2$ is pressurized directly to a pressure of 22 MPa and heated to a temperature of 500° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 22 MPa and a temperature of 400° C. The second conversion reaction lasts for 60 min, during which a volume ratio of H$_2$ to the first conversion product is controlled at 4000:1, producing a second conversion product.

The second conversion product is subjected to a first separation operation in a hot high pressure separator 8 under a pressure of 15 MPa to produce a light component 9 and a heavy component 10.

The heavy component 10 is subjected to depressurization operation with a high-pressure-difference relief valve 11, and then introduced into a distillation tower 12 to carry out vacuum distillation at a temperature of 400° C. to obtain a light fraction, i.e., a tower top oil 13, and a sideline distillate oil 14. Residues 25 are recycled from the bottom of the distillation tower 12.

The light component 9 is mixed with the tower top oil 13 and introduced to a fixed-bed hydrogenation reactor 16 to carry out a hydrogenation reaction under a temperature of 440° C., a pressure of 18 MPa, a hydrogen-oil volume ratio of 1500 and a space velocity of 0.5/h, obtaining a fixed-bed hydrogenation product 16.

The fixed-bed hydrogenation product 16 is introduced to a separator 17 to carry out a second separation operation to obtain hydrogen gas 18, a gas-phase light hydrocarbon 19 and a liquid phase, i.e., a distillate oil 20, wherein the hydrogen gas 18 can be used in the second conversion reaction and the hydrogenation reaction, and the gas-phase light hydrocarbon 19 is recycled.

The distillate oil 20 is introduced to a fractionating tower 21 to carry out fractionation operation at a temperature of 390° C. to separate out naphtha from the top of the tower, to separate out diesel from the middle and upper part of the tower and to discharge a tower bottom oil 24, i.e., a heavy fraction from the bottom of the tower.

Embodiment 67

Provided is a two-stage conversion process for biomass to produce light oil as below.

Preparation of Biomass Slurry:

Corn straw having a water content of 5 wt % to 20 wt % by weight is collected, and then pulverized to a particle size of 0.2 μm to 5 cm by using an ultrafine pulverizer.

The pulverized straw is compressed and molded by using a plodder under a compression pressure of 2.5 MPa and a compression temperature of 45° C. to a true density of 1.0 kg/m$^3$.

The compressed straw is pulverized again to a particle size of 100 mesh by using an airflow crusher to obtain straw powder.

30 kg waste lubricating oil is mixed with 100 kg of the straw powder and 8 kg water, and then mixed with further 50 kg waste lubricating oil to carry out grinding pulping for 15 min by using a colloid mill to obtain a first slurry.

Wherein, the catalyst added in the first slurry is an iron-based catalyst present in an amount of 10 wt % and having an average particle size of 5 mm.

Iron-Based Catalyst:

A regeneration product of a waste agent resulting from use of a desulfurizer comprising FeOOH is used as the iron-based catalyst. Based on the total weight of the desulfurizer, the desulfurizer comprises 45% by weight of γ-FeOOH, 35% by weight of α-FeOOH, 15% by weight of molecular sieve as carriers, and 5% by weight of sesbania powder as binder.

The desulfurizer is used in a desulfurization process for removing $H_2S$ from exhaust gas, which is described as below. An exhaust gas having a $H_2S$ content of 5500 mg/cm$^3$ is introduced to a desulfurization section at a space velocity of 3000 h$^{-1}$ to carry out desulfurization reaction at 30° C. When the content of $H_2S$ in the outlet gas of the desulfurization section is less than or equal to 0.01 ppm, a waste agent in the desulfurization section is collected.

The obtained waste agent was regenerated described as below: The waste agent is washed with water, and then ground with water in a wet ball mill to obtain a waste powder of 80 mesh. The waste powder is prepared into an aqueous suspension with a solid mass percentage of 8%, into which compressed air is introduced. Sample is taken for testing after reacting for a period of time. When there is no $H_2S$ produced from the reaction between the sample and hydrochloric acid, the iron sulphides in the waste agent have been completely converted into FeOOH and elemental sulfur, producing a slurry comprising FeOOH and elemental sulfur. Filtering the slurry to obtain a solid material, and extracting the solid material with $CCl_4$ for three times, then combining the extracted liquids, and recovering the solvents by distillation to obtain crystalline elemental sulfurs. Mixing the remaining solids separated from the extraction liquids with sesbania powders to obtain a regeneration product of the above-mentioned waste agent, wherein the amount of the binder sesbania powders is 5% by mass of the solids.

Adding carbon disulfides: Carbon disulfides are added into the above regeneration product until the molar ratio of iron element to sulfur element is 1:2, thereby ensuring that the molar ratio of iron element to sulfur element in the reaction system is 1:2.

First Conversion Reaction:

A partial of a mixture of CO and $H_2$ (CO accounts for 60% and $H_2$ accounts for 40%) is pressurized to a pressure of 16.8 MPa and heated to a temperature of 250° C., and then introduced to a pipeline which conveys the first slurry. The remaining of the mixture of CO and $H_2$ is pressurized to a pressure of 16.2 MPa and heated to a temperature of 550° C., and then injected to a fluidized bed reactor through an inlet thereof to contact with the first slurry which has entered the fluidized bed reactor, so that first conversion reaction including cracking, carbonylation, shift and hydrogenation reactions takes place under a pressure of 16 MPa and a temperature of 390° C. The first conversion reaction lasts for 60 min, during which a volume ratio of the mixture of CO and $H_2$ to the first slurry is controlled at 5000:1, producing a first conversion product.

Second Conversion Reaction:

$H_2$ is pressurized directly to a pressure of 19 MPa and heated to a temperature of 410° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 18 MPa and a temperature of 420° C. The second conversion reaction lasts for 30 min, during which a volume ratio of $H_2$ to the first conversion product is controlled at 2600:1, producing a second conversion product.

The second conversion product is subjected to a first separation operation in a hot high pressure separator 8 under a pressure of 15 MPa to produce a light component 9 and a heavy component 10.

The heavy component 10 is subjected to depressurization operation with a high-pressure-difference relief valve 11, and then introduced into a distillation tower 12 to carry out vacuum distillation at a temperature of 400° C. to obtain a light fraction, i.e., a tower top oil 13, and a sideline distillate oil 14. Residues 25 are recycled from the bottom of the distillation tower 12.

The light component 9 is mixed with the tower top oil 13 and introduced to a fixed-bed hydrogenation reactor 16 to carry out a hydrogenation reaction under a temperature of 450° C., a pressure of 23 MPa, a hydrogen-oil volume ratio of 1500 and a space velocity of 0.5/h, obtaining a fixed-bed hydrogenation product 16.

The fixed-bed hydrogenation product 16 is introduced to a separator 17 to carry out a second separation operation to obtain hydrogen gas 18, a gas-phase light hydrocarbon 19 and a liquid phase, i.e., a distillate oil 20, wherein the hydrogen gas 18 can be used in the second conversion reaction and the hydrogenation reaction, and the gas-phase light hydrocarbon 19 is recycled.

The distillate oil 20 is introduced to a fractionating tower 21 to carry out fractionation operation at a temperature of 390° C. to separate out naphtha from the top of the tower, to separate out diesel from the middle and upper part of the tower and to discharge a tower bottom oil 24, i.e., a heavy fraction from the bottom of the tower.

Embodiment 68

Provided is a two-stage conversion process for biomass to produce light oil as below.

Preparation of Biomass Slurry:

Corn straw having a water content of 5 wt % to 20 wt % is collected, and then pulverized to a particle size of 0.2 μm to 5 cm by using an ultrafine pulverizer.

The pulverized straw is compressed and molded by using a plodder under a compression pressure of 2.5 MPa and a compression temperature of 45° C. to a true density of 1.0 kg/m$^3$.

The compressed straw is pulverized again to a particle size of 100 mesh by using an airflow crusher to obtain straw powder, then 100 kg of the straw powder is mixed with a catalyst to obtain a mixed powder.

80 kg waste lubricating oil is mixed with the mixed powder and 8 kg water to carry out grinding pulping for 15 min by using a colloid mill to obtain a first slurry.

Wherein, the catalyst added in the first slurry is an iron-based catalyst present in an amount of 5 wt % and having an average particle size of 5 μm.

Iron-Based Catalyst:

A waste agent of a desulfurizer comprising FeOOH as an active component is used as the iron-based catalyst. Every 30 g of the desulfurizer comprises 6 g soluble iron salt $Fe(NO_3)_3 \cdot 9H_2O$, 9 g iron salt complexing agent triethanolamine, and 15 g amorphous iron hydroxyl oxide.

The above desulfurizer is used in a desulfurization process for removing $H_2S$ from exhaust gas, which is described as below. An exhaust gas having a $H_2S$ content of 5500 mg/cm$^3$ is introduced to a desulfurization section at a space velocity of 3000 h$^{-1}$ to carry out desulfurization reaction at 30° C. When the content of $H_2S$ in the outlet gas of the desulfurization section is less than or equal to 0.01 ppm, a waste agent in the desulfurization section is collected.

Adding sulfur: The waste agent is tested to determine a molar ratio of iron element to sulfur element comprised therein. If the molar ratio of iron element to sulfur element is less than 1:5, solid sulfur powder is added to the waste agent until the molar ratio of iron element to sulfur element reaches 1:5, thereby ensuring that the molar ratio of iron element to sulfur element in the reaction system is 1:5. However if the molar ratio of iron element to sulfur element is greater than 1:5, excess sulfur is removed by conventional methods such as solvent extraction or heating.

First Conversion Reaction:

A partial of a mixture of CO and $H_2$ (CO accounts for 60% and $H_2$ accounts for 40%) is pressurized to a pressure of 21 MPa and heated to a temperature of 350° C., and then introduced to a pipeline which conveys the first slurry. The remaining of the mixture of CO and $H_2$ is pressurized to a pressure of 21 MPa and heated to a temperature of 500° C., and then injected to a slurry bed reactor through an inlet thereof to contact with the first slurry which has entered the slurry bed reactor, so that first conversion reaction including cracking, carbonylation, shift and hydrogenation reactions takes place under a pressure of 20 MPa and a temperature of 380° C. The first conversion reaction lasts for 20 min, during which a volume ratio of the mixture of CO and $H_2$ to the first slurry is controlled at 3000:1, producing a first conversion product.

Second Conversion Reaction:

Firstly, a hydrogenation catalyst is added to the first conversion product. The hydrogenation catalyst consists of aluminium oxide loading 5% MoO based on the total weight of the hydrogenation catalyst, and is present in an amount of 1.5 wt % by mass of the first conversion product.

Then, $H_2$ is divided into a first part and a second part, and the first part is pressurized to a pressure of 21 MPa and heated to a temperature of 350° C., and then introduced to a pipeline which conveys the first conversion product. The second part of $H_2$ is pressurized to a pressure of 21 MPa and heated to a temperature of 500° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 18 MPa and a temperature of 360° C. The second conversion reaction lasts for 30 min, during which a volume ratio of $H_2$ to the first conversion product is controlled at 1000:1, producing a second conversion product.

The second conversion product is subjected to a first separation operation in a hot high pressure separator 8 under a pressure of 19 MPa to produce a light component 9 and a heavy component 10.

The heavy component 10 is subjected to depressurization operation with a high-pressure-difference relief valve 11, and then introduced into a distillation tower 12 to carry out vacuum distillation at a temperature of 360° C. to obtain a light fraction, i.e., a tower top oil 13, and a sideline distillate oil 14. Residues 25 are recycled from the bottom of the distillation tower 12.

The light component 9 is mixed with the tower top oil 13 and introduced to a fixed-bed hydrogenation reactor 16 to carry out a hydrogenation reaction under a temperature of 430° C., a pressure of 17 MPa, a hydrogen-oil volume ratio of 1100 and a space velocity of 1.2/h, obtaining a fixed-bed hydrogenation product 16.

The fixed-bed hydrogenation product 16 is introduced to a separator 17 to carry out a second separation operation to obtain hydrogen gas 18, a gas-phase light hydrocarbon 19 and a liquid phase, i.e., a distillate oil 20, wherein the hydrogen gas 18 can be used in the second conversion reaction and the hydrogenation reaction, and the gas-phase light hydrocarbon 19 is recycled.

The distillate oil 20 is introduced to a fractionating tower 21 to carry out fractionation operation at a temperature of 360° C. to separate out naphtha from the top of the tower, to separate out diesel from the middle and upper part of the tower and to discharge a tower bottom oil 24, i.e., a heavy fraction from the bottom of the tower.

Embodiment 69

Provided is a two-stage conversion process for biomass to produce light oil as below.

Preparation of Biomass Slurry:

Wheat straw having a water content of 10 wt % to 20 wt % is collected, and then pulverized to a particle size of 0.2 μm to 5 cm by using an ultrafine pulverizer.

The pulverized straw is compressed and molded by using a plodder under a compression pressure of 0.5 MPa and a compression temperature of 60° C. to a true density of 0.75 kg/m$^3$.

The compressed straw is pulverized again to a particle size of 80 mesh by using an airflow crusher to obtain straw powder.

100 kg washing oil is mixed with 100 kg of the straw powder and 3 kg water to carry out grinding pulping for 8 min by using a colloid mill to obtain a first slurry.

Wherein, the catalyst added in the first slurry is an iron-based catalyst present in an amount of 1 wt % and having an average particle size of 10 μm.

Iron-Based Catalyst:

A waste agent resulting from use of a desulfurizer comprising iron oxide as an active component is used as the iron-based catalyst. Every 53 g of the desulfurizer comprises 10 g calcium bicarbonate, 12 g basic cupric carbonate, 18 g γ-$Fe_2O_3$, 8 g $MnO_2$, and 5 g NiO.

The waste agent is produced by a desulfurization process with the above desulfurizer, which is described as follows.

1) Exhaust gas produced by fixed bed catalytic hydrogenation of medium-low temperature coal tar is collected.

2) The above mentioned desulfurizer is prepared into particles having a diameter of 1 mm and a length of 15 mm, and filled in a desulfurization tower to form a desulfurization layer.

3) The collected exhaust gas passes through the desulfurization layer at a space velocity of 2000 h$^{-1}$, so that desulfurization reaction takes place when the exhaust gas contact with the desulfurizer in the desulfurization layer at 50° C. to remove hydrogen sulfide in the exhaust gas. After the reaction is completed, a waste agent, i.e. a spent desulfurizer, is collected and cooled to room temperature, i.e. obtaining a waste agent resulting from use of a desulfurizer comprising iron oxide as an active component.

Adding sulfur: The waste agent is tested to determine a molar ratio of iron element to sulfur element comprised therein. If the molar ratio of iron element to sulfur element is less than 1:1, solid sulfur powder is added to the waste agent until the molar ratio of iron element to sulfur element reaches 1:1, thereby ensuring that the molar ratio of iron element to sulfur element in the reaction system is 1:1. However if the molar ratio of iron element to sulfur element is greater than 1:1, excess sulfur is removed by conventional methods such as solvent extraction or heating.

First Conversion Reaction:

A partial of a mixture of CO and $H_2$ (CO accounts for 60% and $H_2$ accounts for 40%) is pressurized to a pressure of 17 MPa and heated to a temperature of 300° C., and then introduced to a pipeline which conveys the first slurry as described above. The remaining of the mixture of CO and $H_2$ is pressurized to a pressure of 17 MPa and heated to a temperature of 450° C., and then injected to a suspended bed reactor through an inlet thereof to contact with the first slurry which has entered the suspended bed reactor, so that first conversion reaction including cracking, carbonylation, shift and hydrogenation reactions takes place under a pressure of 16 MPa and a temperature of 420° C. The first conversion reaction lasts for 30 min, during which a volume ratio of the mixture of CO and $H_2$ to the first slurry is controlled at 2000:1, producing a first conversion product.

Second Conversion Reaction:

$H_2$ is divided into a first part and a second part, and the first part is pressurized to a pressure of 16 MPa and heated to a temperature of 350° C., and then introduced to a pipeline which conveys the first conversion product. The second part of $H_2$ is pressurized to a pressure of 16 MPa and heated to a temperature of 500° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 15 MPa and a temperature of 300° C. The second conversion reaction lasts for 15 min, during which a volume ratio of $H_2$ to the first conversion product is controlled at 2000:1, producing a second conversion product.

The second conversion product is subjected to a first separation operation in a hot high pressure separator 8 under a pressure of 15 MPa to produce a light component 9 and a heavy component 10.

The heavy component 10 is subjected to depressurization operation with a high-pressure-difference relief valve 11, and then introduced into a distillation tower 12 to carry out vacuum distillation at a temperature of 400° C. to obtain a light fraction, i.e., a tower top oil 13, and a sideline distillate oil 14. Residues 25 are recycled from the bottom of the distillation tower 12.

The light component 9 is mixed with the tower top oil 13 and introduced to a fixed-bed hydrogenation reactor to carry out a hydrogenation reaction under a temperature of 390° C., a pressure of 14 MPa, a hydrogen-oil volume ratio of 1500 and a space velocity of 0.3/h, obtaining a fixed-bed hydrogenation product 16.

The fixed-bed hydrogenation product 16 is introduced to a separator 17 to carry out a second separation operation to obtain hydrogen gas 18, a gas-phase light hydrocarbon 19 and a liquid phase, i.e., a distillate oil 20, wherein the hydrogen gas 18 can be used in the second conversion reaction and the hydrogenation reaction, and the gas-phase light hydrocarbon 19 is recycled.

The distillate oil 20 is introduced to a fractionating tower 21 to carry out fractionation operation at a temperature of 390° C. to separate out naphtha from the top of the tower, to separate out diesel from the middle and upper part of the tower and to discharge a tower bottom oil 24, i.e., a heavy fraction from the bottom of the tower.

Embodiment 70

Provided is a two-stage conversion process for biomass to produce light oil as below.

Preparation of Biomass Slurry:

Red algae is collected and dried to a moisture content of less than 20 wt %, and then pulverized to a particle size of 0.2 μm to 5 cm.

The pulverized red algae is compressed and molded by using a plodder under a compression pressure of 3 MPa and a compression temperature of 40° C. to a true density of 0.95 kg/m$^3$.

The compressed red algae is pulverized again to a particle size of 100 mesh by using an airflow crusher to obtain red algae powder.

100 kg of the pulverized red algae powder is mixed with 65 kg waste engine oil, a catalyst and 5 kg water to carry out grinding pulping for 12 min to obtain a first slurry.

Wherein, the catalyst added in the first slurry is an iron-based catalyst present in an amount of 1 wt % and having an average particle size of 10 μm.

Iron-Based Catalyst:

Amorphous FeOOH is used as the iron-based catalyst.

Adding sulfur: Solid sulfur powder is added to the catalyst until the molar ratio of iron element to sulfur element comprised therein is 1:2, thereby ensuring that the molar ratio of iron element to sulfur element in the reaction system is 1:2.

First Conversion Reaction:

A partial of a mixture of CO and $H_2$ (CO accounts for 60% and $H_2$ accounts for 40%) is pressurized to a pressure of 17 MPa and heated to a temperature of 250° C., and then introduced to a pipeline which conveys the first slurry. The remaining of the mixture of CO and $H_2$ is pressurized to a pressure of 17 MPa and heated to a temperature of 550° C., and then injected to a fluidized bed reactor through an inlet thereof to contact with the first slurry which has entered the fluidized bed reactor, so that first conversion reaction including cracking, carbonylation, shift and hydrogenation reactions takes place under a pressure of 16 MPa and a temperature of 450° C. The first conversion reaction lasts for 35 min, during which a volume ratio of the mixture of CO and $H_2$ to the first slurry is controlled at 1000:1, producing a first conversion product.

Second Conversion Reaction:

Firstly, an iron-based catalyst is added to the first conversion product. The iron-based catalyst is amorphous FeOOH and has an amount of 0.5 wt % of the first conversion product.

Then, $H_2$ is pressurized to a pressure of 15.4 MPa and heated to a temperature of 380° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 15 MPa and a temperature of 380° C. The second conversion reaction lasts for 20 min, during which a volume ratio of $H_2$ to the first conversion product is controlled at 1500:1, producing a second conversion product.

The second conversion product is subjected to a first separation operation in a hot high pressure separator 8 under a pressure of 15 MPa to produce a light component 9 and a heavy component 10.

The heavy component 10 is subjected to depressurization operation with a high-pressure-difference relief valve 11, and then introduced into a distillation tower 12 to carry out vacuum distillation at a temperature of 320° C. to obtain a light fraction, i.e., a tower top oil 13, and a sideline distillate oil 14. Residues 25 are recycled from the bottom of the distillation tower 12.

The light component 9 is mixed with the tower top oil 13 and introduced to a fixed-bed hydrogenation reactor 16 to carry out a hydrogenation reaction under a temperature of 450° C., a pressure of 26 MPa, a hydrogen-oil volume ratio of 1000 and a space velocity of 1.5/h, obtaining a fixed-bed hydrogenation product 16.

The fixed-bed hydrogenation product 16 is introduced to a separator 17 to carry out a second separation operation to obtain hydrogen gas 18, a gas-phase light hydrocarbon 19 and a liquid phase, i.e., a distillate oil 20, wherein the hydrogen gas 18 can be used in the second conversion reaction and the hydrogenation reaction, and the gas-phase light hydrocarbon 19 is recycled.

The distillate oil 20 is introduced to a fractionating tower 21 to carry out fractionation operation at a temperature of 300° C. to separate out naphtha from the top of the tower, to separate out diesel from the middle and upper part of the tower and to discharge a tower bottom oil 24, i.e., a heavy fraction from the bottom of the tower.

Embodiment 71

Provided is a two-stage conversion process for biomass to produce light oil as below.

Preparation of Biomass Slurry:

Wheat straw and peanut straw, having a moisture content of 8-20 wt %, are collected, and then pulverized to a particle size of 0.2 μm to 5 cm by using an ultrafine pulverizer.

The pulverized straw is compressed and molded by using a plodder under a compression pressure of 5 MPa and a compression temperature of 30° C. to a true density of 1.5 kg/m³.

The compressed straw is pulverized again to a particle size of 120 mesh by using an airflow crusher to obtain straw powder.

A catalyst is mixed with 80 kg anthracene oil, and then mixed with 100 kg of the straw power and 3 kg water to carry out grinding pulping for 20 min by using a colloid mill to obtain a first slurry.

The above catalyst is an iron-based catalyst, wherein, a regeneration product of a waste agent resulting from use of a desulfurizer comprising iron oxide as an active component is present in the first slurry in a content of 2 wt %, and has an average particle size of 400 μm.

Iron-Based Catalyst:

A regeneration product of a waste agent resulting from use of a desulfurizer comprising iron oxide as an active component is used as the iron-based catalyst. Every 88 g of the desulfurizer comprises 50 g cubic $Fe_3O_4$, 12 g calcium sulphate dihydrate, 20 g basic zinc carbonate, and 6 g sodium carboxymethylcellulose.

The desulfurizer is used in a desulfurization process for petroleum comprising hydrogen sulfide, which is described as below.

(1) The above mentioned desulfurizer is prepared into particles having a diameter of 1.5 mm, and filled in a desulfurization tower to form a desulfurization layer.

(2) Petroleum comprising hydrogen sulfide is sprayed by a nozzle into the desulfurization layer from the top of the desulfurization tower to carry out desulfurization under spraying. After desulfurization is completed, a spent desulfurizer is produced, which is the waste agent resulting from use of a desulfurizer comprising iron oxide.

The obtained waste agent is subjected to regeneration which is described as below:

1) The waste agent is mixed with water and stirred in a slurry tank to form a second slurry which has a solid content of 12% by weight.

2) Sodium hypochlorite is introduced into the second slurry to carry out a first oxidation reaction at 60° C. and 1 MPa, producing an oxidized slurry.

3) $Na_2S$ is added to the oxidized slurry to carry out a vulcanization reaction at 10° C. and 5 MPa, producing a vulcanized slurry.

4) Hydrogen peroxide is introduced into the vulcanized slurry to carry out a second oxidation reaction at 30° C. and 1.1 MPa to further oxidize and regenerate the slurry.

5) Steps 3) and 4) are repeated once to produce a final slurry wherein the molar ratio of iron to sulfur is 1:1.8.

6) The final slurry is subjected to solid-liquid separation to obtain the regeneration product of the above waste agent.

Adding sulfur: Solid sulfur powder is added to the above regeneration product until the molar ratio of iron element to sulfur element comprised therein is 1:2, thereby ensuring that the molar ratio of iron element to sulfur element in the reaction system is 1:2.

First Conversion Reaction:

Synthesis gas (CO accounts for 20% by volume) is pressurized to a pressure of 8.2 MPa and heated to a temperature of 450° C., and then introduced into a bubbling bed reactor through four injection ports on the bottom and side walls thereof to contact with the first slurry which has entered the bubbling bed reactor to carry out first conversion reaction including cracking, carbonylation, shift and hydrogenation reactions under a pressure of 8 MPa and a temperature of 400° C. The first conversion reaction lasts for 60 min, during which the volume ratio of the synthesis gas to the first slurry is 950:1, producing a first conversion product.

Second Conversion Reaction:

$H_2$ is pressurized directly to a pressure of 18 MPa and heated to a temperature of 500° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 18 MPa and a temperature of 380° C. The second conversion reaction lasts for 30 min, during which a volume ratio of $H_2$ to the first conversion product is controlled at 1000:1, producing a second conversion product.

The second conversion product is subjected to a first separation operation in a hot high pressure separator 8 under a pressure of 22 MPa to produce a light component 9 and a heavy component 10.

The heavy component 10 is subjected to depressurization operation with a high-pressure-difference relief valve 11, and then introduced into a distillation tower 12 to carry out vacuum distillation at a temperature of 380° C. to obtain a light fraction, i.e., a tower top oil 13, and a sideline distillate oil 14. Residues 25 are recycled from the bottom of the distillation tower 12.

The light component 9 is mixed with the tower top oil 13 and introduced to a fixed-bed hydrogenation reactor 16 to carry out a hydrogenation reaction under a temperature of 450° C., a pressure of 26 MPa, a hydrogen-oil volume ratio of 1000 and a space velocity of 1.5/h, obtaining a fixed-bed hydrogenation product 16.

The fixed-bed hydrogenation product 16 is introduced to a separator 17 to carry out a second separation operation to obtain hydrogen gas 18, a gas-phase light hydrocarbon 19 and a liquid phase, i.e., a distillate oil 20, wherein the hydrogen gas 18 can be used in the second conversion reaction and the hydrogenation reaction, and the gas-phase light hydrocarbon 19 is recycled.

The distillate oil 20 is introduced to a fractionating tower 21 to carry out fractionation operation at a temperature of 330° C. to separate out naphtha from the top of the tower, to separate out diesel from the middle and upper part of the tower and to discharge a tower bottom oil 24, i.e., a heavy fraction from the bottom of the tower.

Embodiment 72

Provided is a two-stage conversion process for biomass to produce light oil as below.

Preparation of Biomass Slurry:

Corn straw having a water content of 5 wt % to 20 wt % is collected, and then pulverized to a particle size of 0.2 μm to 5 cm by using an ultrafine pulverizer.

The pulverized straw is compressed and molded by using a plodder under a compression pressure of 2.5 MPa and a compression temperature of 45° C. to a true density of 1.0 kg/m$^3$.

The compressed straw is pulverized again to a particle size of 100 mesh by using an airflow crusher to obtain straw powder.

A catalyst is mixed with 80 kg waste lubricating oil, 100 kg of the straw powder and 8 kg water to carry out grinding pulping for 15 min by using a colloid mill to obtain a first slurry. Wherein, the catalyst is an iron-based catalyst with a content of 8 wt %.

Iron-Based Catalyst:

A regeneration product of a waste agent resulting from use of a desulfurizer comprising $Fe_{21.333}O_{32}$ as an active component is used as the iron-based catalyst. Every 92 g of the desulfurizer comprises 55 g $Fe_{21.333}O_{32}$, 22 g anatase type $TiO_2$, and 15 g bentonite clay.

The desulfurizer comprising $Fe_{21.333}O_{32}$ as an active component is used in a desulfurization process is described as below:

The desulfurizer is filled into a fixed bed reactor to contact fully with gas-field water containing $H_2S$ under a temperature of 35° C., a pressure of 0.2 MPa, and a volumetric space velocity of 10000 h$^{-1}$ to carry out desulfurization reaction. After the desulfurization reaction is completed, a spent desulfurizer is produced, i.e. obtaining a waste agent resulting from use of a desulfurizer comprising $Fe_{21.333}O_{32}$ as an active component.

The obtained waste agent was regenerated described as below:

1) The waste agent is dispersed in water to form a slurry.

2) The slurry is heated to a temperature of 45° C. under atmospheric pressure. Then hydrogen peroxide is added to the slurry by using a peristaltic pump and air is introduced at a hydrogen peroxide flow rate of 500 mL/min and an air flow rate of 100 mL/min to perform reactions for a period of 5 min under magnetic stirring.

3) After the reaction is completed, the resulted reaction solution is filtered, producing a precipitate which is then washed three times with water and then dried naturally to obtain a regeneration product of the above-mentioned waste agent.

Adding sulfur: Solid sulfur powder is added to the regeneration product until the molar ratio of iron element to sulfur element reaches 1:4, thereby ensuring that the molar ratio of iron element to sulfur element in the reaction system is 1:4.

Hydrogenation Catalyst:

The hydrogenation catalyst consists of silica loading 5% MoO and 2% CoO based on the total weight of the hydrogenation catalyst, and has a particle size of 500 μm.

First Conversion Reaction:

Synthesis gas is pressurized directly to a pressure of 20 MPa and heated to a temperature of 450° C., and then injected to a slurry bed reactor through an inlet thereof to contact with the first slurry which has entered the slurry bed reactor, so that first conversion reaction including cracking, carbonylation, shift and hydrogenation reactions takes place under a pressure of 20 MPa and a temperature of 400° C. The first conversion reaction lasts for 30 min, during which a volume ratio of the synthesis gas to the first conversion reaction is controlled at 2000:1, producing a first conversion product.

Second Conversion Reaction:

The first conversion product and the above hydrogenation catalyst are prepared into an aqueous slurry, wherein, the iron-based catalyst is present in an amount of 5 wt %. $H_2$ is pressurized to a pressure of 16 MPa and heated to a temperature of 410° C., and then injected to a slurry bed reactor through an inlet thereof to contact with the aqueous slurry which has entered the slurry bed reactor, so that second conversion reaction including cracking, carbonylation, shift and hydrogenation reactions takes place under a pressure of 15 MPa and a temperature of 380° C. The second conversion reaction lasts for 25 min, during which a volume ratio of $H_2$ to the aqueous slurry is controlled at 2000:1, producing a second conversion product.

The second conversion product is subjected to a first separation operation in a hot high pressure separator 8 under a pressure of 21 MPa to produce a light component 9 and a heavy component 10.

The heavy component 10 is subjected to depressurization operation with a high-pressure-difference relief valve 11, and then introduced into a distillation tower 12 to carry out vacuum distillation at a temperature of 330° C. to obtain a light fraction, i.e., a tower top oil 13, and a sideline distillate oil 14. Residues 25 are recycled from the bottom of the distillation tower 12.

The light component 9 is mixed with the tower top oil 13 and introduced to a fixed-bed hydrogenation reactor to carry out a hydrogenation reaction under a temperature of 430° C., a pressure of 20 MPa, a hydrogen-oil volume ratio of 1000 and a space velocity of 0.3/h, obtaining a fixed-bed hydrogenation product 16.

The fixed-bed hydrogenation product 16 is introduced to a separator 17 to carry out a second separation operation to obtain hydrogen gas 18, a gas-phase light hydrocarbon 19 and a liquid phase, i.e., a distillate oil 20, wherein the hydrogen gas 18 can be used in the second conversion reaction and the hydrogenation reaction, and the gas-phase light hydrocarbon 19 is recycled.

The distillate oil 20 is introduced to a fractionating tower 21 to carry out fractionation operation at a temperature of 280° C. to separate out naphtha from the top of the tower, to separate out diesel from the middle and upper part of the tower and to discharge a tower bottom oil 24, i.e., a heavy fraction from the bottom of the tower.

Embodiment 73

Provided is a two-stage conversion process for biomass to produce light oil as below.

Preparation of Biomass Slurry:

100 kg corn straw and cotton straw, having a water content of 5 wt % to 20 wt %, are collected and mixed with a catalyst, then pulverized to a particle size of 0.2 μm to 5 cm by using an ultrafine pulverizer.

The pulverized material is compressed and molded by using a plodder under a compression pressure of 4 MPa and a compression temperature of 40° C. to a true density of 0.9 kg/m$^3$.

The compressed material is pulverized again to a particle size of 100 mesh by using an airflow crusher to obtain a mixed powder of straw and catalyst.

70 kg rancid oil is mixed with the mixed powder and 2 kg water to carry out grinding pulping for 15 min by using a colloid mill to obtain a first slurry.

The used catalyst is an iron-based catalyst, wherein, a regeneration product of a waste agent resulting from use of a desulfurizer comprising iron oxide as an active component is present in the first slurry in a content of 0.3 wt %, and has an average particle size of 20 μm.

Iron-Based Catalyst:

A regeneration product of a waste agent resulting from use of a desulfurizer comprising FeOOH as an active component is used as the iron-based catalyst. Every 68 g of the desulfurizer comprises 30 g α-FeOOH, 20 g amorphous FeOOH, 8 g potassium oxide, and 10 g binding agent kaolin.

The desulfurizer comprising FeOOH as an active component is used in a desulfurization process for a tail gas produced in the hydro-upgrading process of medium-low temperature coal tar in industry described as below.

1) Exhaust gas produced by fixed bed catalytic hydrogenation of medium-low temperature coal tar is collected.

2) The above mentioned desulfurizer is prepared into particles having a diameter of 1 mm and a length of 15 mm, and filled in a desulfurization tower to form a desulfurization layer.

3) The collected exhaust gas passes through the desulfurization layer at a space velocity of 2000 h$^{-1}$, so that desulfurization reaction takes place when the exhaust gas contact with the desulfurizer in the desulfurization layer at 50° C. to remove hydrogen sulfide in the exhaust gas. After the reaction is completed, a waste agent, i.e. a spent desulfurizer, is collected and cooled to room temperature, i.e. obtaining a waste agent resulting from use of a desulfurizer comprising iron oxide as an active component.

The above waste agent was regenerated described as below:

1) The above waste agent is mixed with sodium hydroxide solution and stirred in a slurry tank to form a second slurry which has a pH value of 8.0 and a solid content of 4 wt %.

2) Air is introduced into the second slurry to carry out a first oxidation reaction at 90° C. and 0.1 MPa, producing an oxidized slurry.

3) H$_2$S is introduced into the oxidized slurry to carry out a vulcanization reaction at 10° C. and 5 MPa, producing a vulcanized slurry.

4) Air is introduced into the vulcanized slurry to carry out a second oxidation reaction at 90° C. and 0.1 MPa to further oxidize and regenerate the slurry.

5) Steps 3) and 4) are repeated once to produce a final slurry wherein the molar ratio of iron to sulfur is 1:2.

6) The final slurry is subjected to solid-liquid separation to obtain the regeneration product of the above waste agent.

7) Adding sulfur: Solid sulfur powder is added to the regeneration product until the molar ratio of iron element to sulfur element reaches 1:2.5, thereby ensuring that the molar ratio of iron element to sulfur element in the reaction system is 1:2.5.

First Conversion Reaction:

A partial of a mixture of CO and H$_2$ (CO accounts for 80% and H$_2$ accounts for 20%) is pressurized to a pressure of 19.5 MPa and heated to a temperature of 300° C., and then introduced to a pipeline which conveys the first slurry. The remaining of the mixture of CO and H$_2$ is pressurized to a pressure of 19.3 MPa and heated to a temperature of 480° C., and then injected into a slurry bed reactor through three injection ports on the bottom and side walls thereof to contact with the first slurry which has entered the slurry bed reactor, so that first conversion reaction including cracking, carbonylation, shift and hydrogenation reactions takes place under a pressure of 19 MPa and a temperature of 460° C. The first conversion reaction lasts for 20 min, during which a volume ratio of the mixture of CO and H$_2$ to the first slurry is controlled at 800:1, producing a first conversion product.

Second Conversion Reaction:

Firstly, a hydrogenation catalyst is added to the first conversion product. The hydrogenation catalyst consists of zeolite loading 2% MoO, 6% NiO and 3% CoO based on the total weight of the hydrogenation catalyst, and is present in an amount of 2 wt % of the first conversion product.

Then, H$_2$ is divided into a first part and a second part, and the first part is pressurized to a pressure of 20 MPa and heated to a temperature of 380° C., and then introduced to a pipeline which conveys the first conversion product. The second part of H$_2$ is pressurized to a pressure of 20 MPa and heated to a temperature of 480° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 15 MPa and a temperature of 390° C. The second conversion reaction lasts for 30 min, during which a volume ratio of H$_2$ to the first conversion product is controlled at 4000:1, producing a second conversion product.

The second conversion product is subjected to a first separation operation in a hot high pressure separator 8 under a pressure of 21 MPa to produce a light component 9 and a heavy component 10.

The heavy component 10 is subjected to depressurization operation with a high-pressure-difference relief valve 11, and then introduced into a distillation tower 12 to carry out vacuum distillation at a temperature of 330° C. to obtain a light fraction, i.e., a tower top oil 13, and a sideline distillate oil 14. Residues 25 are recycled from the bottom of the distillation tower 12.

The light component 9 is mixed with the tower top oil 13 and introduced to a fixed-bed hydrogenation reactor 16 to carry out a hydrogenation reaction under a temperature of 350° C., a pressure of 5 MPa, a hydrogen-oil volume ratio of 1000 and a space velocity of 1.5/h, obtaining a fixed-bed hydrogenation product 16.

The fixed-bed hydrogenation product 16 is introduced to a fractionating tower 21 to carry out fractionation operation at a temperature of 280° C. to separate out naphtha from the top of the tower, to separate out diesel from the middle and upper part of the tower and to discharge a tower bottom oil 24, i.e., a heavy fraction from the bottom of the tower.

Embodiment 74

Provided is a two-stage conversion process for biomass to produce light oil as below.

Preparation of Biomass Slurry:

100 kg peanut oil residue having a moisture content of 5-15 wt % is collected and mixed with a catalyst, and then pulverized to a particle size of 0.2 μm to 5 cm by using an ultrafine pulverizer.

The pulverized material is compressed and molded by using a plodder under a compression pressure of 2.5 MPa and a compression temperature of 50° C. to a true density of 1.2 kg/m$^3$.

The compressed material is pulverized again to a particle size of 100 mesh by using an airflow crusher to obtain a mixed powder of peanut oil residue and catalyst; 60 kg gutter oil is mixed with the mixed powder and 8 kg water to carry out grinding pulping for 16 min by using a colloid mill to obtain a first slurry.

Wherein, the catalyst is an iron-based catalyst present in an amount of 0.2 wt % in the first slurry and has an average particle size of 2 μm.

Iron-Based Catalyst:

A regeneration product of a waste agent resulting from use of a desulfurizer comprising iron oxide as an active component is used as the iron-based catalyst. Every 80 g of the desulfurizer comprises 12 g $Fe_3O_4$ of cubic crystal, 24 g amorphous $Fe_2O_3$, 39 g amorphous $Fe_2O_3.H_2O$, and 5 g NiO.

The waste agent is produced by a desulfurization process for removing $H_2S$ from an exhaust gas with the above desulfurizer. In detail, an exhaust gas having a $H_2S$ content of 5500 mg/cm$^3$ is introduced into a desulfurization section at a space velocity of 3000 h$^{-1}$ to carry out desulfurization reaction at a temperature of 30° C., and then a waste agent is collected in the desulfurization section when the content of $H_2S$ in an outlet gas of the desulfurization section is less than or equal to 0.01 ppm.

The above waste agent resulting from use of a desulfurizer comprising iron oxide as an active component was regenerated described as below:

The above waste agent was regenerated described as below:

1) The waste agent is washed with water, and then ground with water in a wet ball mill to obtain a waste powder of 200 mesh.

2) The waste powder is prepared into an aqueous suspension with a solid mass percentage of 7%, into which compressed air is introduced to carry out the reaction.

3) The aqueous suspension is filtered to obtain solid materials, which are placed in a flotation tank, into which water is added, and then air is introduced, and the precipitate at the lower part of the container is dried to obtain a regeneration product of the above waste agent.

Adding sulfur: Solid sulfur powder is added to the above regeneration product until the molar ratio of iron element to sulfur element comprised therein is 1:0.9, thereby ensuring that the molar ratio of iron element to sulfur element in the reaction system is 1:0.9.

First Conversion Reaction:

A mixture of CO and $H_2$ (CO accounts for 60% and $H_2$ accounts for 40%) is pressurized to a pressure of 20.4 MPa and heated to a temperature of 500° C., and then injected to a slurry bed reactor through three injection ports on the side walls thereof to contact with the first slurry which has entered the slurry bed reactor, so that first conversion reaction including cracking, carbonylation, shift and hydrogenation reactions takes place under a pressure of 20 MPa and a temperature of 440° C. The first conversion reaction lasts for 30 min, during which a volume ratio of the mixture of CO and $H_2$ to the first slurry is controlled at 650:1, producing a first conversion product.

Second Conversion Reaction:

Firstly, a further amount of the iron-based catalyst is added to the first conversion product at a dosage of 1.9 wt % of the first conversion product.

Then, $H_2$ is pressurized to a pressure of 19 MPa and heated to a temperature of 490° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 18 MPa and a temperature of 410° C. The second conversion reaction lasts for 30 min, during which a volume ratio of $H_2$ to the first conversion product is controlled at 1000:1, producing a second conversion product.

The second conversion product is subjected to a first separation operation in a hot high pressure separator 8 under a pressure of 15 MPa to produce a light component 9 and a heavy component 10.

The heavy component 10 is subjected to depressurization operation with a high-pressure-difference relief valve 11, and then introduced into a distillation tower 12 to carry out vacuum distillation at a temperature of 400° C. to obtain a light fraction, i.e., a tower top oil 13, and a sideline distillate oil 14. Residues 25 are recycled from the bottom of the distillation tower 12.

The light component 9 is mixed with the tower top oil 13 and introduced to a fixed-bed hydrogenation reactor 16 to carry out a hydrogenation reaction under a temperature of 380° C., a pressure of 16 MPa, a hydrogen-oil volume ratio of 1500 and a space velocity of 0.5/h, obtaining a fixed-bed hydrogenation product 16.

The fixed-bed hydrogenation product 16 is introduced to a separator 17 to carry out a second separation operation to obtain hydrogen gas 18, a gas-phase light hydrocarbon 19 and a liquid phase, i.e., a distillate oil 20, wherein the hydrogen gas 18 can be used in the second conversion reaction and the hydrogenation reaction, and the gas-phase light hydrocarbon 19 is recycled.

The distillate oil 20 is introduced to a fractionating tower 21 to carry out fractionation operation at a temperature of 390° C. to separate out naphtha from the top of the tower, to separate out diesel from the middle and upper part of the tower and to discharge a tower bottom oil 24, i.e., a heavy fraction from the bottom of the tower.

Embodiment 75

Provided is a two-stage conversion process for biomass to produce light oil as below.

Preparation of Biomass Slurry:

100 kg peanut oil residue having a moisture content of 5-15 wt % is collected, and then pulverized to a particle size of 0.2 μm to 5 cm by using an ultrafine pulverizer.

The pulverized peanut oil residue is mixed with a catalyst, and then compressed and molded by using a plodder under a compression pressure of 2.5 MPa and a compression temperature of 50° C. to a true density of 1.2 kg/m$^3$.

The compressed material is pulverized again to a particle size of 100 mesh by using an airflow crusher to obtain a mixed powder of peanut oil residue and catalyst.

60 kg gutter oil is mixed with the mixed powder and 8 kg water to carry out grinding pulping for 16 min by using a colloid mill to obtain a first slurry.

The catalyst is an iron-based catalyst, wherein, a waste agent resulting from use of a desulfurizer comprising FeOOH as an active component is present in the first slurry in a content of 4 wt %, and has an average particle size of 120 μm.

Iron-Based Catalyst:

A waste agent resulting from use of a desulfurizer comprising FeOOH as an active component is used as the iron-based catalyst. Every 100 g of the desulfurizer comprises 70 g amorphous FeOOH, 25 g $Co_2O_3$, and 5 g NiO.

The desulfurizer comprising FeOOH as an active component is used in a desulfurization process for removing $H_2S$ from exhaust gas, which is described as below. An exhaust gas having a $H_2S$ content of 5500 $mg/cm^3$ is introduced to a desulfurization section at a space velocity of 3000 $h^{-1}$ to carry out desulfurization reaction at 30° C. When the content of $H_2S$ in the outlet gas of the desulfurization section is less than or equal to 0.01 ppm, a waste agent is produced and collected in the desulfurization section, i.e. obtaining the waste agent mentioned above.

Adding sulfur: Solid sulfur powder is added into the waste agent until the molar ratio of iron element to sulfur element is 1:3, thereby ensuring that the molar ratio of iron element to sulfur element in the reaction system is 1:3.

First Conversion Reaction:

A partial of pure CO gas is pressurized to a pressure of 18 MPa and heated to a temperature of 250° C., and then introduced into the first slurry. The remaining of the pure CO gas is pressurized to a pressure of 18 MPa and heated to a temperature of 500° C., and then injected to a slurry bed reactor through four injection ports on the bottom and side walls thereof to contact with the first slurry which has entered the slurry bed reactor, so that first conversion reaction including cracking, carbonylation, shift and hydrogenation reactions takes place under a pressure of 17 MPa, a temperature of 410° C. The first conversion reaction lasts for 20 in, during which the volume ratio of pure CO to the first slurry is 950:1, producing a first conversion product.

Second Conversion Reaction:

$H_2$ is pressurized to a pressure of 14 MPa and heated to a temperature of 480° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 20 MPa and a temperature of 380° C. The second conversion reaction lasts for 30 min, during which a volume ratio of $H_2$ to the first conversion product is controlled at 1500:1, producing a second conversion product.

The second conversion product is subjected to a first separation operation in a hot high pressure separator 8 under a pressure of 15 MPa to produce a light component 9 and a heavy component 10.

The heavy component 10 is subjected to depressurization operation with a high-pressure-difference relief valve 11, and then introduced into a distillation tower 12 to carry out vacuum distillation at a temperature of 400° C. to obtain a light fraction, i.e., a tower top oil 13, and a sideline distillate oil 14. Residues 25 are recycled from the bottom of the distillation tower 12.

The light component 9 is mixed with the tower top oil 13 and introduced to a fixed-bed hydrogenation reactor 16 to carry out a hydrogenation reaction under a temperature of 390° C., a pressure of 18 MPa, a hydrogen-oil volume ratio of 1500 and a space velocity of 0.5/h, obtaining a fixed-bed hydrogenation product 16.

The fixed-bed hydrogenation product 16 is introduced to a separator 17 to carry out a second separation operation to obtain hydrogen gas 18, a gas-phase light hydrocarbon 19 and a liquid phase, i.e., a distillate oil 20, wherein the hydrogen gas 18 can be used in the second conversion reaction and the hydrogenation reaction, and the gas-phase light hydrocarbon 19 is recycled.

The distillate oil 20 is introduced to a fractionating tower 21 to carry out fractionation operation at a temperature of 390° C. to separate out naphtha from the top of the tower, to separate out diesel from the middle and upper part of the tower and to discharge a tower bottom oil 24, i.e., a heavy fraction from the bottom of the tower.

Embodiment 76

Provided is a two-stage conversion process for biomass to produce light oil as below.

Preparation of Slurry:

100 kg red algae having a moisture content of 70 wt % to 90 wt % is collected and dried to a moisture content of less than 20 wt %, and then pulverized to a particle size of 0.2 μm to 5 cm.

The pulverized red algae is compressed and molded by using a plodder under a compression pressure of 3 MPa and a compression temperature of 40° C. to a true density of 0.95 $kg/m^3$.

The compressed red algae is mixed with a catalyst, and pulverized again to a particle size of 100 mesh by using an airflow crusher to obtain a mixed power of red algae and catalyst.

The pulverized mixed power is mixed with 60 kg waste engine oil and 5 kg water to carry out grinding pulping for 12 min to obtain a first slurry.

The catalyst is an iron-based catalyst, wherein, a desulfurizer comprising FeOOH as an active component is present in the first slurry in a content of 8 wt % and has an average particle size of 300 μm.

Iron-Based Catalyst:

A desulfurizer comprising FeOOH as an active component is used as the iron-based catalyst. Based on the total weight of the desulfurizer, the desulfurizer comprises 60% by weight of amorphous FeOOH, 30% by weight of diatomaceous earth carrier, and 10% by weight of cellulose powder binding agent.

Adding sulfur: Solid sulfur powder is added into the desulfurizer until the molar ratio of iron element to sulfur element is 1:4, thereby ensuring that the molar ratio of iron element to sulfur element in the reaction system is 1:4.

First Conversion Reaction:

A mixture of CO and $H_2$ (CO accounts for 50% by volume) is pressurized to a pressure of 18 MPa and heated to a temperature of 380° C., and then injected into a slurry bed reactor from five injection ports on the bottom and side walls thereof to contact with the first slurry which has entered therein to carry out first conversion reaction including cracking, carbonylation, shift and hydrogenation reactions under a pressure of 17 MPa and a temperature of 400° C. The first conversion reaction lasts for 50 min, during which the volume ratio of the mixture of CO and $H_2$ to the first slurry is 900:1, producing a first conversion product.

Second Conversion Reaction:

$H_2$ is pressurized directly to a pressure of 22 MPa and heated to a temperature of 500° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 22 MPa and a temperature of 380° C. The second conversion reaction lasts for 60 min, during which a volume ratio of $H_2$ to the first conversion product is controlled at 4000:1, producing a second conversion product.

The second conversion product is subjected to a first separation operation in a hot high pressure separator 8 under a pressure of 15 MPa to produce a light component 9 and a heavy component 10.

The heavy component 10 is subjected to depressurization operation with a high-pressure-difference relief valve 11, and then introduced into a distillation tower 12 to carry out vacuum distillation at a temperature of 400° C. to obtain a light fraction, i.e., a tower top oil 13, and a sideline distillate oil 14. Residues 25 are recycled from the bottom of the distillation tower 12.

The light component 9 is mixed with the tower top oil 13 and introduced to a fixed-bed hydrogenation reactor 16 to carry out a hydrogenation reaction under a temperature of 440° C., a pressure of 26 MPa, a hydrogen-oil volume ratio of 1500 and a space velocity of 0.5/h, obtaining a fixed-bed hydrogenation product 16.

The fixed-bed hydrogenation product 16 is introduce to a separator 17 to carry out a second separation operation to obtain hydrogen gas 18, a gas-phase light hydrocarbon 19 and a liquid phase, i.e., a distillate oil 20, wherein the hydrogen gas 18 can be used in the second conversion reaction and the hydrogenation reaction, and the gas-phase light hydrocarbon 19 is recycled.

The distillate oil 20 is introduced to a fractionating tower 21 to carry out fractionation operation at a temperature of 390° C. to separate out naphtha from the top of the tower, to separate out diesel from the middle and upper part of the tower and to discharge a tower bottom oil 24, i.e., a heavy fraction from the bottom of the tower.

Embodiment 77

Provided is a two-stage conversion process for biomass to produce light oil as below.

Preparation of Biomass Slurry:

Corn straw having a water content of 5 wt % to 20 wt % is collected, and then pulverized to a particle size of 0.2 μm to 5 cm by using an ultrafine pulverizer.

The pulverized straw is compressed and molded by using a plodder under a compression pressure of 2.5 MPa and a compression temperature of 45° C. to a true density of 1.0 kg/m³.

The compressed straw is pulverized again to a particle size of 100 mesh by using an airflow crusher to obtain straw powder.

80 kg waste lubricating oil is mixed with 100 kg of the straw powder, a catalyst and 8 kg water to carry out grinding pulping for 15 min by using a colloid mill to obtain a first slurry. Wherein, the catalyst added in the first slurry is an iron-based catalyst with a content of 10 wt % and an average particle size of 5 mm.

Iron-Based Catalyst:

A regeneration product of a waste agent resulting from use of a desulfurizer comprising FeOOH is used as the iron-based catalyst. Based on the total weight of the desulfurizer, the desulfurizer comprises 45% by weight of γ-FeOOH, 35% by weight of α-FeOOH, 15% by weight of molecular sieve as carriers, and 5% by weight of sesbania powder as binder.

The desulfurizer is used in a desulfurization process for removing $H_2S$ from exhaust gas, which is described as below. An exhaust gas having a $H_2S$ content of 5500 mg/cm³ is introduced to a desulfurization section at a space velocity of 3000 h$^{-1}$ to carry out desulfurization reaction at 30° C. When the content of $H_2S$ in the outlet gas of the desulfurization section is less than or equal to 0.01 ppm, a waste agent in the desulfurization section is collected.

The obtained waste agent was regenerated described as below: The waste agent is washed with water, and then ground with water in a wet ball mill to obtain a waste powder of 80 mesh. The waste powder is prepared into an aqueous suspension with a solid mass percentage of 8%, into which compressed air is introduced. Sample is taken for testing after reacting for a period of time. When there is no $H_2S$ produced from the reaction between the sample and hydrochloric acid, the iron sulphides in the waste agent have been completely converted into FeOOH and elemental sulfur, producing a slurry comprising FeOOH and elemental sulfur. Filtering the slurry to obtain a solid material, and extracting the solid material with $CCl_4$ for three times, then combining the extracted liquids, and recovering the solvents by distillation to obtain crystalline elemental sulfurs. Mixing the remaining solids separated from the extraction liquids with sesbania powders to obtain a regeneration product of the above-mentioned waste agent, wherein the amount of the binder sesbania powders is 5% by mass of the solids.

Adding carbon disulfides: Adding carbon disulfides into the regeneration product until the molar ratio of iron element to sulfur element is 1:2, thereby ensuring that the molar ratio of iron element to sulfur element in the reaction system is 1:2.

First Conversion Reaction:

A partial of a mixture of CO and $H_2$ (CO accounts for 60% and $H_2$ accounts for 40%) is pressurized to a pressure of 16.8 MPa and heated to a temperature of 250° C., and then introduced to a pipeline which conveys the first slurry. The remaining of the mixture of CO and $H_2$ is pressurized to a pressure of 16.2 MPa and heated to a temperature of 550° C., and then injected to a fluidized bed reactor through an inlet thereof to contact with the first slurry which has entered the fluidized bed reactor, so that first conversion reaction including cracking, carbonylation, shift and hydrogenation reactions takes place under a pressure of 16 MPa and a temperature of 420° C. The first conversion reaction lasts for 60 min, during which a volume ratio of the mixture of CO and $H_2$ to the first slurry is controlled at 5000:1, producing a first conversion product.

Second Conversion Reaction:

$H_2$ is pressurized directly to a pressure of 19 MPa and heated to a temperature of 410° C., and then injected to a slurry bed reactor through an inlet thereof to contact with the first conversion product which has entered the slurry bed reactor, so that second conversion reaction including cracking, carbonylation, shift and hydrogenation reactions takes place under a pressure of 18 MPa and a temperature of 390° C. The second conversion reaction lasts for 30 min, during which a volume ratio of $H_2$ to the first conversion product is controlled at 2600:1, producing a second conversion product.

The second conversion product is subjected to a first separation operation in a hot high pressure separator 8 under a pressure of 15 MPa to produce a light component 9 and a heavy component 10.

The heavy component 10 is subjected to depressurization operation with a high-pressure-difference relief valve 11, and then introduced into a distillation tower 12 to carry out vacuum distillation at a temperature of 400° C. to obtain a light fraction, i.e., a tower top oil 13, and a sideline distillate oil 14. Residues 25 are recycled from the bottom of the distillation tower 12.

The light component 9 is mixed with the tower top oil 13 and introduced to a fixed-bed hydrogenation reactor 16 to carry out a hydrogenation reaction under a temperature of 460° C., a pressure of 26 MPa, a hydrogen-oil volume ratio of 1500 and a space velocity of 0.5/h, obtaining a fixed-bed hydrogenation product 16.

The fixed-bed hydrogenation product 16 is introduced to a separator 17 to carry out a second separation operation to obtain hydrogen gas 18, a gas-phase light hydrocarbon 19 and a liquid phase, i.e., a distillate oil 20, wherein the hydrogen gas 18 can be used in the second conversion reaction and the hydrogenation reaction, and the gas-phase light hydrocarbon 19 is recycled.

The distillate oil 20 is introduced to a fractionating tower 21 to carry out fractionation operation at a temperature of 390° C. to separate out naphtha from the top of the tower, to separate out diesel from the middle and upper part of the tower and to discharge a tower bottom oil 24, i.e., a heavy fraction from the bottom of the tower.

Comparative Example 8

Provided is a comparative co-conversion process for biomass and anthracene oil, which is the same as that of embodiment 61 except that, in this comparative example, wheat straw and peanut straw are used as biomass solid, and the biomass solid has a water content of 80 ppm based on the total amount of the biomass solid, the molar ratio of iron to sulfur in the reaction system is 1:0.1.

Comparative Example 9

Provided is a comparative co-conversion process for biomass and anthracene oil, which is the same as that of embodiment 71 except that, in this comparative example, wheat straw and peanut straw are used as biomass solid, and the biomass solid has a water content of 80 ppm based on the total amount of the biomass; the molar ratio of iron to sulfur in the reaction system is 1:0.1.

Test Example 7

The oil products prepared in the Embodiments 58-77 of the present invention and those of comparative examples 8 and 9 are tested and analyzed according to the following methods.

The conversion rate of solid organic material %=(the total mass of solid organic materials in the raw materials−the mass of residual solid organic materials in the reaction product)/the total mass of solid organic material in the raw materials. Wherein, said "solid organic material" in the conversion rate of solid organic material has no water and no ash basis (the same as below).

The yield of oils converted from solid organic material %=the mass of liquid phase oils at normal temperature and pressure in the conversion products of solid organic material/the total feed mass of solid organic material in raw materials.

Hydrogen consumption rate (mol/100 g solid organic material)=(moles of hydrogen feed−moles of hydrogen in product gas)/mass of solid organic material feed×100%.

Carbon monoxide consumption rate (mol/100 g solid organic material)=(molds of carbon monoxide feed−moles of carbon monoxide in the product gas)/mass of solid organic material feed×100%.

The corresponding test results are shown in Table 9.

TABLE 9

Product distributions after conversion of solid organic materials

| Conversion results | Conversion rate of solid organic material % | Yield of oils converted from solid organic material % | Carbon content of oils converted from solid organic material wt % | Hydrogen content of oils converted from solid organic material wt % | Oxygen content of oils converted from solid organic material wt % | Hydrogen consumption rate (mol/100 g) | Carbon monoxide consumption rate (mol/100 g) |
|---|---|---|---|---|---|---|---|
| Embodiment 58 | 99.3 | 50.6 | 85.7 | 13.4 | 0.1 | 0.9 | 0.7 |
| Embodiment 59 | 99.0 | 49.0 | 86.8 | 13.0 | 0.2 | 1.8 | 1.25 |
| Embodiment 60 | 99.5 | 50.1 | 86.7 | 12.9 | 0.07 | 1.6 | 0.53 |
| Embodiment 61 | 98.9 | 48.8 | 85.0 | 14.6 | 0.3 | 1.0 | 1.0 |
| Embodiment 62 | 99.2 | 47.6 | 86.8 | 12.9 | 0.16 | 1.5 | 1.5 |
| Embodiment 63 | 99.1 | 51.0 | 86.8 | 12.9 | 0.16 | 1.5 | 1.5 |
| Embodiment 64 | 99.7 | 53.2 | 87.1 | 12.8 | 0.09 | 1.6 | 0.7 |
| Embodiment 65 | 99.4 | 53.5 | 87.0 | 12.9 | 0.06 | 1.8 | 0.6 |
| Embodiment 66 | 98.8 | 50.9 | 86.4 | 13.2 | 0.18 | 1.6 | 0.8 |
| Embodiment 67 | 98.9 | 51.1 | 86.8 | 12.9 | 0.13 | 1.8 | 0.9 |
| Embodiment 68 | 99.0 | 50.7 | 86.7 | 12.4 | 0.19 | 0.7 | 0.9 |
| Embodiment 69 | 99.0 | 50.0 | 86.8 | 13.1 | 0.1 | 1.8 | 1.22 |
| Embodiment 70 | 99.2 | 50.1 | 86.3 | 12.9 | 0.08 | 1.5 | 0.50 |
| Embodiment 71 | 98.3 | 48.2 | 85.0 | 14.6 | 0.3 | 1.0 | 1.0 |
| Embodiment 72 | 98.6 | 47.6 | 86.5 | 13.2 | 0.15 | 0.7 | 0.47 |
| Embodiment 73 | 99.4 | 50.0 | 86.6 | 12.9 | 0.16 | 1.5 | 1.1 |
| Embodiment 74 | 99.1 | 53.2 | 87.0 | 12.8 | 0.09 | 1.6 | 0.7 |
| Embodiment 75 | 99.2 | 53.5 | 87.3 | 12.5 | 0.06 | 1.6 | 0.6 |
| Embodiment 76 | 98.9 | 50.4 | 86.3 | 13.2 | 0.18 | 1.4 | 0.8 |
| Embodiment 77 | 99.1 | 50.1 | 86.6 | 12.9 | 0.13 | 1.5 | 0.8 |

TABLE 9-continued

Product distributions after conversion of solid organic materials

| Conversion results | Conversion rate of solid organic material % | Yield of oils converted from solid organic material % | Carbon content of oils converted from solid organic material wt % | Hydrogen content of oils converted from solid organic material wt % | Oxygen content of oils converted from solid organic material wt % | Hydrogen consumption rate (mol/100 g) | Carbon monoxide consumption rate (mol/100 g) |
|---|---|---|---|---|---|---|---|
| Comparative Example 8 | 86.9 | 38.8 | 84.2 | 13.7 | 1.3 | 0.7 | 0.3 |
| Comparative Example 9 | 88.6 | 41.2 | 83.7 | 12.6 | 1.9 | 1.4 | 0.2 |

The light oil products obtained from each embodiment and comparative example are tested, and the results are shown in the following table:

TABLE 10

Distributions of oil fractions in each embodiment and comparative example

| | Distribution of oil fractions (wt %) | | | |
|---|---|---|---|---|
| | <145° C. | 145-360° C. | 360-520° C. | >520° C. |
| Embodiment 58 | 21 | 46 | 30 | 3 |
| Embodiment 59 | 26 | 55 | 18 | 1 |
| Embodiment 60 | 20 | 47 | 29 | 4 |
| Embodiment 61 | 22 | 50 | 27 | 1 |
| Embodiment 62 | 18 | 49 | 31 | 2 |
| Embodiment 63 | 32 | 58 | 9 | 1 |
| Embodiment 64 | 30 | 59 | 9 | 2 |
| Embodiment 65 | 32 | 58 | 9 | 1 |
| Embodiment 66 | 18 | 48 | 32 | 2 |
| Embodiment 67 | 20 | 46 | 31 | 3 |
| Embodiment 68 | 21 | 45 | 32 | 2 |
| Embodiment 69 | 30 | 60 | 9 | 1 |
| Embodiment 70 | 18 | 49 | 31 | 2 |
| Embodiment 71 | 29 | 58 | 11 | 2 |
| Embodiment 72 | 20 | 45 | 34 | 1 |
| Embodiment 73 | 31 | 60 | 8 | 1 |
| Embodiment 74 | 29 | 59 | 10 | 2 |
| Embodiment 75 | 30 | 60 | 9 | 1 |
| Embodiment 76 | 22 | 44 | 32 | 2 |
| Embodiment 77 | 21 | 45 | 33 | 1 |
| Comparative Example 8 | 27 | 37 | 30 | 6 |
| Comparative Example 9 | 30 | 47 | 16 | 7 |

Embodiment 78

Provided is a co-conversion process for biomass and coal, which is described as below.

Catalyst:

A waste agent resulting from use of a desulfurizer comprising iron oxide as an active component is used as a catalyst. The desulfurizer comprises 10 g calcium bicarbonate, 12 g basic cupric carbonate, 18 g $\gamma\text{-}Fe_2O_3$, 5 g $MnO_2$, and 5 g NiO.

The waste agent is produced by a desulfurization process with the above desulfurizer, which is described as follows.

1) Exhaust gas produced by fixed bed catalytic hydrogenation of medium-low temperature coal tar is collected.

2) The above mentioned desulfurizer is prepared into particles having a diameter of 1 mm and a length of 15 mm, and filled in a desulfurization tower to form a desulfurization layer.

3) The collected exhaust gas passes through the desulfurization layer at a space velocity of 2000 $h^{-1}$, so that desulfurization reaction takes place when the exhaust gas contact with the desulfurizer in the desulfurization layer at 50° C. to remove hydrogen sulfide in the exhaust gas. After the reaction is completed, a waste agent, i.e. a spent desulfurizer, is collected and cooled to room temperature, i.e. obtaining a waste agent resulting from use of a desulfurizer comprising iron oxide as an active component.

Adding sulfur: The waste agent is tested to determine a molar ratio of iron element to sulfur element comprised therein. If the molar ratio of iron element to sulfur element is less than 1:1, solid sulfur powder is added to the waste agent until the molar ratio of iron element to sulfur element reaches 1:1, thereby ensuring that the molar ratio of iron element to sulfur element in the reaction system is 1:1. However if the molar ratio of iron element to sulfur element is greater than 1:1, excess sulfur is removed by conventional methods such as solvent extraction or heating.

Preparation of Aqueous Slurry:

(1) Corn straw having a water content of 5 wt % to 20 wt % is collected, and then pulverized to a particle size of 0.2 μm to 5 cm by using an ultrafine pulverizer.

(2) The pulverized straw in step (1) is compressed and molded by using a plodder under a compression pressure of 2.5 MPa and a compression temperature of 45° C. to a true density of 1.0 kg/m$^3$.

(3) The compressed straw in step (2) is pulverized again to a particle size of 0.1-500 μm by using an airflow crusher to obtain straw powder.

(4) Bituminous coal is collected and pulverized to a particle size of 0.1-500 μm to obtain coal powder;

(5) 95 kg of the straw powder is mixed with 5 kg of the coal powder, and then mixed with 80 kg anthracene oil under a negative pressure of 1 KPa to obtain a mixture.

(6) Firstly, the obtained mixture is mixed with 8 kg water to carry out grinding pulping for 15 min by using a colloid mill, and then mixed with the above catalyst uniformly to obtain a first slurry having a water content of 10 wt %, wherein, the catalyst has an average particle size of 10 μmm.

Conversion Reaction:

A partial of a mixture of CO and $H_2$ (CO accounts for 60% and $H_2$ accounts for 40%) is pressurized to a pressure of 22 MPa and heated to a temperature of 350° C., and then introduced to a pipeline which conveys the first slurry. The remaining of the mixture of CO and $H_2$ is pressurized to a pressure of 22 MPa and heated to a temperature of 500° C., and then injected to a slurry bed reactor through an inlet thereof to contact with the first slurry which has entered the slurry bed reactor, so that first conversion reaction including cracking, carbonylation, shift and hydrogenation reactions takes place under a pressure of 22 MPa and a temperature of 450° C. The first conversion reaction lasts for 60 min, during which a volume ratio of the mixture of CO and $H_2$ to the first slurry is controlled at 3000:1, producing an oil product.

Embodiment 79

Provided is a co-conversion process for biomass and coal, which is described as below.
Catalyst:
Amorphous FeOOH is used as a catalyst.
Adding sulfur: Solid sulfur powder is added to the above catalyst until the molar ratio of iron element to sulfur element reaches 1:2, thereby ensuring that the molar ratio of iron element to sulfur element in the reaction system is 1:2.
Preparation of Aqueous Slurry:
(1) Corn straw having a water content of 5 wt % to 20 wt % is collected, and then pulverized to a particle size of 0.2 μm to 5 cm by using an ultrafine pulverizer.
(2) The pulverized straw in step (1) is compressed and molded by using a plodder under a compression pressure of 2.5 MPa and a compression temperature of 45° C. to a true density of 1.0 kg/m³.
(3) The compressed straw in step (2) is pulverized again to a particle size of 0.1-500 μm by using an airflow crusher to obtain straw powder.
(4) Lean coal is collected and pulverized to a particle size of 0.1-500 μm to obtain coal powder;
(5) 50 kg of the straw powder is mixed with 50 kg of the coal powder, and then mixed with 30 kg waste lubricating oil under a negative pressure of 70 KPa to obtain a mixture.
(6) Firstly, the obtained mixture of step (5) is mixed with 8 kg water, and then mixed with further 50 kg waste lubricating oil to carry out grinding pulping for 15 min by using a colloid mill, then mixed with 6 kg of the above catalyst uniformly to obtain a first slurry having a water content of 4 wt %, wherein, the catalyst has an average particle size of 10 μm.
Conversion Reaction:
A partial of a mixture of CO and $H_2$ (CO accounts for 60% and $H_2$ accounts for 40%) is pressurized to a pressure of 19 MPa and heated to a temperature of 400° C., and then introduced to a pipeline which conveys the first slurry as described above. The remaining of the mixture of CO and $H_2$ is pressurized to a pressure of 19 MPa and heated to a temperature of 520° C., and then injected to a suspended bed reactor through an inlet thereof to contact with the first slurry which has entered the suspended bed reactor, so that conversion reaction including cracking, carbonylation, shift and hydrogenation reactions takes place under a pressure of 18 MPa and a temperature of 430° C. The conversion reaction lasts for 30 min, during which a volume ratio of the mixture of CO and $H_2$ to the first slurry is controlled at 2000:1, producing an oil product.

Embodiment 80

Provided is a co-conversion process for biomass and coal, which is described as below.
Catalyst:
A regeneration product of a waste agent resulting from use of a desulfurizer comprising FeOOH as an active component is used as a catalyst. The desulfurizer comprises 30 g α-FeOOH, 20 g amorphous FeOOH, 8 g potassium oxide, and 10 g binding agent kaolin.
The desulfurizer comprising FeOOH as an active component is used in a desulfurization process for a tail gas produced in the hydro-upgrading process of medium-low temperature coal tar in industry described as below.
1) Exhaust gas produced by fixed bed catalytic hydrogenation of medium-low temperature coal tar is collected.
2) The above mentioned desulfurizer is prepared into particles having a diameter of 1 mm and a length of 15 mm, and filled in a desulfurization tower to form a desulfurization layer.
3) The collected exhaust gas passes through the desulfurization layer at a space velocity of 2000 $h^{-1}$, so that desulfurization reaction takes place when the exhaust gas contact with the desulfurizer in the desulfurization layer at 50° C. to remove hydrogen sulfide in the exhaust gas. After the reaction is completed, a waste agent, i.e. a spent desulfurizer, is collected and cooled to room temperature, i.e. obtaining a waste agent resulting from use of a desulfurizer comprising iron oxide as an active component.
The above waste agent was regenerated described as below:
1) The waste agent is mixed with sodium hydroxide solution and stirred in a slurry tank to form a second slurry which has a pH value of 8.0 and a solid content of 4 wt %.
2) Air is introduced into the second slurry to carry out a first oxidation reaction at 90° C. and 0.1 MPa, producing an oxidized slurry.
3) $H_2S$ is introduced into the oxidized slurry to carry out a vulcanization reaction at 10° C. and 5 MPa, producing a vulcanized slurry.
4) Air is introduced into the vulcanized slurry to carry out a second oxidation reaction at 90° C. and 0.1 MPa to further oxidize and regenerate the slurry.
5) Steps 3) and 4) are repeated once to produce a final slurry wherein the molar ratio of iron to sulfur is 1:2.
6) The final slurry is subjected to solid-liquid separation to obtain the regeneration product of the above waste agent.
Preparation of Aqueous Slurry:
(1) Red algae having a moisture content of 70 wt % to 90 wt % is collected, and dried to a moisture content of less than 20 wt %, and then pulverized to a particle size of 0.2 cm to 5 cm.
(2) The pulverized red algae in step (1) is compressed and molded by using a plodder under a compression pressure of 3 MPa and a compression temperature of 40° C. to a true density of 0.95 kg/m³.
(3) The compressed red algae in step (2) is pulverized again to a particle size of 0.1-500 μm by using an airflow crusher to obtain red algae powder, and 56 kg of the red algae powder is mixed with 1 kg catalyst to obtain a mixed powder of red algae.
(4) Long flame coal is collected and pulverized to a particle size of 0.1-500 m to obtain coal powder.
(5) The mixed powder of red algae is mixed with 4 kg of the coal powder, and then mixed with 10 kg waste engine oil under a negative pressure of 50 KPa to obtain a mixture.
(6) Firstly, the obtained mixture of step (5) is mixed with 5 kg water, and then mixed with further 40 kg waste lubricating oil to carry out grinding pulping for 12 min by using a colloid mill to obtain a first slurry having a water content of 15 wt %.
Adding sulfur: Solid sulfur powder is added to the regeneration product until the molar ratio of iron element to sulfur element reaches 1:2.5, thereby ensuring that the molar ratio of iron element to sulfur element in the reaction system is 1:2.5.
Conversion Reaction:
A partial of a mixture of CO and $H_2$ (CO accounts for 60% and $H_2$ accounts for 40%) is pressurized to a pressure of 17

MPa and heated to a temperature of 250° C., and then introduced to a pipeline which conveys the first slurry. The remaining of the mixture of CO and $H_2$ is pressurized to a pressure of 17 MPa and heated to a temperature of 550° C., and then injected to a fluidized bed reactor through an inlet thereof to contact with the first slurry which has entered the fluidized bed reactor, so that conversion reaction including cracking, carbonylation, shift and hydrogenation reactions takes place under a pressure of 16 MPa and a temperature of 420° C. The conversion reaction lasts for 40 min, during which a volume ratio of the mixture of CO and $H_2$ to the first slurry is controlled at 1000:1, producing an oil product.

Embodiment 81

Provided is a co-conversion process for biomass and coal, which is described as below.
Catalyst:
A regeneration product of a waste agent resulting from use of a desulfurizer comprising iron oxide as an active component is used as a catalyst. The desulfurizer comprises 12 g $Fe_3O_4$ of cubic crystal, 24 g amorphous $Fe_2O_3$, 39 g amorphous $Fe_2O_3.H_2O$, and 5 g NiO.

The waste agent is produced by a desulfurization process for removing $H_2S$ from an exhaust gas with the above desulfurizer. In detail, an exhaust gas having a $H_2S$ content of 5500 mg/cm$^3$ is introduced into a desulfurization section at a space velocity of 3000 h$^{-1}$ to carry out desulfurization reaction at a temperature of 30° C., and then a waste agent is collected in the desulfurization section when the content of $H_2S$ in an outlet gas of the desulfurization section is less than or equal to 0.01 ppm.

The above waste agent resulting from use of a desulfurizer comprising iron oxide as an active component was regenerated described as below:

The above waste agent was regenerated described as below:

1) The waste agent is washed with water, and then ground with water in a wet ball mill to obtain a waste powder of 200 mesh.

2) The waste powder is prepared into an aqueous suspension with a solid mass percentage of 7%, into which compressed air is introduced to carry out the reaction.

3) The aqueous suspension is filtered to obtain solid materials, which are placed in a flotation tank, into which water is added, and then air is introduced, and the precipitate at the lower part of the container is dried to obtain a regeneration product of the above waste agent.

Adding sulfur: Solid sulfur powder is added to the above regeneration product until the molar ratio of iron element to sulfur element comprised therein is 1:2, thereby ensuring that the molar ratio of iron element to sulfur element in the reaction system is 1:2.

Preparation of Aqueous Slurry:

(1) Corn straw having a water content of 5 wt % to 20 wt % is collected, and then pulverized to a particle size of 0.2 µm to 5 cm by using an ultrafine pulverizer.

(2) The pulverized straw in step (1) is compressed and molded by using a plodder under a compression pressure of 2.5 MPa and a compression temperature of 45° C. to a true density of 1.0 kg/m$^3$.

(3) The compressed straw in step (2) is pulverized again to a particle size of 0.1-500 µm by using an airflow crusher to obtain straw powder.

(4) Bituminous coal is collected and pulverized to a particle size of 0.1-500 µm to obtain coal powder.

(5) 5 kg of the catalyst is mixed with 10 kg of the coal powder, and then mixed with 80 kg anthracene oil, and then mixed with 90 kg of the straw powder under a negative pressure of 1 KPa to obtain a mixture.

(6) The obtained mixture of step (5) is mixed with 8 kg water to carry out grinding pulping for 15 min by using a colloid mill to obtain a first slurry having a water content of 8 wt %.

Conversion Reaction:

Synthesis gas (CO accounts for 20% by volume) is pressurized to a pressure of 18.2 MPa and heated to a temperature of 450° C., and then introduced into a bubbling bed reactor through four injection ports on the side and bottom of the bubbling bed reactor to contact with the first slurry which has entered the bubbling bed reactor to carry out conversion reaction including cracking, carbonylation, shift and hydrogenation reactions under a pressure of 18 MPa and a temperature of 380° C. The conversion reaction lasts for 100 min, during which the volume ratio of the synthesis gas to the first slurry is 950:1, producing an oil product.

Embodiment 82

Provided is a co-conversion process for biomass and coal, which is described as below.
Catalyst:
A waste agent resulting from use of a desulfurizer comprising FeOOH as an active component is used as a catalyst. The desulfurizer comprises 70 g amorphous FeOOH, 25 g $Co_2O_3$, and 5 g NiO.

The desulfurizer comprising FeOOH as an active component is used in a desulfurization process for removing $H_2S$ from exhaust gas, which is described as below. An exhaust gas having a $H_2S$ content of 5500 ng/cm$^3$ is introduced to a desulfurization section at a space velocity of 3000 h$^{-1}$ to carry out desulfurization reaction at 30° C. When the content of $H_2S$ in the outlet gas of the desulfurization section is less than or equal to 0.01 ppm, a waste agent is produced and collected in the desulfurization section, i.e. obtaining the waste agent mentioned above.

Adding sulfur: Solid sulfur powder is added into the waste agent until the molar ratio of iron element to sulfur element is 1:3, thereby ensuring that the molar ratio of iron element to sulfur element in the reaction system is 1:3.

Preparation of Aqueous Slurry:

(1) Corn straw having a water content of 5 wt % to 20 wt % is collected, and then pulverized to a particle size of 0.2 µm to 5 cm by using an ultrafine pulverizer.

(2) The pulverized straw in step (1) is compressed and molded by using a plodder under a compression pressure of 2.5 MPa and a compression temperature of 45° C. to a true density of 1.0 kg/m$^3$.

(3) The compressed straw in step (2) is pulverized again to a particle size of 0.1-500 µm by using an airflow crusher to obtain straw powder.

(4) Bituminous coal is collected and pulverized to a particle size of 0.1-500 µm to obtain coal powder.

(5) 5 kg of the catalyst is mixed with 20 kg of the coal powder, and then mixed with 80 kg anthracene oil and 80 kg of the straw powder under a negative pressure of 1 KPa to obtain a mixture.

(6) The obtained mixture in step (5) is mixed with 8 kg water to carry out grinding pulping for 15 min by using a colloid mill to obtain a first slurry having a water content of 13 wt %.

Liquefaction Reaction:

A mixture of CO and $H_2$ (CO accounts for 50% by volume) is pressurized to a pressure of 17.5 MPa and heated to a temperature of 380° C., and then injected to a slurry bed reactor through five injection ports thereof to contact with the first slurry which has entered the slurry bed reactor, so that conversion reaction including cracking, carbonylation, shift and hydrogenation reactions takes place under a pressure of 17 MPa and a temperature of 420° C. The conversion reaction lasts for 50 min, during which a volume ratio of the mixture of CO and $H_2$ to the first slurry is controlled at 1500:1, producing an oil product.

Embodiment 83

Provided is a liquefaction process for biomass, which is described as below.

Catalyst:

A waste agent resulting from use of a desulfurizer comprising FeOOH as an active component is used as a catalyst. The desulfurizer comprises 6 g soluble iron salt $Fe(NO_3)_3 \cdot 9H_2O$, 9 g iron salt complexing agent triethanolamine, and 15 g amorphous iron hydroxyl oxide.

The waste agent is produced by a desulfurization process for removing $H_2S$ from an exhaust gas with the above desulfurizer. In detail, an exhaust gas having a $H_2S$ content of 5500 mg/cm³ is introduced into a desulfurization section at a space velocity of 3000 h⁻¹ to carry out desulfurization reaction at a temperature of 30° C., and then a waste agent is collected in the desulfurization section when the content of $H_2S$ in an outlet gas of the desulfurization section is less than or equal to 0.01 ppm.

Adding sulfur: The waste agent is tested to determine a molar ratio of iron element to sulfur element comprised therein. If the molar ratio of iron element to sulfur element is less than 1:2, solid sulfur powder is added to the waste agent until the molar ratio of iron element to sulfur element reaches 1:2, thereby ensuring that the molar ratio of iron element to sulfur element in the reaction system is 1:5. However if the molar ratio of iron element to sulfur element is greater than 1:2, excess sulfur is removed by conventional methods such as solvent extraction or heating.

Preparation of Aqueous Slurry:

(1) Corn straw having a water content of 5 wt % to 20 wt % is collected, and then pulverized to a particle size of 0.2 μm to 5 cm by using an ultrafine pulverizer.

(2) The pulverized straw in step (1) is compressed and molded by using a plodder under a compression pressure of 2.5 MPa and a compression temperature of 45° C. to a true density of 1.0 kg/m³.

(3) The compressed straw in step (2) is pulverized again to a particle size of 0.1-500 μm by using an airflow crusher to obtain straw powder.

(4) Bituminous coal is collected and pulverized to a particle size of 0.1-500 μm to obtain coal powder.

(5) 5 kg of the catalyst is mixed with 30 kg of the coal powder, and then mixed with 80 kg gutter oil, and then mixed with 70 kg of the straw powder under a negative pressure of 1 KPa to obtain a mixture.

(6) The obtained mixture in step (5) is mixed with 8 kg water to carry out grinding pulping for 15 min by using a colloid mill to obtain a first slurry having a water content of 18 wt %.

Conversion Reaction:

A partial of a mixture of CO and $H_2$ (CO accounts for 80% and $H_2$ accounts for 20%) is pressurized to a pressure of 19.5 MPa and heated to a temperature of 300° C., and then introduced to a pipeline which conveys the first slurry as described above. The remaining of the mixture of CO and $H_2$ is pressurized to a pressure of 19.3 MPa and heated to a temperature of 480° C., and then injected to a slurry bed reactor through three injection ports thereof to contact with the first slurry which has entered the slurry bed reactor, so that conversion reaction including cracking, carbonylation, shift and hydrogenation reactions takes place under a pressure of 19 MPa and a temperature of 390° C. The conversion reaction lasts for 100 min, during which a volume ratio of the mixture of CO and $H_2$ to the first slurry is controlled at 800:1, producing an oil product.

Embodiment 84

Provided is a liquefaction process for biomass, which is described as below.

Catalyst:

A regeneration product of a waste agent resulting from use of a desulfurizer comprising FeOOH is used as a catalyst. Based on the total weight of the desulfurizer, the desulfurizer comprises 45% by weight of γ-FeOOH, 35% by weight of α-FeOOH, 15% by weight of molecular sieve as carriers, and 5% by weight of sesbania powder as binder.

The desulfurizer is used in a desulfurization process for removing $H_2S$ from exhaust gas, which is described as below. An exhaust gas having a $H_2S$ content of 5500 ng/cm³ is introduced to a desulfurization section at a space velocity of 3000 h⁻¹ to carry out desulfurization reaction at 30° C. When the content of $H_2S$ in the outlet gas of the desulfurization section is less than or equal to 0.01 ppm, a waste agent in the desulfurization section is collected.

The obtained waste agent was regenerated described as below: The waste agent is washed with water, and then ground with water in a wet ball mill to obtain a waste powder of 80 mesh. The waste powder is prepared into an aqueous suspension with a solid mass percentage of 8%, into which compressed air is introduced. Sample is taken for testing after reacting for a period of time. When there is no $H_2S$ produced from the reaction between the sample and hydrochloric acid, the iron sulphides in the waste agent have been completely converted into FeOOH and elemental sulfur, producing a slurry comprising FeOOH and elemental sulfur. Filtering the slurry to obtain a solid material, and extracting the solid material with $CCl_4$ for three times, then combining the extracted liquids, and recovering the solvents by distillation to obtain crystalline elemental sulfurs. Mixing the remaining solids separated from the extraction liquids with sesbania powders to obtain a regeneration product of the above-mentioned waste agent, wherein the amount of the binder sesbania powders is 5% by mass of the solids.

Adding carbon disulfides: Carbon disulfides are added into the regeneration product until the molar ratio of iron element to sulfur element is 1:2, thereby ensuring that the molar ratio of iron element to sulfur element in the reaction system is 1:2.

Preparation of Aqueous Slurry:

(1) Peanut oil residue having a moisture content of 5-15 wt % is collected, and then pulverized to a particle size of 0.2 μm to 5 cm by using an ultrafine pulverizer.

(2) The pulverized peanut oil residue of step (1) is compressed and molded by using a plodder under a compression pressure of 2.5 MPa and a compression temperature of 50° C. to a true density of 1.2 kg/m³.

(3) The compressed peanut oil residue of step (2) is pulverized again to a particle size of 0.1-500 μm by using an airflow crusher to obtain peanut oil residue powder.

(4) Coking coal is collected and pulverized to a particle size of 0.1-500 μm to obtain coal powder.

(5) 30 kg of the peanut oil residue powder is mixed with 70 kg of the coal powder, and then mixed with 100 kg anthracene oil under a negative pressure of 30 KPa to obtain a mixture.

(6) The obtained mixture in step (5) is mixed with 8 kg water to carry out grinding pulping for 16 min by using a colloid mill, and then mixed with 16 kg of the above catalyst to obtain a first slurry, wherein, the catalyst has an average size of 5 mm.

Conversion Reaction:

A mixture of CO and $H_2$ (CO accounts for 60% and $H_2$ accounts for 40%) is pressurized to a pressure of 20.4 MPa and heated to a temperature of 500° C., and then injected to a slurry bed reactor through three injection ports thereof to contact with the first slurry which has entered the slurry bed reactor, so that conversion reaction including cracking, carbonylation, shift and hydrogenation reactions takes place under a pressure of 20 MPa and a temperature of 430° C. The conversion reaction lasts for 110 min, during which a volume ratio of the mixture of CO and $H_2$ to the first slurry is controlled at 650:1, producing an oil product.

Embodiment 85

Provided is a liquefaction process for biomass, which is described as below.

Catalyst:

A regeneration product of a waste agent resulting from use of a desulfurizer comprising $Fe_{21.333}O_{32}$ is used as a catalyst. The desulfurizer comprises 55 g $Fe_{21.333}O_{32}$, 12 g copper oxide, and 21 g $Fe_2O_3$ as carrier.

The desulfurizer is used in a desulfurization process for a coal pyrolysis gas comprising hydrogen sulfide, which is described as below.

(1) A compressed coal pyrolysis gas is cooled to a temperature of 30-35° C., and mixed with air from an air pump and introduced to a desulfurization tower filled with the above-mentioned desulfurizer which mainly comprises iron oxide as an active component. The compressed coal pyrolysis gas enters at the bottom and exits at the top, thereby preventing liquid water from entering the desulfurizer bed.

(2) After many times use of the above-mentioned desulfurizer, a waste agent, i.e. spent desulfurizer, is produced and removed from the desulfurizer bed, i.e. obtaining a waste agent resulting from use of a desulfurizer comprising $Fe_{21.333}O_{32}$.

The obtained waste agent was regenerated described as below:

1) The waste agent is dispersed in water to form a slurry.

2) The slurry is heated to a temperature of 60° C. under atmospheric pressure. Then hydrogen peroxide is added to the slurry by using a peristaltic pump at a flow rate of 500 mL/min to perform reactions for a period of 10 min under magnetic stirring.

3) After the reaction is completed, the resulted reaction solution is filtered, producing a precipitate which is then washed twice with water and then dried naturally to obtain a regeneration product of the above-mentioned waste agent.

Preparation of Aqueous Slurry:

(1) Red algae having a moisture content of 70 wt % to 90 wt % is collected and dried to a moisture content of less than 20 wt %, and then pulverized to a particle size of 0.2 μm to 5 cm.

(2) The pulverized red algae in step (1) is compressed and molded by using a plodder under a compression pressure of 3 MPa and a compression temperature of 40° C. to a true density of 0.95 kg/m³.

(3) The compressed red algae in step (2) is mixed with 3 kg of the catalyst and then pulverized again to a particle size of 0.1-500 μm by using an airflow crusher to obtain a mixed powder of red algae.

(4) Long flame coal is collected and pulverized to a particle size of 0.1-500 μm to obtain coal powder.

(5) The mixed powder of red algae is mixed with 10 kg of the coal powder, and then mixed with 40 kg waste engine oil under a negative pressure of 50 KPa to obtain a mixture.

(6) The obtained mixture in step (5) is mixed with 5 kg water, and then mixed with further 60 kg waste engine oil to carry out grinding pulping for 12 min by using a colloid mill to obtain a first slurry, wherein, the catalyst has an average size of 300 μm.

Conversion Reaction:

A partial of pure CO is pressurized to a pressure of 18 MPa and heated to a temperature of 250° C., and then introduced into the first slurry. The remaining of the pure CO is pressurized to a pressure of 18 MPa and heated to a temperature of 500° C., and then injected to a slurry bed reactor through four injection ports on the bottom and side walls thereof to contact with the first slurry which has entered the slurry bed reactor, so that conversion reaction including cracking, carbonylation, shift and hydrogenation reactions takes place under a pressure of 17 MPa, a temperature of 400° C. The conversion reaction lasts for 40 min, during which the volume ratio of pure CO to the first slurry is 950:1, producing an oil product.

Comparative Example 10

Provided is a comparative co-conversion process for biomass and coal, which is the same as that of embodiment 79 except that, in this comparative example, the corn straw and coal are dried to have a water content of 80 ppm; the molar ratio of iron to sulfur in the reaction system is 1:0.1.

Test Example 8

The oil products prepared in the Embodiments 78-85 of the present invention and that of comparative example 10 are tested and analyzed according to the following methods.

The conversion rate of solid organic material %=(the total mass of solid organic materials in the raw materials–the mass of residual solid organic materials in the reaction product)/the total mass of solid organic material in the raw materials. Wherein, said "solid organic material" in the conversion rate of solid organic material has no water and no ash basis (the same as below).

The yield of oils converted from solid organic material %=the mass of liquid phase oils at normal temperature and pressure in the conversion products of solid organic material/the total feed mass of solid organic material in raw materials. The rate of water produced in the reaction %=(the water mass of the reaction products–total mass of water added initially in the reaction or carried by the raw materials)/the mass of the total charge raw materials. When this value is <0, it is marked as "none".

The corresponding test results are shown in Table 11:

TABLE 11

Product distributions after conversion of solid organic materials

| Conversion results | Conversion rate of solid organic material % | Yield of oils converted from solid organic material % | Carbon content of oils converted from solid organic material wt % | Hydrogen content of oils converted from solid organic material wt % | Oxygen content of oils converted from solid organic material wt % | Calorific value of oils converted from solid organic material (times of the calorific value of standard fuel oil) | Rate of water produced in the reaction wt % |
|---|---|---|---|---|---|---|---|
| Embodiment 78 | 98.3 | 52.2 | 85.2 | 11.7 | 1.3 | 0.96 | none |
| Embodiment 79 | 98.6 | 56.4 | 86.4 | 12 | 0.5 | 0.97 | none |
| Embodiment 80 | 98.7 | 51.2 | 86.5 | 12.9 | 0.3 | 0.98 | none |
| Embodiment 81 | 97.2 | 50.1 | 87.0 | 10.5 | 1.2 | 0.97 | 1.3 |
| Embodiment 82 | 99.0 | 53.1 | 86.9.3 | 12.1 | 0.6 | 0.98 | none |
| Embodiment 83 | 97.7 | 55.3 | 84.7 | 13.6 | 0.8 | 0.97 | none |
| Embodiment 84 | 96.9 | 58.2 | 86.2 | 12.7 | 0.6 | 0.98 | none |
| Embodiment 85 | 99.3 | 51.4 | 85.1 | 12.8 | 1.0 | 0.97 | none |
| Comparative Embodiment 10 | 89.8 | 37.3 | 80.2 | 8.3 | 10.1 | 0.86 | 2.4 |

In addition, in the present application, the raw slurry material from the slurry preparation system enters a raw oil buffer tank (40° C. to 180° C.). A stirrer is provided in the raw oil buffer tank to prevent solid particle form depositing in the raw slurry material. The slurry from the bottom of the raw oil buffer tank is pressurized to 0.3-0.5 MPa by using a low-pressure pump 2-1, then divided into a first part and a second part, and the first part enters a high-pressure booster pump 3-1 through an inlet thereof to be further pressurized to 5-22 MPa, and the second part returns to the raw oil buffer tank. The arrangement of the low pressure pump can on the one hand meet the pressure requirement for the inlet of the high pressure pump, and on the other hand prevent solid particle from depositing in the raw material tank.

The pressurized slurry is mixed with a partial of CO-containing gas, and enters a second heat exchange system 4-1, and is heated to 150-450° C. by a first heating furnace 5-1, then enters suspended bed reactor 8-1.

Fresh CO-containing gas is pressurized by a fresh gas compression system 16-1 and mixed with a circulating gas in the system to obtain a mixed gas. The mixed gas is subjected to heat exchange in a first heat exchange system 6-1, and then divided into a first part and a second part. The first part is sent to mix with the raw material slurry prior to the raw material heating furnace. The second part is sent to a second heating furnace 7-1 to be heated to 300° C. to 600° C., and then introduced into a suspended bed reactor 8-1 to carry out reactions therein. A cold cycle gas line is provided in the reactor to continuously inject a circulating cold air having a temperature of 30-130° C. into the reactor, thereby ensuring the temperature in the reactor kept at 300-470° C. The reactor is a cold wall reactor, and the material is introduced from the bottom thereof and discharged from the top thereof. The reaction product coming from the top of the reactor is introduced into a hot high pressure separator 9-1 to carry out gas-liquid-solid separation. A hot high liquid separated from the bottom of the hot high pressure separator is depressurized by a pressure reducing system 11-1 and then is fed into a hot low pressure separator 12-1 to separate and remove hydrogen and other light components dissolved therein, and sent to a second separation system 14-1 to mainly separates a biomass heavy oil and a solid residue, producing products mainly includes a gas, a biomass heavy oil and a solid residue. The second separation system is provided with means for separating the solid residue, so that a large amount of catalyst is discharged as a solid residue. A part of the catalyst-containing heavy oil separated from the second separation system is discharged as a product, and the remaining is mixed with the raw material oil and then enters the raw material buffer tank.

A hot high gas coming from the top of the hot high-pressure separator is sent into a cooling system 10-1, and then sent into a first separation system 13-1. A cold high gas coming from the top of a cold high pressure separator in the first separation system is sent to a circulating gas compression system 15-1 for pressurizing. The pressurized circulating gas is fed into the reactor for recycling. The first separation system is provided mainly to separate the circulating gas from the light biomass oil, producing products mainly including gas and bio-light oil.

Figure 3:
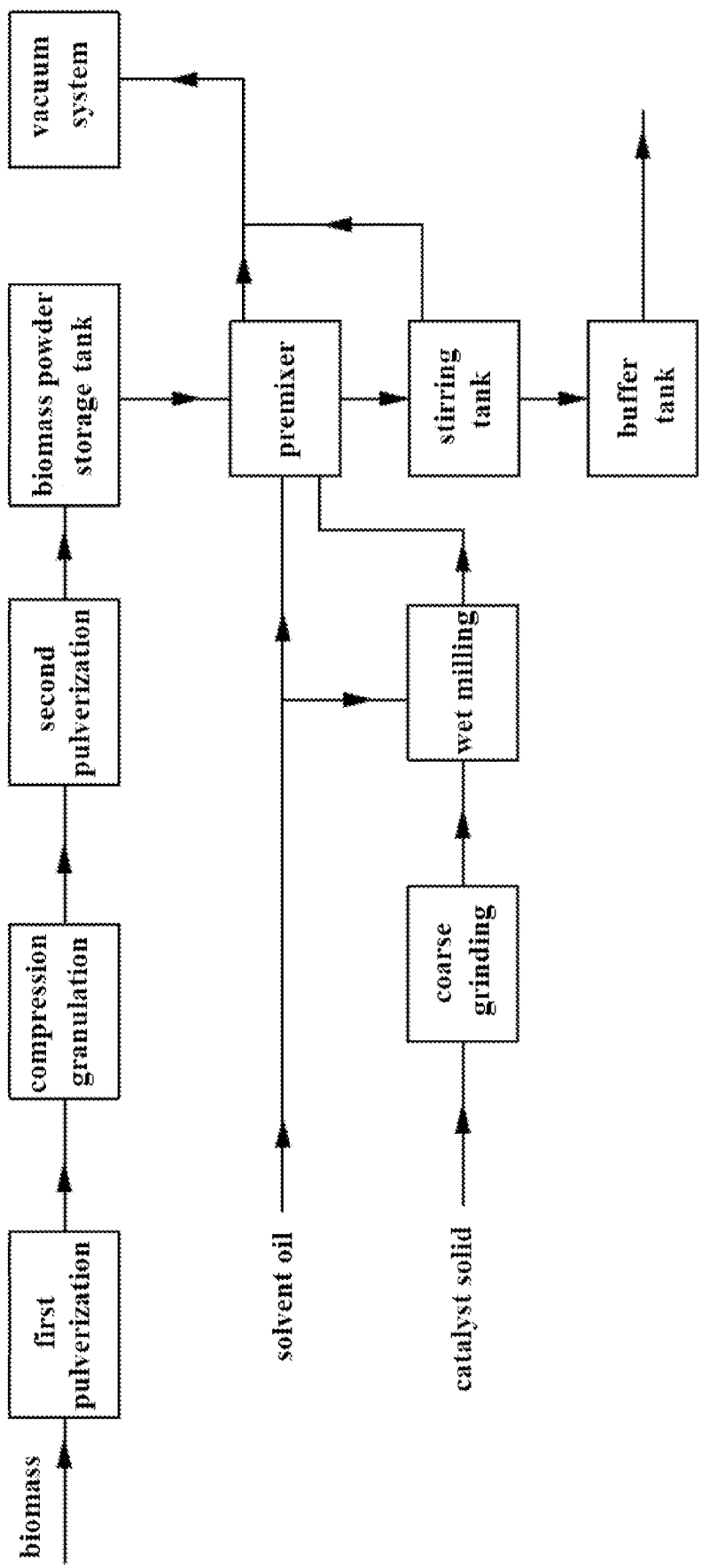
FIG. 3 is a flow diagram of preparing a slurry of the solid biomass provided by embodiment 86 of the present invention.

Furthermore, as shown in FIG. 3, the catalyst is subjected to coarsely grinding before mixing with the first solvent oil and subjecting to wet milling.

Embodiment 86

Figure 2:
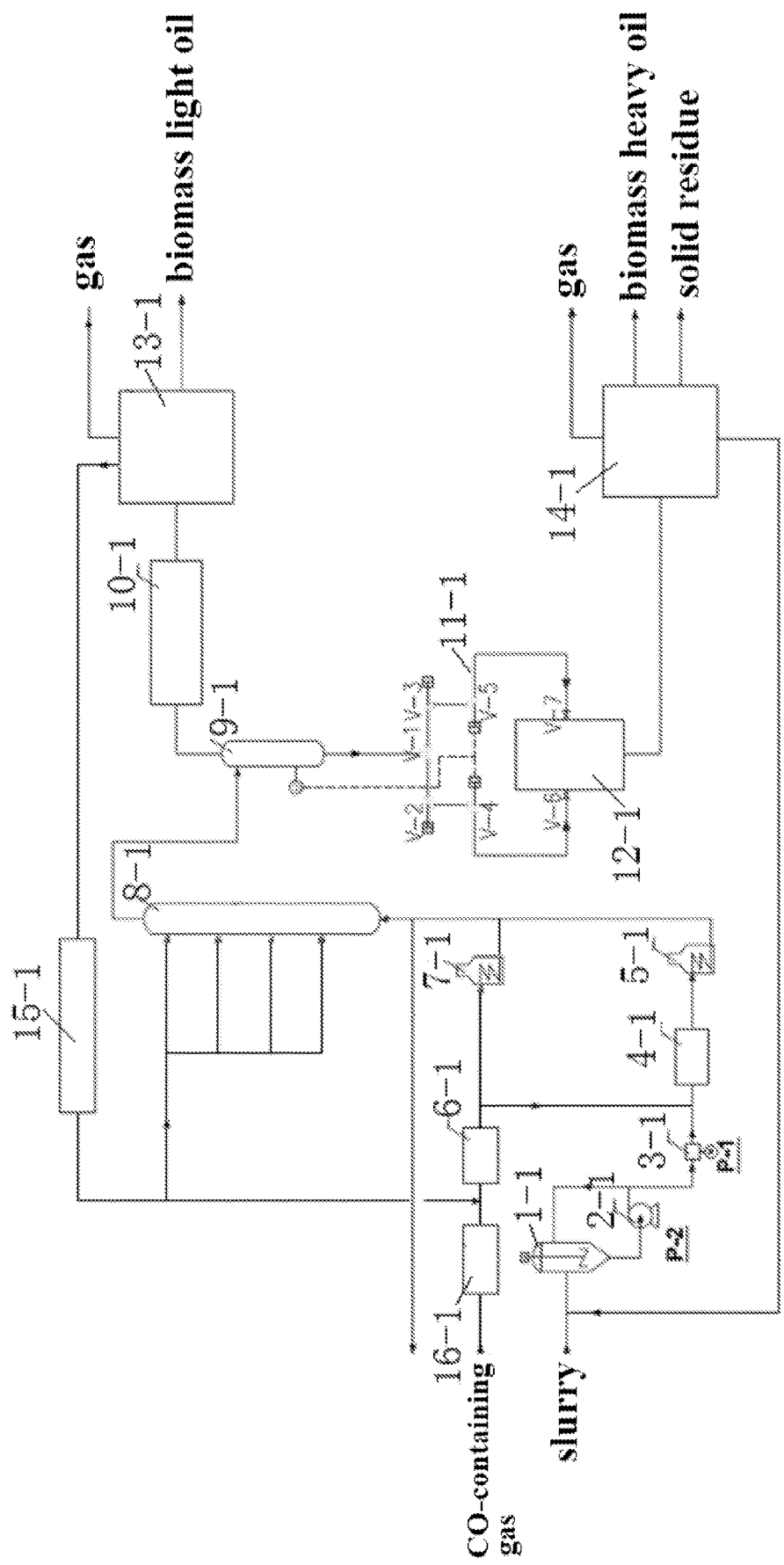
FIG. 2 is a flow diagram of conversion process for the solid biomass provided by embodiment 86 of the present invention.

As shown in FIG. 2 and FIG. 3, provided is a conversion process for a solid biomass, which is described as below.

Pretreatment of Biomass:

Rice straw and reed straw are used as solid biomass, which are sent to an ultrafine pulverizer for initial pulverization to an average particle size of 100 μm, then fed into a briquetting press for compressing and extruding to have a diameter of 8 mm, a length of 25 mm, an apparent density of no less than 0.4 g/cm$^3$, and a moisture content of no more than 15%, and then subjected to a second pulverization by using a roller pulverizer to obtain a biomass powder having an average particle size of 3 mm, which is stored in a biomass powder storage tank.

Catalyst and Pretreatment Thereof:

1. Catalyst: A waste agent resulting from use of a desulfurizer comprising FeOOH is used as a catalyst. The desulfurizer comprises 6 g soluble iron salt Fe(NO$_3$)$_3$.9H$_2$O, 9 g iron salt complexing agent triethanolamine, and 15 g amorphous FeOOH.

The waste agent is produced by a desulfurization process for removing H$_2$S from an exhaust gas with the above desulfurizer. In detail, an exhaust gas having a H$_2$S content of 5500 mg/cm$^3$ is introduced into a desulfurization section at a space velocity of 3000 h$^{-1}$ to carry out desulfurization reaction at a temperature of 30° C., and then a waste agent is collected in the desulfurization section when the content of H$_2$S in an outlet gas of the desulfurization section is less than or equal to 0.01 ppm.

Adding sulfur: The waste agent is tested to determine a molar ratio of iron element to sulfur element comprised therein. If the molar ratio of iron element to sulfur element is less than 1:5, solid sulfur powder is added to the waste agent until the molar ratio of iron element to sulfur element reaches 1:5, thereby ensuring that the molar ratio of iron element to sulfur element in the reaction system is 1:5. However if the molar ratio of iron element to sulfur element is greater than 1:5, excess sulfur is removed by conventional methods such as solvent extraction or heating.

2. Pretreatment of the catalyst: The above catalyst is mixed with a residue oil and wet-milled by a colloid mill to obtain a catalyst-containing premixed slurry, which has a catalyst content of 20 wt %.

Preparation of a Slurry Containing Catalyst and Biomass:

The biomass powder, residue oil and the catalyst-containing premixed slurry are sequentially mixed in a premixer and a stirring tank. A vacuum system is used to maintain a vacuum degree of 40 kPa and a temperature of 150° C. in the premixer and the stirring tank, producing a slurry containing catalyst and biomass. The rice straw and the reed straw are present in a total amount of 60 wt % in the slurry, and the slurry has a water content of 12 wt %, and a catalyst content of 5 wt %, wherein, the catalyst has an average particle size of 5 μm.

Conversion Reaction:

The slurry containing catalyst and biomass coming from the slurry preparation system enters a buffer tank 1-1 (50° C.). A stirrer is provided in the buffer tank 1-1 to prevent solid particle form depositing in the slurry. The slurry coming from the bottom of the buffer tank 1-1 is pressurized to 0.4 MPa by using a low-pressure pump 2-1, then divided into a first part and a second part. The first part enters a high-pressure booster pump 3-1 through an inlet thereof to be further pressurized to 21 MPa, and the second part returns to the buffer tank 1-1.

The pressurized slurry is mixed with a partial of CO-containing gas, and enters a second heat exchange system 4-1, and is heated to 380° C. through a first heating furnace 5-1, then enters a suspended bed reactor 8-1 to carry out conversion reaction under a pressure of 20.5 MPa and a temperature of 450° C. The conversion reaction lasts for 60 min, during which a volume ratio of the mixture of CO and H$_2$ to the slurry is controlled at 3000:1.

Fresh CO-containing gas is pressurized by a fresh gas compression system 16-1 and mixed with the circulating gas in the system to obtain a mixed gas. The mixed gas is subjected to heat exchange in a first heat exchange system 6-1, then divided into a first part and a second part, wherein the first part is sent to mix with the raw material slurry prior to the raw material heating furnace, and the second part is sent to a second heating furnace 7-1 to heat to 420° C., and then introduced into a suspended bed reactor 8-1 to carry out reactions. A cold cycle gas line is provided in the reactor to continuously inject a circulating cold air having a temperature of 50° C. into the reactor, thus to ensure that the temperature in the reactor is 450° C. The reactor is a cold wall reactor, wherein, the material is introduced from the bottom thereof and discharged from the top thereof. The reaction product coming from the top of the reactor is introduced into a hot high pressure separator 9-1 to carry out gas-liquid-solid separation under a pressure of 15 MPa and a temperature of 400° C. A hot high liquid separated from the bottom of the hot high pressure separator 9-1 is depressurized by a pressure reducing system 11-1, and then fed into a hot low pressure separator 12-1 operated at a pressure of 1.8 MPa and a temperature of 300° C. to separate and remove hydrogen and other light components that have been dissolved in the hot high liquid to obtain a hot low liquid, which is sent to a second separation system 14-1 to obtain main products such as a gas, a biomass heavy oil and a solid residue. The second separation system 14-1 is provided with means for separating the solid residue, so that a large amount of catalyst is discharged as a solid residue. A part of the catalyst-containing heavy oil separated from the second separation system is discharged as a product, and the remaining is mixed with the raw material oil and then enters the raw material buffer tank 1-1 for refining.

The hot high gas coming from the top of the hot high-pressure separator 9-1 is sent into a cooling system 10-1, the material outlet parameters of which are controlled as: a pressure of 11 MPa, and a temperature of 100° C., and then sent into a first separation system 13-1. The cold high gas on the top of a cold high separator of the first separation system 13-1 is sent to a circulating gas compression system 15-1 for pressurizing. The pressurized circulating gas is fed into the reactor for recycling. The main products of the first separation system 13-1 are a gas and a bio-light oil.

Wherein, the pressure reducing system includes a high pressure three-way angle valve (V1), two high pressure cut-off angle valves (a first high pressure cut-off angle valve V2, and a second high pressure cut-off angle valve V3), two high pressure modulating pressure reducing angle valves (a first high pressure modulating pressure reducing angle valve V4, and a second high pressure modulating pressure reducing angle valve V5), two high pressure cut-off straight-through valves (a first high pressure cut-off straight-through valve V6, and a second high pressure cut-off straight-through valve V7), and connecting lines between the above four kind of valves disposed on the pipeline. The inlet pipeline of the high pressure three-way angle valve is connected with the bottom pipeline of the hot high pressure separator; the outlet of the high pressure three-way angle valve is divided into two pipelines, and each line is respectively connected with an inlet pipeline of a high pressure cut-off angle valve; the outlet pipeline of the high pressure cut-off angle valve is connected to an inlet pipeline of the high pressure modulating pressure reducing angle valve, and the outlet pipeline of the high pressure modulating pressure reducing angle valve is connected with an inlet pipeline of the high pressure cut-off straight-through valve, and the outlet lines of the high pressure shut-off valve are connected to a hot low pressure separator respectively.

Embodiment 87

Provided is a conversion process for a solid biomass, which is described as below.

Pretreatment of Biomass:

Wheat straw and corn straw are used as solid biomass, which are sent to an ultrafine pulverizer for initial pulverization to an average particle size of 5 cm, then fed into a briquetting press for compressing and extruding to a diameter of 2 mm, a length of 50 mm, an apparent density of no less than 0.4 g/cm$^3$, and a moisture content of no more than 15%, then subjected to a second pulverization by using a roller pulverizer to obtain biomass powder having an average particle size of 5 mm, which is stored in a biomass powder storage tank.

Catalyst and Pretreatment Thereof:

1. Catalyst: A waste agent resulting from use of a desulfurizer comprising iron oxide as an active component is used as a catalyst. The desulfurizer comprises 10 g calcium bicarbonate, 12 g basic cupric carbonate, 18 g γ-$Fe_2O_3$, 5 g $MnO_2$, and 5 g NiO.

The waste agent is produced by a desulfurization process with the above desulfurizer, which is described as follows.

1) Exhaust gas produced by fixed bed catalytic hydrogenation of medium-low temperature coal tar is collected.

2) The above mentioned desulfurizer is prepared into particles having a diameter of 1 mm and a length of 15 mm, and filled in a desulfurization tower to form a desulfurization layer.

3) The collected exhaust gas passes through the desulfurization layer at a space velocity of 2000 $h^{-1}$, so that desulfurization reaction takes place when the exhaust gas contact with the desulfurizer in the desulfurization layer at 50° C. to remove hydrogen sulfide in the exhaust gas. After the reaction is completed, a waste agent, i.e. a spent desulfurizer, is collected and cooled to room temperature, i.e. obtaining a waste agent resulting from use of a desulfurizer comprising iron oxide as an active component.

Adding sulfur: The waste agent is tested to determine a molar ratio of iron element to sulfur element comprised therein. If the molar ratio of iron element to sulfur element is less than 1:1, solid sulfur powder is added to the waste agent until the molar ratio of iron element to sulfur element reaches 1:1, thereby ensuring that the molar ratio of iron element to sulfur element in the reaction system is 1:1. However if the molar ratio of iron element to sulfur element is greater than 1:1, excess sulfur is removed by conventional methods such as solvent extraction or heating.

2. Pretreatment of the catalyst: The above catalyst is mixed with mineral oil and wet-milled by a colloid mill to obtain a catalyst-containing premixed slurry, which has a catalyst content of 15 wt %.

Preparation of a Slurry Containing Catalyst and Biomass:

The biomass powder, coal tar oil and the catalyst-containing premixed slurry are sequentially mixed in a premixer and a stirring tank. A vacuum system is used to maintain a vacuum degree of 1 kPa and a temperature of 200° C. in the premixer and the stirring tank to prepare a slurry containing catalyst and biomass. The rice straw and the reed straw are present in a total amount of 35 wt % in the slurry, and the slurry has a water content of 5 wt % by weight, and a catalyst content of 10 wt % by weight, wherein, the catalyst has an average particle size of 100 μm.

Conversion Reaction:

The slurry containing catalyst and biomass coming from the slurry preparation system enters a buffer tank 1-1 (150° C.), and a stirrer is provided in the buffer tank 1-1 to prevent solid particle form depositing in the slurry. The slurry coming from the bottom of the buffer tank 1-1 is pressurized to 0.3 MPa by using a low-pressure pump 2-1, then divided into two parts, one part of which enters a high-pressure booster pump 3-1 through an inlet thereof to be further pressurized to 18.3 MPa, and the other part returns to the buffer tank 1-1.

The pressurized slurry is mixed with a partial of CO-containing gas, and enters a second heat exchange system 4-1, and is heated to 380° C. through a first heating furnace 5-1, then enters suspended bed reactor 8-1 to carry out conversion reactions under a pressure of 18 MPa and a temperature of 420° C. The conversion reaction lasts for 30 min, during which a volume ratio of the mixture of CO and $H_2$ to the slurry is controlled at 6000:1.

Fresh CO-containing gas is pressurized by a fresh gas compression system 16-1 and mixed with the circulating gas in the system to obtain a mixed gas. The mixed gas is subjected to heat exchange in a first heat exchange system 6-1, then divided into two parts, one part of which is sent to mix with the raw slurry material prior to the raw material heating furnace. The other part is heated to 420° C. in a second heating furnace 7-1, and then is introduced into a suspended bed reactor 8-1 to carry out a reaction in the reactor. A cold cycle gas line is provided in the reactor to continuously inject a circulating cold air having a temperature of 100° C. into the reactor, thus to ensure that the temperature in the reactor is kept at 420° C. The reactor is a cold wall reactor, wherein, the material is introduced from the bottom thereof and discharged from the top thereof. The reaction product from the top of the reactor is introduced into a hot high pressure separator 9-1 to carry out gas-liquid-solid separation under a pressure of 10 MPa and a temperature of 300° C. A hot high liquid separated from the bottom of the hot high pressure separator 9-1 is depressurized by a pressure reducing system 11-1 and then is fed into a hot low pressure separator 12-1 operated at a pressure of 2.5 MPa and a temperature of 280° C. to separate and remove hydrogen and other light components that have been dissolved in the hot high liquid to obtain a hot low liquid under, which is sent to a second separation system 14-1 to obtain main products such as a gas, a biomass heavy oil and a solid residue. The second separation system is provided with means for separating the solid residue, so that a large amount of catalyst is discharged as a solid residue. A part of the catalyst-containing heavy oil separated from the second separation system is discharged as a product, and the remaining is mixed with the raw material oil and then enters the raw material buffer tank for refining.

A hot high gas coming from the top of the hot high-pressure separator is sent into a cooling system 10-1, the material outlet parameters of which are controlled as: a pressure of 6 MPa, and a temperature of 80° C., and is then sent into a first separation system 13-1. A cold high gas on the top of a cold high pressure separator in the first separation system is sent to a circulating gas compression system 15-1 for pressurizing. The pressurized circulating gas is fed into the reactor for recycling. The main products of the first separation system are a gas and a bio-light oil.

Wherein, the pressure reducing system includes a high pressure three-way angle valve (V1), two high pressure cut-off angle valves (a first high pressure cut-off angle valve V2, and a second high pressure cut-off angle valve V3), two high pressure modulating pressure reducing angle valves (a first high pressure modulating pressure reducing angle valve V4, and a second high pressure modulating pressure reducing angle valve V5), two high pressure cut-off straight-through valves (a first high pressure cut-off straight-through valve V6, and a second high pressure cut-off straight-through valve V7), and connecting lines between the above four valves disposed on the pipeline. The inlet pipeline of the high pressure three-way angle valve is connected with the bottom pipeline of the hot high pressure separator; the outlet of the high pressure three-way angle valve is divided into two pipelines, and each line is respectively connected with an inlet pipeline of a high pressure cut-off angle valve; the outlet pipeline of the high pressure cut-off angle valve is connected to an inlet pipeline of the high pressure modulating pressure reducing angle valve, and the outlet pipeline of the high pressure modulating pressure reducing angle valve is connected with an inlet pipeline of the high pressure cut-off straight-through valve, and the outlet lines of the high pressure shut-off valve are connected to a hot low pressure separator respectively.

Embodiment 88

Provided is a conversion process for a solid biomass, which is described as below.

Pretreatment of Biomass:

Cotton straw is used as a solid biomass, which is sent to an ultrafine pulverizer for initial pulverization to an average particle size of 1 cm, then fed into a briquetting press for compressing and extruding to have a diameter of 10 mm, a length of 3 mm, an apparent density of no less than 0.4 g/cm$^3$, and a moisture content of no more than 15%, and then subjected to a second pulverization by using a roller pulverizer to obtain biomass powder having an average particle size of 200 μm, which is stored in a biomass powder storage tank.

Catalyst and Pretreatment Thereof:

1. Catalyst Amorphous FeOOH is used as a catalyst. Adding sulfur: Solid sulfur powder is added to the above catalyst until the molar ratio of iron element to sulfur element reaches 1:2, thereby ensuring that the molar ratio of iron element to sulfur element in the reaction system is 1:2.

2. Pretreatment of the catalyst: The above catalyst is mixed with residual oil and wet-milled by a colloid mill to obtain a catalyst-containing premixed slurry, which has a catalyst content of 10 wt %.

Preparation of a Slurry Containing Catalyst and Biomass:

The biomass powder, palm oil and the catalyst-containing premixed slurry are sequentially mixed in a premixer and a stirring tank. A vacuum system is used to maintain a vacuum degree of 95 kPa and a temperature of 80° C. in the premixer and the stirring tank to prepare a slurry containing catalyst and biomass. The straw is present in a total amount of 40 wt % in the slurry, and the slurry has a water content of 10 wt %, and a catalyst content of 3 wt %, wherein, the catalyst has an average particle size of 5 μm.

Conversion Reaction:

The slurry containing catalyst and biomass coming from the slurry preparation system enters a buffer tank 1-1 (100° C.), and a stirrer is provided in the buffer tank 1-1 to prevent solid particle form depositing in the slurry. The slurry coming from the bottom of the buffer tank 1-1 is pressurized to 0.5 MPa by using a low-pressure pump 2-1, then divided into two parts, on part of which enters a high-pressure booster pump 3-1 through an inlet thereof to be further pressurized to 12.5 MPa, and the other part returns to the buffer tank 1-1.

The pressurized slurry is mixed with a partial of CO-containing gas, and enters a second heat exchange system 4-1, and is heated to 300° C. through a first heating furnace 5-1, then enters suspended bed reactor 8-1 to carry out conversion reaction under a pressure of 12 MPa and a temperature of 380° C. The conversion reaction lasts for 120 min, during which a volume ratio of the mixture of CO and H$_2$ to the slurry is controlled at 10000:1.

Fresh CO-containing gas is pressurized by a fresh gas compression system 16-1 and mixed with the circulating gas in the system to obtain a mixed gas. The mixed gas is subjected to heat exchange in a first heat exchange system 6-1, then divided into two parts, one part of which is sent to mix with the raw slurry material prior to the first heating furnace, and the other part is heated to 390° C. in a second heating furnace 7-1, and then is introduced into a suspended bed reactor 8-1 to carry out reactions in the reactor. A cold cycle gas line is provided in the reactor to continuously inject a circulating cold air having a temperature of 120° C. into the reactor, thus to ensure that the temperature in the reactor is 380° C. The reactor is a cold wall reactor, wherein, the material is introduced from the bottom thereof and discharged from the top thereof. The reaction product from the top of the reactor is introduced into a hot high pressure separator 9-1 to carry out gas-liquid-solid separation under a pressure of 5 MPa and a temperature of 330° C. A hot high liquid separated from the bottom of the hot high pressure separator 9-1 is depressurized by a pressure reducing system 11-1 and then is fed into a suspended bed hot low pressure separator 12-1 operated a pressure of 0.3 MPa and a temperature of 300° C. to separate and remove hydrogen and the other light components that have been dissolved in the hot high liquid to obtain hot low liquid, which is sent to a second separation system 14-1 to obtain main products such as a gas, a biomass heavy oil and a solid residue. The second separation system is provided with means for separating the solid residue, so that a large amount of catalyst is discharged as a solid residue. A part of the catalyst-containing heavy oil separated from the second separation system is discharged as a product, and the remaining is mixed with the raw material oil and then enters the raw material buffer tank for refining.

A hot high gas coming from the top of the hot high-pressure separator is sent into a cooling system 10-1, the material outlet parameters of which are controlled as: a pressure of 5 MPa, and a temperature of 210° C., and is then sent into a first separation system 13-1. The cold high gas on the top of a cold high pressure separator in the first separation system is sent to a circulating gas compression system 15-1 for pressurizing. The pressurized circulating gas is fed into the reactor for recycling. The main products of the first separation system are a gas and a bio-light oil.

Wherein, the pressure reducing system includes a high pressure three-way angle valve (V1), two high pressure cut-off angle valves (a first high pressure cut-off angle valve V2, and a second high pressure cut-off angle valve V3), two high pressure modulating pressure reducing angle valves (a first high pressure modulating pressure reducing angle valve V4, and a second high pressure modulating pressure reducing angle valve V5), two high pressure cut-off straight-through valves (a first high pressure cut-off straight-through valve V6, and a second high pressure cut-off straight-through valve V7), and connecting lines between the above four valves disposed on the pipeline. The inlet pipeline of the high pressure three-way angle valve is connected with the bottom pipeline of the hot high pressure separator; the outlet of the high pressure three-way angle valve is divided into two pipelines, and each line is respectively connected with an inlet pipeline of a high pressure cut-off angle valve; the outlet pipeline of the high pressure cut-off angle valve is connected to an inlet pipeline of the high pressure modulating pressure reducing angle valve, and the outlet pipeline of the high pressure modulating pressure reducing angle valve is connected with an inlet pipeline of the high pressure cut-off straight-through valve, and the outlet lines of the high pressure shut-off valve are connected to a hot low pressure separator respectively.

Embodiment 89

As shown in FIG. 1 and FIG. 2, provided is a conversion process for a solid biomass, which is described as below.

Pretreatment of Biomass:

Wood chips and soybean straw are used as a solid biomass, which are sent to an ultrafine pulverizer for initial pulverization to an average particle size of 50 μm, then fed into a briquetting press for compressing and extruding to have a diameter of 4 mm, a length of 38 mm, an apparent density of no less than 0.4 g/cm$^3$, and a moisture content of no more than 15%, and then subjected to a second pulverization by using a roller pulverizer to obtain biomass powder having an average particle size of 100 μm, which is stored in a biomass powder storage tank.

Catalyst and Pretreatment Thereof:

1. Catalyst: A regeneration product of a waste agent resulting from use of a desulfurizer comprising iron oxide as an active component is used as a catalyst. The desulfurizer comprises 50 g cubic $Fe_3O_4$, 12 g calcium sulphate dihydrate, 20 g basic zinc carbonate, and 6 g sodium carboxymethylcellulose.

The desulfurizer is used in a desulfurization process for petroleum comprising hydrogen sulfide, which is described as below.

(1) The above mentioned desulfurizer is prepared into particles having a diameter of 1.5 mm, and filled in a desulfurization tower to form a desulfurization layer.

(2) Petroleum comprising hydrogen sulfide is sprayed by a nozzle into the desulfurization layer from the top of the desulfurization tower to carry out desulfurization under spraying. After desulfurization is completed, a spent desulfurizer is produced, which is the waste agent resulting from use of a desulfurizer comprising iron oxide.

The obtained waste agent is subjected to regeneration which is described as below:

1) The waste agent is mixed with water and stirred in a slurry tank to form a second slurry which has a solid content of 12 wt %.

2) Sodium hypochlorite is introduced into the second slurry to carry out a first oxidation reaction at 60° C. and 1 MPa, producing an oxidized slurry.

3) $Na_2S$ is added to the oxidized slurry to carry out a vulcanization reaction at 10° C. and 5 MPa, producing a vulcanized slurry.

4) Hydrogen peroxide is introduced into the vulcanized slurry to carry out a second oxidation reaction at 30° C. and 1.1 MPa to further oxidize and regenerate the slurry.

5) Steps 3) and 4) are repeated once to produce a final slurry wherein the molar ratio of iron to sulfur is 1:1.8.

6) The final slurry is subjected to solid-liquid separation to obtain the regeneration product of the above waste agent.

Adding sulfur: Solid sulfur powder is added to the above regeneration product until the molar ratio of iron element to sulfur element comprised therein is 1:2, thereby ensuring that the molar ratio of iron element to sulfur element in the reaction system is 1:2.

2. Pretreatment of the catalyst: The above catalyst is mixed with residual oil and wet-milled by a colloid mill to obtain a catalyst-containing premixed slurry, which has a catalyst content of 26 wt %.

Preparation of a Slurry Containing Catalyst and Biomass:

The biomass powder, canola oil and the catalyst-containing premixed slurry are sequentially mixed in a premixer and a stirring tank. A vacuum system is used to maintain a vacuum degree of 28 kPa and a temperature of 146° C. in the premixer and the stirring tank to prepare a slurry containing catalyst and biomass. The straw is present in a total amount of 28 wt % in the slurry, and the slurry has a water content of 8 wt %, and a catalyst content of 2 wt %, wherein, the catalyst has an average particle size of 400 μm.

Conversion Reaction:

The slurry containing catalyst and biomass coming from the slurry preparation system enters a buffer tank 1-1 (170° C.), and a stirrer is provided in the buffer tank 1-1 to prevent solid particle form depositing in the slurry. The slurry coming from the bottom of the buffer tank 1-1 is pressurized to 0.4 MPa by using a low-pressure pump 2-1, then divided into two parts, one part of which enters a high-pressure booster pump 3-1 through an inlet thereof to be further pressurized to 22 MPa, and the other part returns to the buffer tank 1-1.

The pressurized slurry is mixed with a partial of CO-containing gas, and enters a second heat exchange system 4-1, and is heated to 300° C. through a first heating furnace 5-1, then enters suspended bed reactor 8-1 to carry out conversion reaction under a pressure of 21.5 MPa and a temperature of 350° C. The conversion reaction lasts for 180 min, during which a volume ratio of the mixture of CO and $H_2$ to the slurry is controlled at 1000:1.

Fresh CO-containing gas is pressurized by a fresh gas compression system 16-1 and mixed with the circulating gas in the system to obtain a mixed gas. The mixed gas is subjected to heat exchange in a first heat exchange system 6-1, then divided into two parts, one part of which is sent to mix with the raw slurry material prior to a first heating furnace, and the other part is heated to 370° C. in a second heating furnace 7-1, and then is introduced into a suspended bed reactor 8-1 to carry out reaction. A cold cycle gas line is provided in the reactor to continuously inject a circulating cold air having a temperature of 80° C. into the reactor, thus to ensure that the temperature in the reactor is 350° C. The reactor is a cold wall reactor, wherein, the material is introduced from the bottom thereof and discharged from the top thereof. The reaction product from the top of the reactor is introduced into a hot high pressure separator 9-1 to carry out gas-liquid-solid separation under a pressure of 20 MPa and a temperature of 320° C. A hot high liquid separated from the bottom of the hot high pressure separator 9-1 is depressurized by a pressure reducing system 11-1 and then is fed into a hot low pressure separator 12-1 operated at a pressure of 2.5 MPa and a temperature of 290° C. to separate and remove hydrogen and the other light components that have been dissolved in the hot high liquid to obtain hot low liquid, which is sent to a second separation system 14-1 to obtain main products such as a gas, a biomass heavy oil and a solid residue. The second separation system is provided with means for separating the solid residue, so that a large amount of catalyst is discharged as a solid residue. A part of the catalyst-containing heavy oil separated from the second separation system is discharged as a product, and the remaining is mixed with the raw material oil and then enters the raw material buffer tank for refining.

A hot high gas coming from the top of the hot high-pressure separator is sent into a cooling system 10-1, the material outlet parameters of which are controlled as: a pressure of 18 MPa, and a temperature of 200° C., and is then sent into a first separation system 13-1. The cold high gas on the top of a cold high pressure separator in the first separation system is sent to a circulating gas compression system 15-1 for pressurizing. The pressurized circulating gas is fed into the reactor for recycling. The main products of the first separation system are a gas and a bio-light oil.

Wherein, the pressure reducing system includes a high pressure three-way angle valve (V1), two high pressure cut-off angle valves (a first high pressure cut-off angle valve V2, and a second high pressure cut-off angle valve V3), two high pressure modulating pressure reducing angle valves (a first high pressure modulating pressure reducing angle valve V4, and a second high pressure modulating pressure reducing angle valve V5), two high pressure cut-off straight-through valves (a first high pressure cut-off straight-through valve V6, and a second high pressure cut-off straight-through valve V7), and connecting lines between the above four valves disposed on the pipeline. The inlet pipeline of the high pressure three-way angle valve is connected with the bottom pipeline of the hot high pressure separator; the outlet of the high pressure three-way angle valve is divided into two pipelines, and each line is respectively connected with an inlet pipeline of a high pressure cut-off angle valve; the outlet pipeline of the high pressure cut-off angle valve is connected to an inlet pipeline of the high pressure modulating pressure reducing angle valve, and the outlet pipeline of the high pressure modulating pressure reducing angle valve is connected with an inlet pipeline of the high pressure cut-off straight-through valve, and the outlet lines of the high pressure shut-off valve are connected to a hot low pressure separator respectively.

Embodiment 90

Provided is a conversion process for a solid biomass, which is described as below.

Pretreatment of Biomass:

Pea straw, sorghum straw, and rice straw are used as a solid biomass, which are sent to an ultrafine pulverizer for initial pulverization to an average particle size of 18 μm, then fed into a briquetting press for compressing and extruding to have a diameter of 6 mm, a length of 50 mm, an apparent density of no less than 0.4 g/cm$^3$, and a moisture content of no more than 15%, and then subjected to a second pulverization by using a roller pulverizer to obtain biomass powder having an average particle size of 1 mm, which is stored in a biomass powder storage tank.

Catalyst and Pretreatment Thereof:

1. Catalyst: A regeneration product of a waste agent resulting from use of a desulfurizer comprising $Fe_{21.333}O_{32}$ as an active component is used as a catalyst. The desulfurizer comprises 55 g $Fe_{21.333}O_{32}$, 22 g anatase type $TiO_2$, and 15 g bentonite clay.

The desulfurizer comprising $Fe_{21.333}O_{32}$ as an active component is used in a desulfurization process is described as below:

The above catalyst is filed into a fixed bed reactor to contact fully with gas-field water containing $H_2S$ under a temperature of 35° C., a pressure of 0.2 MPa, and a volumetric space velocity of 10000 h$^{-1}$ to carry out desulfurization reaction. After the desulfurization reaction is completed, a spent desulfurizer is produced, i.e. obtaining a waste agent resulting from use of a desulfurizer comprising $Fe_{21.333}O_{32}$ as an active component.

The obtained waste agent was regenerated described as below:

1) The waste agent is dispersed in water to form a slurry.

2) The slurry is heated to a temperature of 45° C. under atmospheric pressure. Then hydrogen peroxide is added to the slurry by using a peristaltic pump and air is introduced at a hydrogen peroxide flow rate of 500 mL/min and an air flow rate of 100 mL/min to perform reactions for a period of 5 min under magnetic stirring.

3) After the reaction is completed, the resulted reaction solution is filtered, producing a precipitate which is then washed three times with water and then dried naturally to obtain a regeneration product of the above-mentioned waste agent.

Adding sulfur: Solid sulfur powder is added to the regeneration product until the molar ratio of iron element to sulfur element reaches 1:4, thereby ensuring that the molar ratio of iron element to sulfur element in the reaction system is 1:4.

2. Pretreatment of the catalyst: The above catalyst is mixed with residual oil and wet-milled by a colloid mill to obtain a catalyst-containing premixed slurry, which has a catalyst content of 14 wt %.

Preparation of a Slurry Containing Catalyst and Biomass:

The biomass powder, lard oil and the catalyst-containing premixed slurry are sequentially mixed in a premixer and a stirring tank. A vacuum system is used to maintain a vacuum degree of 20 kPa and a temperature of 130° C. in the premixer and the stirring tank to prepare a slurry containing catalyst and biomass. The straw is present in a total amount of 33 wt % in the slurry, and the slurry has a water content of 12 wt %, and a catalyst content of 2 wt %, wherein, the catalyst has an average particle size of 36 μm.

Conversion Reaction:

The slurry containing catalyst and biomass coming from the slurry preparation system enters the buffer tank 1-1 (120° C.), and a stirrer is provided in the buffer tank 1-1 to prevent solid particle form depositing in the slurry. The slurry coming from the bottom of the buffer tank 1-1 is pressurized to 0.5 MPa by using a low-pressure pump 2-1, then divided into two parts, and one part enters a high-pressure booster pump 3-1 through an inlet thereof to be further pressurized to 19 MPa, and the other part returns to the buffer tank 1-1.

The pressurized slurry is mixed with a partial of CO-containing gas, and enters a second heat exchange system 4-1, and is heated to 300° C. through a first heating furnace 5-1, then enters suspended bed reactor 8-1 to carry out conversion reaction under a pressure of 18.7 MPa and a temperature of 400° C. The conversion reaction lasts for 90 min, during which a volume ratio of the mixture of CO and $H_2$ to the slurry is controlled at 600:1.

Fresh CO-containing gas is pressurized by a fresh gas compression system 16-1 and mixed with the circulating gas in the system to obtain a mixed gas. The mixed gas is subjected to heat exchange in a first heat exchange system 6-1, then divided into two parts, and one part is sent to mix with the raw slurry material prior to the raw material heating furnace, and the other part is heated to 420° C. in a second heating furnace 7-1, and then is introduced into a suspended bed reactor 8-1 to carry out reactions. A cold cycle gas line is provided in the reactor to continuously inject a circulating cold air having a temperature of 60° C. into the reactor, thus to ensure that the temperature in the reactor is 400° C. The reactor is a cold wall reactor, wherein, the material is introduced from the bottom thereof and discharged from the top thereof. The reaction product from the top of the reactor is introduced into a hot high pressure separator 9-1 to carry out gas-liquid-solid separation under a pressure of 16 MPa and a temperature of 390° C. The hot high liquid separated from the bottom of the hot high pressure separator is depressurized by a pressure reducing system 11-1 and then fed into a hot low pressure separator 12-1 operated at a pressure of 2 MPa and a temperature of 320° C. to separate and remove hydrogen and the other light components that have been dissolved in the hot high liquid to obtain hot low liquid, which is sent to a second separation system 14-1 to obtain main products such as a gas, a biomass heavy oil and a solid residue. The second separation system is provided with means for separating the solid residue, so that a large amount of catalyst is discharged as a solid residue. A part of the catalyst-containing heavy oil separated from the second separation system is discharged as a product, and the remaining is mixed with the raw material oil and then enters the raw material buffer tank for refining.

The hot high gas coming from the top of the hot high-pressure separator is sent into a cooling system 10-1, the material outlet parameters of which are controlled as: a pressure of 12 MPa, and a temperature of 200° C., and then sent into a first separation system 13-1. The cold high gas on the top of a cold high pressure separator in the first separation system is sent to a circulating gas compression system 15-1 for pressurizing. The pressurized circulating gas is fed into the reactor for recycling. The main products of the first separation system are a gas and a bio-light oil.

Wherein, the pressure reducing system includes a high pressure three-way angle valve (V1), two high pressure cut-off angle valves (a first high pressure cut-off angle valve V2, and a second high pressure cut-off angle valve V3), two mass of residual solid organic materials in the reaction product)/the total mass of solid organic material in the raw materials. Wherein, said "solid organic material" in the conversion rate of solid organic material has no water and no ash basis (the same as below).

The yield of oils converted from solid organic material %=the mass of liquid phase oils at normal temperature and pressure in the conversion products of solid organic material/the total feed mass of solid organic material in raw materials.

The rate of water produced in the reaction %=(the water mass of the reaction products−total mass of water added initially in the reaction or carried by the raw materials)/the mass of the total charge raw materials. When this value is <0, it is marked as "none".

Yield of light oil converted from solid biomass=proportion of light oil with a distillation range of no more than 360° C. in oils converted from solid biomass.

The corresponding test results are shown in Table 12:

TABLE 12

Product distributions after conversion of solid organic materials

| Conversion results | Conversion rate of solid organic material % | Yield of oils converted from solid organic material % | Carbon content of oils converted from solid organic material wt % | Hydrogen content of oils converted from solid organic material wt % | Oxygen content of oils converted from solid organic material wt % | Calorific value of oils converted from solid organic material (times of the calorific value of standard fuel oil) | Rate of water produced in the reaction wt % | Yield of light oil converted from solid biomass wt % |
|---|---|---|---|---|---|---|---|---|
| Embodiment 86 | 99.2 | 50.1 | 82.1 | 12.0 | 4.6 | 0.93 | 3.0 | 56 |
| Embodiment 87 | 98.0 | 51.3 | 82.8 | 12.0 | 3.1 | 0.924 | none | 64 |
| Embodiment 88 | 99.5 | 52.4 | 83.0 | 12.5 | 2.7 | 0.93 | 1.0 | 59 |
| Embodiment 89 | 98.8 | 51.7 | 83.4 | 11.2 | 4.3 | 0.93 | none | 51 |
| Embodiment 90 | 99.2 | 51.5 | 82.7 | 12.3 | 3.0 | 0.918 | 0.8 | 63 | high pressure modulating pressure reducing angle valves (a first high pressure modulating pressure reducing angle valve V4, and a second high pressure modulating pressure reducing angle valve V5), two high pressure cut-off straight-through valves (a first high pressure cut-off straight-through valve V6, and a second high pressure cut-off straight-through valve V7), and connecting lines between the above four valves disposed on the pipeline. The inlet pipeline of the high pressure three-way angle valve is connected with the bottom pipeline of the hot high pressure separator; the outlet of the high pressure three-way angle valve is divided into two pipelines, and each line is respectively connected with an inlet pipeline of a high pressure cut-off angle valve; the outlet pipeline of the high pressure cut-off angle valve is connected to an inlet pipeline of the high pressure modulating pressure reducing angle valve, and the outlet pipeline of the high pressure modulating pressure reducing angle valve is connected with an inlet pipeline of the high pressure cut-off straight-through valve, and the outlet lines of the high pressure shut-off valve are connected to a hot low pressure separator respectively.

Test Example 9

The oil products prepared in the Embodiments 86-90 of the present invention are tested and analyzed according to the following methods.

The conversion rate of solid organic material %=(the total mass of solid organic materials in the raw materials−the Apparently, the aforementioned embodiments are merely examples illustrated for clearly describing the present invention, rather than limiting the implementation ways thereof. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present invention.

We claim:

1. A conversion process for an organic material, characterized by comprising the following steps:
preparing a first slurry that comprises a catalyst and an organic material, wherein the catalyst is at least one selected from the group consisting of an iron oxide compound, a desulfurization waste agent resulting from use of an iron oxide compound as desulfurizer, and a regeneration product of the desulfurization waste agent, and wherein the first slurry comprises water;
carrying out a first conversion reaction by mixing the first slurry with a pure CO gas or a CO containing gas and keeping a molar ratio of iron element to sulfur element of 1:(0.5-5) in a reaction system, thereby obtaining a first oil product; and
the conversion process further comprises carrying out a second conversion reaction by mixing the first oil product with a pure CO or a CO containing gas and keeping a molar ratio of iron element to sulfur element of 1:(0.5-5) in a reaction system, thereby obtaining a second oil product.

2. The conversion process according to claim 1, characterized in that a sulfur-containing substance is added to the catalyst to control the reaction system to have a molar ratio of iron element to sulfur element of 1:(0.5-5).

3. The conversion process according to claim 2, characterized in that the sulfur-containing substance is at least one selected from the group consisting of sulfur, hydrogen sulfide, and carbon disulfide.

4. The conversion process according to claim 1, characterized in that the water comprised in the first slurry comes from water inherently contained in the organic material, and based on a total weight of the organic material, water accounts for 500 ppm to 20%; or,
the water comprised in the first slurry comes from adding of outside water.

5. The conversion process according to claim 1, characterized in that the CO containing gas has a CO volume content of no less than 15%.

6. The conversion process according to claim 5, characterized in that the CO containing gas is a gas mixture of CO and H2 or a synthesis gas.

7. The conversion process according to claim 1, characterized in that the desulfurization waste agent is at least one selected from the group consisting of a waste agent of a desulfurizer comprising iron oxide as an active component, a waste agent of a desulfurizer comprising Fe21.333O32 as an active component, and a waste agent of a desulfurizer comprising FeOOH as an active component; or
the regeneration product is at least one selected from the group consisting of a regeneration product of a desulfurization waste agent of a desulfurizer comprising iron oxide as an active component, a regeneration product of a desulfurization waste agent of a desulfurizer comprising Fe21.333O32 as an active component, and a regeneration product of a desulfurization waste agent of a desulfurizer comprising FeOOH as an active component.

8. The conversion process according to claim 7, characterized in that the iron oxide is Fe2O3 and/or Fe3O4.

9. The conversion process according to claim 8, characterized in that the Fe2O3 is at least one selected from the group consisting of α-Fe2O3, α-Fe2O3.H2O, γ-Fe2O3, γ-Fe2O3.H2O, amorphous Fe2O3, and amorphous Fe2O3.H2O;
the Fe3O4 is of cubic crystal system; and
the FeOOH is at least one selected from the group consisting of α-FeOOH, β-FeOOH, γ-FeOOH, δ-FeOOH, θ-FeOOH, and amorphous FeOOH.

10. The conversion process according to claim 1, characterized in that the regeneration product is selected as the catalyst, and the regeneration product is obtained with a slurry method by subjecting the desulfurization waste agent to oxidation, vulcanization and oxidation.

11. The conversion process according to claim 10, characterized in that the slurry method comprises the following steps:
preparing a second slurry by mixing the desulfurization waste agent with water or an alkali solution;
carrying out a first oxidation reaction by adding an oxidizing agent to the second slurry to obtain an oxidized slurry;
carrying out a vulcanization reaction by adding a vulcanizing agent to the oxidized slurry to obtain a vulcanized slurry;
carrying out a second oxidation reaction by adding an oxidizing agent to the vulcanized slurry;
repeating the vulcanization reaction and the second oxidation reaction to obtain a final slurry; and
subjecting the final slurry to solid-liquid separation to obtain the regeneration product.

12. The conversion process according to claim 1, characterized in that the first conversion reaction is carried out at a reaction pressure of 5-22 MPa and a reaction temperature of 100-470° C.

13. The conversion process according to claim 12, characterized in that the first conversion reaction has a reaction time of no less than 15 min.

14. The conversion process according to claim 1, characterized in that the catalyst is present in an amount of 0.1 to 10% by weight in the first slurry; and
the catalyst has an average particle diameter of from 0.1 μm to 5 mm.

15. The conversion process according to claim 1, characterized in that said carrying out a first conversion reaction by mixing the first slurry with a pure CO gas or a CO containing gas comprises the following steps:
pressurizing and heating a pure CO gas or CO containing gas to a pressure of 5-22 MPa and a temperature of 150-600° C., then mixing with the first slurry in a reaction system to carry out a first conversion reaction.

16. The conversion process according to claim 1, characterized in that said carrying out the first conversion reaction by mixing the first slurry with a pure CO gas or a CO containing gas comprises the following steps:
dividing the pure CO gas or CO containing gas into a first flow and a second flow, pressurizing and heating the first flow to a pressure of 5-22 MPa and a temperature of 150-600° C., then introducing the first flow though a first inlet into the first slurry in a reaction system to carry out a first conversion reaction, and
pressurizing and heating the second flow to a pressure of 5-22 MPa and a temperature of 300-600° C., then introducing the second flow though a second inlet into the first slurry in a reaction system to carry out a first conversion reaction.

17. The conversion process according to claim 1, characterized in that a volume ratio of the pure CO gas or CO containing gas to the first slurry is (50-10000):1.

18. The conversion process according to claim 1, characterized in that the reaction system is carried out in a reactor, which is selected from the group consisting of a suspended bed reactor, a slurry bed reactor, a bubbling column reactor, a fluidized bed reactor, a one-batch reactor; or
the reactor is any one or more of a suspended bed reactor, a slurry bed reactor, a bubbling bed reactor, a fluidized bed reactor, and a one-batch reactor connected in series or in parallel.

19. The conversion process according to claim 1, characterized in that the conversion process further comprises pressurizing and heating the first slurry at a pressure of 5 Mpa-22 Mpa, and a temperature of 50-430° C. prior to the first conversion reaction.

20. The conversion process according to claim 1, characterized in that the CO-containing gas is obtained by gasifying a hydrocarbon.

21. The conversion process according to claim 20, characterized in that the gasifying is carried out at a temperature of 350-1600° C. and a pressure of 1-20 MPa, and the hydrocarbon is at least one selected from the group consisting of coal, mineral oil, coke, biomass, a regenerated bio oil, natural gas, methane, biogas, methanol, and ethanol.

22. The conversion process according to claim 1 characterized in that the second conversion reaction has a reaction pressure of 5-22 MPa and a reaction temperature of 100-470° C.

23. The conversion process according to claim 1, characterized in that the first conversion reaction has a reaction temperature of 100-350° C., the second conversion reaction has a reaction temperature of 300-470° C., and the reaction temperature of the first conversion reaction is lower than the reaction temperature of the second conversion reaction.

24. The conversion process according to claim 1, characterized in that the first conversion reaction has a reaction time of no less than 15 min; and
the second conversion reaction has a reaction time of no less than 15 min.

25. The conversion process according to claim 1, characterized in that after carrying out the first conversion reaction and before carrying out the second conversion reaction, the first oil product is subjected to separation to obtain a light oil and a heavy oil; and a further amount of the catalyst and/or a hydrogenation catalyst is added to the first oil product.

26. The conversion process according to claim 1, characterized in that when the organic material is biomass, said preparing the first slurry comprises the following steps:
pretreatment of raw materials: collecting and pulverizing a biomass to a particle size of 0.2 μm to 5 cm;
compression: compressing and molding the pulverized biomass;
second pulverization: pulverizing the compressed biomass again to a particle size of 0.1 μm to 500 μm, thereby obtaining a biomass powder;
slurry preparation: mixing the biomass powder with a flowing medium to obtain a mixed slurry, wherein the biomass powder is present in an amount of 10 to 60% by weight in the mixed slurry; and
adding the catalyst in any of the above steps.

27. The conversion process according to claim 26, characterized in that the compressed biomass has a true density of between 0.75 and 1.5 kg/m3.

28. The conversion process according to claim 26, characterized in that the compression step has a compression pressure of 0.5-5 MPa and a compression temperature of 30-60° C.

29. The conversion process according to claim 26, characterized in that the catalyst is present in an amount of 0.1 to 10% by weight in the first slurry.

30. The conversion process according to claim 26, characterized in that the first slurry is prepared by grinding pulping, which is stirring pulping, dispersing pulping, emulsifying pulping, shearing pulping, homogeneous pulping and colloid grinder pulping.

31. The conversion process according to claim 26, characterized in that the biomass is selected from the group consisting of a crop straw, a wood chip, an oil residue, a leaf, an algae, and any combination thereof; and
the flowing medium is an oil or water, wherein the oil is selected from the group consisting of hogwash oil, rancid oil, waste lubricating oil, waste engine oil, heavy oil, residual oil, washing oil, anthracene oil, and any combination thereof.

32. The conversion process according to claim 1, characterized by comprising subjecting the second oil product to a first separation operation to produce a light component and a heavy component;
carrying out vacuum distillation on the heavy component to obtain a light fraction;
mixing the light component with the light fraction to form a mixture, carrying out a hydrogenation reaction on the mixture to obtain a hydrogenation product; and
subjecting the hydrogenation product to fractionation operation to obtain a light oil.

33. The conversion process according to claim 32, characterized in that the vacuum distillation is carried out at a temperature of 320-400° C. under a pressure of 5-20 kPa.

34. The conversion process according to claim 32, characterized in that the hydrogenation reaction is carried out under following conditions:
a reaction temperature of 300-440° C.;
a reaction pressure of 6-25 MPa;
a hydrogen/oil volume ratio of 1000-3000; and
a space velocity of 0.3-2 h−1.

35. The conversion process according to claim 32, characterized in that the fractionation operation is carried out at a temperature of 340-390° C.

36. The conversion process according to claim 32, characterized by further comprising a step of collecting a partial distillate oil obtained by the vacuum distillation and a heavy fraction obtained by the fractionation operation, and using the partial distillate oil and the heavy fraction as a pore filling oil and/or a solvent oil.

37. The conversion process according to claim 32, characterized in that, before subjecting the hydrogenation product to fractionation operation, the hydrogenation product is subjected to a second separation operation to obtain hydrogen gas, a gas-phase light hydrocarbon and a liquid phase, wherein the hydrogen gas is circulated and used in the hydrogenation reaction.

38. The conversion process according to claim 32, characterized in that the hydrogenation catalyst comprises at least one selected from the group consisting of:
1) amorphous iron oxide and/or amorphous iron oxide hydroxide; and
2) amorphous aluminum oxide loading an active component, wherein the active component comprises at least one selected from the group consisting of oxides of metals of group VIB, group VIM and group VIII, and the active component has a content of 10 wt % to 25 wt %.

39. The conversion process according to claim 1, characterized in that the conversion process further comprises carrying out a second conversion reaction by mixing the first oil product with hydrogen and keeping a molar ratio of iron element to sulfur element of 1:(0.5-5) in a reaction system, thereby obtaining a second oil product.

40. The conversion process according to claim 39, characterized in that both the first conversion reaction and the second conversion reaction have a reaction pressure of 5-22 MPa and a reaction temperature of 100-470° C.

41. The conversion process according to claim 39, characterized in that the first conversion reaction has a reaction temperature of 100-400° C., and the second conversion reaction has a reaction temperature of 300-470° C.

42. The conversion process according to claim 39, characterized in that the first conversion reaction has a reaction time of no less than 15 min; and
the second conversion reaction has a reaction time of no less than 15 min.

43. The conversion process according to claim 39, characterized in that a further amount of the catalyst and/or a hydrogenation catalyst is added to the first oil product.

44. The conversion process according to claim 43, characterized in that the hydrogenation catalyst is composed of a carrier and an active component loaded thereon, and the active component is loaded in an amount of 0.5-15% based on the total weight of the hydrogenation catalyst.

45. The conversion process according to claim 43, characterized in that the active component is selected from the group consisting of oxides of Mo, Mn, W, Fe, Co, Ni, Pd, and any combination thereof; and
the carrier is at least one selected from the group consisting of silica, alumina, zeolite, and molecular sieve.

46. The conversion process according to claim 43, characterized in that, after the first conversion reaction and before the second conversion reaction, the first oil product is subjected to a separation operation to produce a light oil and a heavy oil.

47. The conversion process according to claim 39, characterized by comprising subjecting the second oil product to a first separation operation to produce a light component and a heavy component;
carrying out vacuum distillation on the heavy component to obtain a light fraction;
mixing the light component with the light fraction to form a mixture, carrying out a hydrogenation reaction on the mixture to obtain a hydrogenation product; and
subjecting the hydrogenation product to fractionation operation to obtain a light oil.

48. The conversion process according to claim 47, characterized in that the hydrogenation reaction is carried out under the following conditions:
a reaction temperature of 300-450° C.;
a reaction pressure of 5-26 MPa;
a hydrogen/oil volume ratio of 1000-3000; and
a space velocity of 0.3-2 h−1.

49. The conversion process according to claim 47, characterized in that the fractionation operation is carried out at a temperature of 300-400° C.

50. The conversion process according to claim 47, characterized by further comprising a step of collecting a partial distillate oil obtained by the vacuum distillation and a heavy fraction obtained by the fractionation operation, and adding the partial distillate oil and the heavy fraction to a first hydrogenation reaction.

51. The conversion process according to claim 47, characterized in that, before the hydrogenation product is subjected to fractionation operation, the hydrogenation product is subjected to a second separation operation to obtain hydrogen gas, a gas-phase light hydrocarbon and a liquid phase, wherein the hydrogen gas is circulated and used in the second conversion reaction and the hydrogenation reaction.

52. The conversion process according to claim 1, characterized in that when the organic material is biomass and coal, the conversion process further comprises preparing an aqueous slurry comprising a catalyst, coal and biomass according to the following steps:
pretreatment of biomass: collecting and pulverizing a biomass to a particle size of 0.2 μm to 5 cm;
compression of biomass: compressing and molding the pulverized biomass;
second pulverization of biomass: pulverizing the compressed biomass again to a particle size of 0.1-500 μm, thereby obtaining a biomass powder;
pulverizing the coal to a particle size of 0.1-500 μm, thereby obtaining a coal powder;
mixing the biomass powder and the coal powder with a solvent oil to obtain the aqueous slurry;
wherein, the catalyst is added in any of the above steps.

53. The conversion process according to claim 52, characterized in that the first conversion reaction is carried out at a reaction pressure of 5-22 MPa and a reaction temperature of 200-500° C.

54. The conversion process according to claim 53, characterized in that the first conversion reaction has a reaction time of no less than 15 min.

55. The conversion process according to claim 52, characterized in that the compressed biomass has a true density of between 0.75 and 2.0 kg/m3;
the compression step has a compression pressure of 0.5-10 MPa and a compression temperature of 30-70° C.;
the biomass powder has an amount of 5-99% by weight based on the total mass of the biomass powder and the coal power; and/or
the catalyst is present in an amount of 0.1-8% by weight in the aqueous slurry; and/or
the biomass powder and the coal power are present in an amount of 10-60% by weight and the water is present in an amount of 1-18% in the aqueous slurry.

56. The conversion process according to claim 52, characterized in that the aqueous slurry is prepared by grinding pulping, which is stirring pulping, dispersing pulping, emulsifying pulping, shearing pulping, homogeneous pulping and colloid grinder pulping;
the grinding pulping lasts for 8-60 min;
the biomass is selected from the group consisting of a crop straw, a wood chip, an oil residue, a leaf, kitchen waste, feces, animal carcasses, an algae, and any combination thereof; and
the solvent oil is a distillate oil from an animal oil, vegetable oil or petroleum, or is a coal tar or an oil produced by self-processing.

* * * * *